(12) United States Patent
Xu

(10) Patent No.: US 11,500,534 B2
(45) Date of Patent: Nov. 15, 2022

(54) BIOMETRIC RECOGNITION INTERACTION METHOD, GRAPHICS INTERACTION INTERFACE, AND RELATED APPARATUS

(71) Applicant: HUAWEI TECHNOLOGIES CO., LTD., Guangdong (CN)

(72) Inventor: Jie Xu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/296,852

(22) PCT Filed: Oct. 15, 2019

(86) PCT No.: PCT/CN2019/111209
§ 371 (c)(1),
(2) Date: May 25, 2021

(87) PCT Pub. No.: WO2020/108133
PCT Pub. Date: Jun. 4, 2020

(65) Prior Publication Data
US 2022/0019325 A1 Jan. 20, 2022

(30) Foreign Application Priority Data
Nov. 30, 2018 (CN) .......................... 201811458665.1

(51) Int. Cl.
*G06V 40/13* (2022.01)
*G06F 3/0488* (2022.01)
(Continued)

(52) U.S. Cl.
CPC .......... *G06F 3/0488* (2013.01); *G06F 3/0482* (2013.01); *G06F 3/04817* (2013.01);
(Continued)

(58) Field of Classification Search
CPC .. G06F 3/0488; G06F 3/0482; G06F 3/04817; G06F 21/32; G06V 40/67; G06V 40/1365; G06V 40/172
See application file for complete search history.

(56) References Cited

U.S. PATENT DOCUMENTS 8,874,032 B2 10/2014 Yang
9,996,254 B2 6/2018 Hemaraj et al.
(Continued)

FOREIGN PATENT DOCUMENTS

| CN | 103076966 A | 5/2013 |
| CN | 103888607 A | 6/2014 |

(Continued)

OTHER PUBLICATIONS

Aun, et al., "A Temporal-Aware Signature Extraction Method Using Sliding-Window Mechanism for Scalable, Cost-Effective and Accurate Traffic Classification," 2017 7th IEEE International Conference on Control System, Computing and Engineering (ICCSCE), Nov. 24-26, 2017, 6 pages.
(Continued)

*Primary Examiner* — Stephen G Sherman
(74) *Attorney, Agent, or Firm* — Fish & Richardson P.C.

(57) ABSTRACT

Methods for biometric recognition interaction are provided. One example method includes displaying a gallery application interface that displays at least one album entry that is different from a hidden albums entry, and receiving a sliding operation of a user in the gallery application interface. A start location of the sliding operation is a top of the gallery application interface and a trend of the sliding operation is from the top to a bottom of the gallery application interface. If a sliding distance of the sliding operation is greater than a first distance threshold or duration of the sliding operation is greater than a first duration threshold, collecting face information of the user. If the face information matches a
(Continued)

face information template, displaying the hidden albums entry. Or, if the face information matches a face information template, displaying a hidden albums interface. The hidden albums interface includes hidden photos.

20 Claims, 106 Drawing Sheets

(51) Int. Cl.
| | |
|---|---|
| G06V 40/16 | (2022.01) |
| G06V 40/60 | (2022.01) |
| G06V 40/12 | (2022.01) |
| G06F 3/04817 | (2022.01) |
| G06F 3/0482 | (2013.01) |
| G06F 21/32 | (2013.01) |

(52) U.S. Cl.
CPC .......... *G06F 21/32* (2013.01); *G06V 40/1365* (2022.01); *G06V 40/172* (2022.01); *G06V 40/67* (2022.01)

(56) References Cited

U.S. PATENT DOCUMENTS

| | | | | |
|---|---|---|---|---|
| 2013/0321305 | A1* | 12/2013 | Liang | ............... H04M 1/67 345/173 |
| 2014/0313307 | A1* | 10/2014 | Oh | ............... G06F 3/012 348/78 |
| 2015/0135135 | A1* | 5/2015 | Chiu | ............... G06F 3/0488 715/799 |
| 2019/0080072 | A1* | 3/2019 | Van Os | ............... H04L 9/3231 |

FOREIGN PATENT DOCUMENTS

| | | |
|---|---|---|
| CN | 104598792 A | 5/2015 |
| CN | 104793867 A | 7/2015 |
| CN | 105160274 A | 12/2015 |
| CN | 105468281 A | 4/2016 |
| CN | 105573643 A | 5/2016 |
| CN | 106168891 A | 11/2016 |
| CN | 106209805 A | 12/2016 |
| CN | 106570370 A | 4/2017 |
| CN | 106815509 A | 6/2017 |
| CN | 106843637 A | 6/2017 |
| CN | 107317926 A | 11/2017 |
| CN | 107430654 A | 12/2017 |
| CN | 108052819 A | 5/2018 |
| CN | 108171034 A | 6/2018 |
| CN | 108369618 A | 8/2018 |
| CN | 108701000 A | 10/2018 |
| CN | 109635542 A | 4/2019 |
| EP | 2813932 A1 | 12/2014 |
| WO | 2012028773 A1 | 3/2012 |

OTHER PUBLICATIONS

Capello et al., "Rendez-Vous and Docking Position Tracking via Sliding Mode Control," 2015 American Control Conference (ACC), Jul. 1-3, 2015, 6 pages.

Chen et al., "Terminal Sensitive Data Protection Method by Self-Regulated Access Time," Computer Engineering and Software, vol. 38, No. 12, 2017, 6 pages (with English abstract).

Office Action issued in Chinese Application No. 201811458665.1 dated Nov. 18, 2021, 14 pages (with English translation).

Zhang et al., "Sensitive association rule hiding based on sliding window," Journal of Jilin University (Engineering and Technology Edition), vol. 43, No. 1, Jan. 2013, 7 pages (with English abstract).

PCT International Search Report and Written Opinion issued International Application No. PCT/CN2109/111209 dated Dec. 30, 2019, 19 pages (with English translation).

Extended European Search Report issued in European Application No. 19890912.9 dated Nov. 11, 2021, 5 pages.

Office Action issued in Indian Application No. 202117021125 dated Feb. 24, 2022, 6 pages.

Office Action issued in Chinese Application No. 201811458665.1 dated Aug. 9, 2022, 15 pages.

Ponecxp [online], "Where can I find the private photo album of Redmi mobile phones?" Zhidao.Baidu.com recommendation, received at URL <https://zhidao.baidu.com/question/1112045944073656219.html>, response dated Aug. 19, 2019, 10 pages (with English translation).

* cited by examiner

BIOMETRIC RECOGNITION INTERACTION METHOD, GRAPHICS INTERACTION INTERFACE, AND RELATED APPARATUS

CROSS-REFERENCE TO RELATED APPLICATIONS

This application is a National Stage of International Application No. PCT/CN2019/111209, filed on Oct. 15, 2019, which claims priority to Chinese Patent Application No. 201811458665.1, filed on Nov. 30, 2018, both of which are hereby incorporated by reference in their entireties.

TECHNICAL FIELD

This application relates to the field of electronic technologies, and in particular, to a biometric recognition interaction method and a related apparatus.

BACKGROUND

As people attach more importance to information security issues, biometric feature-based identity identification technologies such as fingerprint recognition and face-iris recognition are rapidly developed. Recognition based on a single biometric feature may be affected by several aspects: (1) limitations of a use environment, such as a fingerprint requires contact collection, iris requires not too strong or too weak light intensity of a photographing environment, and a human face has specific requirements for an illumination angle, a photographing angle, and a facial expression; and (2) instability of the biometric feature: For example, the fingerprint is susceptible to trauma or dirt, facial recognition is susceptible to uneven illumination, excessive illumination, dirt, and the like, and when a distance is far, iris is susceptible to visible light. Therefore, a current terminal usually provides a user with more than one biometric feature-based identity authentication manner, for example, facial recognition and fingerprint recognition.

Currently, before facial recognition, the user usually needs to find a function control related to facial recognition, and then tap the function control to start recognition. For example, to open a hidden album, the user needs to open a gallery application, and then tap a "Hidden albums" function control in "More functions" in Gallery, and then, the terminal starts facial recognition. This operation process is complex.

Therefore, how to simplify operation steps of the user becomes a problem that needs to be resolved.

SUMMARY

Embodiments of this application provide a biometric recognition interaction method, a graphics interaction interface, and a related apparatus, thereby simplifying an operation of triggering biometric recognition by a user.

In the embodiments of this application, an electronic device displays a first interface, and the first interface is not a lock screen interface, to be specific, is an interface displayed after the electronic device is unlocked. Then, the electronic device receives a sliding operation of a user in the first interface. If it is determined that a start location and a sliding distance that are of the sliding operation meet a specified condition, a facial recognition function is enabled; and if facial recognition succeeds, the electronic device performs a specified function. In this way, interaction steps used by the electronic device to enable facial recognition can be reduced, and an interaction step between the electronic device and the user can be improved.

The first interface may be a gallery application interface, and therefore, the specified function may be displaying a hidden album. The first interface may be alternatively a page of a home screen, and therefore, the specified function may be displaying a hidden application. The first interface may be alternatively a system settings interface, and therefore, the specified function may be logging in to a system account associated with a face information template. The first interface may be alternatively an application login interface (for example, a WeChat login interface), and therefore, the specified function may be logging in to an application account associated with a face information template. The first interface may be alternatively an order payment page, and therefore, the specified function may be completing a payment process of an order. In addition, the first interface may be alternatively a page of a payment application (for example, a home page of Alipay), and the specified function may be displaying a payment code (for example, a payment QR code, a payment barcode, and a payment digital code).

According to a first aspect, this application provides a method for displaying a hidden album, including: First, an electronic device displays a gallery application interface, where the gallery application interface displays at least one album entry, and the at least one album entry is different from a "Hidden albums" entry. Then, the electronic device receives a sliding operation of a user in the gallery application interface, where a start location of the sliding operation is the top of the gallery application interface, and a trend of the sliding operation is from the top of the gallery application interface to a bottom of the gallery application interface. If a sliding distance of the sliding operation is greater than a first distance threshold or duration of the sliding operation is greater than a first duration threshold, the electronic device collects face information of the user. If the collected face information matches a stored face information template, the electronic device displays the "Hidden albums" entry, and in response to selection of the "Hidden albums" entry by the user, the electronic device displays the "Hidden albums" interface. Alternatively, if the collected face information matches a stored face information template, the electronic device displays a "Hidden albums" interface, where the "Hidden albums" interface includes one or more hidden photos. In this way, facial recognition can be quickly performed on the user, to display a hidden album or the hidden photo after facial recognition succeeds.

In an implementation, the electronic device may display the "Hidden albums" entry or display the "Hidden albums" interface only when the collected face information matches the face information template and the sliding distance of the sliding operation is greater than a second distance threshold. The second distance threshold is greater than the first distance threshold. In another implementation, the electronic device may display the "Hidden albums" entry or display the "Hidden albums" interface only when the collected face information matches the face information template and the duration of the sliding operation is greater than a second duration threshold.

In an implementation, the method further includes: If the sliding distance is greater than the first distance threshold, the electronic device displays a fingerprint recognition icon in an area corresponding to a fingerprint recognition module; or if the duration of the sliding operation is greater than the first duration threshold, the electronic device displays the fingerprint recognition icon in the area corresponding to the fingerprint recognition module; or if the collected face information does not match the stored face information template, the electronic device displays the fingerprint recognition icon in the area corresponding to the fingerprint recognition module. In this way, display of the fingerprint recognition icon may be triggered by the sliding operation, thereby preventing the fingerprint recognition icon from continuously blocking a touchscreen.

In an implementation, the method further includes: When the electronic device detects that a finger of the user slides onto the fingerprint recognition icon in the sliding operation or the user touches the fingerprint recognition icon, the electronic device collects fingerprint information of the user; the electronic device determines whether the collected fingerprint information matches a stored fingerprint information template; and if the collected fingerprint information matches the stored fingerprint information template, the electronic device displays the "Hidden albums" entry in the gallery application interface, or the electronic device displays the "Hidden albums" interface. In this way, in a process in which the user performs the sliding operation, facial recognition is first triggered and then fingerprint recognition is triggered, thereby reducing operation steps performed by the user to trigger facial recognition and fingerprint recognition, and improving user experience.

In an implementation, the method further includes: The electronic device displays, in a process of matching the collected face information with the stored face information template, a prompt indicating that facial recognition is in progress. The prompt indicating that recognition is in progress is displayed in an area that is emptied after the at least one album entry moves downward. In this way, when the prompt indicating that recognition is in progress is displayed in the area that is emptied after the at least one album entry moves downward, a prompt indicating that facial recognition has been performed can be fed back to the user, thereby improving interaction experience, reducing blocking of a non-blank area on the touchscreen, and improving screen utilization.

In an implementation, the method further includes: If the face information matches the stored face information template, the electronic device displays a first prompt, to notify the user that facial recognition succeeds, or if the face information does not match the stored face information template, the electronic device displays a second prompt, to notify the user that facial recognition fails. The first prompt and the second prompt are displayed in the area that is emptied after the at least one album entry moves downward. In this way, a facial recognition result is displayed in the area that is emptied after the at least one album entry moves downward, thereby improving interaction experience, reducing blocking of the non-blank area on the touchscreen, and improving screen utilization.

In an implementation, the first prompt or the second prompt may be displayed after a facial recognition process is completed. In another implementation, the first prompt or the second prompt may be displayed when a facial recognition process is completed and the sliding distance of the sliding operation is greater than the second distance threshold. In another implementation, the first prompt or the second prompt may be displayed when a facial recognition process is completed and the duration of the sliding operation is greater than the second distance threshold.

In an implementation, the method further includes: Before collecting the face information of the user, the electronic device enables a module for collecting the face information. After completing the process of matching the collected face information with the stored face information template, the electronic device disables the module for collecting the face information. In this way, a facial recognition module can be prevented from being always enabled, thereby reducing power consumption.

In an implementation, the method further includes: The electronic device enables the fingerprint recognition module when or before displaying the fingerprint recognition icon; and the electronic device skips displaying the fingerprint recognition icon after completing the process of matching the collected fingerprint information with the stored fingerprint information template. In this way, the fingerprint recognition icon can be prevented from blocking a display interface on the touchscreen for a long time, and the fingerprint recognition module under the screen can be prevented from being always enabled, thereby reducing power consumption.

According to a second aspect, this application provides a method for displaying a hidden application, including: First, an electronic device displays a page of a home screen, where the page of the home screen displays an icon of at least one application, and the icon of the at least one application is different from an icon of a hidden application. Then, the electronic device receives a sliding operation of a user on the page of the home screen. If a sliding distance of the sliding operation is greater than a first distance threshold or duration of the sliding operation is greater than a first duration threshold, the electronic device collects face information of the user. If the collected face information matches a stored face information template, the electronic device displays the icon of the hidden application. In this way, facial recognition can be quickly performed on the user, to display the hidden application after facial recognition succeeds.

In an implementation, the electronic device may display the hidden application only when the collected face information matches the face information template and the sliding distance of the sliding operation is greater than a second distance threshold. The second distance threshold is greater than the first distance threshold. In another implementation, the electronic device may display the hidden application only when the collected face information matches the face information template and the duration of the sliding operation is greater than a second duration threshold.

In an implementation, the page of the home screen is a rightmost page of the home screen, a start location of the sliding operation is the right side of the rightmost page, and a trend of the sliding operation is leftward. Alternatively, the page of the home screen is a leftmost page of the home screen, a start location of the sliding operation is the left side of the leftmost page, and a trend of the sliding operation is rightward.

In an implementation, the method further includes: If the sliding distance is greater than the first distance threshold, the electronic device displays a fingerprint recognition icon in an area corresponding to a fingerprint recognition module; or if the duration of the sliding operation is greater than the first duration threshold, the electronic device displays the fingerprint recognition icon in the area corresponding to the fingerprint recognition module; or if the collected face information does not match the stored face information template, the electronic device displays the fingerprint recognition icon in the area corresponding to the fingerprint recognition module. In this way, display of the fingerprint recognition icon may be triggered by the sliding operation, thereby preventing the fingerprint recognition icon from continuously blocking a touchscreen.

In an implementation, the method further includes: When the electronic device detects that a finger of the user slides onto the fingerprint recognition icon in the sliding operation or the user touches the fingerprint recognition icon, the electronic device collects fingerprint information of the user; the electronic device determines whether the collected fingerprint information matches a stored fingerprint information template; and if the collected fingerprint information matches the stored fingerprint information template, the electronic device displays the icon of the hidden application. In this way, in a process in which the user performs the sliding operation, facial recognition is first triggered and then fingerprint recognition is triggered, thereby reducing operation steps performed by the user to trigger facial recognition and fingerprint recognition, and improving user experience.

In an implementation, the method further includes: The electronic device displays, in a process of matching the collected face information with the stored face information template, a prompt indicating that facial recognition is in progress. The prompt indicating that recognition is in progress is displayed in an area that is emptied after the icon of the at least one application moves. In this way, when the prompt indicating that recognition is in progress is displayed in the area that is emptied after the icon of the at least one application moves, a prompt indicating that facial recognition has been performed can be fed back to the user, thereby improving interaction experience, reducing blocking of a non-blank area on the touchscreen, and improving screen utilization.

In an implementation, the method further includes: If the face information matches the stored face information template, the electronic device displays a first prompt, to notify the user that facial recognition succeeds. If the face information does not match the stored face information template, the electronic device displays a second prompt, to notify the user that facial recognition fails. The first prompt and the second prompt are displayed in the area that is emptied after the icon of the at least one application moves. In this way, a facial recognition result is displayed in the area that is emptied after the icon of the at least one application moves, thereby improving interaction experience, reducing blocking of the non-blank area on the touchscreen, and improving screen utilization.

In an implementation, the first prompt or the second prompt may be displayed after a facial recognition process is completed. In another implementation, the first prompt or the second prompt may be displayed when a facial recognition process is completed and the sliding distance of the sliding operation is greater than the second distance threshold. In another implementation, the first prompt or the second prompt may be displayed when a facial recognition process is completed and the duration of the sliding operation is greater than the second distance threshold.

In an implementation, the method further includes: Before collecting the face information of the user, the electronic device enables a module for collecting the face information. After completing the process of matching the collected face information with the stored face information template, the electronic device disables the template for collecting the face information. In this way, a facial recognition module can be prevented from being always enabled, thereby reducing power consumption.

In an implementation, the method further includes: The electronic device enables the fingerprint recognition module when or before displaying the fingerprint recognition icon; and the electronic device skips displaying the fingerprint recognition icon after completing the process of matching the collected fingerprint information with the stored fingerprint information template. In this way, the fingerprint recognition icon can be prevented from blocking a display interface on the touchscreen for a long time, and the fingerprint recognition module under the screen can be prevented from being always enabled, thereby reducing power consumption.

According to a third aspect, this application provides a method for logging in to a system account, including: First, an electronic device displays a system settings interface. In this case, the electronic device has not logged in to a system account, or has logged in to another account other than an account associated with a stored face information template. The system settings interface includes at least one settings entry. Then, the electronic device receives a sliding operation of a user in the system settings interface, where a start location of the sliding operation is the top of the system settings interface, and a trend of the sliding operation is toward the bottom of the system setting interface. If a sliding distance of the sliding operation is greater than a first distance threshold or duration of the sliding operation is greater than a first duration threshold, the electronic device collects face information of the user. If the collected face information matches a stored face information template, the electronic device logs in to a system account associated with the face information template. In this way, facial recognition can be quickly performed on the user. After facial recognition succeeds, the electronic device can automatically log in to the system account associated with the face information template.

In an implementation, only when the collected face information matches the face information template and the sliding distance of the sliding operation is greater than a second distance threshold, the electronic device may log in to the system account associated with the face information template. The second distance threshold is greater than the first distance threshold. In another implementation, only when the collected face information matches the face information template and the duration of the sliding operation is greater than a second duration threshold, the electronic device may log in to the system account associated with the face information template.

In an implementation, the method further includes: If the sliding distance is greater than the first distance threshold, the electronic device displays a fingerprint recognition icon in an area corresponding to a fingerprint recognition module; or if the duration of the sliding operation is greater than the first duration threshold, the electronic device displays the fingerprint recognition icon in the area corresponding to the fingerprint recognition module; or if the collected face information does not match the stored face information template, the electronic device displays the fingerprint recognition icon in the area corresponding to the fingerprint recognition module. In this way, display of the fingerprint recognition icon may be triggered by the sliding operation, thereby preventing the fingerprint recognition icon from continuously blocking a touchscreen.

In an implementation, the method further includes: When the electronic device detects that a finger of the user slides onto the fingerprint recognition icon in the sliding operation or the user touches the fingerprint recognition icon, the electronic device collects fingerprint information of the user; the electronic device determines whether the collected fingerprint information matches a stored fingerprint information template; and if the collected fingerprint information matches the stored fingerprint information template, the electronic device logs in to the system account associated with the fingerprint information template. In this way, in a process in which the user performs the sliding operation, facial recognition is first triggered and then fingerprint recognition is triggered, thereby reducing operation steps performed by the user to trigger facial recognition and fingerprint recognition, and improving user experience.

In an implementation, the method further includes: The electronic device displays, in a process of matching the collected face information with the stored face information template, a prompt indicating that facial recognition is in progress. The prompt indicating that recognition is in progress is displayed in an area that is emptied after the at least one settings entry moves downward. In this way, when the prompt indicating that recognition is in progress is displayed in the area that is emptied after the at least one settings entry moves downward, a prompt indicating that facial recognition has been performed can be fed back to the user, thereby improving interaction experience, reducing blocking of a non-blank area on the touchscreen, and improving screen utilization.

In an implementation, the method further includes: If the face information matches the stored face information template, the electronic device displays a first prompt, to notify the user that facial recognition succeeds. If the face information does not match the stored face information template, the electronic device displays a second prompt, to notify the user that facial recognition fails. The first prompt and the second prompt are displayed in the area that is emptied after the at least one settings entry moves downward. In this way, a facial recognition result is displayed in the area that is emptied after an icon of the at least one settings entry moves, thereby improving interaction experience, reducing blocking of the non-blank area on the touchscreen, and improving screen utilization.

In an implementation, the first prompt or the second prompt may be displayed after a facial recognition process is completed. In another implementation, the first prompt or the second prompt may be displayed when a facial recognition process is completed and the sliding distance of the sliding operation is greater than the second distance threshold. In another implementation, the first prompt or the second prompt may be displayed when a facial recognition process is completed and the duration of the sliding operation is greater than the second distance threshold.

In an implementation, the method further includes: Before collecting the face information of the user, the electronic device enables a module for collecting the face information. After completing the process of matching the collected face information with the stored face information template, the electronic device disables the module for collecting the face information. In this way, a facial recognition module can be prevented from being always enabled, thereby reducing power consumption.

In an implementation, the method further includes: The electronic device enables the fingerprint recognition module when or before displaying the fingerprint recognition icon; and the electronic device skips displaying the fingerprint recognition icon after completing the process of matching the collected fingerprint information with the stored fingerprint information template. In this way, the fingerprint recognition icon can be prevented from blocking a display interface on the touchscreen for a long time, and the fingerprint recognition module under the screen can be prevented from being always enabled, thereby reducing power consumption.

According to a fourth aspect, this application provides an electronic device, and the electronic device includes one or more processors, one or more memories, and a touchscreen. The one or more memories are coupled to the one or more processors. The one or more memories are configured to store computer program code, and the computer program code includes a computer instruction. When the one or more processors execute the computer instruction, the electronic device is enabled to perform the method for displaying a hidden album in any one of the foregoing possible implementations of the first aspect, the method for displaying a hidden application in any one of the foregoing possible implementations of the second aspect, or the method for logging in to a system account in any one of the foregoing possible implementations of the third aspect.

According to a fifth aspect, an embodiment of this application provides a computer storage medium, including a computer instruction. When the computer instruction is run on an electronic device, the electronic device is enabled to perform the method for displaying a hidden album in any one of the foregoing possible implementations of the first aspect, the method for displaying a hidden application in any one of the foregoing possible implementations of the second aspect, or the method for logging in to a system account in any one of the foregoing possible implementations of the third aspect.

According to a sixth aspect, an embodiment of this application provides a computer program product. When the computer program product is run on a computer, the computer is enabled to perform the method for displaying a hidden album in any one of the foregoing possible implementations of the first aspect, the method for displaying a hidden application in any one of the foregoing possible implementations of the second aspect, or the method for logging in to a system account in any one of the foregoing possible implementations of the third aspect.

In a seventh aspect, facial recognition in the first aspect, the second aspect, or the third aspect may be replaced with fingerprint recognition, in other words, the sliding operation may trigger only one identity identification manner of fingerprint recognition, and facial recognition is not performed. For example, if a sliding distance of the sliding operation is greater than a first distance threshold or duration of the sliding operation is greater than a first duration threshold, the electronic device displays a fingerprint recognition icon in an area corresponding to a fingerprint recognition module. When fingerprint recognition succeeds, the electronic device may display the hidden album in the first aspect, or display the hidden application in the second aspect, or log in to the system account in the third aspect, or the like. When fingerprint recognition succeeds, the electronic device may further log in to an application account, complete payment of an order, display a payment code, or the like.

Certainly, the sliding operation may alternatively trigger only facial recognition, or the sliding operation may trigger both facial recognition and fingerprint recognition. For an implementation process, refer to content in the first aspect, the second aspect, or the third aspect.

That the sliding operation triggers facial recognition and/or fingerprint recognition may be used in a scenario of logging in to a third-party application (for example, WeChat or Weibo). The sliding operation may be: sliding in a login interface of the third-party application. If the sliding distance of the sliding operation is greater than the first distance threshold or the duration of the sliding operation is greater than the first duration threshold, the electronic device may perform facial recognition, and/or display a fingerprint recognition icon. When a user touches the fingerprint recognition icon, fingerprint recognition is performed. After facial recognition succeeds and/or fingerprint recognition succeeds, the electronic device may log in to the account of the third-party application.

That the sliding operation triggers facial recognition and/or fingerprint recognition may be used in an order payment scenario, and the sliding operation is: sliding in an order confirmation interface or a payment interface. If the sliding distance of the sliding operation is greater than the first distance threshold or the duration of the sliding operation is greater than the first duration threshold, the electronic device may perform facial recognition, and/or display a fingerprint recognition icon. When a user touches the fingerprint recognition icon, fingerprint recognition is performed. After facial recognition succeeds and/or fingerprint recognition succeeds, the electronic device may complete payment.

That the sliding operation triggers facial recognition and/or fingerprint recognition may be used in a scenario of opening a payment code. If the sliding distance of the sliding operation is greater than the first distance threshold or the duration of the sliding operation is greater than the first duration threshold, the electronic device may perform facial recognition, and/or display a fingerprint recognition icon. When a user touches the fingerprint recognition icon, fingerprint recognition is performed. After facial recognition succeeds and/or fingerprint recognition succeeds, the electronic device may complete payment.

DESCRIPTION OF EMBODIMENTS

The technical solutions according to embodiments of this application are clearly and completely described in the following with reference to the accompanying drawings. In the descriptions of the embodiments of this application, unless otherwise stated, "/" means "or", for example, A/B may represent A or B. In this specification, "and/or" is merely an association relationship that describes associated objects, and indicates that three relationships may exist. For example, A and/or B may indicate three cases: only A exists, both A and B exist, and only B exists. In addition, in the descriptions of the embodiments of this application, "a plurality of" means two or more.

The following terms "first" and "second" are merely intended for a purpose of description, and shall not be understood as an indication or implication of relative importance or implicit indication of a quantity of indicated technical features. Therefore, a feature defined by "first" or "second" may explicitly or implicitly include one or more features. In the descriptions of the embodiments of this application, unless otherwise noted, "a plurality of" means two or more.

Figure 1:
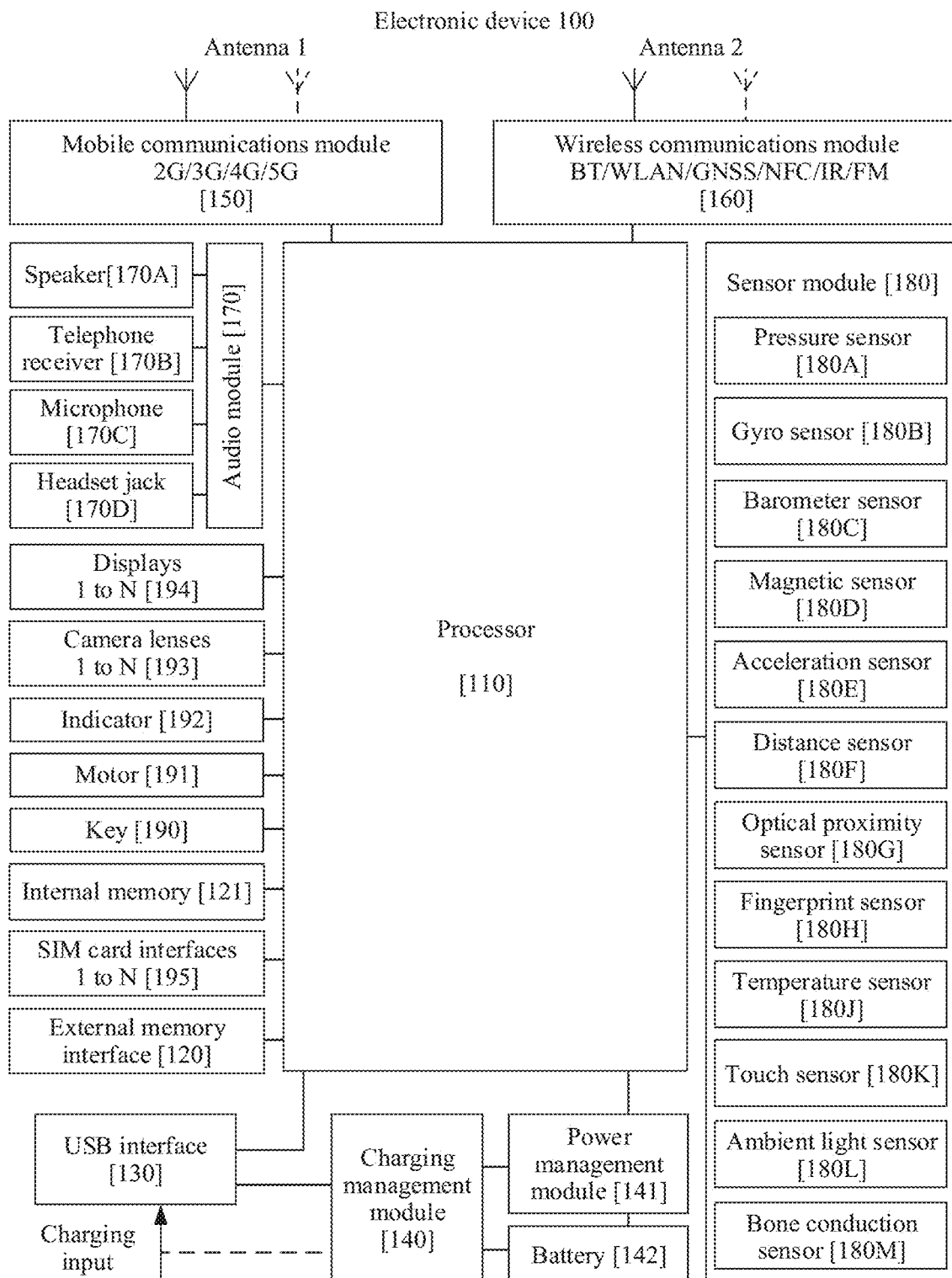
FIG. 1 is a schematic structural diagram of an electronic device according to an embodiment of this application.

FIG. 1 is a schematic structural diagram of an electronic device 100.

The electronic device 100 is used as an example below to specifically describe the embodiments. It should be understood that the electronic device 100 may have more or fewer components than those shown in the figure, may combine two or more components, or may have different component configurations. The components shown in the figure may be implemented in hardware, software, or a combination of hardware and software including one or more signal processing and/or application-specific integrated circuits.

The electronic device 100 may include a processor 110, an external memory interface 120, an internal memory 121, a universal serial bus (USB) interface 130, a charging management module 140, a power management module 141, a battery 142, an antenna 1, an antenna 2, a mobile communications module 150, a wireless communications module 160, an audio module 170, a speaker 170A, a telephone receiver 170B, a microphone 170C, a headset jack 170D, a sensor module 180, a key 190, a motor 191, an indicator 192, a camera lens 193, a display 194, a subscriber identification module (SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180X, a fingerprint sensor 180H, a temperature sensor 180J, a touch sensor 180K, an ambient light sensor 180L, a bone conduction sensor 180M, and the like.

It may be understood that a structure shown in this embodiment of this application does not specifically limit the electronic device 100. In some other embodiments of this application, the electronic device 100 may include more or fewer components than those shown in the figure, or combine some components, or split some components, or have different component arrangements. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, and/or a neural network processing unit (NPU). Different processing units may be independent components, or may be integrated into one or more processors.

The controller may be a neural center and a command center of the electronic device 100. The controller may generate an operation control signal based on instruction operation code and a time sequence signal, to control a fetch instruction and an execute instruction.

A memory may be further disposed in the processor 110, and is configured to store an instruction and data. In some embodiments, the memory in the processor 110 is a cache. The memory may store an instruction or data that has just been used or cyclically used by the processor 110. If the processor 110 needs to use the instruction or the data again, the processor 110 may directly invoke the instruction or the data from the memory. Repeated access is avoided, and waiting time of the processor 110 is reduced, and therefore system efficiency is improved.

In some embodiments, the processor 110 may include one or more interfaces. The interface may include an integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

It may be understood that, an interface connection relationship between modules shown in this embodiment of the present invention is merely a schematic description, and does not limit a structure of the electronic device 100. In some other embodiments of this application, the electronic device 100 may alternatively use an interface connection manner different from that in the foregoing embodiment, or use a combination of a plurality of interface connection manners.

The charging management module 140 is configured to receive charging input from a charger. The charger may be a wireless charger, or may be a wired charger.

The power management module 141 is configured to connect the battery 142 and the charging management module 140 to the processor 110. The power management module 141 receives input of the battery 142 and/or the charging management module 140, and supplies power to the processor 110, the internal memory 121, an external memory, the display 194, the camera lens 193, the wireless communications module 160, and the like.

A wireless communication function of the electronic device 100 may be implemented by using the antenna 1, the antenna 2, the mobile communications module 150, the wireless communications module 160, the modem processor, the baseband processor, and the like.

The electronic device 100 implements a display function by using the GPU, the display 194, the application processor, and the like. The GPU is a microprocessor for image processing, and is connected to the display 194 and the application processor. The GPU is configured to perform mathematical and geometric calculation, and is used for graphics rendering. The processor 110 may include one or more GPUs that execute a program instruction to generate or change display information.

The display 194 is configured to display an image, a video, and the like. The display 194 includes a display panel. The display panel may be a liquid crystal display (LCD), an organic light-emitting diode (OLED), an active matrix organic light-emitting diode (AMOLED), a flexible light-emitting diode (FLED), a mini LED, a micro LED, a micro-oLED, a quantum dot light-emitting diode (QLED), or the like. In some embodiments, the electronic device 100 may include one or N displays 194, where N is a positive integer greater than 1.

The electronic device 100 may implement a photographing function by using the ISP, the camera lens 193, the video codec, the GPU, the display 194, the application processor, and the like.

The ISP is configured to process data fed back by the camera lens 193. For example, during photographing, a shutter is turned on, and light is transmitted to a photosensitive element of the camera lens by using a lens, so that an optical signal is converted into an electrical signal, and the photosensitive element of the camera lens transmits the electrical signal to the ISP for processing, to convert the electrical signal into a macroscopic image. The ISP may further perform algorithm optimization on image noise, luminance, and complexion. The ISP may further optimize parameters such as exposure to a photographing scenario and color temperature. In some embodiments, the ISP may be disposed in the camera lens 193.

The camera lens 193 is configured to capture a static image or a video. An optical image of an object is generated by using the lens and is projected to the photosensitive element. The photosensitive element may be a charge-coupled device (CCD) or a complementary metal-oxide-semiconductor (CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In the embodiments of the present invention, the camera lens 193 includes a camera lens for collecting an image required for facial recognition, such as an infrared camera lens or another camera lens. The camera lens for collecting the image required for facial recognition is usually located on a front side of the electronic device, for example, on the top of a touchscreen, or may be located at another location. This is not limited in the embodiments of the present invention. In some embodiments, the electronic device 100 may include another camera lens. The electronic device may further include a dot-matrix transmitter (not shown in the figure), configured to emit light. The camera lens collects light reflected from a human face, to obtain a face image. The processor processes and analyzes the face image, and compares the reflected light with stored face image information for verification.

The digital signal processor is configured to process a digital signal, and may process another digital signal in addition to the digital image signal. For example, when the electronic device 100 selects a frequency, the digital signal processor is configured to perform Fourier transform or the like on frequency energy.

The video codec is configured to compress or decompress a digital video. The electronic device 100 can support one or more video codecs. In this way, the electronic device 100 can play or record videos in a plurality of encoding formats, for example, moving picture experts group (MPEG) 1, MPEG 2, MPEG 3, and MPEG 4.

The NPU is a neural network (NN) computing processor, performs fast processing on input information by referring to a structure of a biological neural network, for example, by referring to a transmission mode between neurons in a human brain, and may further continuously perform self-learning. Applications such as intelligent cognition of the electronic device 100 can be implemented by using the NPU, such as image recognition, facial recognition, speech recognition, and text understanding.

The external memory interface 120 may be configured to connect to an external storage card such as a micro SD card, to extend a storage capability of the electronic device 100. The external storage card communicates with the processor 110 by using the external memory interface 120, to implement a data storage function. For example, files such as music and a video are stored in the external storage card.

The internal memory 121 may be configured to store computer-executable program code, and the executable program code includes an instruction. The processor 110 performs various functional applications and data processing of the electronic device 100 by running the instruction stored in the internal memory 121. The internal memory 121 may include a program storage area and a data storage area. The program storage area may store an operating system, an application required by at least one function (such as a facial recognition function, a fingerprint recognition function, and a mobile payment function), and the like. The data storage area may store data (such as face information template data and a fingerprint information template) and the like created during use of the electronic device 100. In addition, the internal memory 121 may include a high-speed random access memory, and may further include a non-volatile memory such as at least one magnetic disk storage component, a flash memory component, or a universal flash storage (UFS).

The electronic device 100 may implement an audio function such as music playing and recording by using the audio module 170, the speaker 170A, the telephone receiver 170B, the microphone 170C, the headset jack 170D, the application processor, and the like.

The audio module 170 is configured to convert digital audio information into analog audio signal output, and is also configured to convert analog audio input into a digital audio signal.

The speaker 170A, also referred to as a "loudspeaker", is configured to convert an audio electrical signal into a sound signal.

The telephone receiver 170B, also referred to as an "earpiece", is configured to convert an audio electrical signal into a sound signal.

The microphone 170C, also referred to as a "microphone" or "microphone", is configured to convert a sound signal into an electrical signal.

The headset jack 170D is configured to connect to a wired headset. The headset jack 170D may be the USB interface 130, or may be a 3.5 mm open mobile electronic device platform (OMTP) standard interface, or a cellular telecommunications industry association of the USA (CTIA) standard interface.

The pressure sensor 180A is configured to perceive a pressure signal, and may convert the pressure signal into an electrical signal. In some embodiments, the pressure sensor 180A may be disposed on the display 194. There are many types of pressure sensors 180A, such as a resistive pressure sensor, an inductive pressure sensor, and a capacitive pressure sensor.

The gyro sensor 180B may be configured to determine a motion posture of the electronic device 100. In some embodiments, angular velocities of the electronic device 100 around three axes (namely, an x-axis, a y-axis, and a z-axis) may be determined by using the gyro sensor 180B.

The optical proximity sensor 180G may include, for example, a light emitting diode (LED) and an optical detector such as a photodiode. The light emitting diode may be an infrared light emitting diode.

The ambient light sensor 180L is configured to perceive ambient light luminance. The electronic device 100 may adaptively adjust luminance of the display 194 based on the perceived ambient light luminance. The ambient light sensor 180L may also be configured to automatically adjust white balance during photographing.

The fingerprint sensor 180H is configured to collect a fingerprint. The electronic device 100 may implement fingerprint unlocking, access an application lock, take a photo by using the fingerprint, answer an incoming call by using the fingerprint, and the like by using a feature of the collected fingerprint. The fingerprint sensor 180H may be disposed under the touchscreen. The electronic device 100 may receive a touch operation of the user in an area corresponding to the fingerprint sensor on the touchscreen. The electronic device 100 may collect fingerprint information of a finger of the user in response to the touch operation, to open a hidden album after fingerprint recognition succeeds, open a hidden application after fingerprint recognition succeeds, log in to an account after fingerprint recognition succeeds, and complete payment after fingerprint recognition succeeds in the embodiments of this application.

The temperature sensor 180J is configured to detect temperature. In some embodiments, the electronic device 100 executes a temperature processing policy by using the temperature detected by the temperature sensor 180J.

The touch sensor 180K is also referred to as a "touch panel". The touch sensor 180K may be disposed on the display 194, and the touch sensor 180K and the display 194 form a touchscreen that is also referred to as a "touchscreen". The touch sensor 180K is configured to detect a touch operation performed on or near the touch sensor 180K.

The touch sensor may transfer the detected touch operation to the application processor, to determine a type of a touch event. Visual output related to the touch operation may be provided by using the display 194. In some other embodiments, the touch sensor 180K may be alternatively disposed on a surface of the electronic device 100, and a location of the touch sensor 180K is different from a location of the display 194.

The key 190 includes a power key, a volume key, and the like. The key 190 may be a mechanical key, or may be a touch key. The electronic device 10) may receive key input, and generate key signal input related to user setting and function control of the electronic device 100.

The indicator 192 may be an indicator light, and may be configured to indicate a charging status and a battery level change, or may be configured to indicate a message, a missed call, a notification, or the like.

The SIM card interface 195 is configured to connect to a SIM card. The SIM card may be inserted into the SIM card interface 195 or plugged from the SIM card interface 195 to come into contact with or be separated from the electronic device 100. In some embodiments, the electronic device 100 uses an eSIM, namely, an embedded SIM card. The eSIM card may be embedded in the electronic device 100 and cannot be separated from the electronic device 100.

A software system of the electronic device 100 may use a hierarchical architecture, an event-driven architecture, a microcore architecture, a micro-service architecture, or a cloud architecture. In this embodiment of the present invention, an Android system of a hierarchical architecture is used as an example to illustrate a software structure of the electronic device 100.

Figure 2:
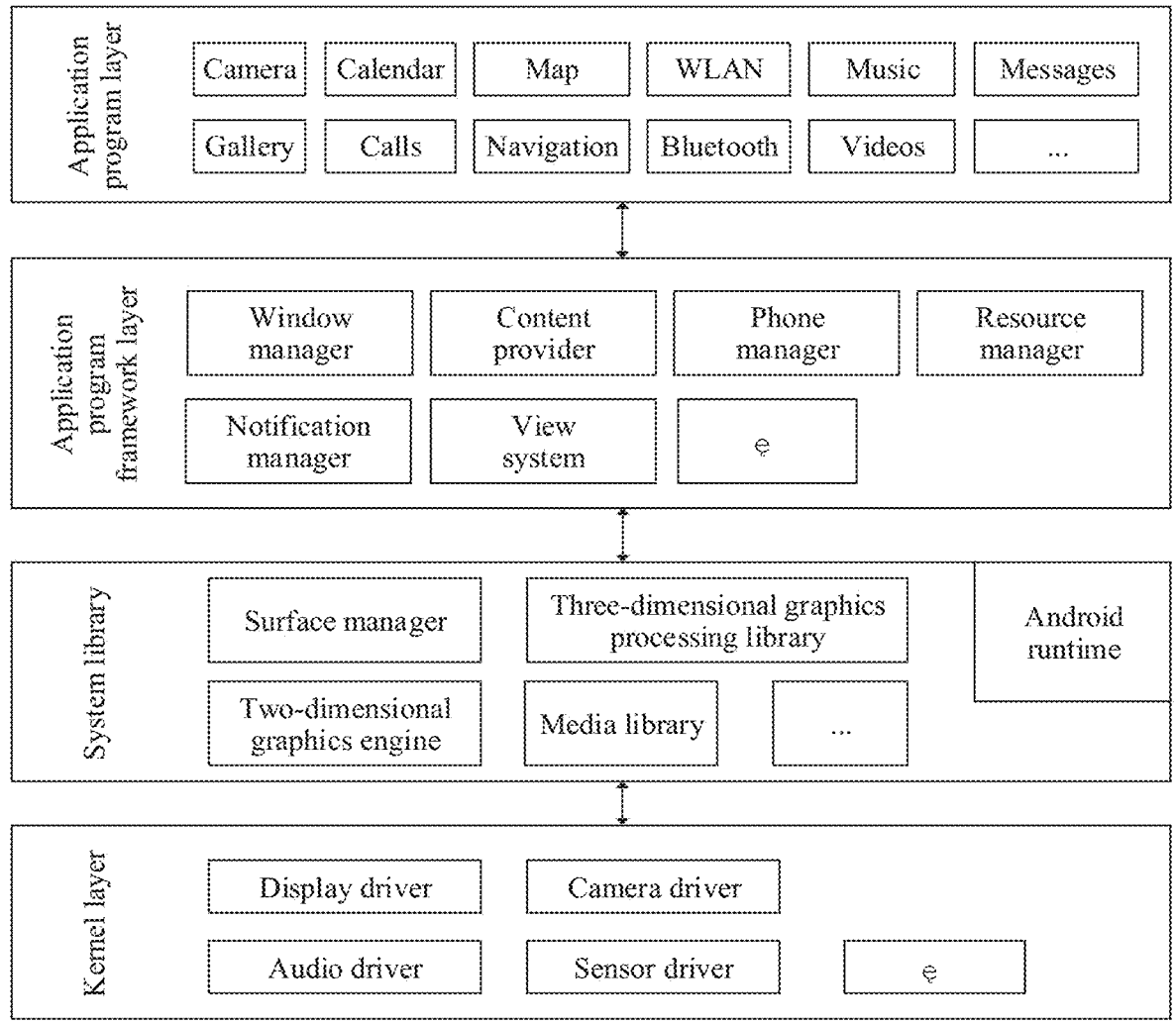
FIG. 2 is a schematic diagram of a software architecture according to an embodiment of this application.

FIG. 2 is a block diagram of a software structure of an electronic device 100 according to an embodiment of the present invention.

In a hierarchical architecture, software is divided into several layers, and each layer has a clear role and task. Layers communicate with each other by using a software interface. In some embodiments, the Android system is divided into four layers, namely, an application program layer, an application program framework layer, an Android runtime and a system library, and a kernel layer from top to bottom.

The application program layer may include a series of application program packages.

As shown in FIG. 2, the application program package may include application programs (which may also be referred to as applications) such as Camera. Gallery, Calendar, Calls, Map, Navigation, WLAN, Bluetooth, Music, Video, and Messages.

The application program framework layer provides an application programming interface (API) and a programming framework for an application program at the application program layer. The application program framework layer includes some predefined functions.

As shown in FIG. 2, the application program framework layer may include a window manager, a content provider, a view system, a phone manager, a resource manager, a notification manager, and the like.

The window manager is configured to manage a window program. The window manager may obtain a size of a display, determine whether there is a status bar, lock a screen, take a screenshot, and the like.

The content provider is configured to store and obtain data and enable the data to be accessible to the application program. The data may include a video, an image, audio, dialed and answered calls, browsing history, a bookmark, an address book, and the like.

The view system includes a visual control, for example, a control for displaying text or a control for displaying a picture. The view system may be configured to create the application program. A display interface may include one or more views. For example, a display interface including a short message notification icon may include a view for displaying text and a view for displaying a picture.

The phone manager is configured to provide a communication function of the electronic device 100, for example, call status (including call connection and hang-up) management.

The resource manager provides various resources such as a localized character string, an icon, a picture, a layout file, and a video file for the application program.

The notification manager enables the application program to display notification information at the status bar, and may be used to transmit a message of a notification type and may automatically disappear after a short stay without user interaction. For example, the notification manager is configured to notify a downloading complete, a message reminder, and the like. Alternatively, the notification manager may be a notification that appears at the status bar at the top of the system in a form of a diagram or scroll bar text, for example, a notification of an application program running in the background, or may be a notification that appears on the screen in a form of a dialog interface. For example, text information is prompted at the status bar, a prompt tone is made, the electronic device vibrates, or the indicator light flickers.

The Android runtime includes a kernel library and a virtual machine. The Android runtime is responsible for scheduling and management of the Android system.

The kernel library includes two parts, a function that needs to be called by a java language, and an Android kernel library.

The application program layer and the application program framework layer run in the virtual machine. The virtual machine executes java files at the application program layer and the application program framework layer as binary files. The virtual machine is configured to perform functions such as object life cycle management, stack management, thread management, security and exception management, and garbage collection.

The system library may include a plurality of functional modules, for example, a surface manager, a media library, a three-dimensional graphics processing library (for example, OpenGL ES), and a 2D graphics engine (for example, SGL).

The surface manager is configured to manage a display subsystem, and provides fusion of 2D and 3D layers for a plurality of application programs.

The media library supports playback and recording of a plurality of common audio and video formats, a static image file, and the like. The media library may support a plurality of audio and video coding formats, for example, MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera lens driver, an audio driver, and a sensor driver.

Figure 3A:
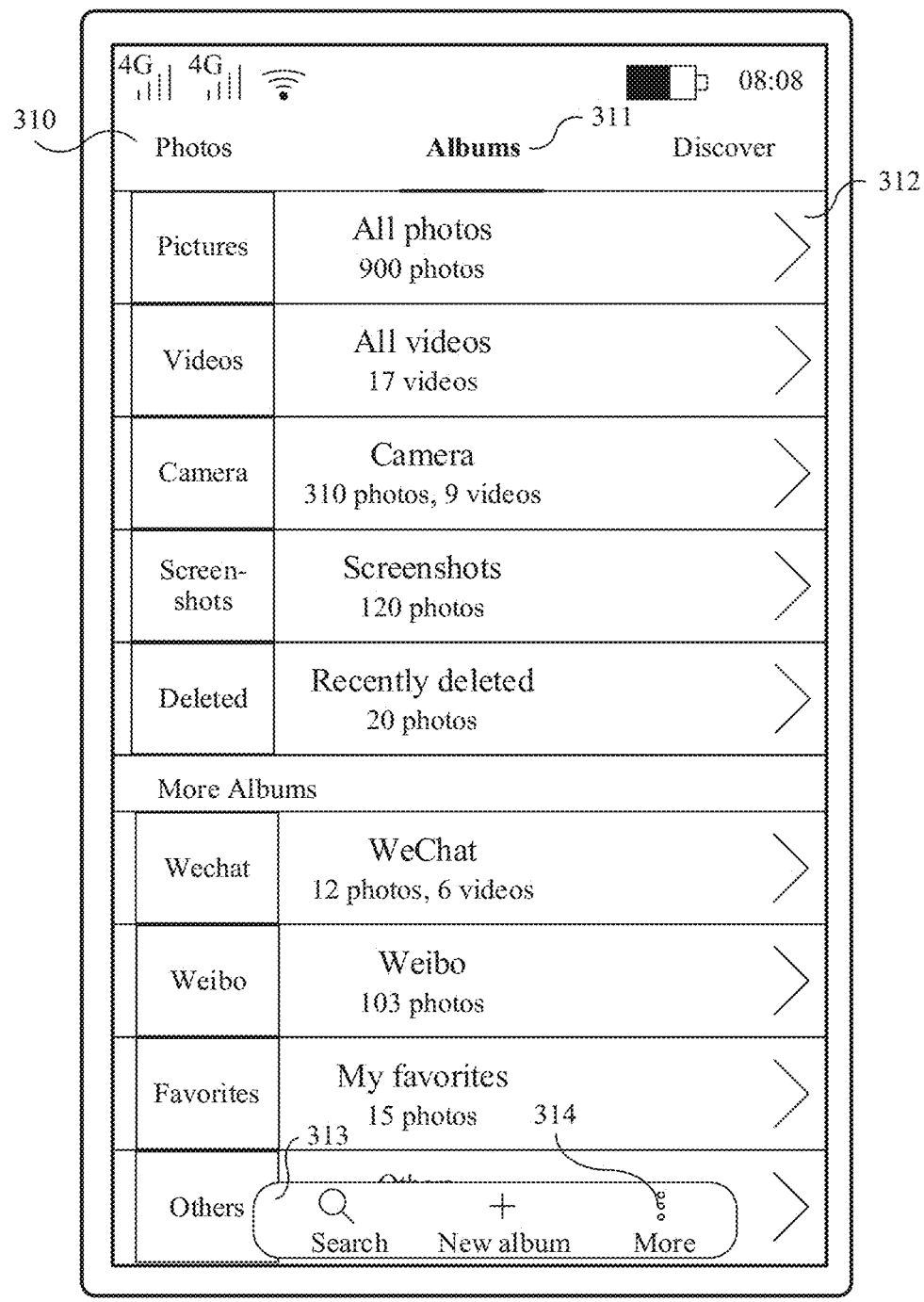
FIG. 3a to FIG. 3g are schematic diagrams of a group of interfaces in the prior art according to an embodiment of this application.
Figure 3B:
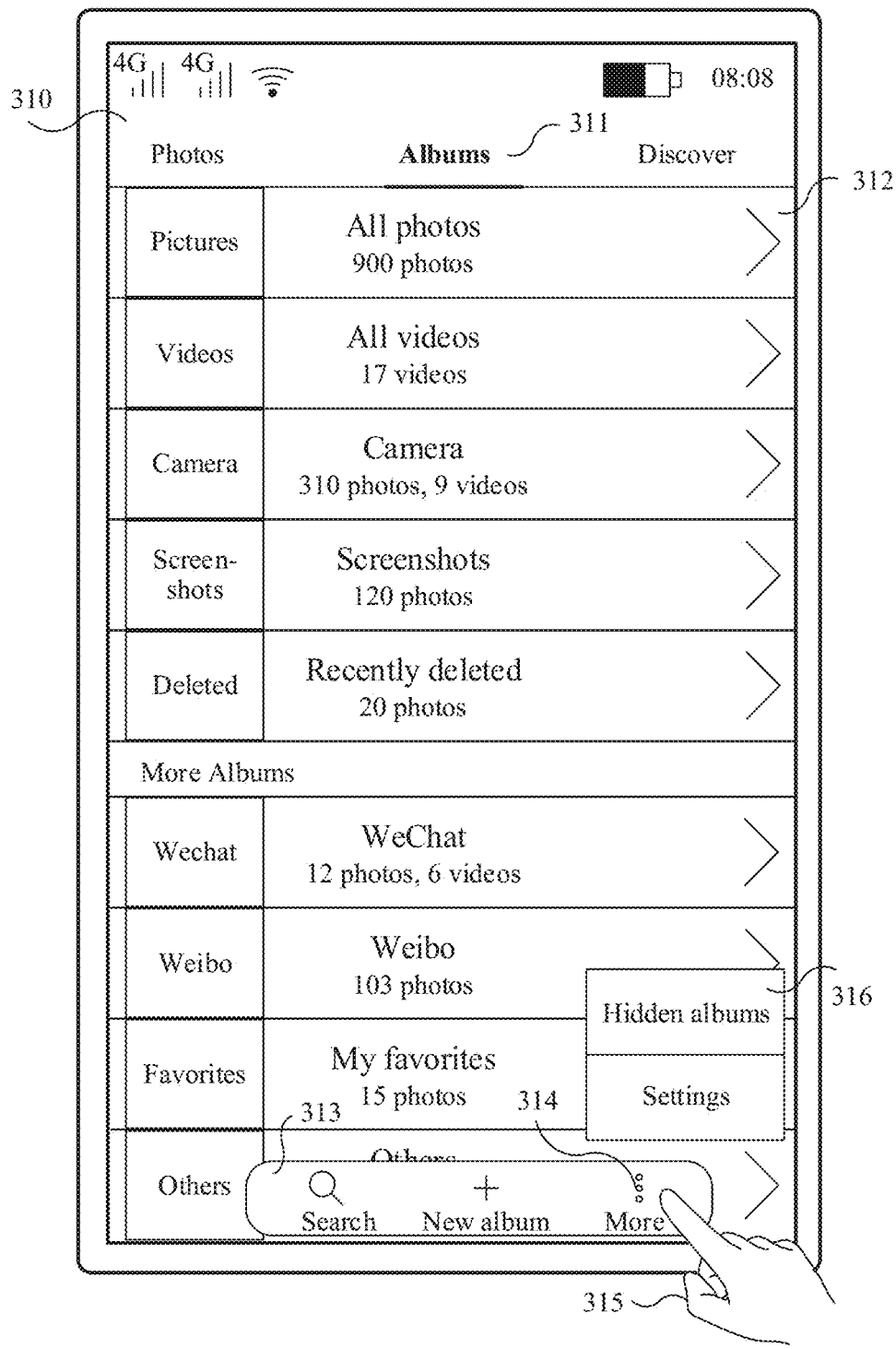
Figure 3C:
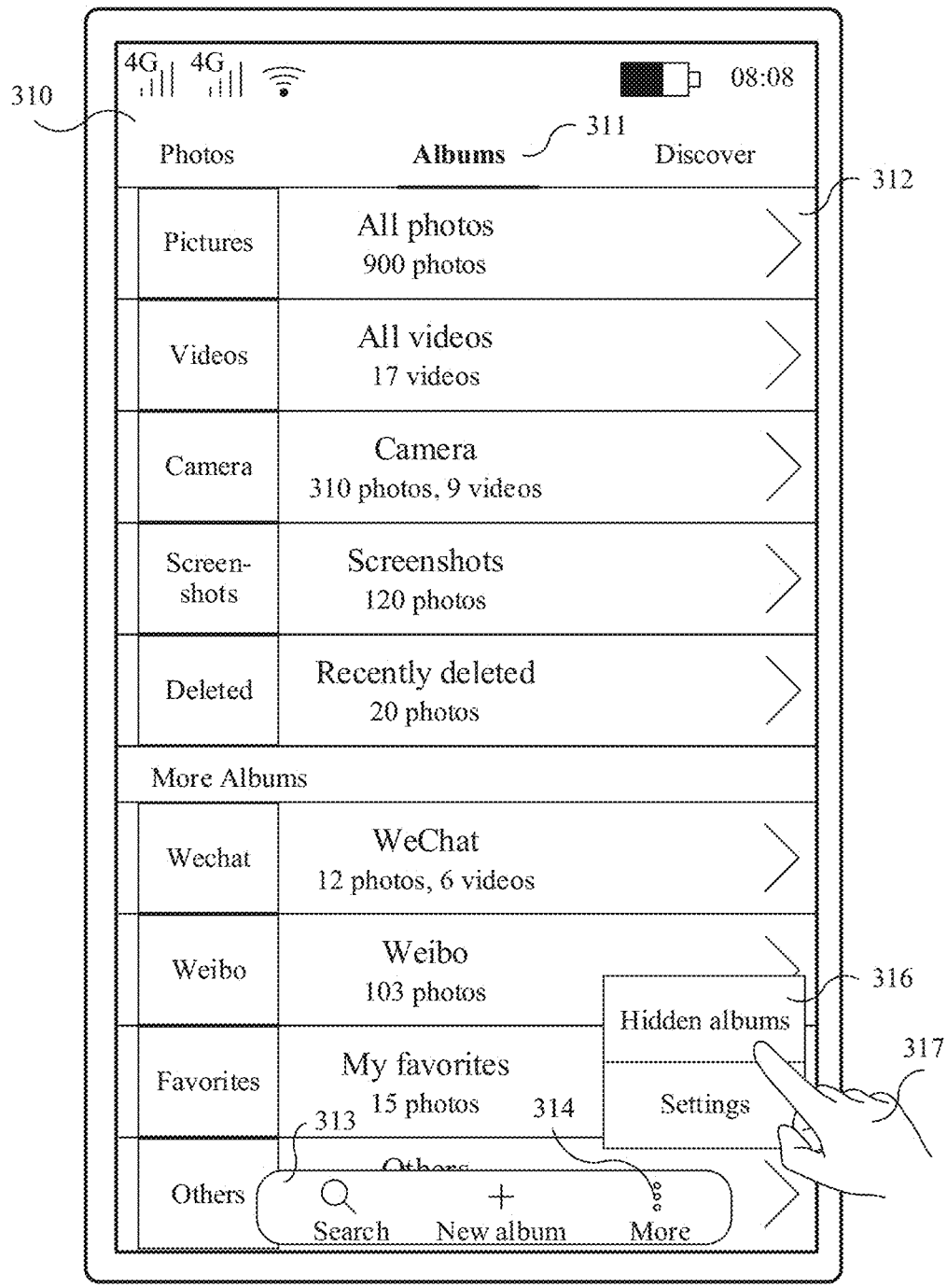
Figure 3D:
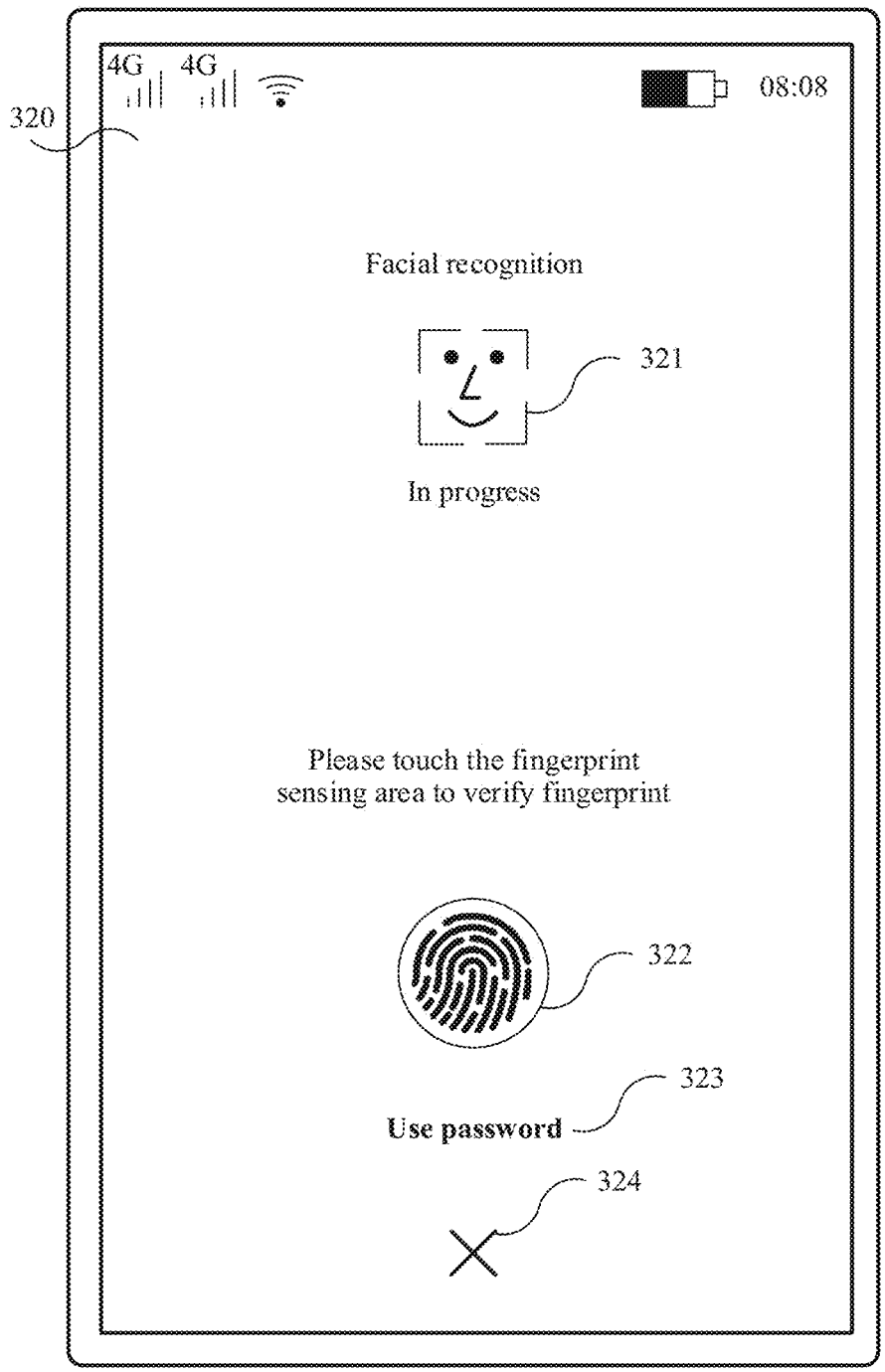
Figures 3E, 3F:
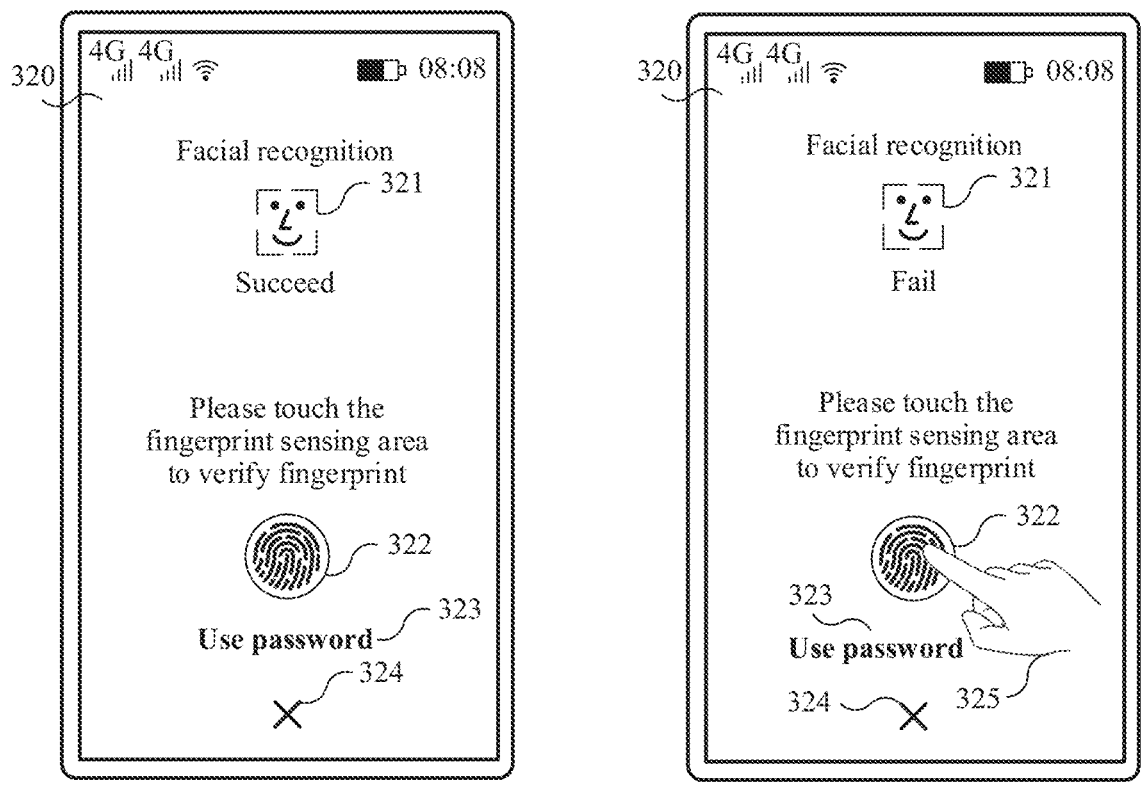
Figure 3G:
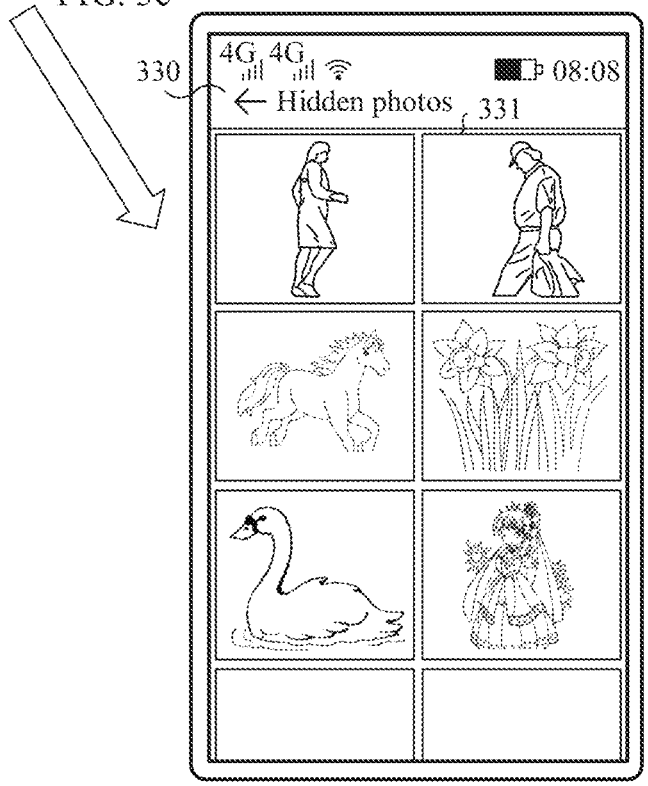

In the prior art, if a user needs to open a hidden album in a gallery application, for an operation process of the user on an electronic device, refer to FIG. 3a, FIG. 3b, FIG. 3c, FIG. 3d, FIG. 3e, FIG. 3f, and FIG. 3g. As shown in FIG. 3a, the electronic device displays a gallery application interface 310, and the gallery application interface 310 includes an "Albums" control 311 and another control (for example, a "Photos" control and a "Discover" control). When the user taps the "Albums" control, a terminal displays an interface corresponding to an album. A display interface corresponding to the "Albums" control 311 may include one or more album entries 312 (for example, an "All photos" album entry, an "All videos" album entry, a "Camera" album entry, a "Screenshots" album entry, a "Recently deleted" album entry, a "WeChat" album entry, a "Weibo" album entry, a "My favorites" album entry, and another album entry). The gallery application interface 310 further includes an album toolbar 313, and the album toolbar 313 includes a "More" control 314 and another control (for example, a "Search" control or a "New album" control). As shown in FIG. 3b, the electronic device receives an input operation 315 (for example, tapping) of the user for the "More" control 314, and in response to the input operation 315 (for example, tapping), the electronic device displays a "Hidden albums" control 316 and another control (for example, a "Settings" control) in the gallery application interface 310. As shown in FIG. 3c, the electronic device may receive an input operation 317 (for example, tapping) of the user for the "Hidden albums" control 316, and in response to the input operation 317 (for example, tapping), the electronic device may display an identity authentication interface 320 shown in FIG. 3d, and start facial recognition. The identity authentication interface 320 may include a facial recognition prompt area 321, a fingerprint recognition indication icon 322, a password authentication control 323, and an authentication canceling control 324. If facial recognition succeeds, the electronic device may display a "Hidden albums" interface 330 shown in FIG. 3g, and the "Hidden albums" interface 330 may include one or more hidden pictures 331. If facial recognition fails, as shown in FIG. 3f, the electronic device may receive an input operation 325 (for example, touching) of the user for a fingerprint recognition indication icon 322. In response to the input operation 325, the electronic device may perform fingerprint recognition. If fingerprint recognition succeeds, the electronic device may display the "Hidden albums" interface 330 shown in FIG. 3g.

It may be learned from the prior art shown in FIG. 3a, FIG. 3b, FIG. 3c, FIG. 3d, FIG. 3e, FIG. 3f, and FIG. 3g that, if the user needs to open a hidden album, the user needs to first tap the "More" control in the album toolbar, to display the "Hidden albums" control, and then the user needs to tap the "Hidden albums" control to trigger an identity identification process, and the electronic device opens the hidden album only after authentication succeeds. In this way, the user needs to perform a plurality of operations to open the hidden album. Therefore, an operation process is relatively complex, affecting user experience. According to a biometric recognition method provided in the embodiments of the present invention, an electronic device may receive a sliding operation of a user in a gallery application interface: when a sliding distance of the sliding operation is greater than a first threshold, the electronic device may trigger facial recognition and display a fingerprint recognition icon; and if facial recognition succeeds, the electronic device may display a hidden album; or if facial recognition fails, the electronic device may receive a touch operation of the user for the fingerprint recognition icon, and in response to the touch operation, the electronic device may perform fingerprint recognition on the user, and if fingerprint recognition succeeds, the electronic device may display a hidden album. In this way, the hidden album can be quickly opened.

Application scenario 1: To resolve the foregoing problem, an embodiment of this application provides a biometric authentication interaction method shown in FIG. 4A and FIG. 4B, to quickly identify an identity of a user, and open a hidden album after identity identification succeeds.

Figure 4A:
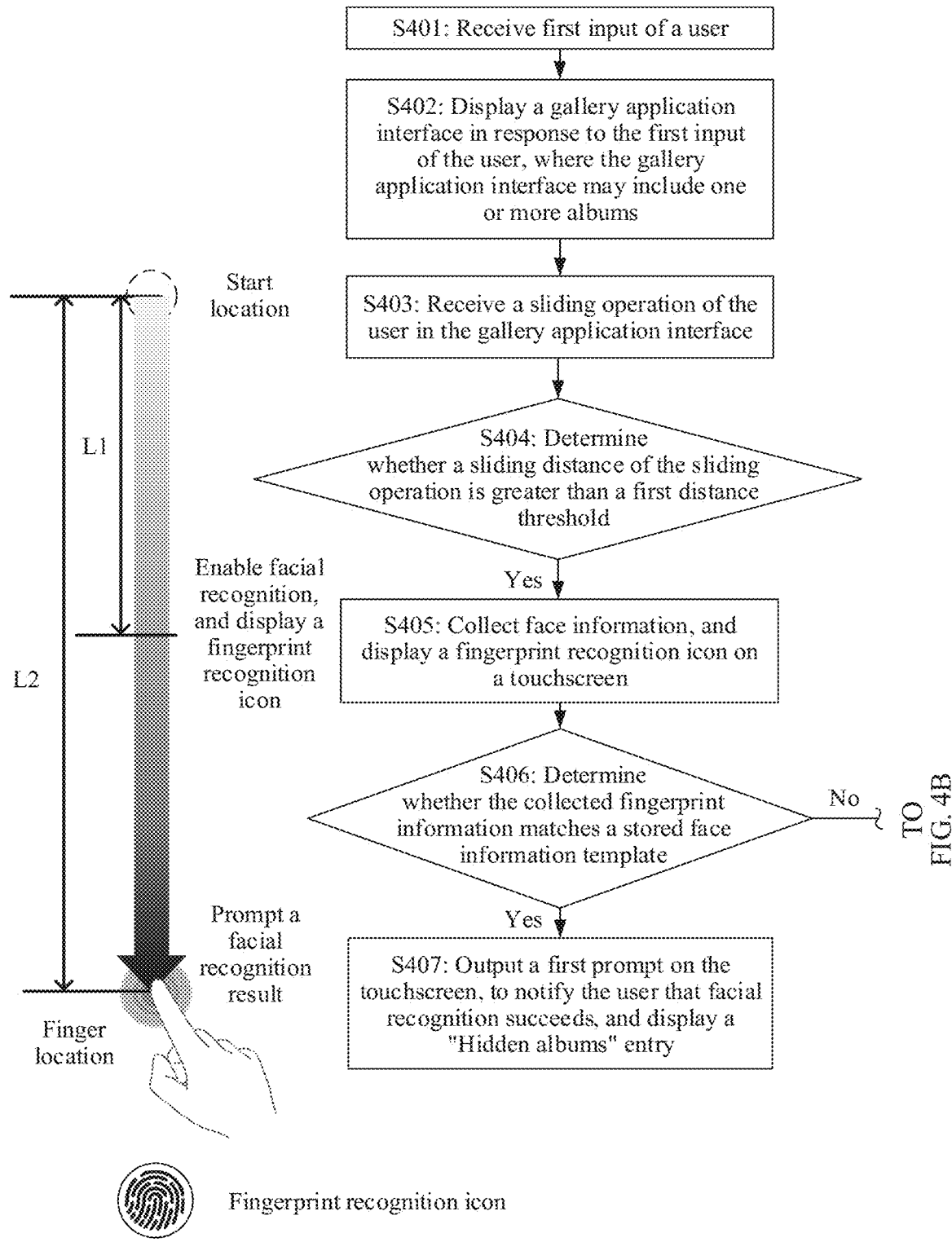
FIG. 4A and FIG. 4B are a schematic flowchart of a method for displaying a hidden album according to an embodiment of this application.
Figure 4B:
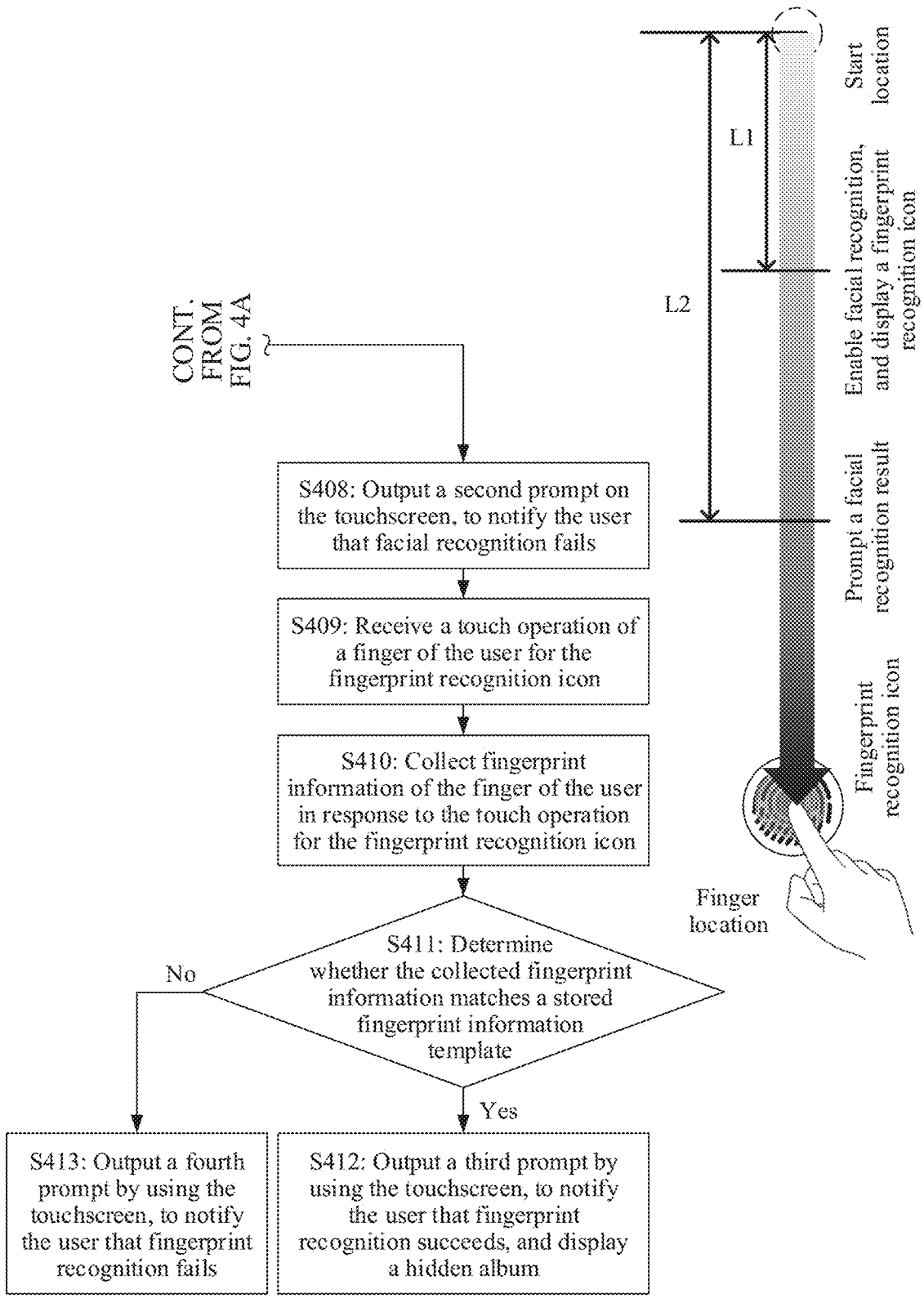

As shown in FIG. 4A and FIG. 4B, the biometric authentication interaction method provided in this embodiment of this application may include the following steps.

S401: An electronic device receives first input of a user.
S402: The electronic device displays a gallery application interface in response to the first input of the user, where the gallery application interface may include one or more album entries, and the entries do not include a "Hidden albums" entry.

Figure 5A:
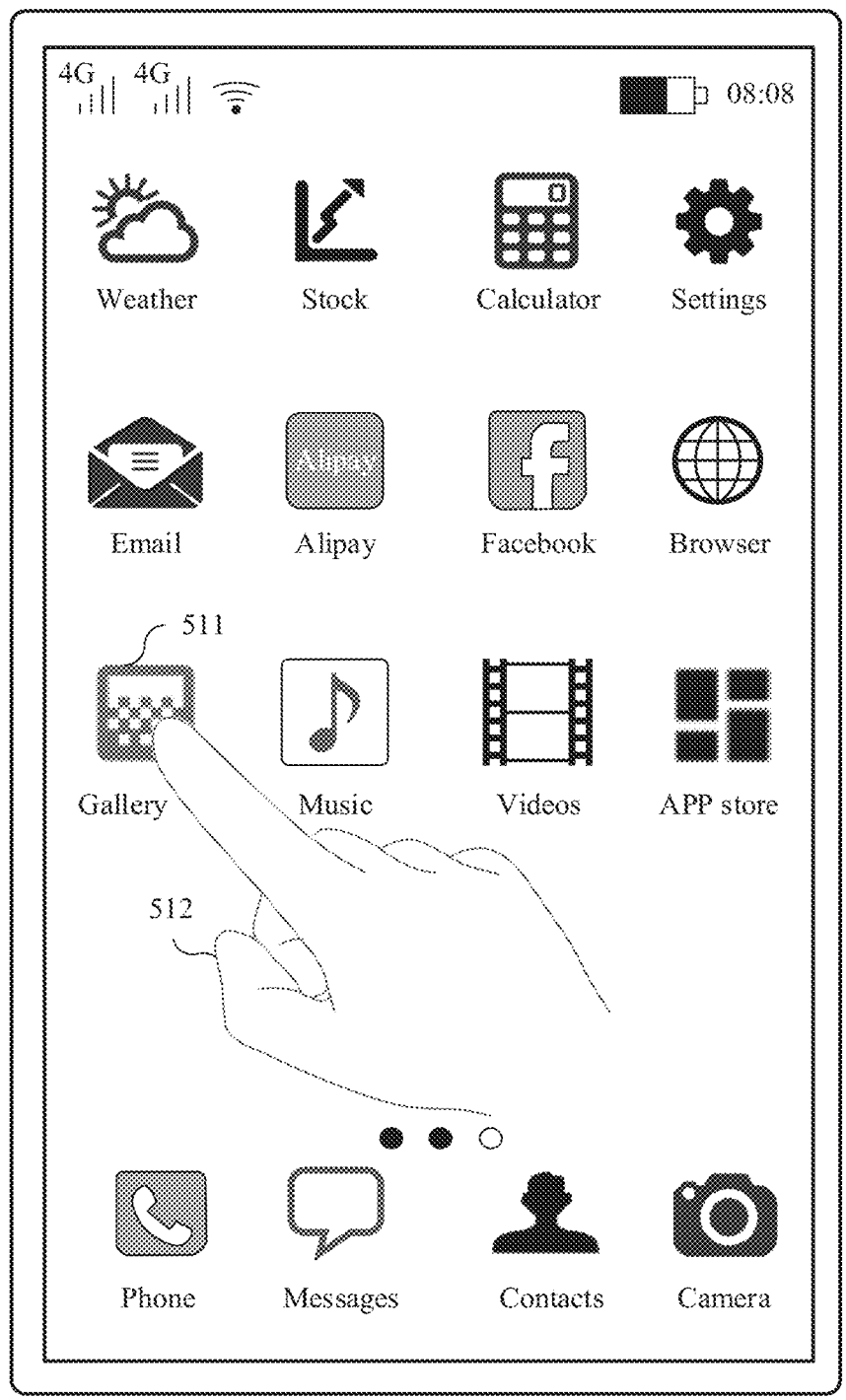
FIG. 5a to FIG. 5g are schematic diagrams of a group of interfaces according to an embodiment of this application.

The first input may be an input operation 512 shown in FIG. 5a in which the user taps a gallery icon on a page. In addition to the input operation 512 shown in FIG. 5a, the first input may be alternatively voice input of the user. This is not limited herein. For example, the electronic device may enable a voice assistant to receive the voice input of the user.

For example, as shown in FIG. 5a, a touchscreen of the electronic device displays an interface of a home screen, the interface displays a page on which an application icon is placed, and the page includes a plurality of application icons (for example, a gallery application icon 511, a weather application icon, a stock application icon, a calculator application icon, a settings application icon, an email application icon, an Alipay application icon, a Facebook application icon, a browser application icon, a music application icon, a videos application icon, and an APP store icon). A page indicator is further included below the plurality of application icons, to indicate a location relationship between the currently displayed page and another page. There are a plurality of tray icons (such as a phone application icon, a messages application icon, a contacts application icon, and a camera application icon) below the page indicator. The tray icons keep displayed during page switching. The page may include a plurality of application icons and the page indicator. Alternatively, the page indicator may not be a part of the page and exist alone. The tray icon is also optional. This is not limited in this embodiment of the present invention.

Figure 5B:
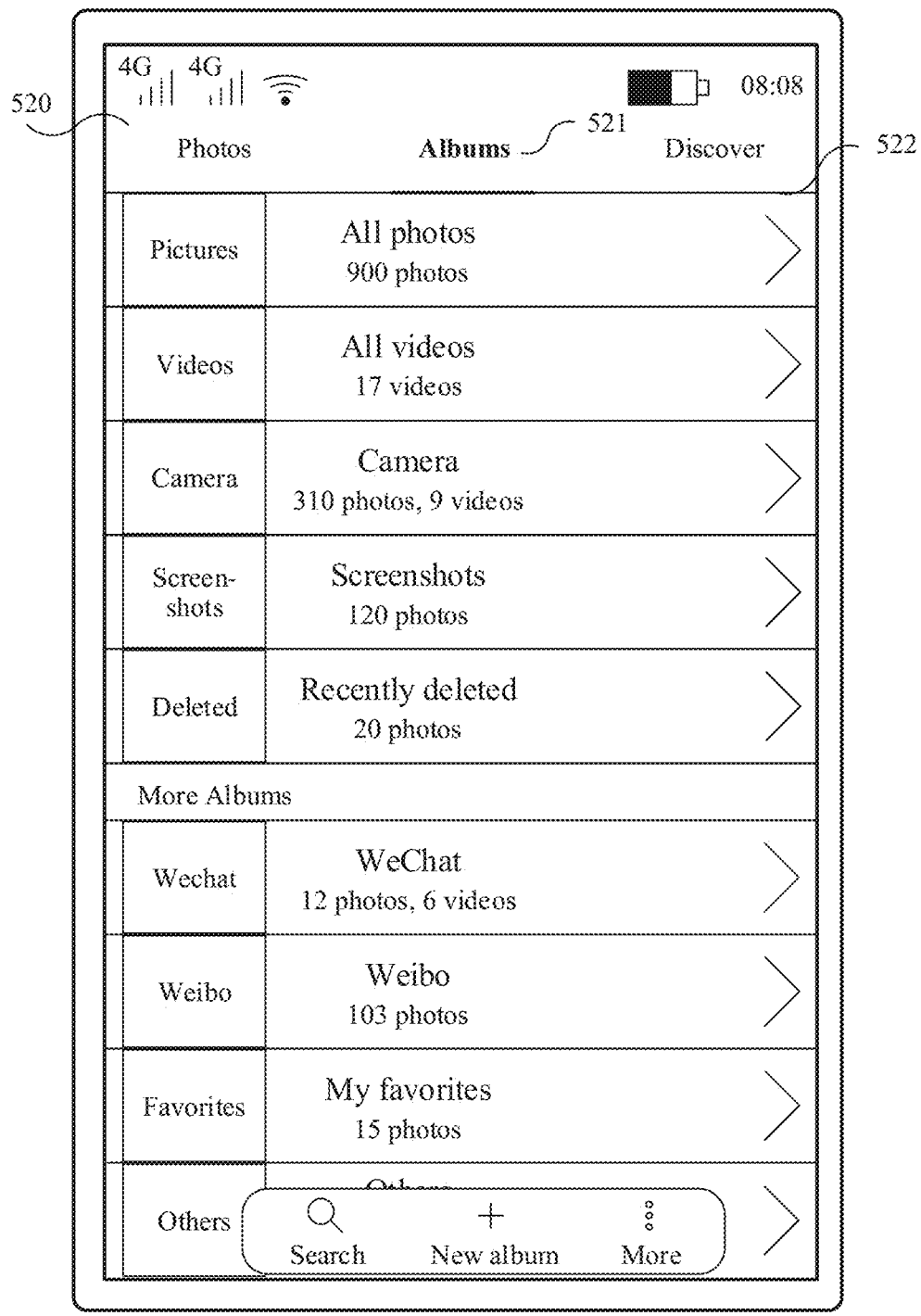

The electronic device may receive an input operation 512 (for example, tapping) of the user for the gallery application icon 511, and in response to the input operation 512, the electronic device may display, on the touchscreen, a gallery application interface 520 shown in FIG. 5b. FIG. 5b is the same as FIG. 3a. Text descriptions of FIG. 3a are also applicable to FIG. 5b, and are not repeated herein again.

S403: The electronic device receives a sliding operation of the user in the gallery application interface.

Figure 5C:
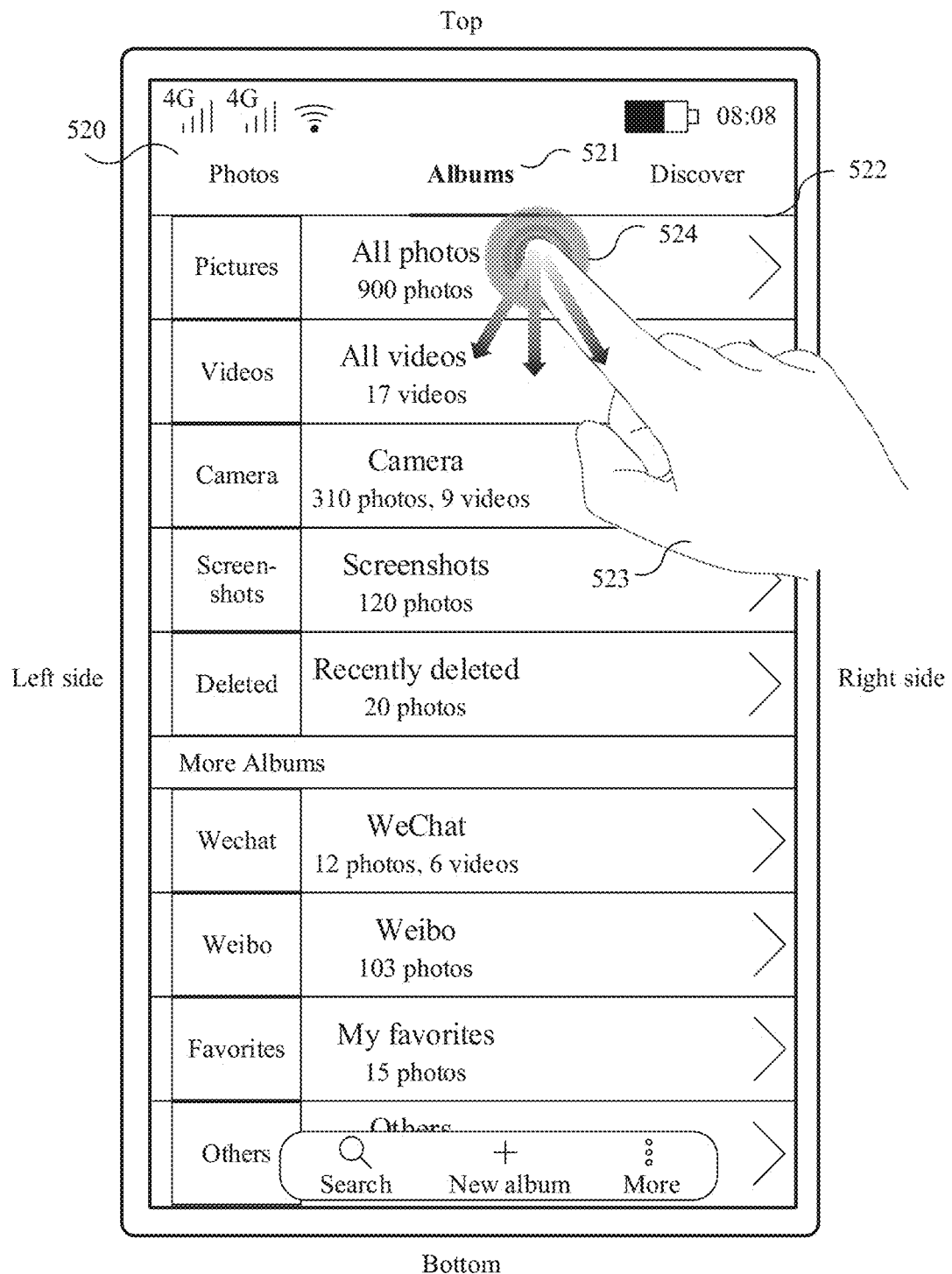

As shown in FIG. 5c, relative locations of the top, the bottom, the left side, and the right side when the electronic device is placed in a manner shown in FIG. 5c are identified. These locations are used to describe locations on the touchscreen of the electronic device, or locations on an interface displayed by the electronic device. In addition, downward means from top to bottom, upward means from bottom to top, rightward means from left to right, and leftward means from right to left. Descriptions of the locations are also applicable in the descriptions of the subsequent accompanying drawings.

The electronic device receives a sliding operation 523 of the user in the gallery application interface 520. A start point of the sliding operation 523 may be the top of the gallery application interface 520, for example, near an "Albums" control, or near a "Photos" control, or near a "Discover" control. For example, a sliding start location of the sliding input operation 523 may be a location 524 shown in FIG. 5c. A trend of the sliding operation 523 may be from the top of the touchscreen to the bottom, and the sliding operation is not required to be roughly parallel to the left and right sides of the touchscreen. For example, the sliding operation is, as shown in FIG. 5c, sliding from the top of the touchscreen to the bottom in a direction toward the left side, or sliding from the top of the touchscreen to the bottom in a direction toward the right side. In addition to the foregoing examples of the sliding operation, the sliding operation may be a single-finger sliding operation, or may be a two-finger sliding operation.

In an implementation, the sliding operation can trigger facial recognition or fingerprint recognition only when a start location of the sliding operation is within a specified location on the touchscreen, and the sliding operation does not trigger facial recognition or fingerprint recognition outside the specified location on the touchscreen. The specified location may be adjusted by the electronic device after receiving input from the user, or may be fixed. This is not limited herein. Descriptions of the specified location are also applicable in the descriptions of the subsequent accompanying drawings.

S404: The electronic device determines whether a sliding distance of the sliding operation is greater than a first distance threshold, and if yes, performs step S405: The electronic device enables a camera lens to collect face information, and displays a fingerprint recognition icon on the touchscreen.

The sliding distance of the sliding operation may be a displacement from the start location 524 to a current location 525 of a finger of the user after the finger touches the touchscreen. In an optional implementation, the sliding distance of the sliding operation 523 may be alternatively a displacement, in a specific direction, from the start location 524 to the current location 525 of the finger of the user after the finger touches the touchscreen (for example, a displacement on the touchscreen in a top-down direction).

It may be understood that step 404 may also be replaced with the following: determining whether duration of the sliding operation is greater than a first duration threshold, and if yes, performing S405.

Figure 5D:
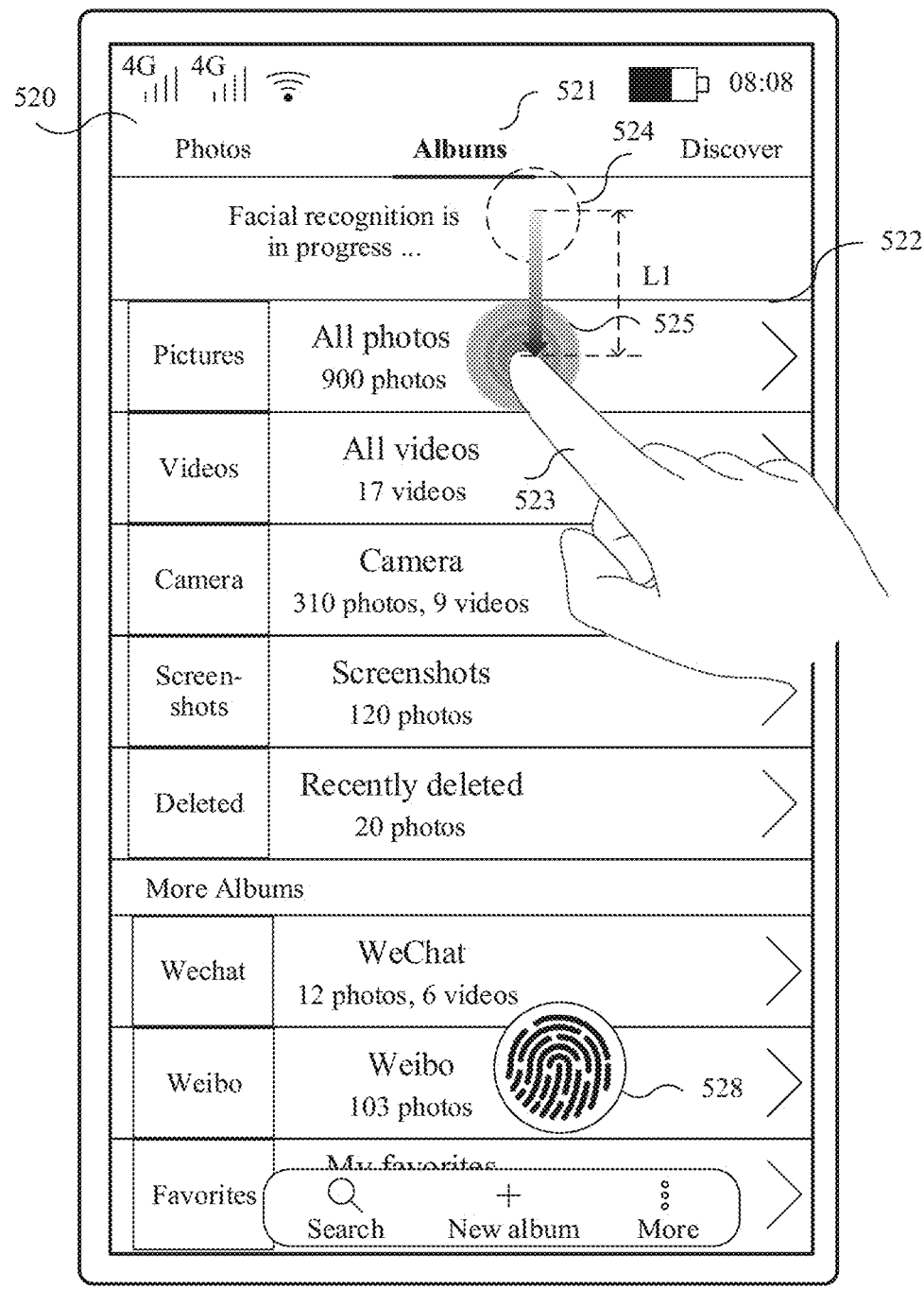

As shown in FIG. 5d, in a process in which the electronic device receives the sliding operation of the user, if the electronic device determines that a sliding distance of the finger of the user (which may be a distance between the current location 525 of the finger of the user and the start location 524) is greater than the first distance threshold (L1), the electronic device enables a facial recognition module (such as a dot matrix transmitter and a camera lens) to collect face information, and displays a fingerprint recognition icon 528 on the touchscreen. Because a fingerprint recognition module is disposed under the touchscreen, the electronic device may collect a fingerprint of the finger of the user when the finger of the user touches a fixed area of the touchscreen. Therefore, a display location of the fingerprint recognition icon 528 may be in an area in which the fingerprint recognition module can collect the fingerprint (for example, at a middle location on a side slightly to the bottom of the touchscreen). After the electronic device collects the face information by using the camera lens, the electronic device may perform some necessary processing, and match the processed face information with a stored face information template. The face information template may be entered by the user before the electronic device performs facial recognition. A facial recognition component and a specific algorithm are not limited in this embodiment of this application, provided that facial recognition can be implemented.

S406: The electronic device determines whether the collected fingerprint information matches the stored face information template: and if yes, performs step S407; or if no, performs step S408.

S407: The electronic device outputs a first prompt by using the touchscreen, to notify the user that facial recognition succeeds, and displays a "Hidden albums" entry.

The first prompt may be a picture and/or text. For example, the first prompt may be a picture prompt of "smiling face expression" and/or a text prompt "Facial recognition succeeds".

Figure 5E:
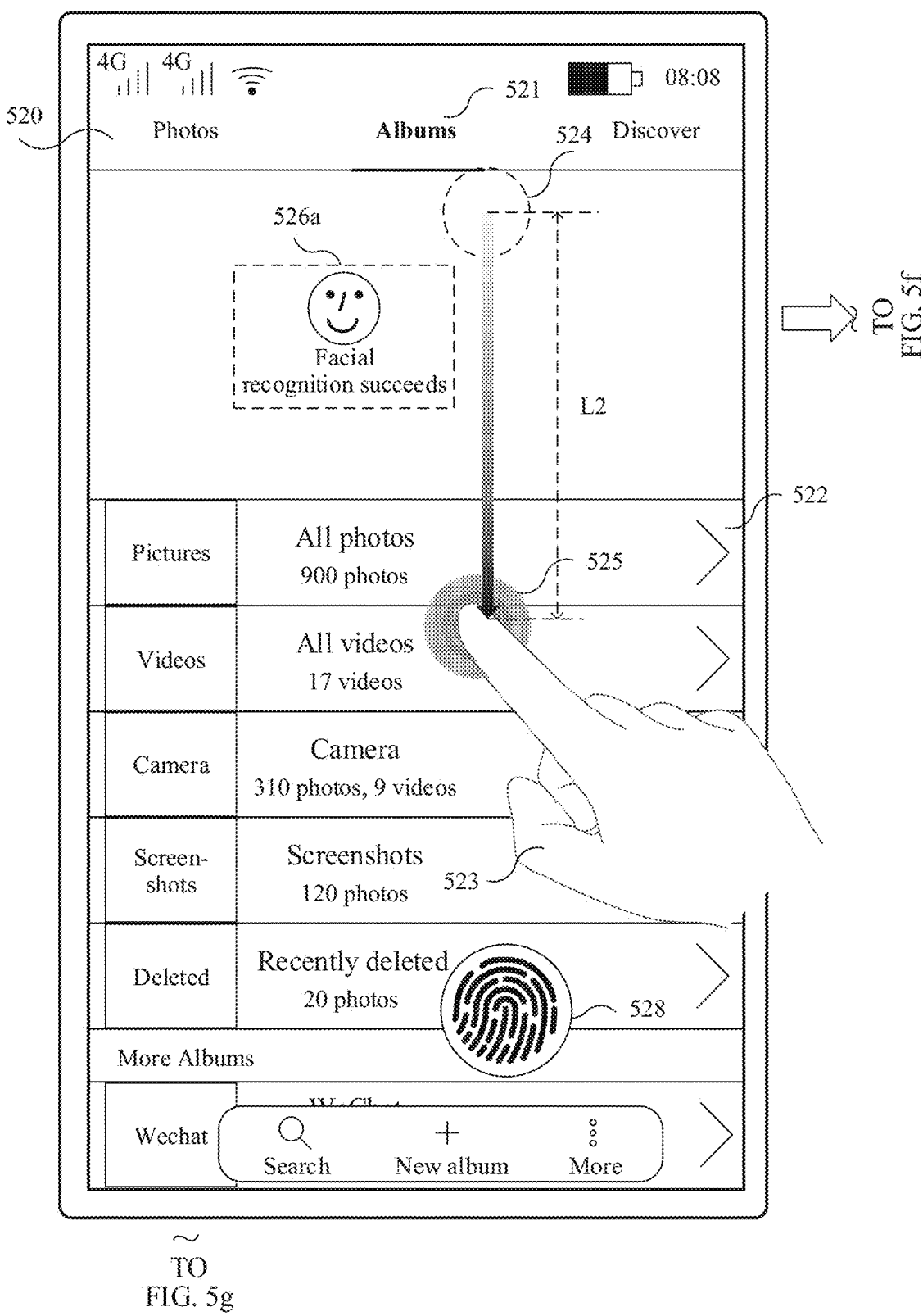

For example, as shown in FIG. 5e, in the process in which the electronic device receives the sliding operation 523 of the user, when the electronic device determines that the sliding distance of the finger of the user (which may be the distance between the current location 525 of the finger of the user and the start location 524) is greater than a second distance threshold (L2), a first prompt 526a may be displayed on the touchscreen.

It may be understood that, in a process of the sliding operation, all entries may move with the sliding operation in real time, and a prompt "Facial recognition is in progress" or the first prompt is displayed in an area that is emptied after all the entries move; or all entries may not move with the sliding operation in real time, but move in a direction of the sliding operation only when the sliding distance reaches L1 or L2, to empty an area to display a prompt "Facial recognition is in progress" or the first prompt.

When the collected face information successfully matches the stored face information template, the first prompt 526a is displayed. The second distance threshold (L2) is greater than the first distance threshold (L1). After facial recognition succeeds (in other words, when the collected face information successfully matches the face information template), the electronic device may display, on a display interface 522 corresponding to an "Albums" control 521, a "Hidden albums" entry 527 shown in FIG. 5f, and the fingerprint recognition icon 528 disappears. A disappearing process of the fingerprint recognition icon 528 may be instantaneously disappearing, or may use a gradient effect, for example, slowly disappears from clear to transparent and then to none. This is not limited herein. After the fingerprint recognition icon 528 disappears, the fingerprint recognition module under the screen may be disabled. In this way, the fingerprint recognition icon 528 can be prevented from blocking a display interface on the touchscreen for a long time, and the fingerprint recognition module under the screen can be prevented from being always enabled, thereby reducing power consumption.

It may be understood that, that the electronic device determines whether the sliding distance of the finger of the user is greater than the second distance threshold (L2) may be replaced with determining duration of the sliding operation 523. A start point of the duration may be counted from a start time point of the sliding operation 523, or may be counted from a time point at which the sliding distance of the sliding operation 523 reaches the first distance threshold or the duration of the sliding operation reaches the first duration threshold.

Figure 5F:
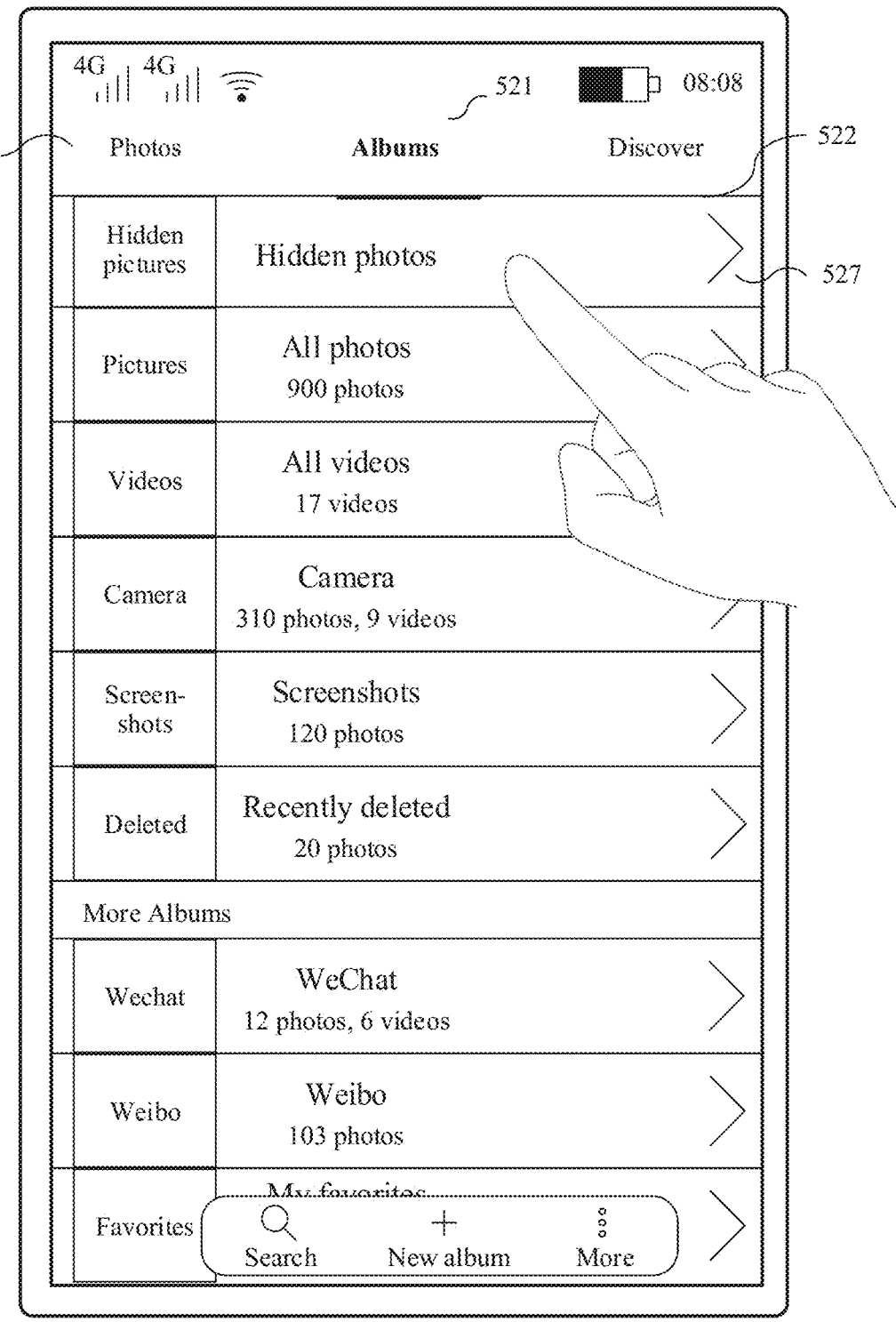

As shown in FIG. 5f, the "Hidden albums" entry 527 may be an uppermost entry in all entries arranged from top to bottom in the interface 522, may be a bottommost entry, or a middle entry. This is not limited herein. The electronic device may receive an input operation (for example, tapping) of the user for the "Hidden albums" entry 527, and in response to the input operation (for example, tapping), the electronic device may display, on the touchscreen, a "Hidden albums" interface 530 shown in FIG. 5g.

Figure 5G:
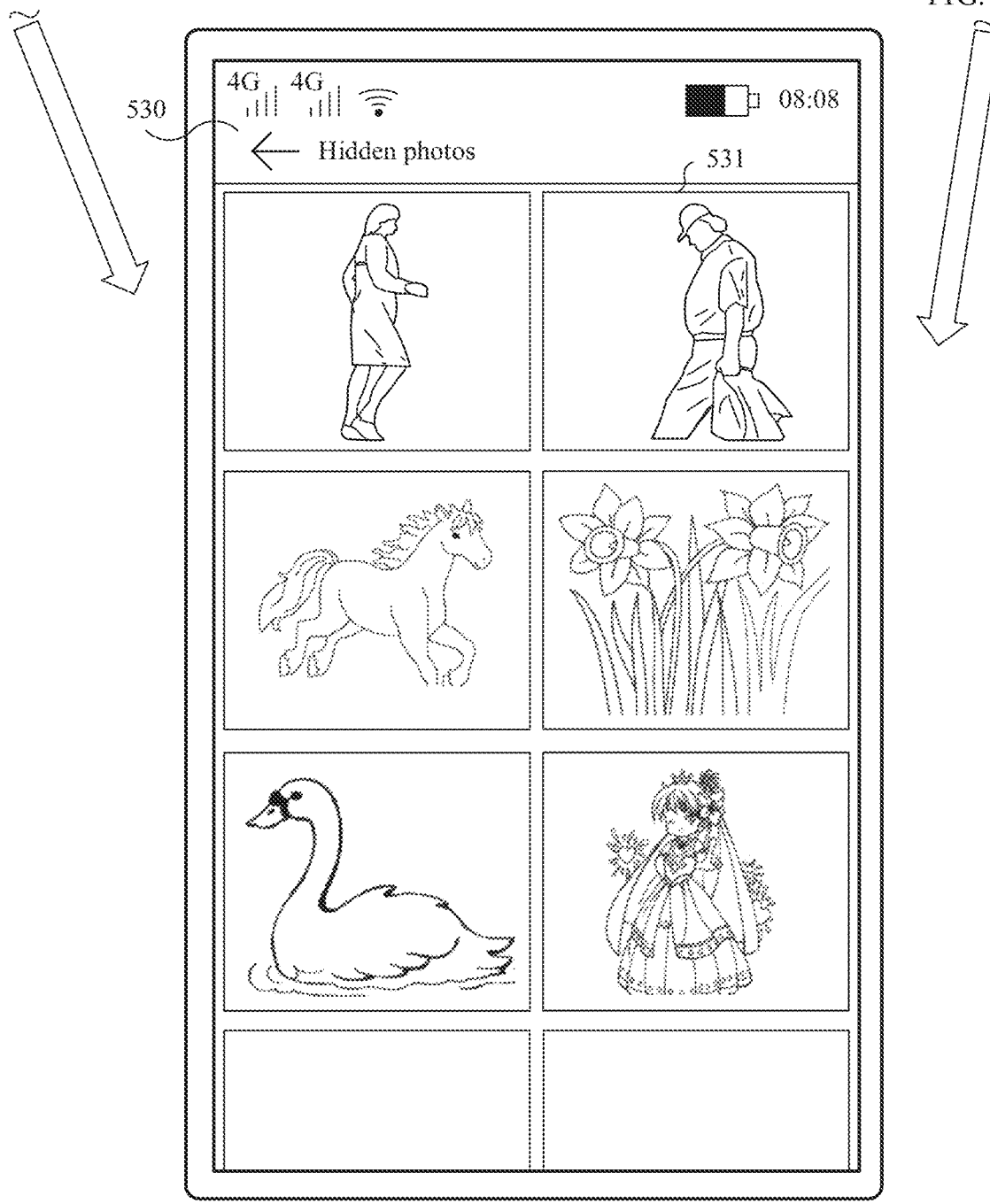

As shown in FIG. 5g, the "Hidden albums" interface 530 may include one or more hidden photos 531. After the electronic device receives the input operation of the user and exits the "Hidden albums" interface 530 and enters the gallery application interface 520, the "Hidden albums" entry 527 may be no longer displayed in the display interface 522 corresponding to the "Albums" control 521. If the user needs to open the hidden album again, the user may perform the sliding operation 523 in the display interface 522 again to perform identity identification (facial recognition or fingerprint recognition) again. After identity identification succeeds (in other words, facial recognition or fingerprint recognition succeeds), the electronic device may display the "Hidden albums" entry 527 or the hidden photo again. In this way, identity identification may be performed before the user opens the hidden album each time, thereby protecting privacy of the hidden album.

In an implementation, a step of displaying FIG. 5f is optional. When facial recognition succeeds, an interface shown in FIG. 5e may be directly switched to the interface shown in FIG. 5g. In this way, after facial recognition succeeds, the user may directly browse the hidden photo, thereby simplifying an input operation performed by the user to browse the hidden photo, and improving user experience.

S408: The electronic device outputs a second prompt by using the touchscreen, to notify the user that facial recognition fails.

The second prompt may be a picture and/or text. For example, the second prompt may be a picture prompt of "sad face expression" and/or a text prompt "Facial recognition fails".

Figure 6A:
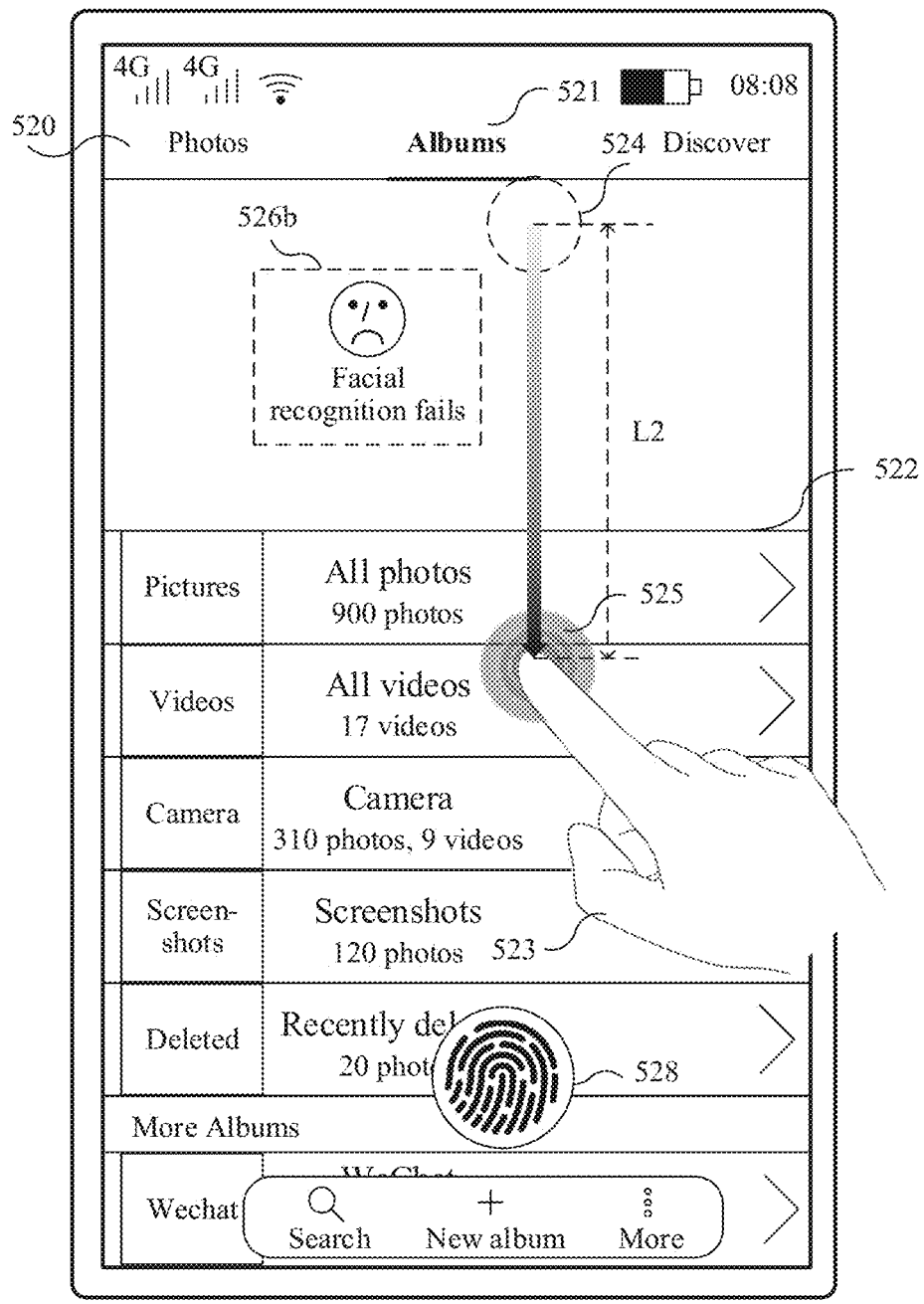
FIG. 6a to FIG. 6d are schematic diagrams of another group of interfaces according to an embodiment of this application.

For example, as shown in FIG. 6a, in the process in which the electronic device receives the sliding operation 523 of the user, when the electronic device determines that the sliding distance of the finger of the user (which may be the distance between the current location 525 of the finger of the user and the start location 524) is greater than the second distance threshold (L2), a second prompt 526b may be displayed on the touchscreen. The second distance threshold (L2) is greater than the first distance threshold (L1). After facial recognition fails, the finger of the user may continue to slide until the finger reaches a location of the fingerprint recognition icon 528.

S409: The electronic device receives a touch operation of the user for the fingerprint recognition icon.

S410: The electronic device collects fingerprint information of the user in response to the touch operation.

S411: The electronic device determines whether the collected fingerprint information matches a stored fingerprint information template: and if yes, performs step S412, or if no, performs step S413.

The fingerprint information template may be entered by the user before the electronic device performs fingerprint recognition. If facial recognition fails but fingerprint recognition succeeds, the electronic device may open the hidden album. In this way, compared with a prior-art step-by-step operation in which the electronic device receives an input operation of the user to trigger facial recognition, and receives, after facial recognition fails, another input operation of the user to trigger fingerprint recognition, in this embodiment of this application, facial recognition and fingerprint recognition are triggered by using one sliding operation, to authenticate an identity of the user, so that user operations can be simplified.

Figure 6B:
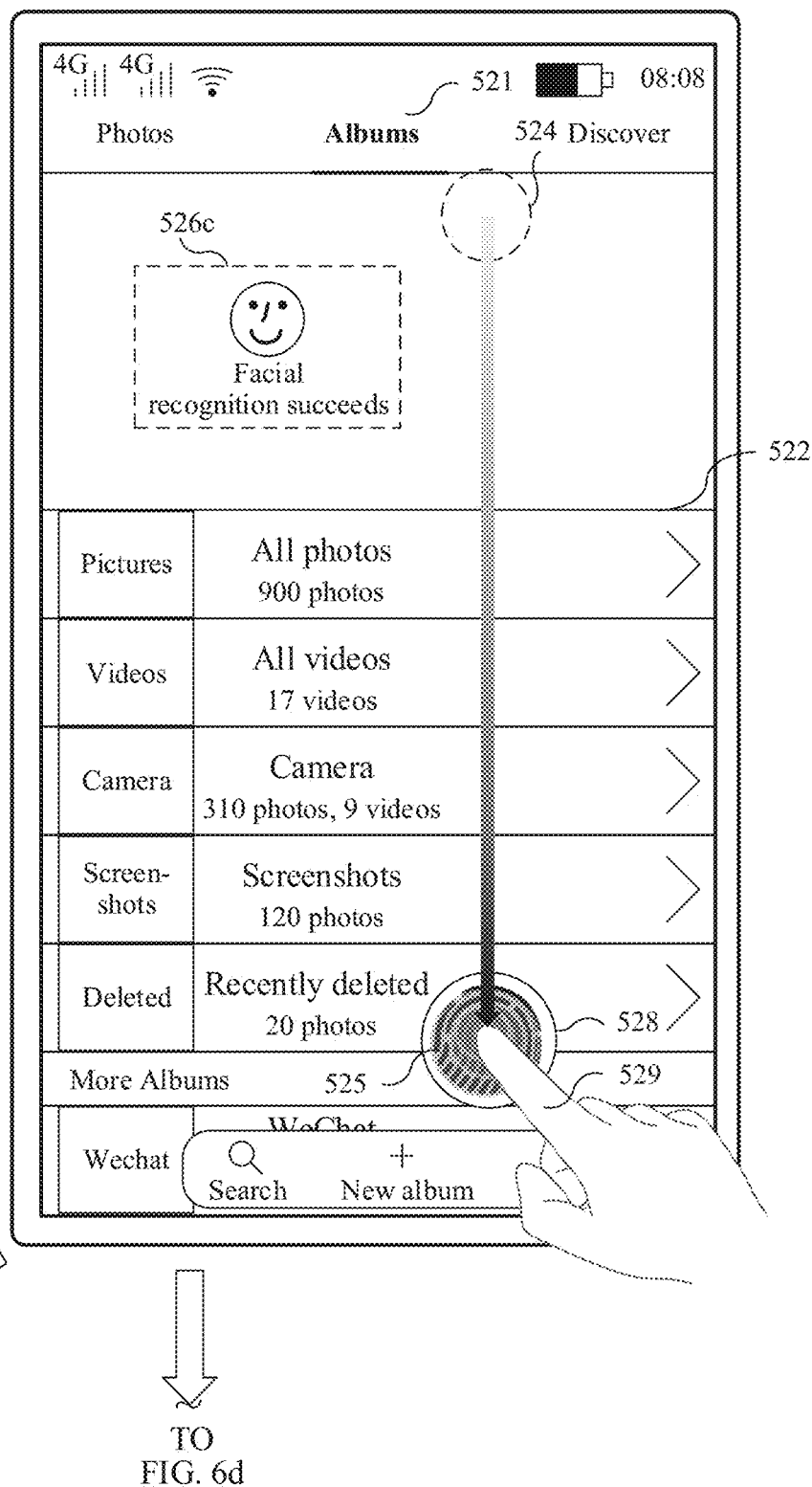

For example, as shown in FIG. 6b, when the finger slides onto the fingerprint recognition icon 528, the electronic device receives a touch operation of the user for the fingerprint recognition icon 528.

S412: The electronic device outputs a third prompt by using the touchscreen, to notify the user that matching of a fingerprint feature succeeds, and displays the hidden album.

The third prompt may be a picture and/or text. For example, the third prompt may be a picture prompt of "smiling face expression" and/or a text prompt "Fingerprint recognition succeeds".

For example, as shown in FIG. 6b, when the collected fingerprint information successfully matches the stored fingerprint information template, a third prompt 526c may be displayed on the touchscreen. After fingerprint recognition succeeds, the electronic device may display, on the display interface 522 corresponding to the "Albums" control 521, a "Hidden albums" entry 527 shown in FIG. 6c or a "Hidden albums" interface 530 shown in FIG. 6d, and the fingerprint recognition icon 528 disappears. For a process in which the fingerprint recognition icon 528 disappears, refer to the process in which the fingerprint recognition icon 528 disappears after facial recognition succeeds. Details are not described herein again. It may be understood that the "Hidden albums" entry 527 or the "Hidden albums" interface 530 may be displayed only after fingerprint recognition succeeds and the finger of the user is lifted, or may be displayed only after a period of time (for example, 1 second) after recognition succeeds. The electronic device may alternatively display the "Hidden albums" entry 527 or the "Hidden albums" interface 530 after fingerprint recognition succeeds, and does not display the third prompt. This is limited herein.

Figure 6C:
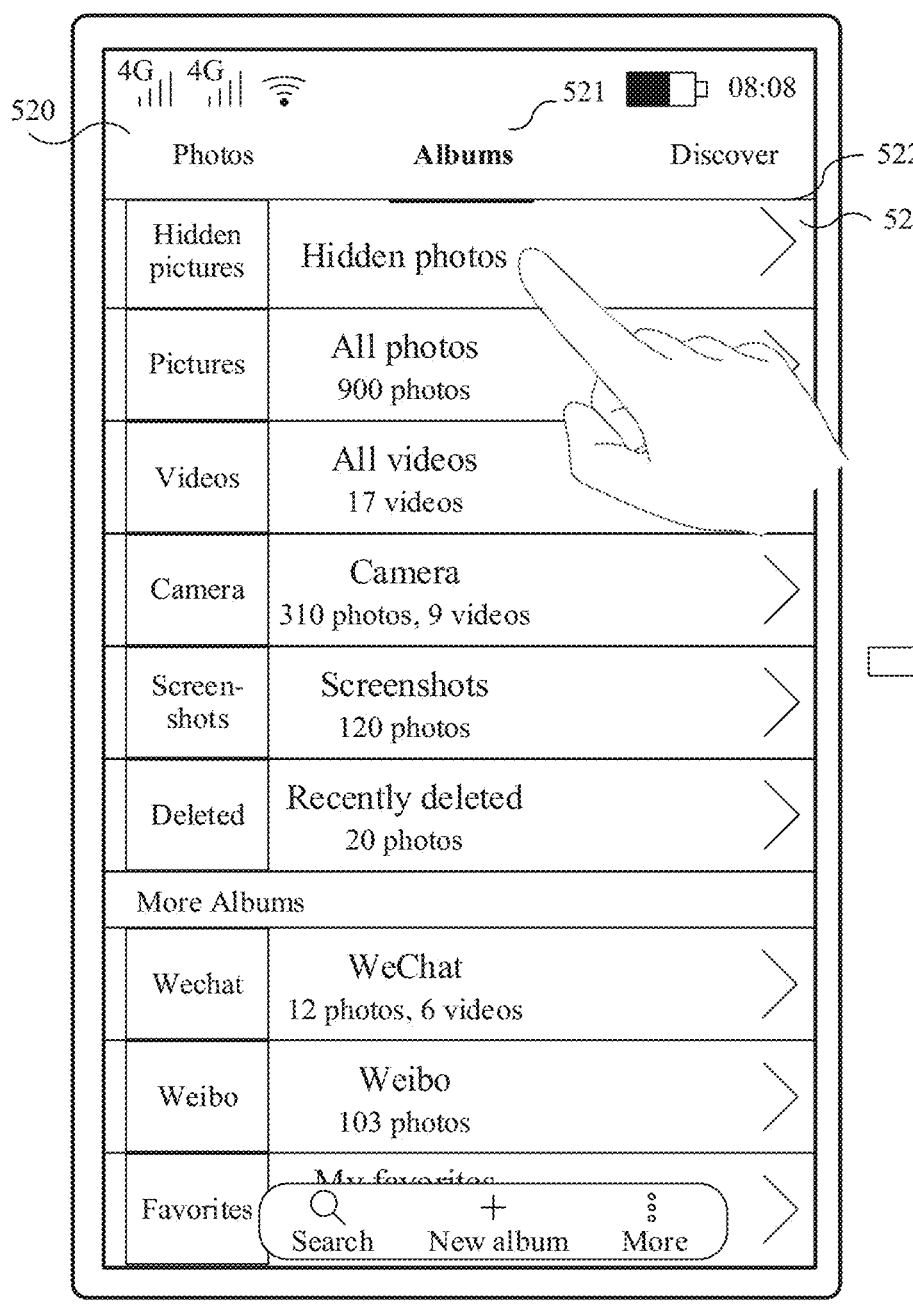
Figure 6D:
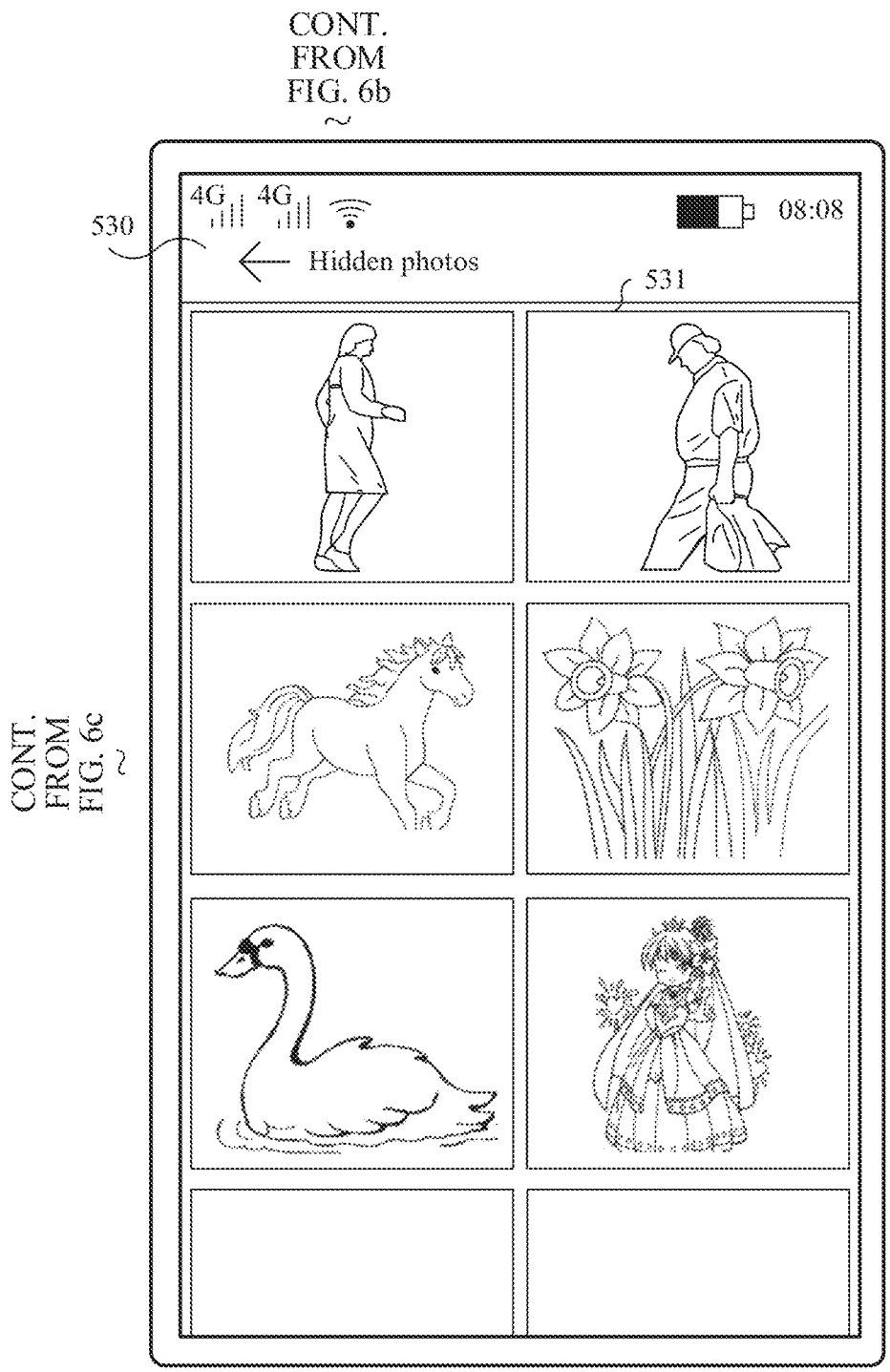

FIG. 6c is the same as FIG. 5f. Text descriptions of FIG. 5f are also applicable to FIG. 6c, and are not repeated herein again. FIG. 6d is the same as FIG. 5g. Text descriptions of FIG. 5g are also applicable to FIG. 6d, and are not repeated herein again.

In an implementation, a step of displaying FIG. 6d is optional. When facial recognition succeeds, the interface shown in FIG. 5e may be directly switched to the interface shown in FIG. 5g. In this way, after fingerprint recognition succeeds, the user may directly browse the hidden photo, thereby simplifying an input operation performed by the user to browse the hidden photo, and improving user experience.

S413: The electronic device outputs a fourth prompt by using the touchscreen, to notify the user that matching of a fingerprint feature fails.

The fourth prompt may be a picture and/or text. For example, the fourth prompt may be a picture prompt of "sad face expression" and/or a text prompt "Fingerprint recognition fails".

Figure 7A:
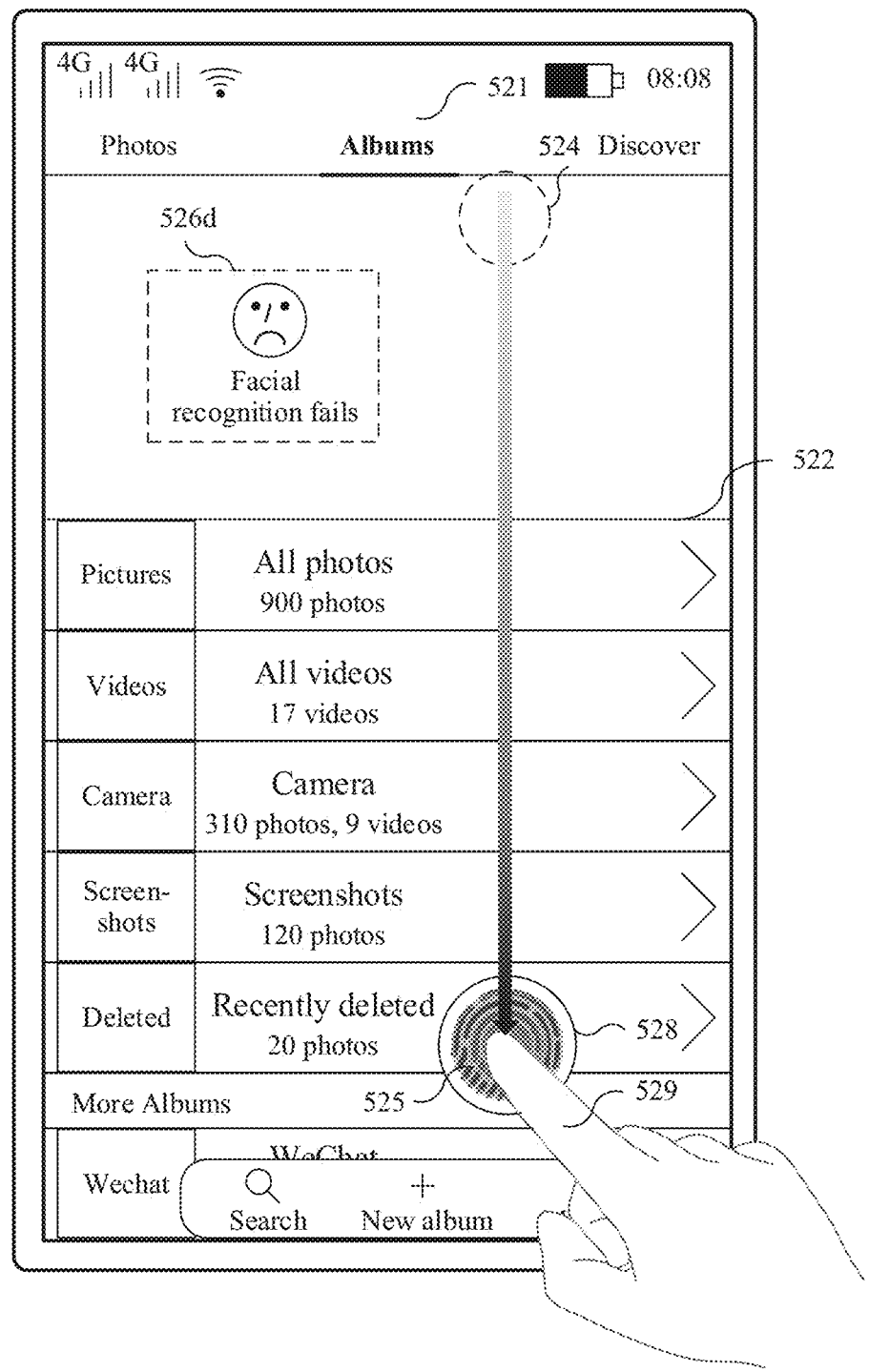
FIG. 7a and FIG. 7b are schematic diagrams of another group of interfaces according to an embodiment of this application.
Figure 7B:
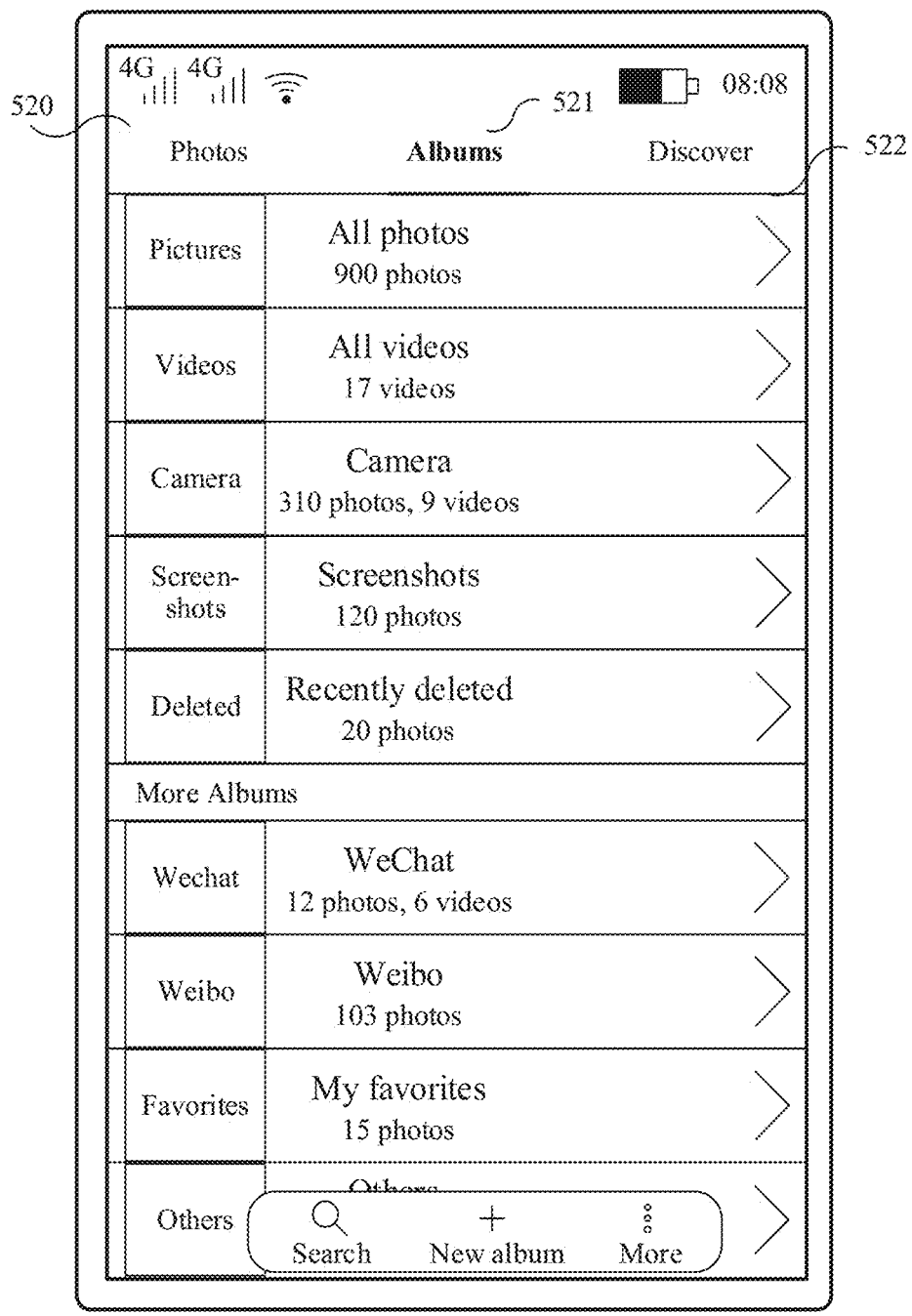

For example, as shown in FIG. 7a, when the collected fingerprint information does not match the stored fingerprint information template, a fourth prompt 526d may be displayed on the touchscreen.

In an implementation, when the sliding distance of the sliding operation of the user is greater than the first distance threshold (L1), the user may lift the finger (in other words, the finger leaves the touchscreen). The electronic device may collect the face information of the user by using the facial recognition module, and display the fingerprint recognition icon on the touchscreen. After collecting the face information of the user, the electronic device may match the face information with the stored face information template, and output a matching result on the touchscreen. If facial recognition succeeds, the electronic device may open the hidden album. If facial recognition fails, the electronic device may receive a touch operation of the user for the fingerprint recognition icon, and in response to the touch operation for the fingerprint recognition icon, the electronic device may collect the fingerprint information of the finger of the user, and perform matching with the stored fingerprint information template. If fingerprint matching succeeds, the electronic device may display the hidden album. In this way, facial recognition or fingerprint recognition may still be performed after the user accidentally lifts the finger in a sliding process, to display the "Hidden albums" entry or open the hidden album, thereby improving user experience.

Figure 8A:
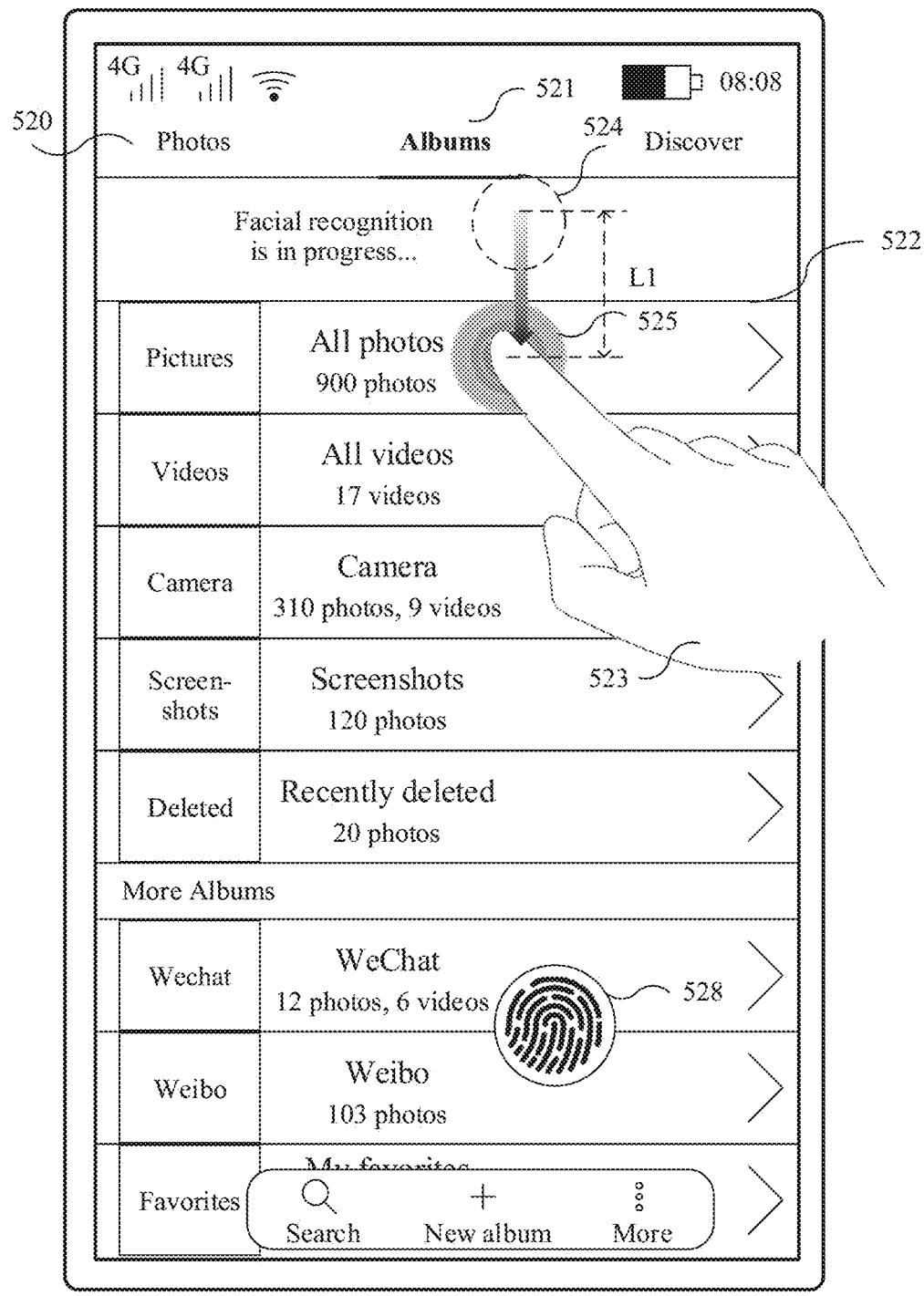
FIG. 8a to FIG. 8d are schematic diagrams of another group of interfaces according to an embodiment of this application.
Figure 8B:
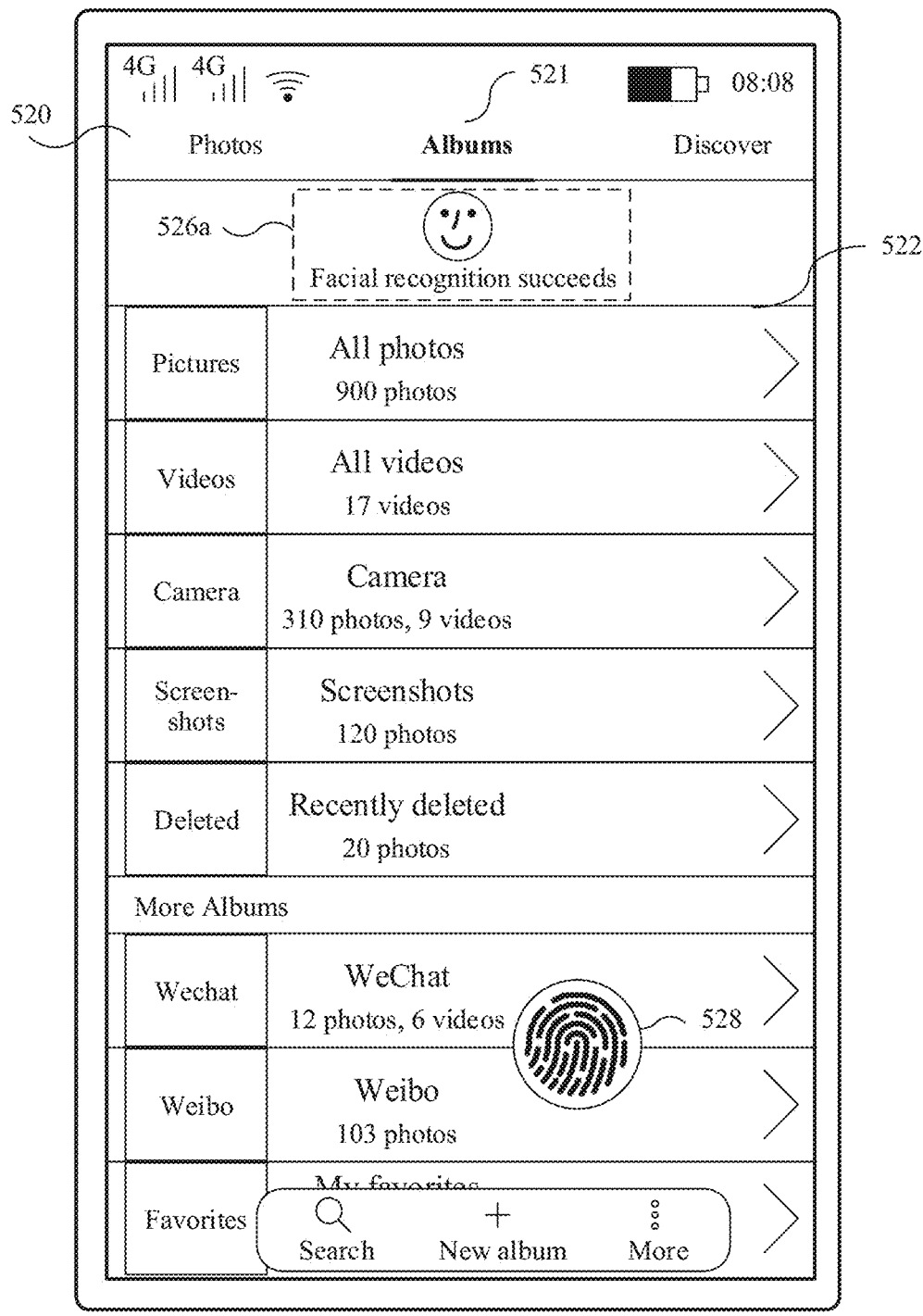

For example, as shown in FIG. 8a, the electronic device may receive the sliding operation 523 of the user, and the electronic device may determine whether the sliding distance of the finger of the user (which may be the distance between the current location 525 of the finger of the user and the start location 524) is greater than the first distance threshold (L1) in a process in which the user performs the sliding operation 523. When the electronic device determines that the sliding distance of the finger of the user is greater than the first distance threshold (L1) in the process of the sliding operation, the electronic device may collect the face information by using the camera lens, and display the fingerprint recognition icon 528 on the touchscreen. In this case, the user may lift the finger (in other words, the finger leaves the touchscreen) and wait for the electronic device to output a facial recognition result. If the collected face information successfully matches the stored face information template, the electronic device may display the hidden album 527 shown in FIG. 5f, or the electronic device may display the "Hidden albums" interface 530 shown in FIG. 5g. In an implementation, before the electronic device displays the hidden album 527 or the "Hidden albums" interface 530, the electronic device may output the first prompt 526a shown in FIG. 8b, and there may be a period of time (for example, 0.5 second, 1 second, or longer) between displaying the first prompt 526a by the electronic device and displaying the hidden album 527 or the "Hidden albums" interface 530.

Figure 8C:
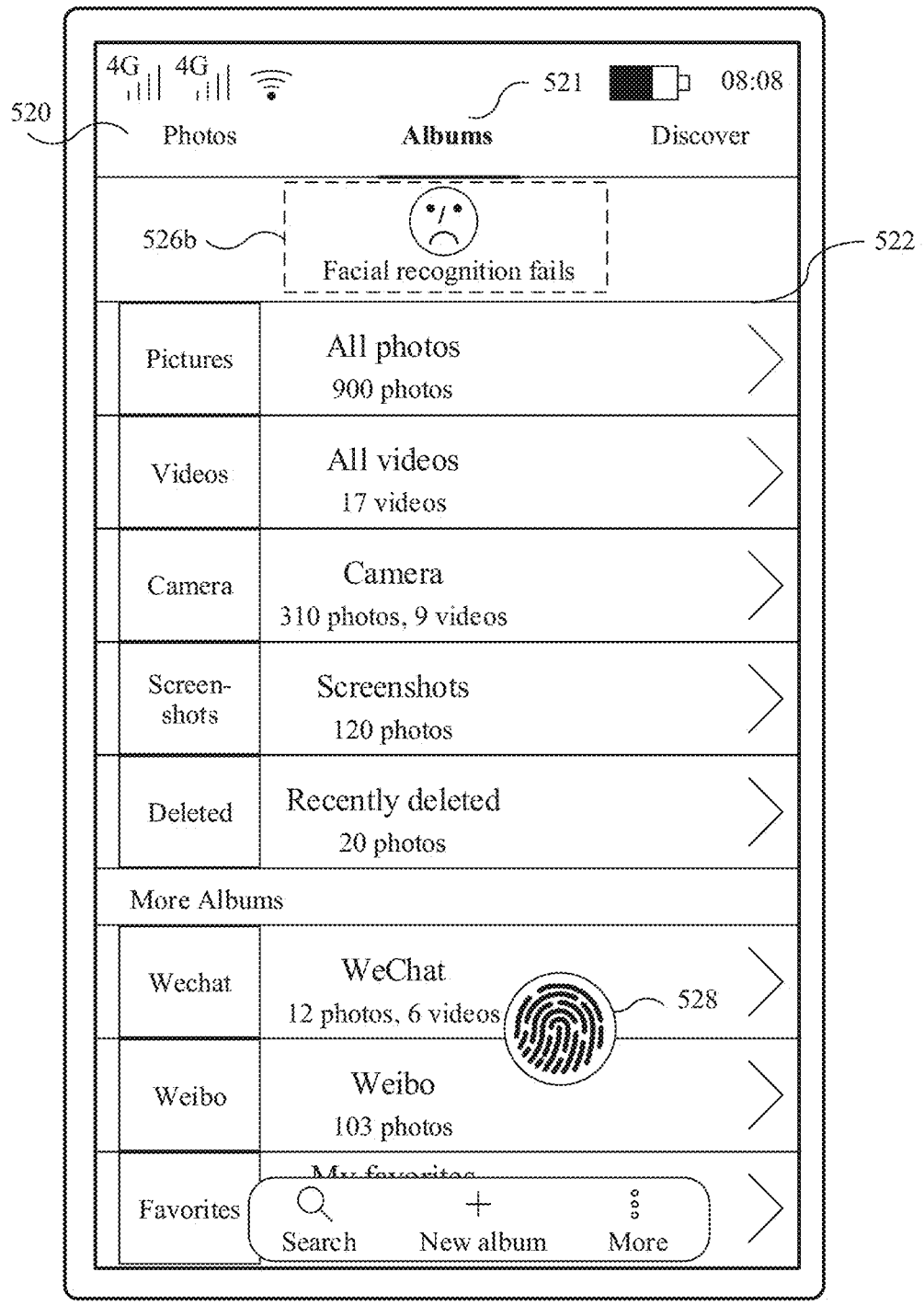
Figure 8D:
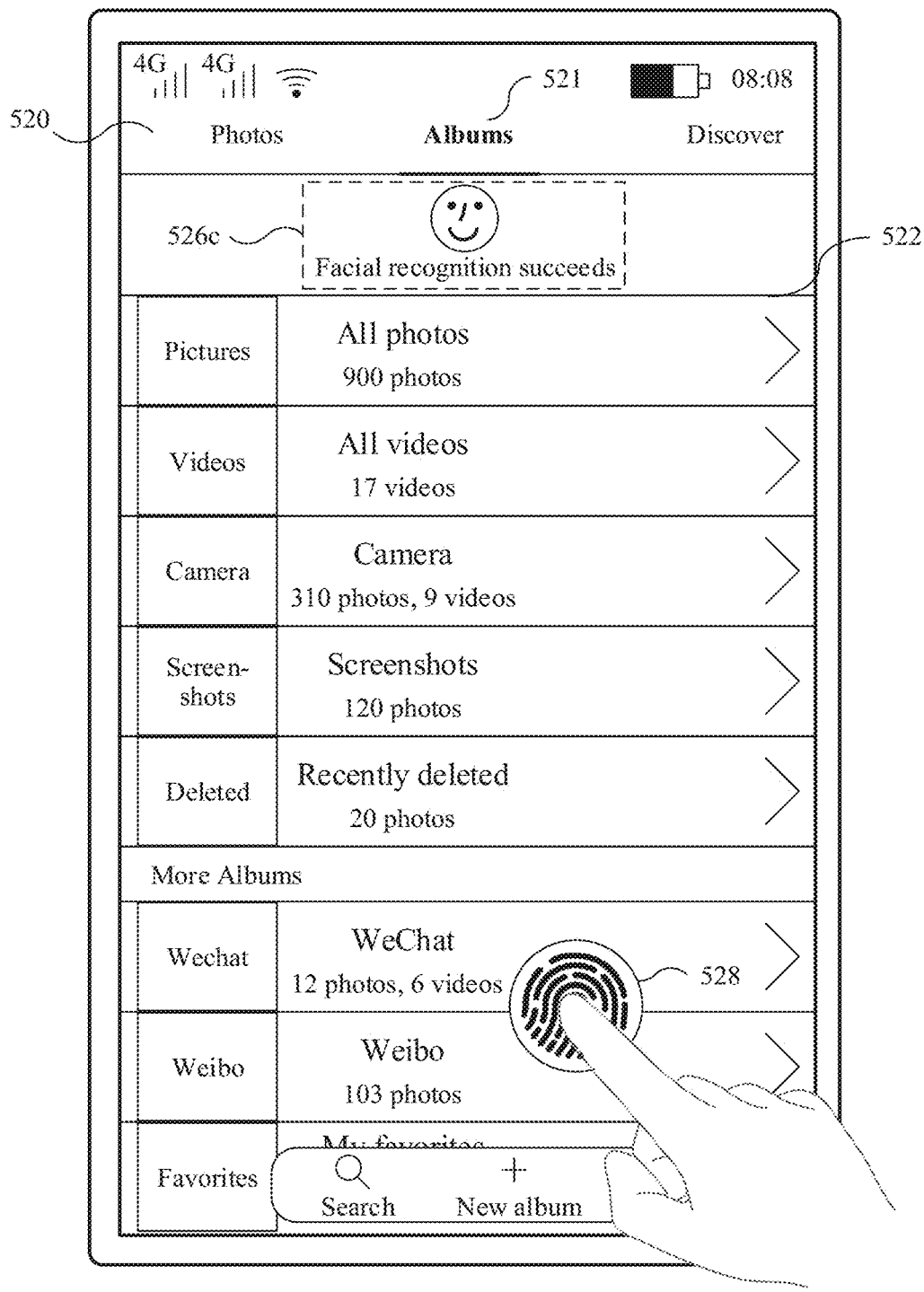

As shown in FIG. 8c, if facial recognition fails, the second prompt 526b may be displayed on the touchscreen. As shown in FIG. 8d, the electronic device may receive the touch operation of the user for the fingerprint recognition icon 528, and in response to the touch operation for the fingerprint recognition icon 528, the electronic device may collect the fingerprint information of the finger of the user by using the fingerprint recognition module, and perform matching with the stored fingerprint information template. If the collected fingerprint information successfully matches the stored fingerprint information template, the electronic device may display the "Hidden albums" entry 527 shown in FIG. 5f, or the electronic device may display the "Hidden albums" interface 530 shown in FIG. 5g.

In an implementation, the electronic device may receive the sliding operation of the user in a gallery application, and trigger only an identity authentication manner of facial recognition to identify an identity of the user, to quickly open the hidden album.

Figure 9A:
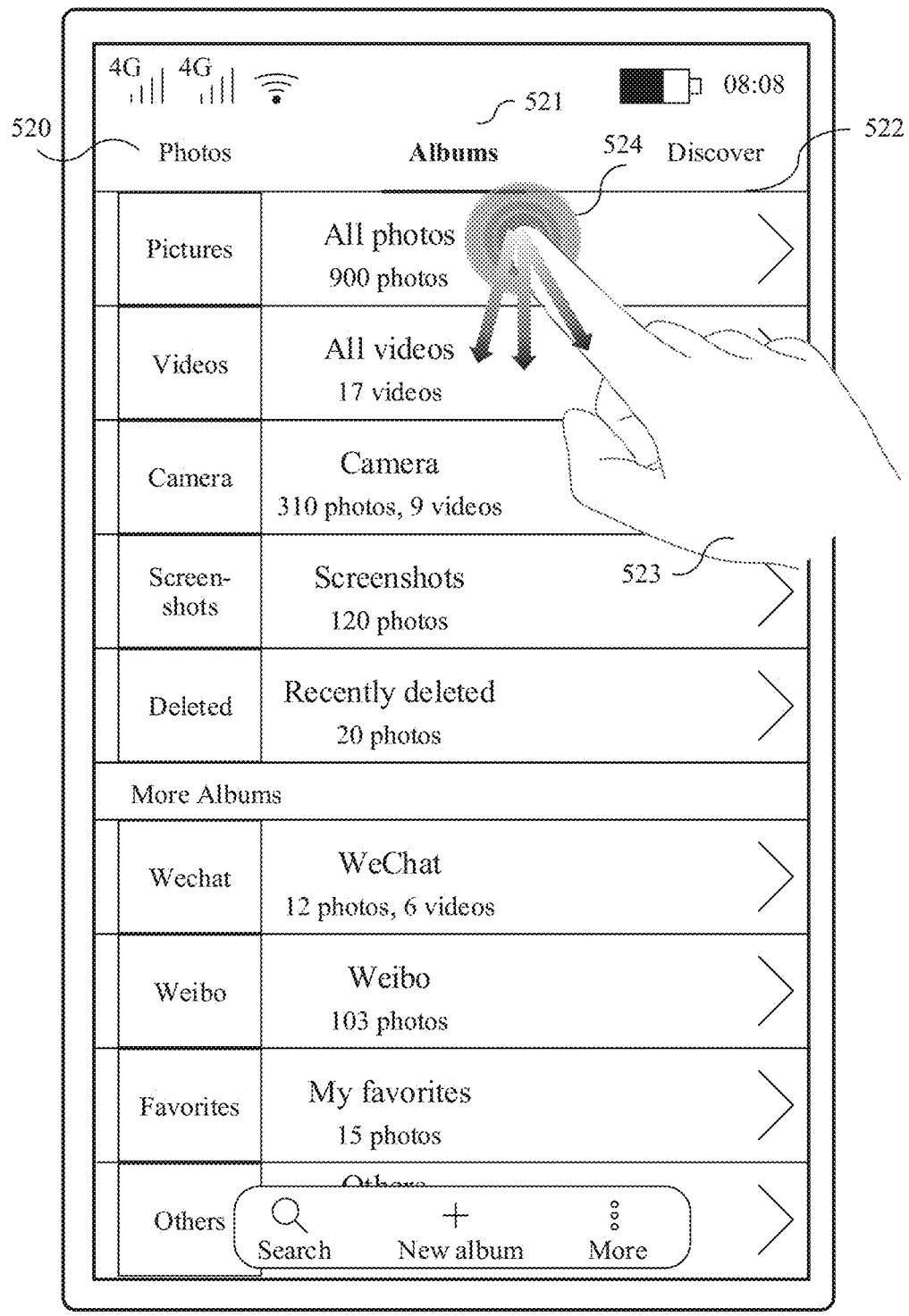
FIG. 9a to FIG. 9d are schematic diagrams of another group of interfaces according to an embodiment of this application.

For example, as shown in FIG. 9a, the electronic device may receive the sliding operation 523 of the user in the gallery application interface 520. For the sliding operation 523, refer to the sliding operation 523 in FIG. 5c. Details are not described herein again.

Figure 9B:
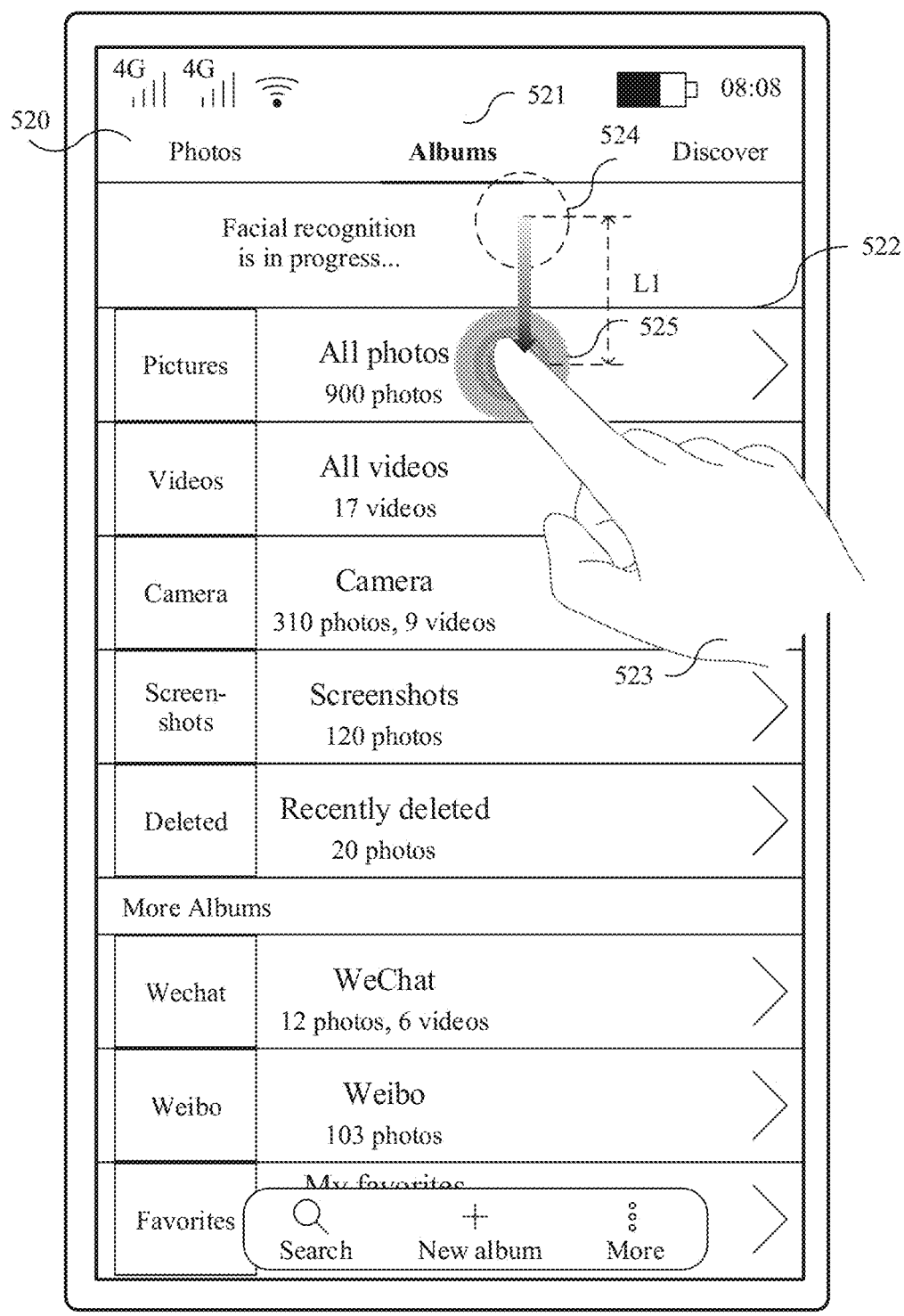

As shown in FIG. 9b, in a process in which the electronic device receives the sliding operation 523 of the user, when the electronic device determines that the sliding distance of the finger of the user (which may be the distance between the current location 525 of the finger of the user and the start location 524) is greater than the first distance threshold (L1), the electronic device may collect the face information by using the facial recognition module, and does not display the fingerprint recognition icon (in other words, does not enable the fingerprint recognition module). The electronic device may match the collected face information with the stored face information template.

Figure 9C:
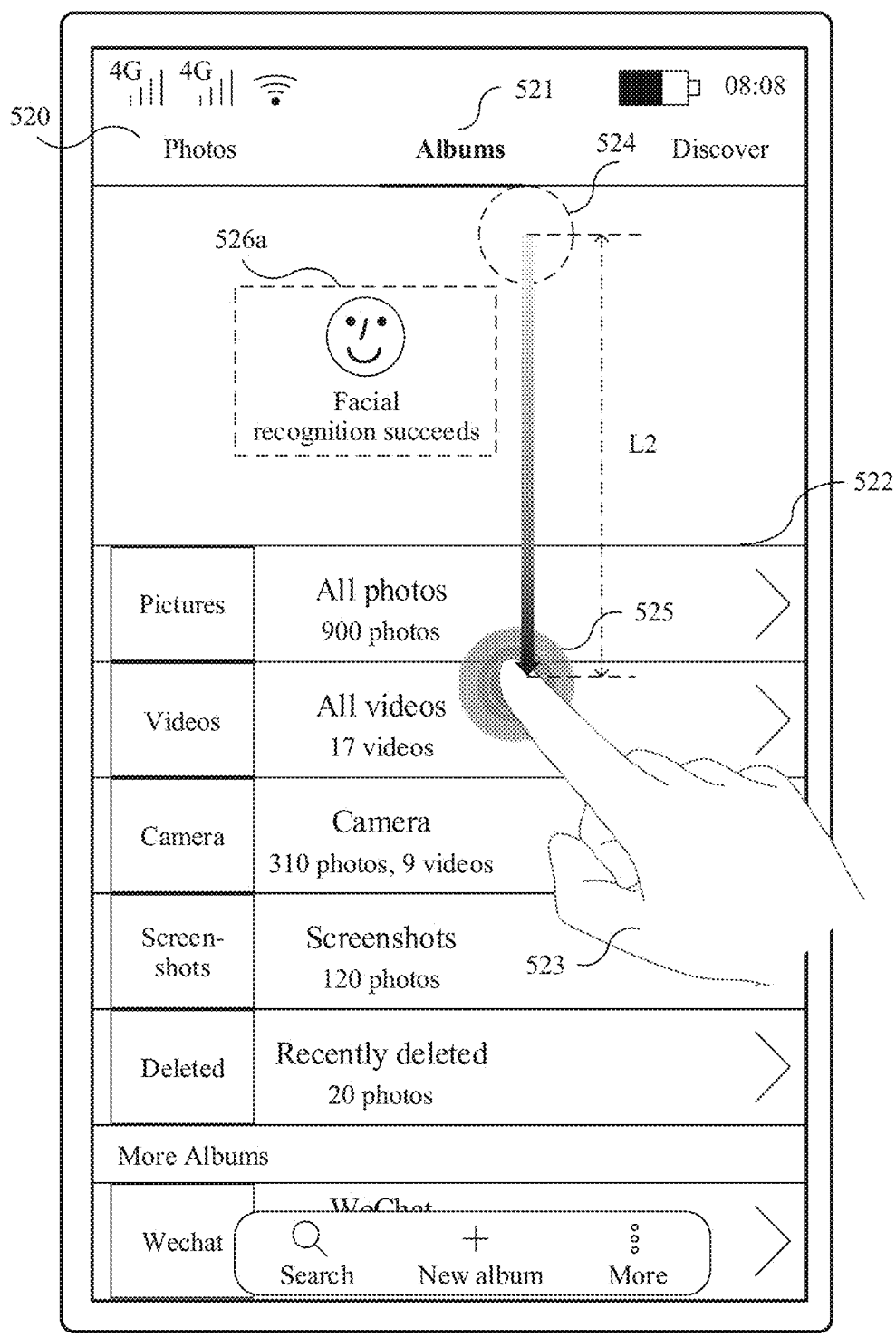

As shown in FIG. 9c, in the process in which the electronic device receives the sliding operation 523 of the user, when the electronic device determines that the sliding distance of the finger of the user (which may be the distance between the current location 525 of the finger of the user and the start location 524) is greater than the second distance threshold (L2), if the collected face information successfully matches the stored face information template, the electronic device may display, on the display interface 522 corresponding to the "Albums" control 521, the hidden album 527 shown in FIG. 5f in the foregoing embodiment, or the "Hidden albums" interface 530 shown in FIG. 5g in the foregoing embodiment.

In an implementation, when the sliding distance of the sliding operation of the user is greater than the first distance threshold (L1), the user may lift the finger (in other words, the finger leaves the touchscreen). The electronic device may collect the face information of the user by using the facial recognition module. After collecting the face information of the user, the electronic device may match the face information with the stored face information template, and output the first prompt or the second prompt on the touchscreen. The first prompt is used to notify the user that facial recognition succeeds, and the second prompt is used to notify the user that facial recognition fails. If facial recognition succeeds, the electronic device may display the "Hidden albums" entry or open the hidden album. In this way, identity identification may still be performed after the user accidentally lifts the finger in the sliding process, thereby improving user experience.

Figure 9D:
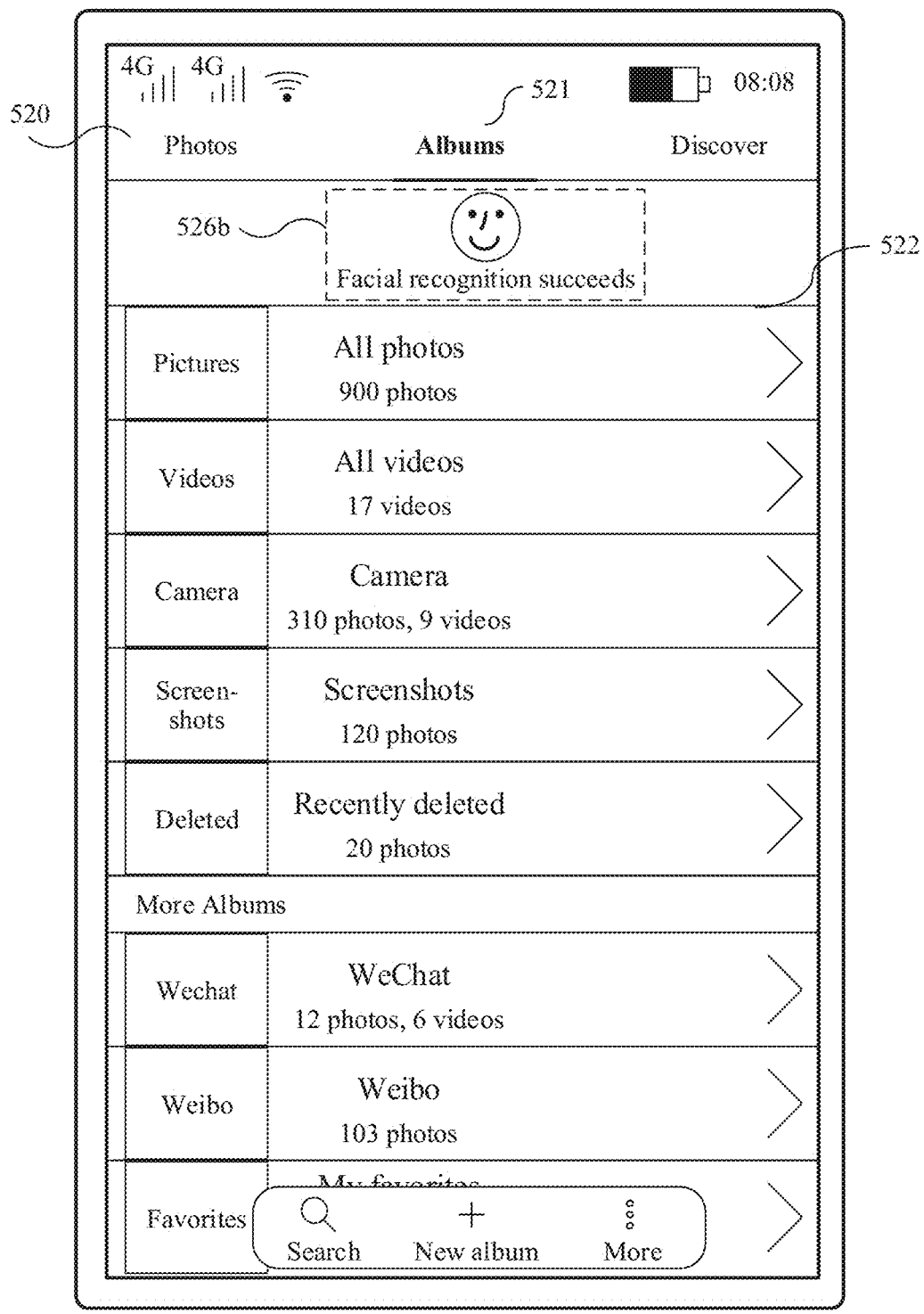

For example, as shown in FIG. 9b and FIG. 9d, in the process in which the electronic device receives the sliding operation 523 of the user, when the sliding distance of the finger of the user is greater than the first distance threshold (L1), the electronic device may collect the face information by using the facial recognition module. In this case, the user may lift the finger (in other words, the finger leaves the touchscreen) and wait for the electronic device to output a facial recognition result (the first prompt or the second prompt). If the collected face information successfully matches the stored face information template, the electronic device may display the hidden album 527 shown in FIG. 5f, or the electronic device may display the "Hidden albums" interface 530 shown in FIG. 5g.

In an implementation, the electronic device may receive the sliding operation of the user in the gallery application, and trigger only an identity authentication manner of fingerprint recognition to identify an identity of the user, to quickly open the hidden album.

Figure 10A:
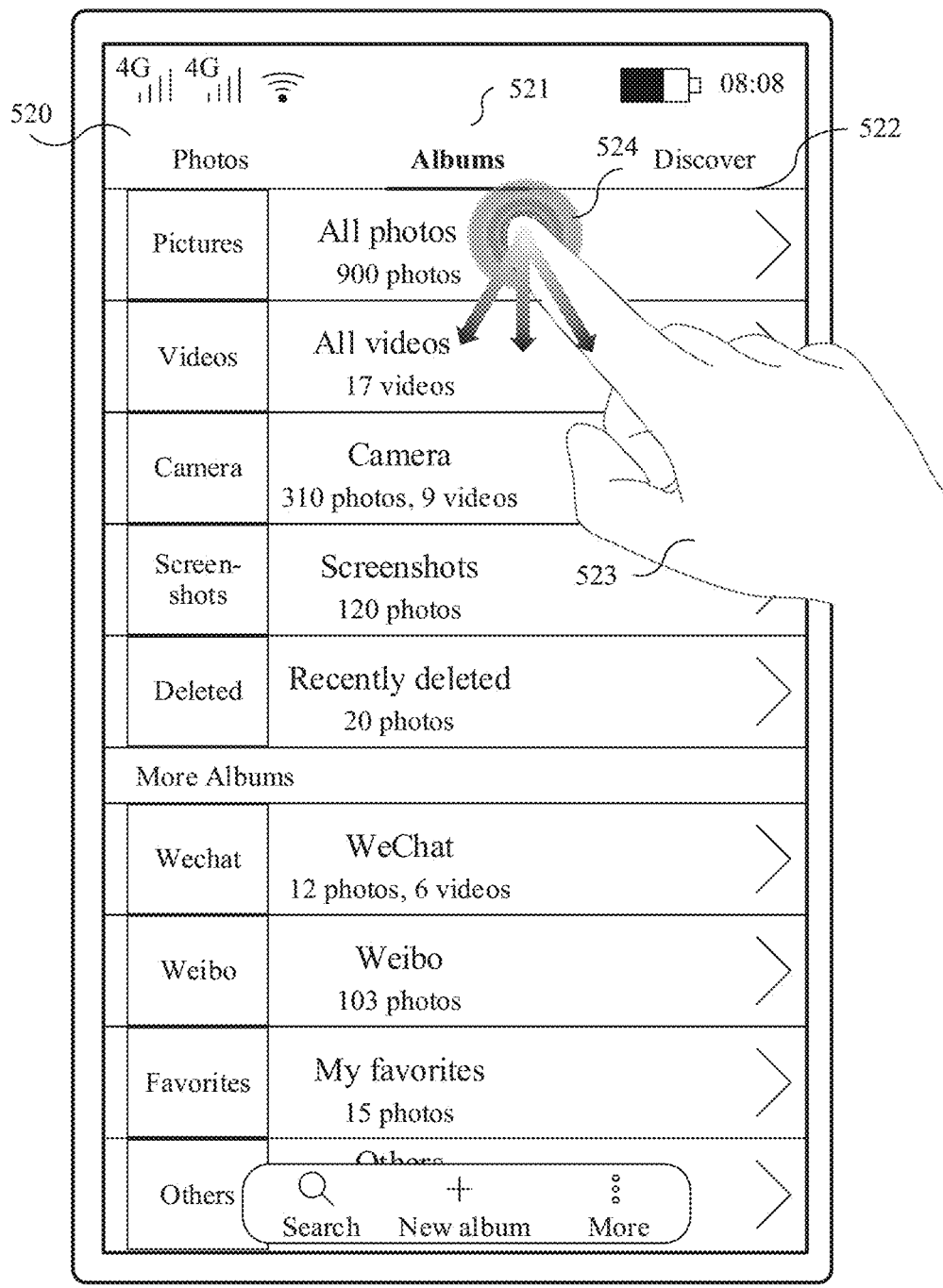
FIG. 10a to FIG. 10d are schematic diagrams of another group of interfaces according to an embodiment of this application.

For example, as shown in FIG. 10a, the electronic device may receive the sliding operation 523 of the user in the gallery application interface 520. For the sliding operation 523, refer to the sliding operation 523 in FIG. 5c. Details are not described herein again.

Figure 10B:
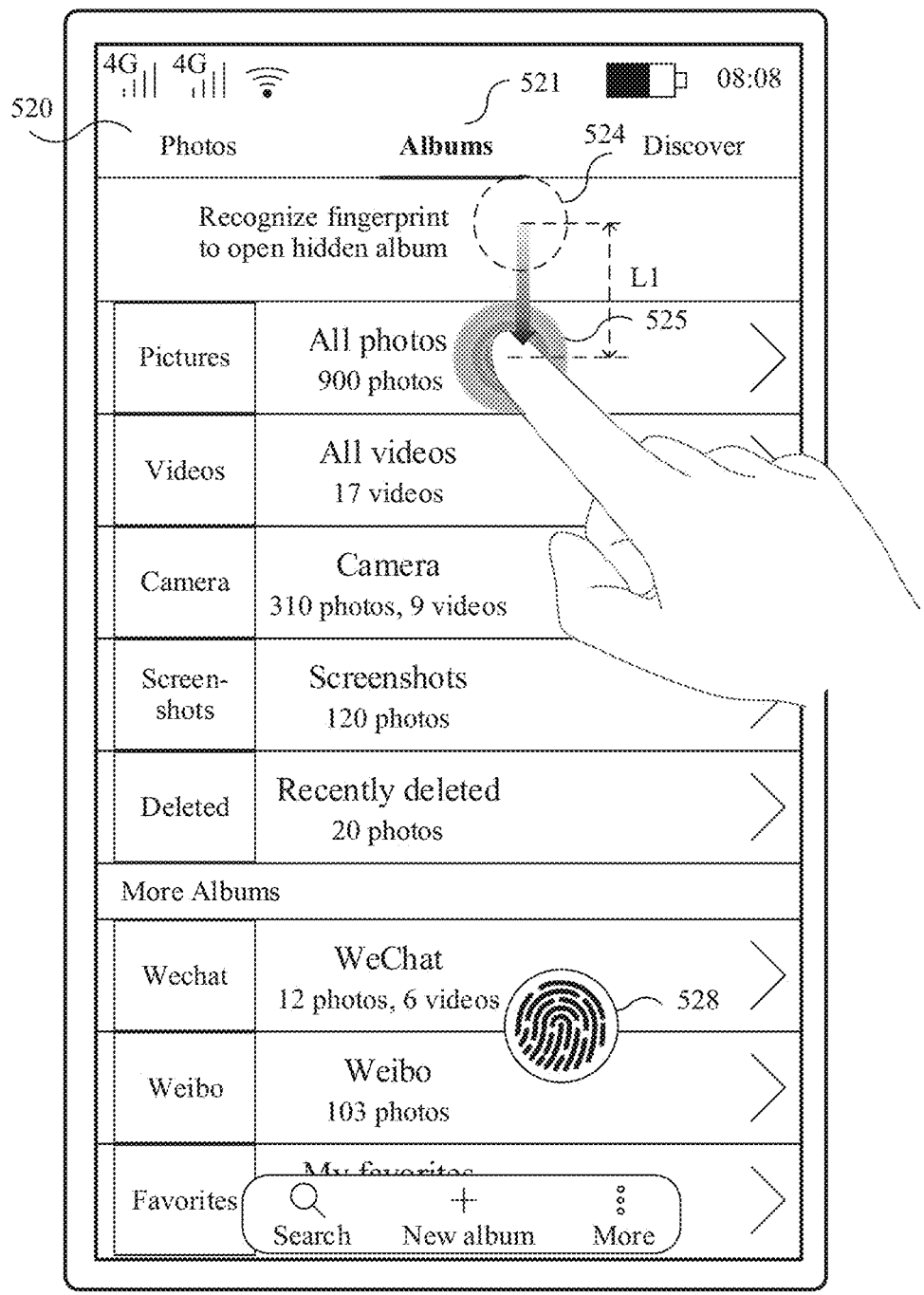

As shown in FIG. 10b, in a process in which the electronic device receives the sliding operation 523 of the user, when the electronic device determines that the sliding distance of the finger of the user (which may be the distance between the current location 525 of the finger of the user and the start location 524) is greater than the first distance threshold (L1), the electronic device may display the fingerprint recognition icon 528 on the touchscreen, and does not enable the facial recognition module.

Figure 10C:
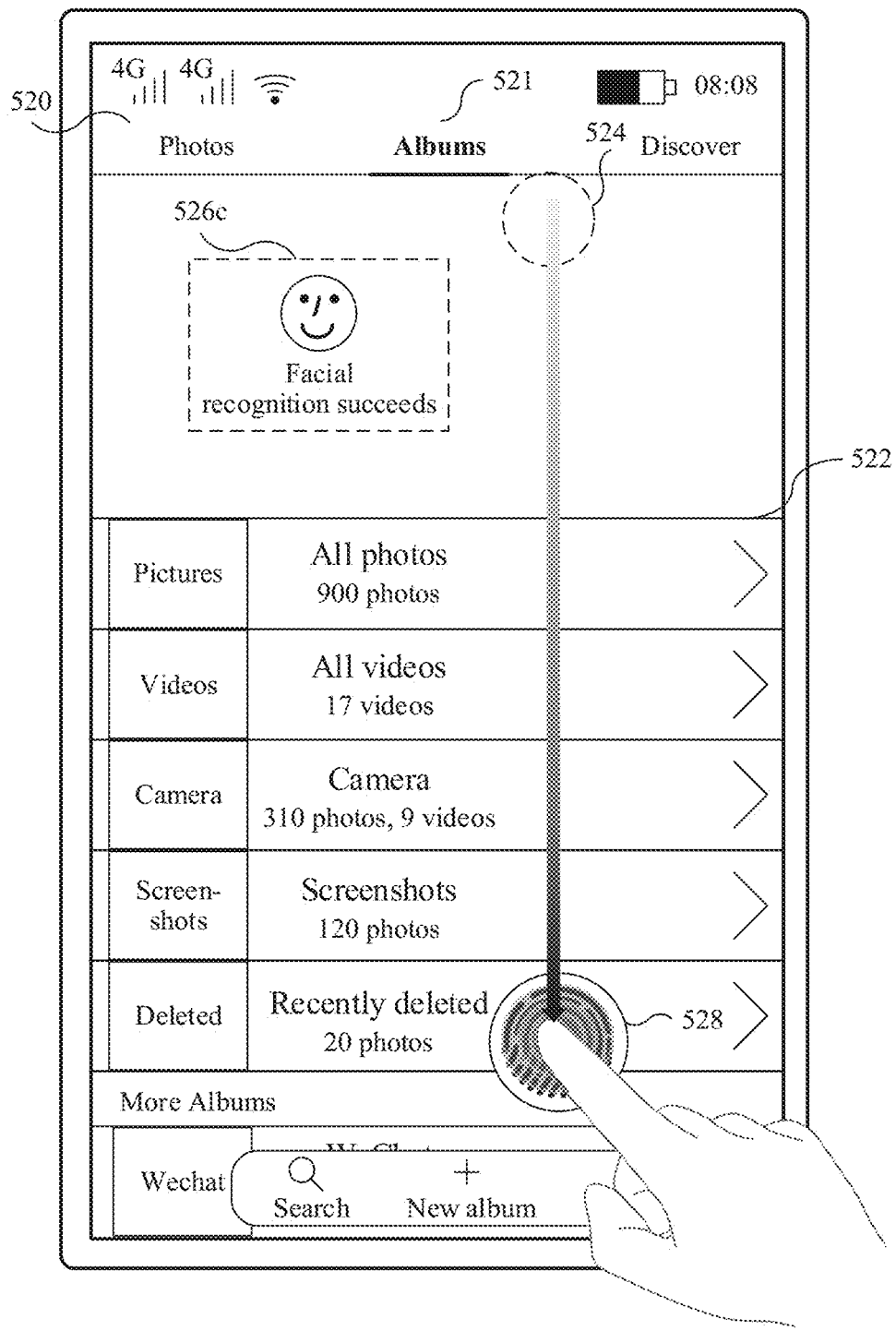
Figure 10D:
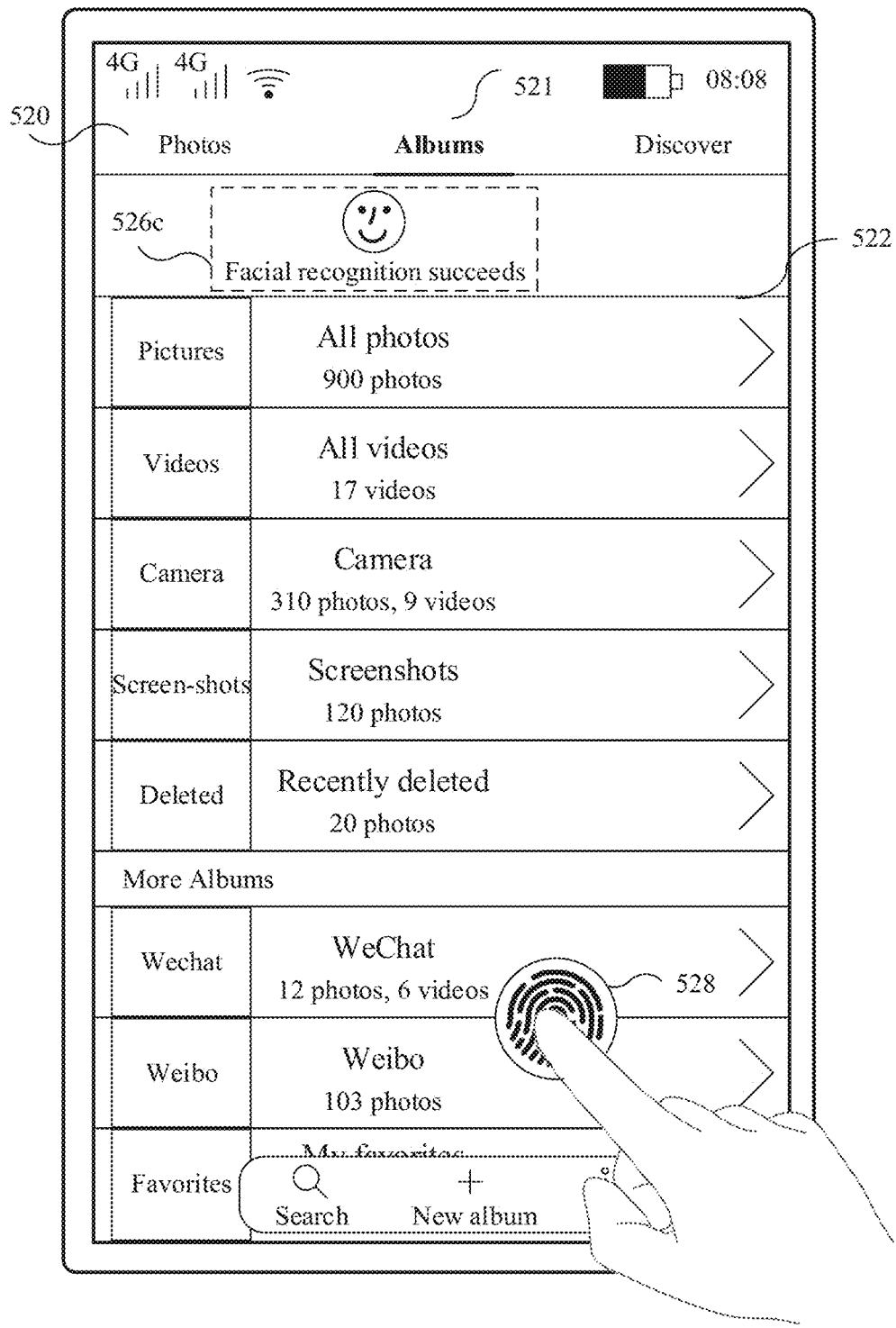

As shown in FIG. 10c and FIG. 10d, the electronic device may receive a touch operation of the user for the fingerprint recognition icon 528. The touch operation for the fingerprint recognition icon 528 may be shown in FIG. 10c. In a process in which the user uses the sliding operation 523, the finger slides to a location of the fingerprint recognition icon 528. The touch operation for the fingerprint recognition icon 528 may be alternatively shown in FIG. 10d. After the sliding distance of the sliding operation of the user is greater than the first distance threshold (L1), the user touches the fingerprint recognition icon 528 after lifting the finger (in other words, the finger leaves the touchscreen). In response to the touch operation for the fingerprint recognition icon 528, the electronic device may collect the fingerprint information of the finger of the user by using the fingerprint recognition module, and perform matching with the stored fingerprint information template. After fingerprint recognition succeeds (in other words, the collected fingerprint information successfully matches the stored fingerprint information template), the electronic device may display the hidden album 527 in the embodiment shown in FIG. 5f, or the electronic device may display the "Hidden albums" interface 530 in the embodiment shown in FIG. 5g.

Application scenario 2: An embodiment of this application provides a biometric authentication interaction method, to quickly identify an identity of a user, and display an icon of a hidden application or open a hidden application after identity identification succeeds.

Figure 11A:
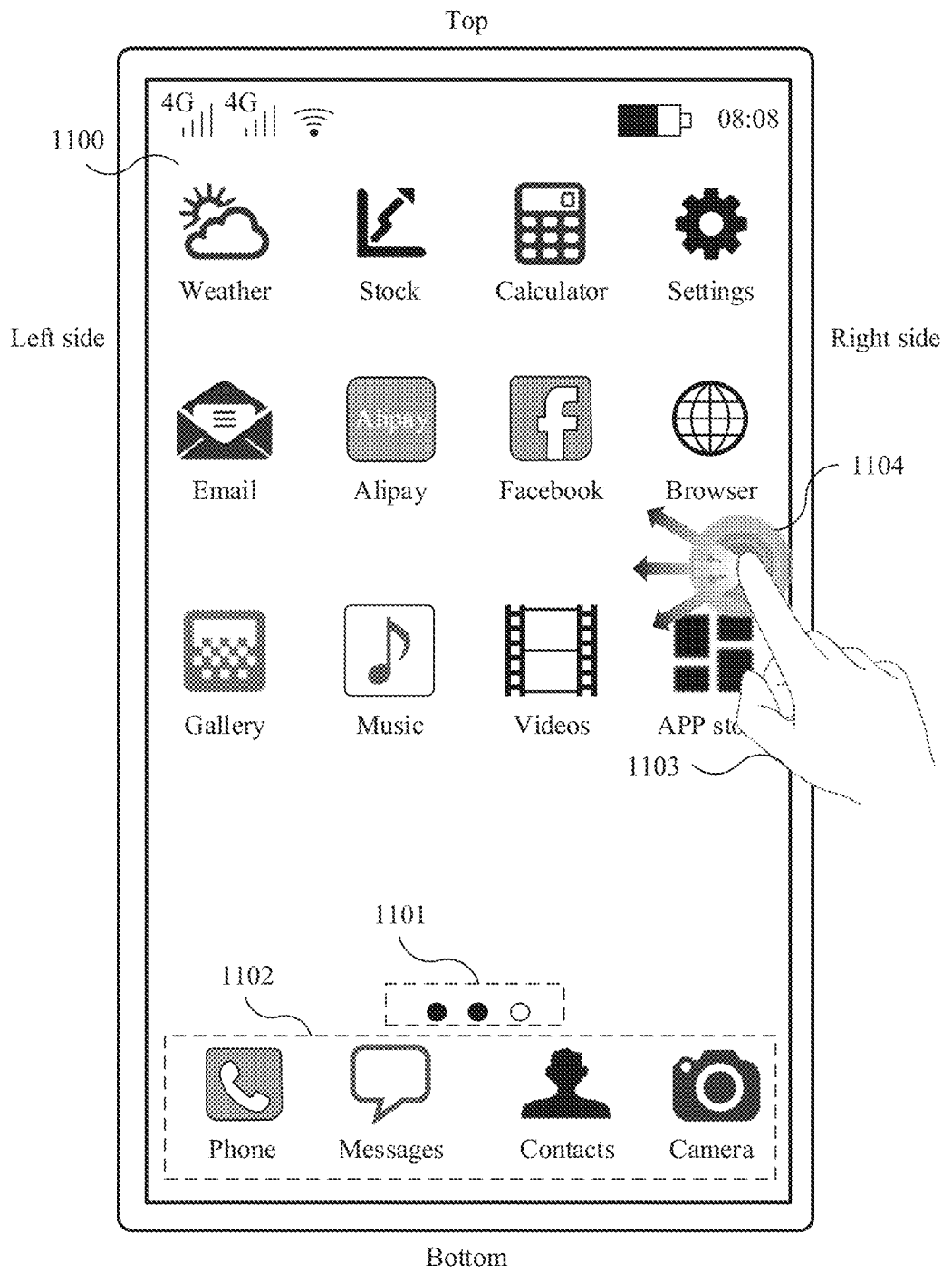
FIG. 11a to FIG. 11g are schematic diagrams of another group of interfaces according to an embodiment of this application.

As shown in FIG. 11a, a touchscreen of an electronic device displays a rightmost page 1100 (or referred to as a last page) in all pages (which do not include an interface that accommodates an icon of a hidden application) of a home screen. A page indicator 1101 on an interface shown in FIG. 11a indicates that there are three pages in total, and a rightmost page in the three pages is currently displayed. The rightmost page 1100 includes a plurality of application icons (for example, a weather application icon, a stock application icon, a calculator application icon, a settings application icon, an email application icon, a music application icon, a videos application icon, and an APP store icon). There are a plurality of tray icons 1102 (for example, a phone application icon, a messages application icon, a contacts application icon, and a camera application icon) below the page indicator 1101. The tray icons 1102 keep displayed during page switching. The rightmost page 1100 may include a plurality of application icons and the page indicator 1101. Alternatively, the page indicator 1101 may not be a part of the page and exist alone. The tray icon is also optional. This is not limited in this embodiment of the present invention.

As shown in FIG. 11a, the electronic device may receive a sliding operation 1103 of a user on the rightmost page 1100 of the home screen, and a start point of the sliding operation 1103 may be a right area of the rightmost page. For example, a sliding start location of the sliding input operation 1103 may be a location 1104 shown in FIG. 11a. A trend of the sliding operation 1103 may be from the right side of the touchscreen to the left side, and the sliding operation is not required to be roughly parallel to the left and right sides of the touchscreen. For example, the sliding operation is, as shown in FIG. 11a, sliding from the right side of the touchscreen to the left side in a direction toward the bottom, or sliding from the right side of the touchscreen to the left side in a direction toward the top. In addition to the foregoing examples of the sliding operation, the sliding operation may be a single-finger sliding operation, or may be a two-finger sliding operation.

The electronic device may determine whether a sliding distance of the sliding operation is greater than a first distance threshold (L1), and if yes, the electronic device may collect face information by using a camera lens, and display a fingerprint recognition icon on the touchscreen. The sliding distance of the sliding operation may be a displacement from the start location to a current location of a finger of the user after the finger touches the touchscreen. In an optional implementation, the sliding distance of the sliding operation may be alternatively a displacement, in a specific direction, from the start location to the current location of the finger of the user after the finger touches the touchscreen (for example, a displacement on the touchscreen in a left-to-right direction).

Figure 11B:
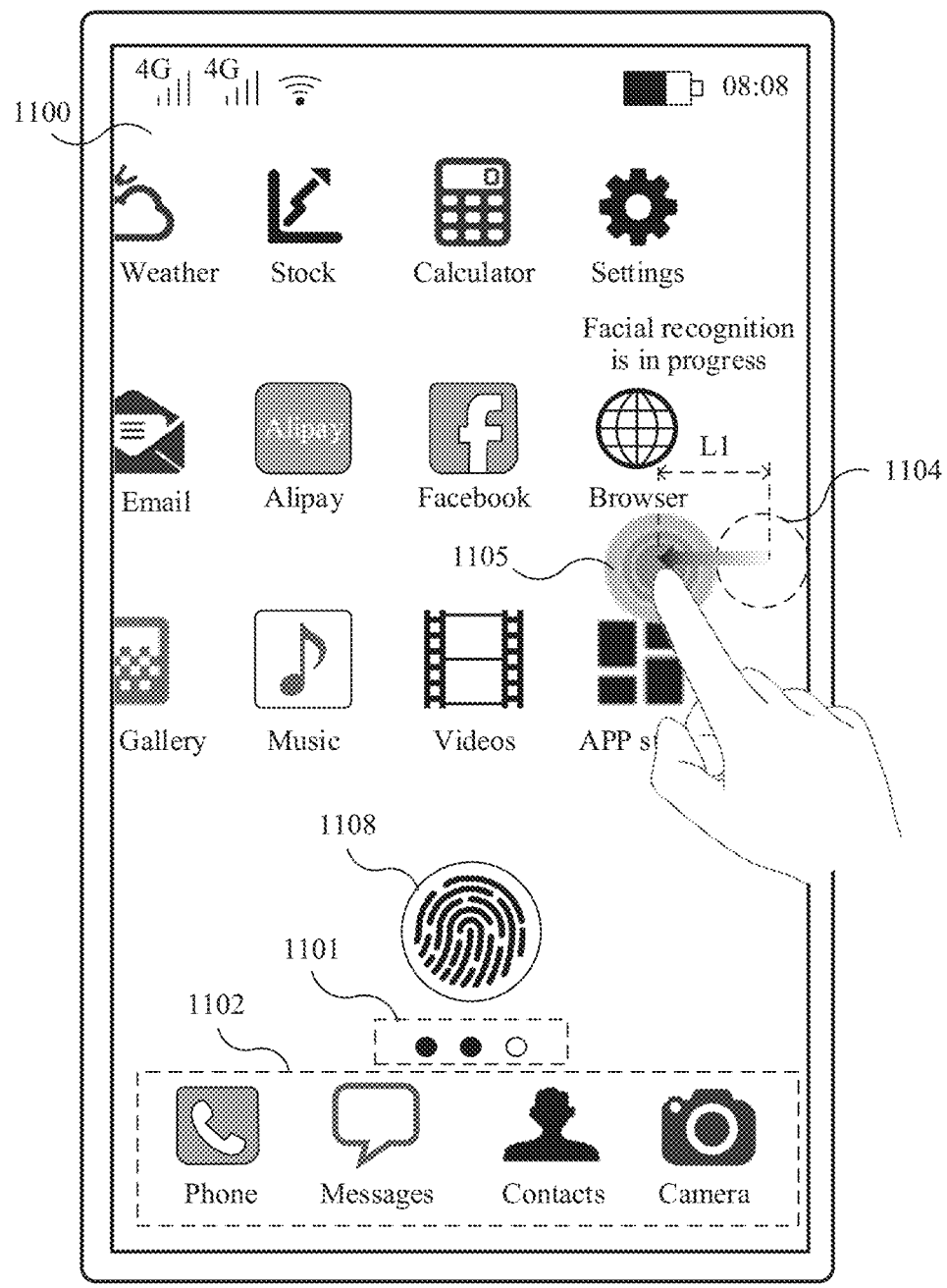

For example, as shown in FIG. 11b, in a process in which the electronic device receives the sliding operation 1103 of the user, when the electronic device determines that the sliding distance of the finger of the user (which may be a distance between the current location 1104 of the finger of the user and the start location 1105) is greater than the first distance threshold (L1), the electronic device may enable a facial recognition module to collect the face information, and displays a fingerprint recognition icon 1108 on the touchscreen. After the electronic device collects the face information, the electronic device may match the collected face information with a stored face information template. The face information template may be entered by the user before the electronic device performs facial recognition.

After collecting the face information of the user, the electronic device may determine whether the face information matches the stored face information template. If yes, the electronic device may output a first prompt by using the touchscreen, to notify the user that facial recognition succeeds, and displays a hidden application.

Figure 11C:
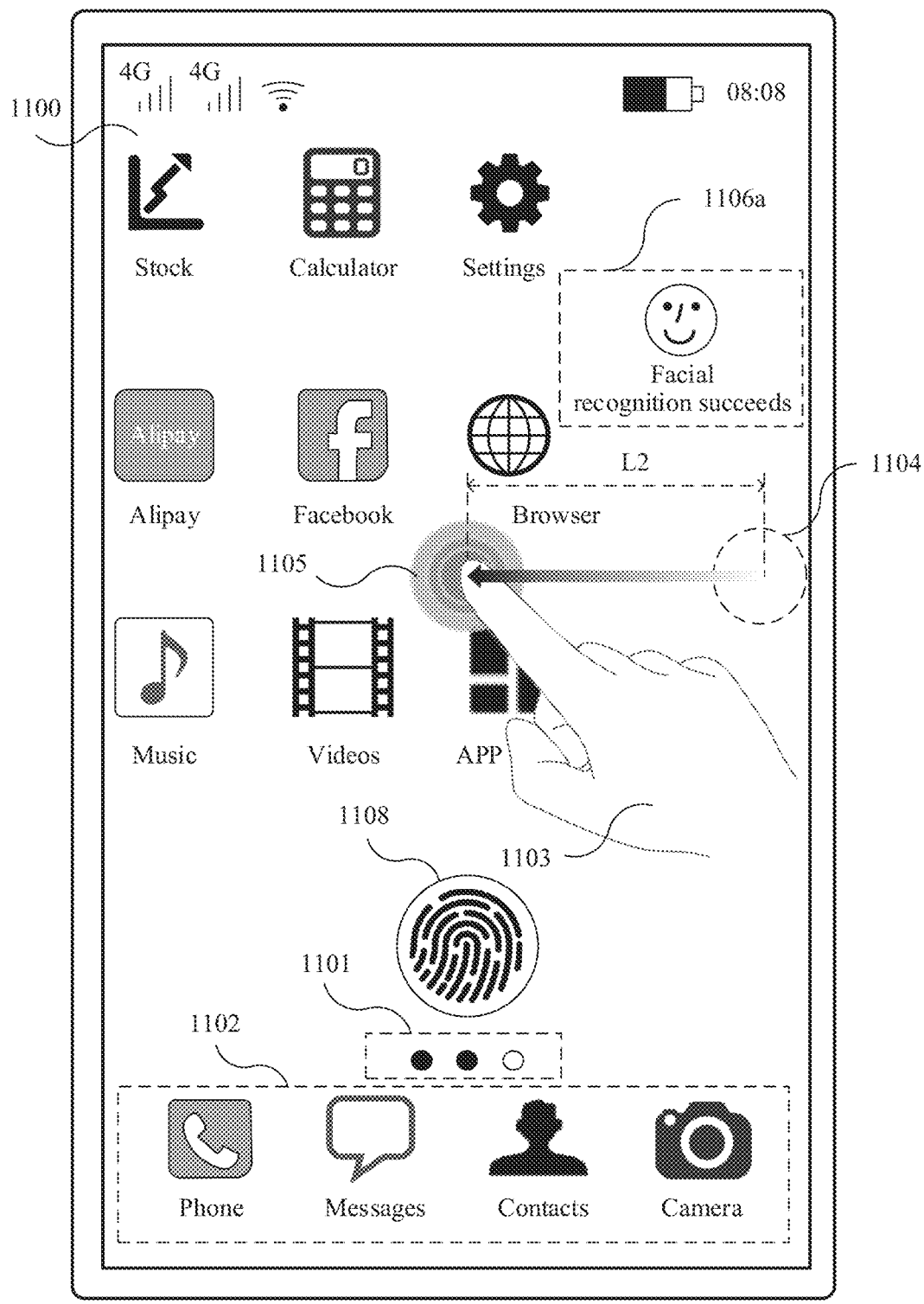
Figure 11D:
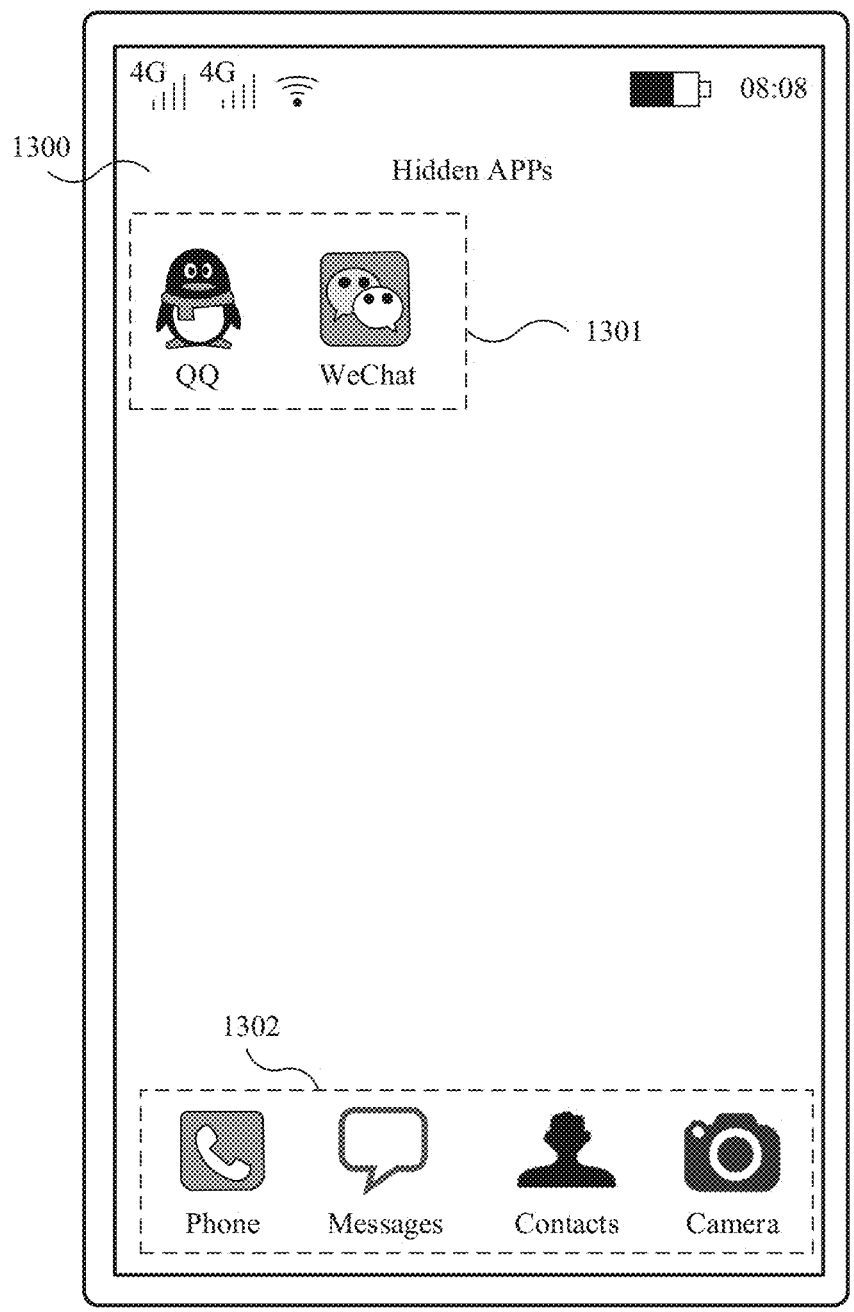

As shown in FIG. 11c, in the process in which the electronic device receives the sliding operation 1103 of the user, when the electronic device determines that the sliding distance of the finger of the user (which may be the distance between the current location 1105 of the finger of the user and the start location 1104) is greater than a second distance threshold (L2), a first prompt 1106a may be displayed on the touchscreen. When the collected face information successfully matches the stored face information template, the electronic device may display a hidden application (for example, QQ and WeChat) shown in FIG. 11d. As shown in FIG. 11d, the electronic device may display a page 1130 on which an icon of the hidden application is placed, and the page 1130 may include an icon 1131 of one or more hidden applications (for example, QQ and WeChat). When the page 1130 on which the icon of the hidden application is placed is displayed, a plurality of tray icons 1132 may still be displayed. When the electronic device displays the page 1130 on which the icon of the hidden application is placed, the fingerprint recognition icon 1108 in FIG. 11c disappears.

The fingerprint recognition icon 1108 may disappear instantaneously, or may use a gradient effect, for example, slowly disappears from clear to transparent and then to none. This is not limited herein. After the fingerprint recognition icon 1108 disappears, a fingerprint recognition module under the screen may be disabled. In this way, the fingerprint recognition icon 1108 can be prevented from blocking a display interface on the touchscreen for a long time, and the fingerprint recognition module under the screen can be prevented from being always enabled, thereby reducing power consumption.

It may be understood that, that the electronic device determines whether the sliding distance of the finger of the user is greater than the second distance threshold (L2) may be replaced with determining duration of the sliding operation. A start point of the duration may be counted from a start point of the sliding operation 1103, or may be counted from a time point at which the distance of the sliding operation 1103 reaches the first distance threshold or duration of the sliding operation 1103 reaches a first duration threshold.

It may be understood that the icon of the hidden application may be displayed in a plurality of manners. In addition to that the foregoing interface on which the icon of the hidden application is placed is separately displayed independent of the pages (similar to a hidden page), the interface on which the icon of the hidden application is placed may be alternatively superimposed on a displayed page (as shown in FIG. 11a). This is not limited in this embodiment of the present invention.

In an implementation, when the user sets only one hidden application (for example, QQ), the electronic device may directly open the hidden application when facial recognition succeeds. In this way, the unique hidden application can be quickly opened, and the hidden application is opened while the user does not need to tap an icon of the hidden application, thereby simplifying operation steps of the user.

After collecting the face information of the user, the electronic device may determine whether the face information matches the stored face information template. If no, the electronic device may output a second prompt by using the touchscreen, to notify the user that facial recognition fails.

Figure 11E:
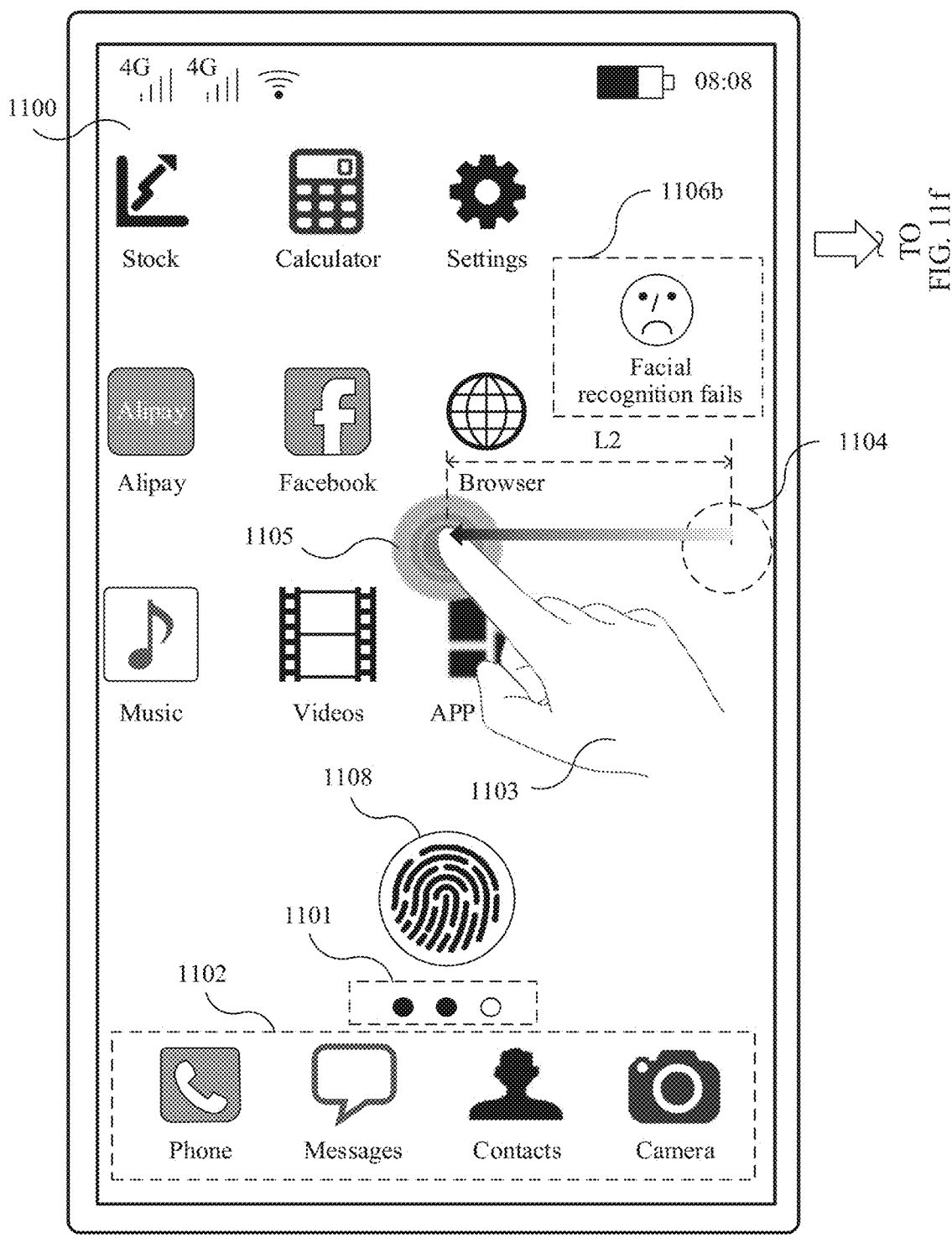

For example, as shown in FIG. 11e, in the process in which the electronic device receives the sliding operation 1103 of the user, when the electronic device determines that the sliding distance of the finger of the user (which may be the distance between the current location 1105 of the finger of the user and the start location 1104) is greater than the second distance threshold (L2), a second prompt 1106b may be displayed on the touchscreen.

When facial recognition fails, the electronic device may receive a touch operation of the user for the fingerprint recognition icon, and in response to this input operation for the fingerprint recognition icon, the electronic device may recognize a fingerprint of the user. If fingerprint recognition succeeds, the electronic device may display the icon of the hidden application or open the hidden application.

Figure 11F:
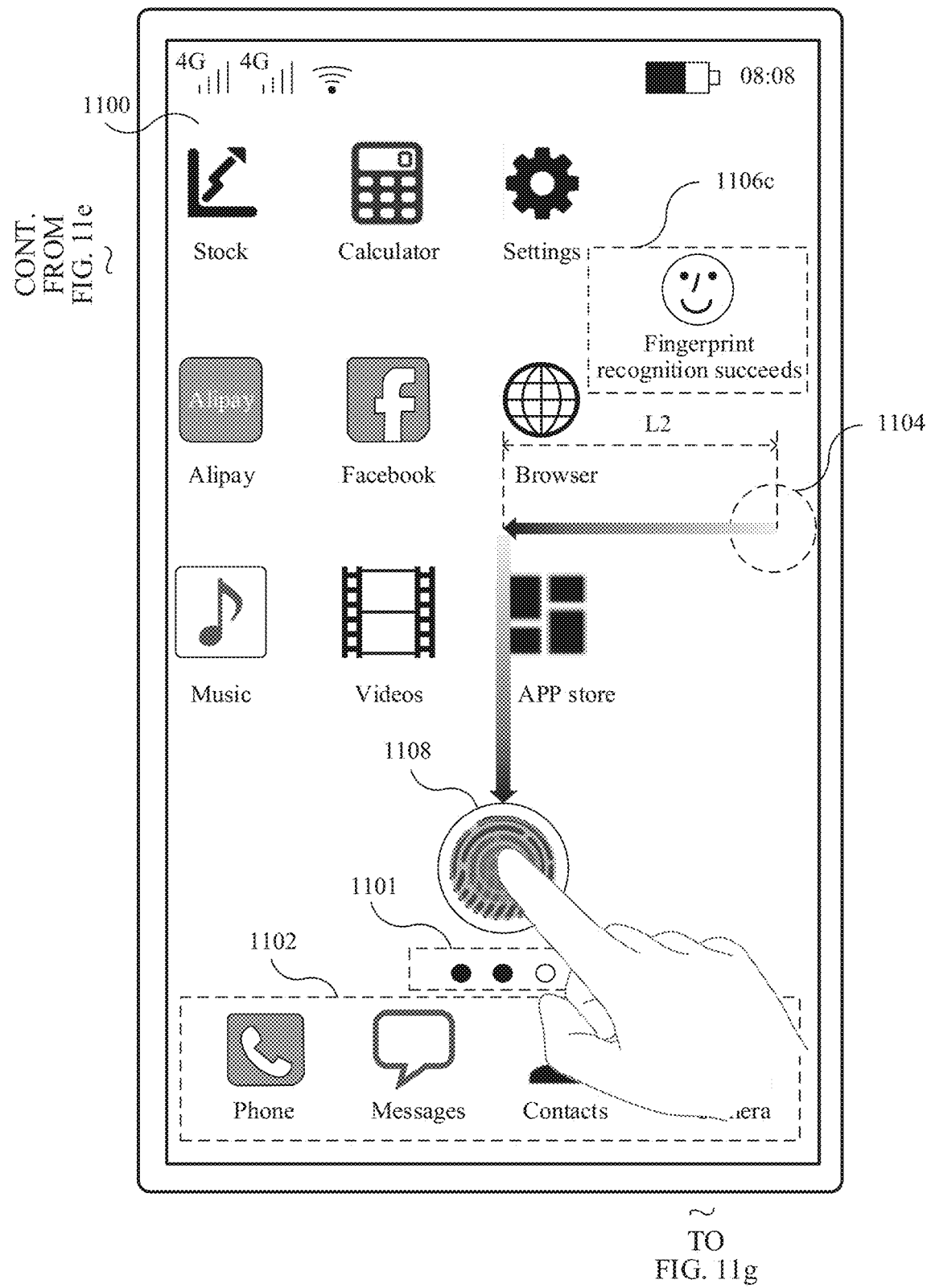
Figure 11G:
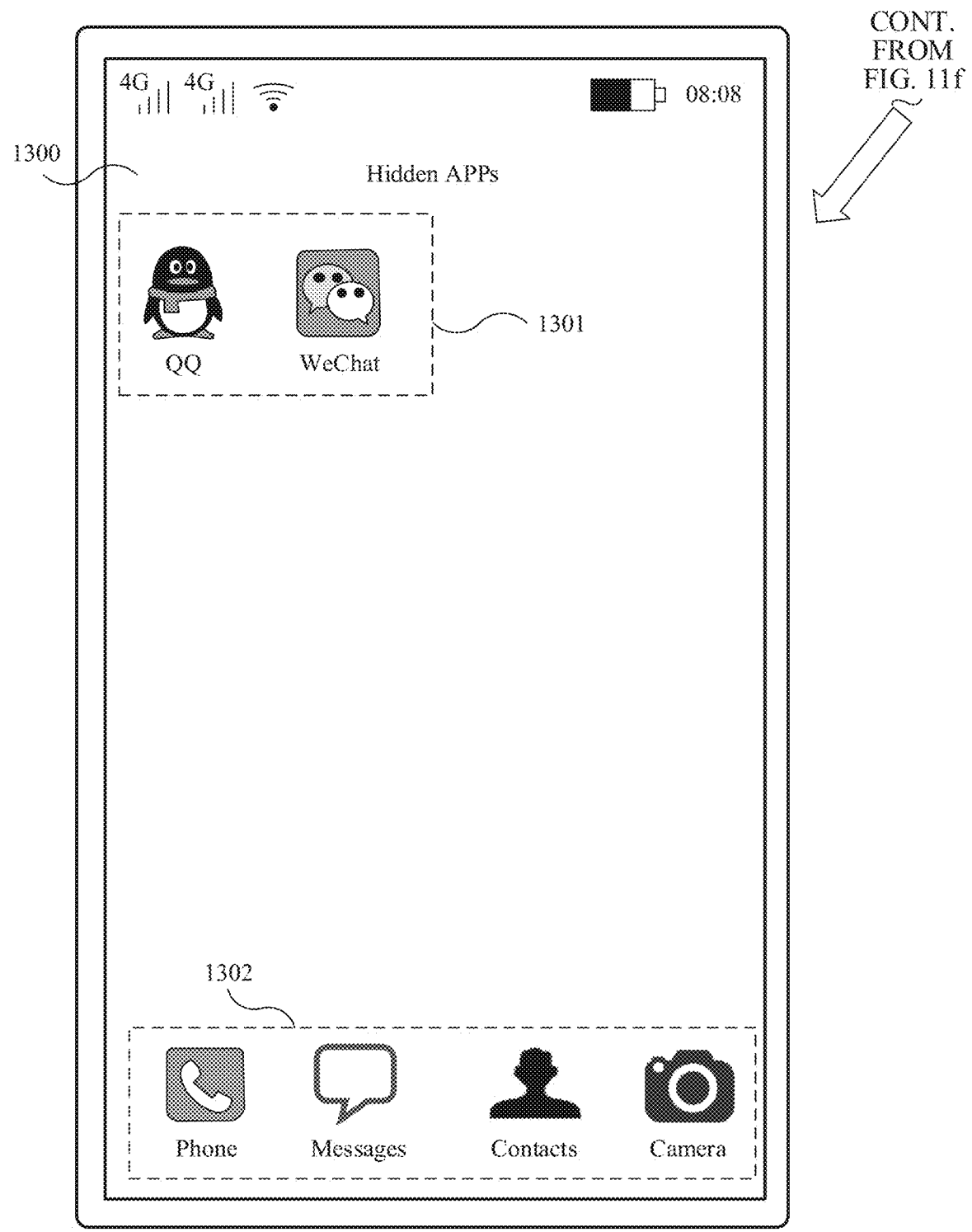

For example, as shown in FIG. 11f, after facial recognition fails, the finger of the user may continue to slide until the finger reaches a location of the fingerprint recognition icon 1108. When the finger slides onto the fingerprint recognition icon 1108, the electronic device receives a touch operation of the user for the fingerprint recognition icon 1108. In response to the touch operation for the fingerprint recognition icon 1108, the electronic device may collect fingerprint information of the finger of the user by using the fingerprint recognition module, and perform matching with a stored fingerprint information template. The fingerprint information template may be entered by the user before the electronic device performs fingerprint recognition. If the collected fingerprint information of the finger of the user successfully matches the fingerprint information template (in other words, fingerprint recognition succeeds), the hidden application may be displayed on the touchscreen. For example, after fingerprint recognition succeeds, the electronic device may display a hidden application 1131 shown in FIG. 11g. FIG. 11d is the same as FIG. 11g. Text descriptions of FIG. 11d are also applicable to FIG. 11g, and are not repeated herein again.

In an implementation, after the sliding distance of the sliding operation 1103 of the user is greater than the first distance threshold (L1), the user may lift the finger (in other words, the finger leaves the touchscreen). The electronic device may collect the face information of the user by using the camera lens, and display the fingerprint recognition icon on the touchscreen. After collecting the face information of the user, the electronic device may match the face information with the stored face information template. If facial recognition succeeds, the electronic device may display the hidden application. If facial recognition fails, the electronic device may receive a touch operation of the user for the fingerprint recognition icon, and in response to the touch operation for the fingerprint recognition icon, the electronic device may collect the fingerprint information of the finger of the user, and perform matching with the stored fingerprint information template. If fingerprint matching succeeds, the electronic device may display the hidden application. In this way, the user of the user only needs to slide a short distance (L1) on the touchscreen to trigger an identity authentication process for opening the hidden application, thereby simplifying an operation of the user and improving user experience. In this way, identity identification may still be performed after the user accidentally lifts the finger in the sliding process, to display the hidden application, thereby improving user experience.

Figure 12A:
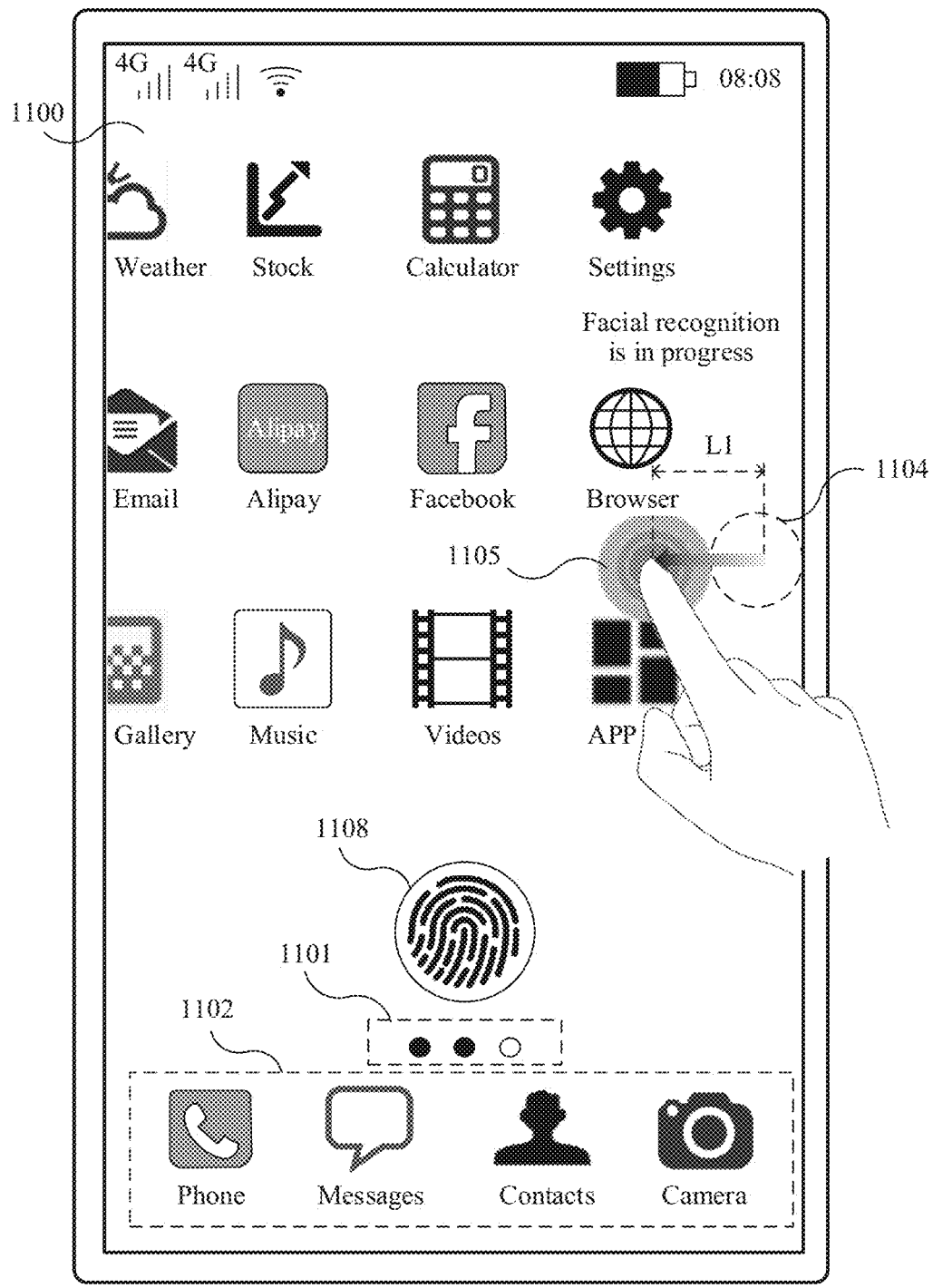
FIG. 12a to FIG. 12d are schematic diagrams of another group of interfaces according to an embodiment of this application.
Figure 12B:
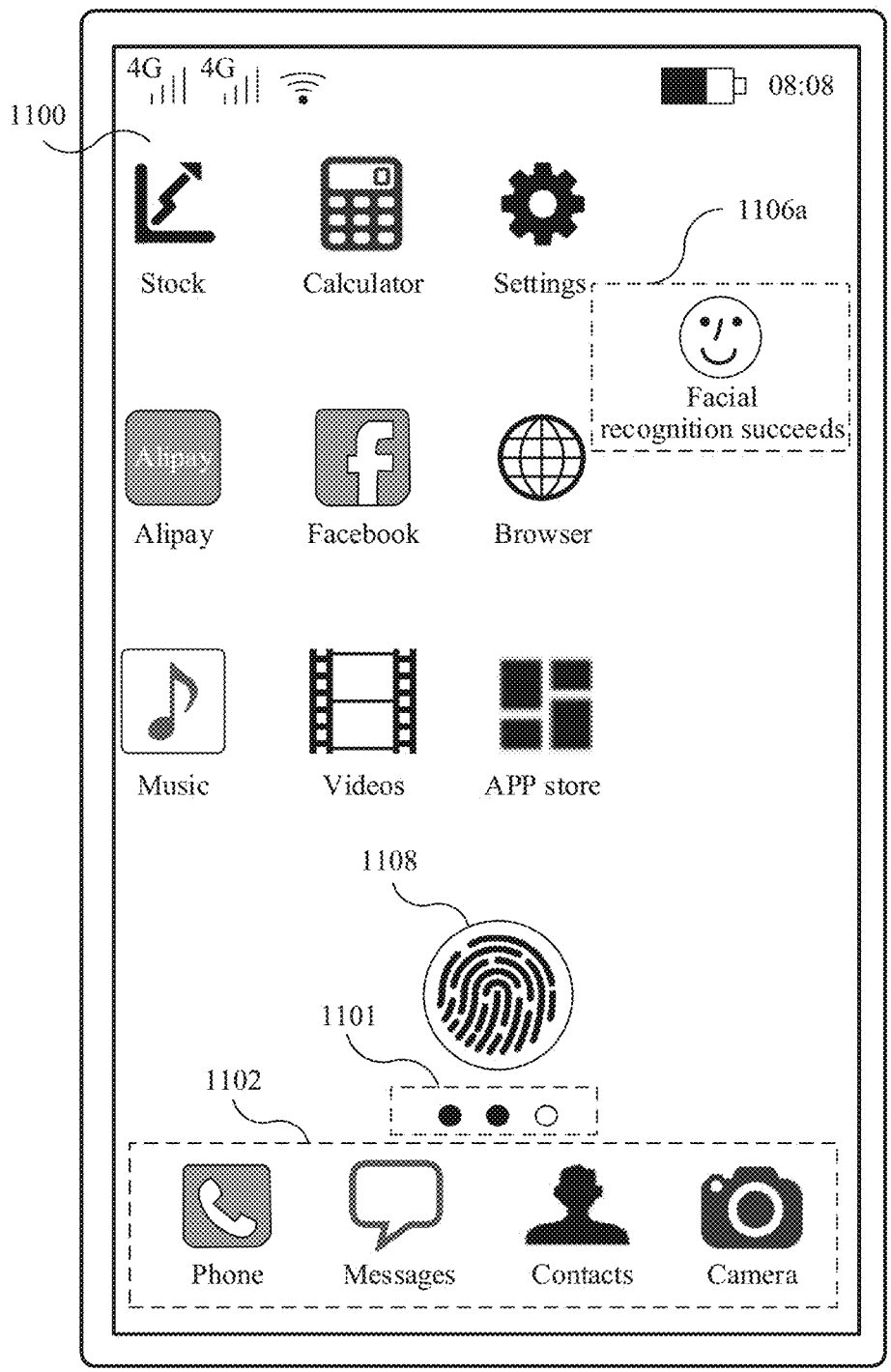

For example, as shown in FIG. 12a, the electronic device may receive the sliding operation 1103 of the user, and the electronic device may determine whether the sliding distance of the finger of the user (which may be the distance between the current location 1105 of the finger of the user and the start location 1104) is greater than the first distance threshold (L1) in a process in which the user performs the sliding operation 1103. When the electronic device determines that the sliding distance of the finger of the user is greater than the first distance threshold (L1) in the process of the sliding operation, the electronic device may collect the face information by using the camera lens, and display the fingerprint recognition icon 1108 on the touchscreen. In this case, the user may lift the finger (in other words, the finger leaves the touchscreen) and wait for the electronic device to output a facial recognition result. If the collected face information successfully matches the stored face information template, the electronic device may display the icon 1131 of the hidden application shown in FIG. 11d. In an implementation, before the electronic device displays the icon 1131 of the hidden application, the electronic device may output a first prompt 1106a shown in FIG. 12b. There may be a time difference (for example, 0.5 second, 1 second, or longer) between displaying the first prompt 1106a by the electronic device and displaying the icon 1131 of the hidden application.

Figure 12C:
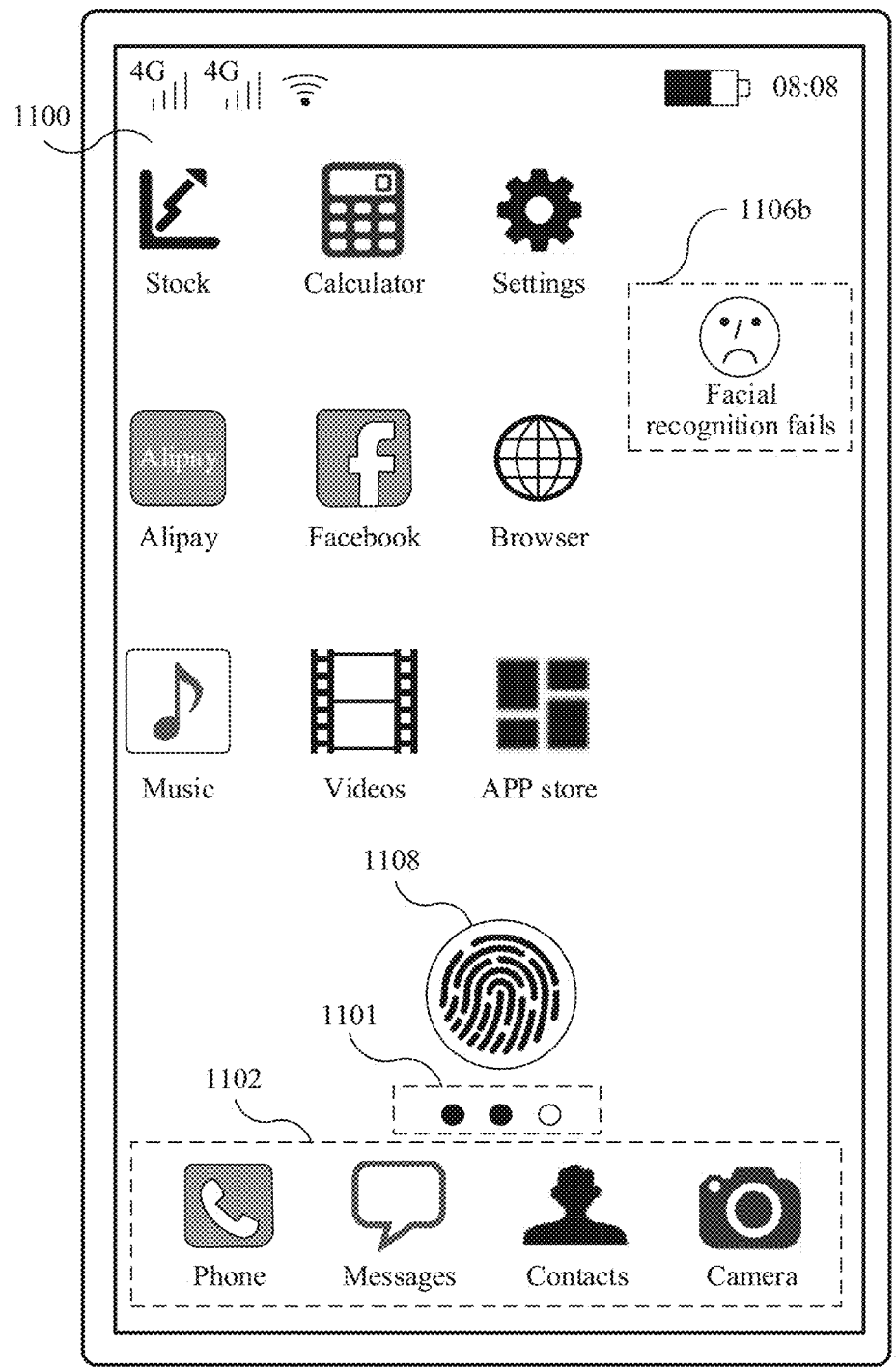
Figure 12D:
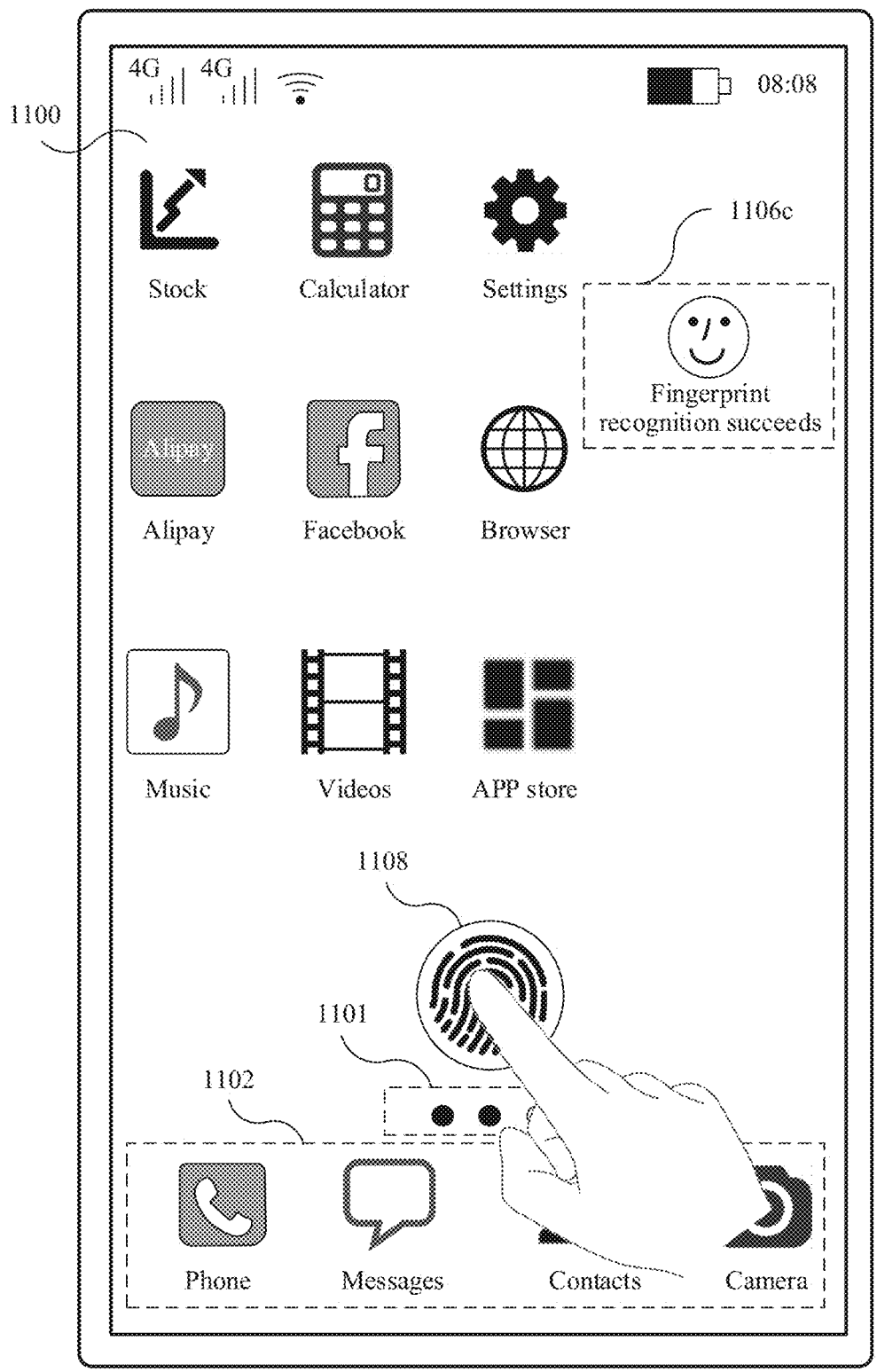

As shown in FIG. 12c, if facial recognition fails, a second prompt 1106b may be displayed on the touchscreen. As shown in FIG. 12d, the electronic device may receive a touch operation (not the sliding operation 1103) of the user for the fingerprint recognition icon 1208, and in response to the touch operation for the fingerprint recognition icon 1208, the electronic device may collect the fingerprint information of the finger of the user by using the fingerprint recognition module, and perform matching with the stored fingerprint information template. When the collected fingerprint information successfully matches the stored fingerprint information template, the electronic device may display the hidden application 1131 shown in FIG. 11*d*. In an implementation, before the electronic device displays the icon 1131 of the hidden application, the electronic device may output a third prompt 1106*c* shown in FIG. 12*d*, to notify the user that fingerprint recognition succeeds. There may be a time difference (for example, 0.5 second, 1 second, or longer) between displaying the third prompt 1106*c* by the electronic device and displaying the icon 1131 of the hidden application.

In an implementation, the electronic device may receive the sliding operation of the user on the rightmost page of the home screen on a desktop, and trigger only an identity authentication manner of facial recognition to identify an identity of the user, to quickly open the hidden application.

Figure 13A:
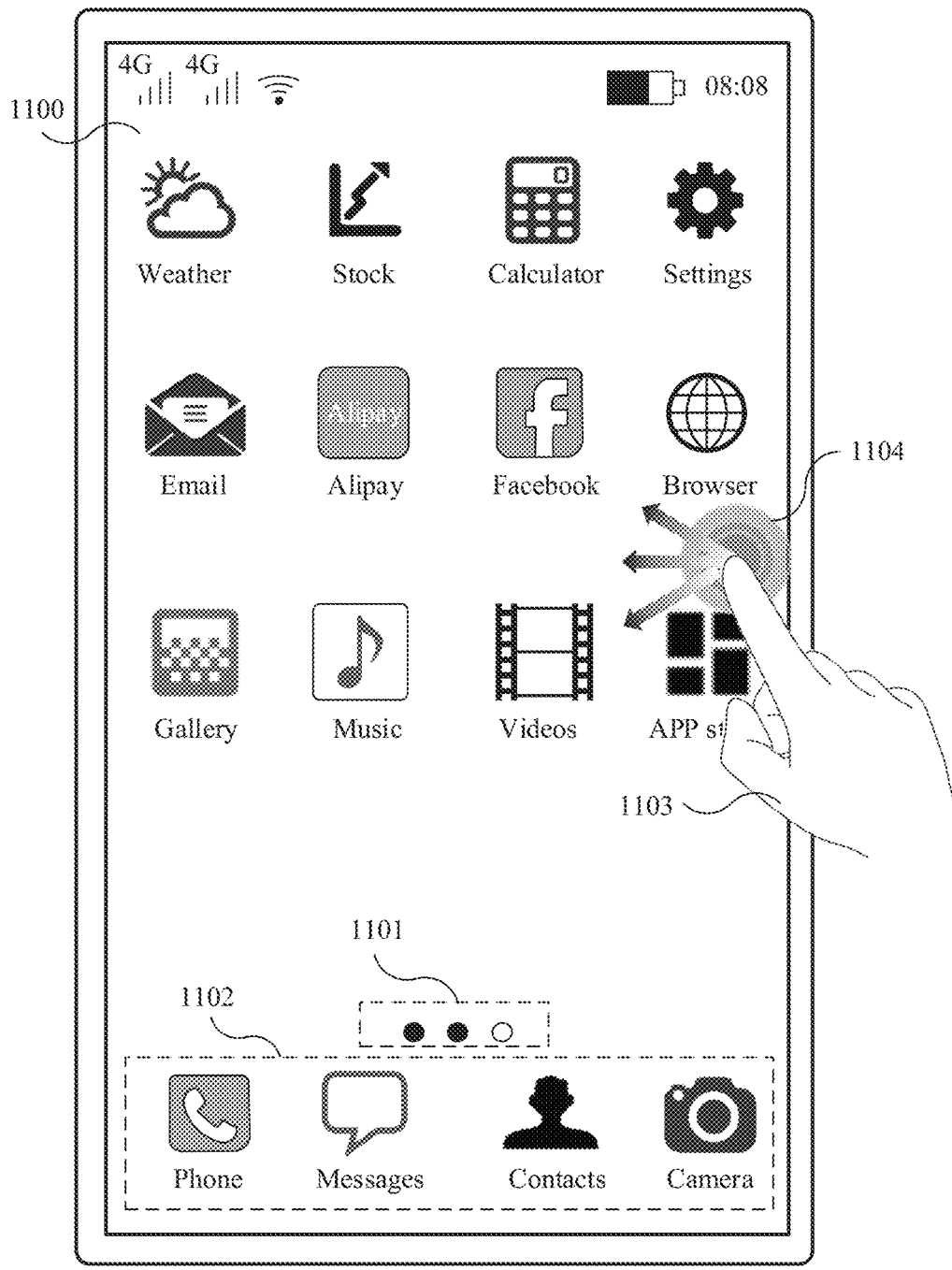
FIG. 13a to FIG. 13d are schematic diagrams of another group of interfaces according to an embodiment of this application.
Figure 13B:
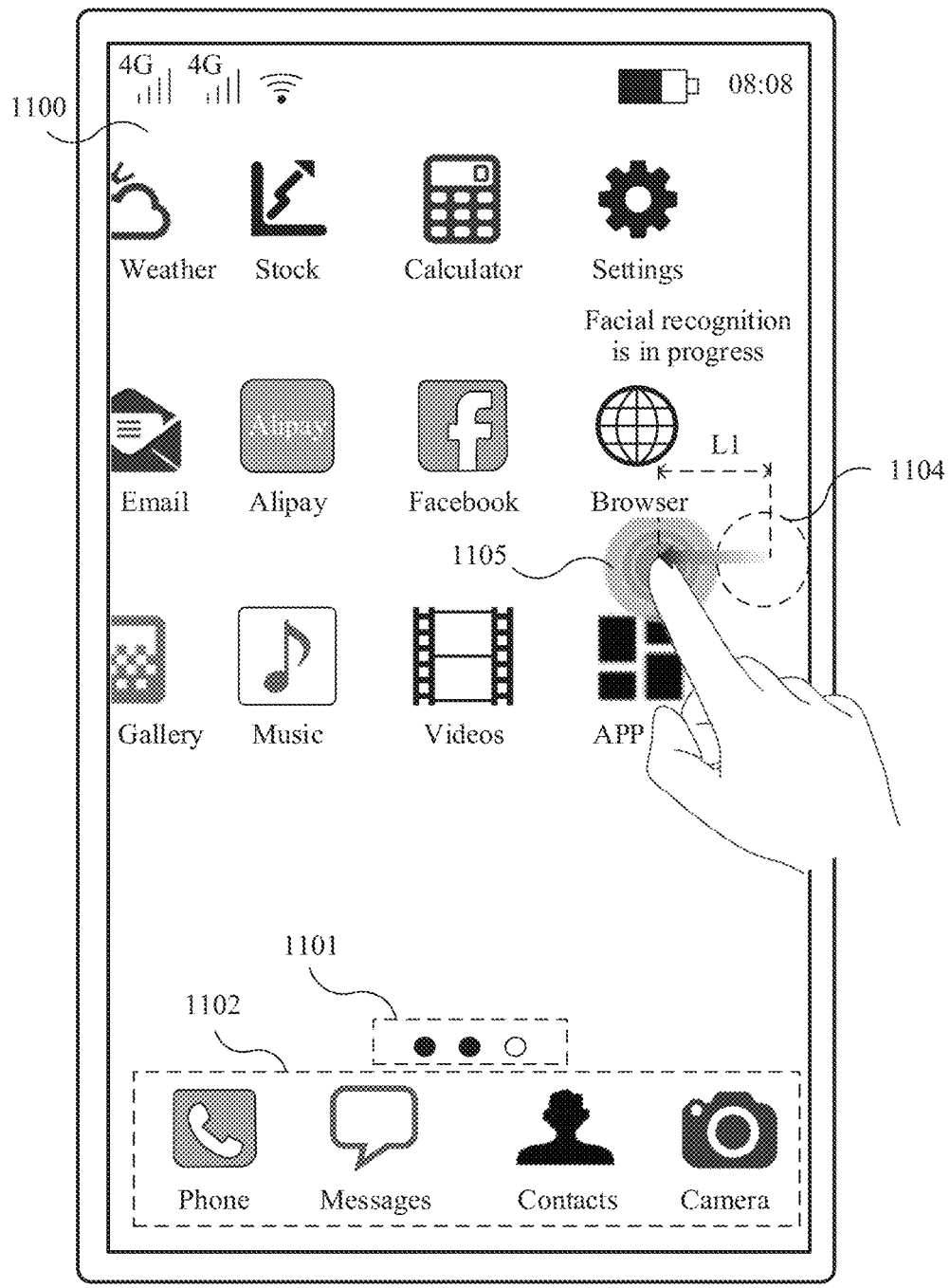

For example, as shown in FIG. 13*a*, the electronic device may receive a sliding operation 1103 of the user for a last page of a user interface 1100 on the desktop. As shown in FIG. 13*b*, in a process in which the electronic device receives the sliding operation 1103 of the user, when the electronic device determines that a sliding distance of a finger of the user (which may be a distance between a current location 1105 of the finger of the user and a start location 1104) is greater than a first distance threshold (L1), the electronic device may collect face information by using a facial recognition module, and does not display a fingerprint recognition icon (in other words, a fingerprint recognition module is not enabled). After the electronic device collects the face information, the electronic device may match the collected face information with a stored face information template.

Figure 13C:
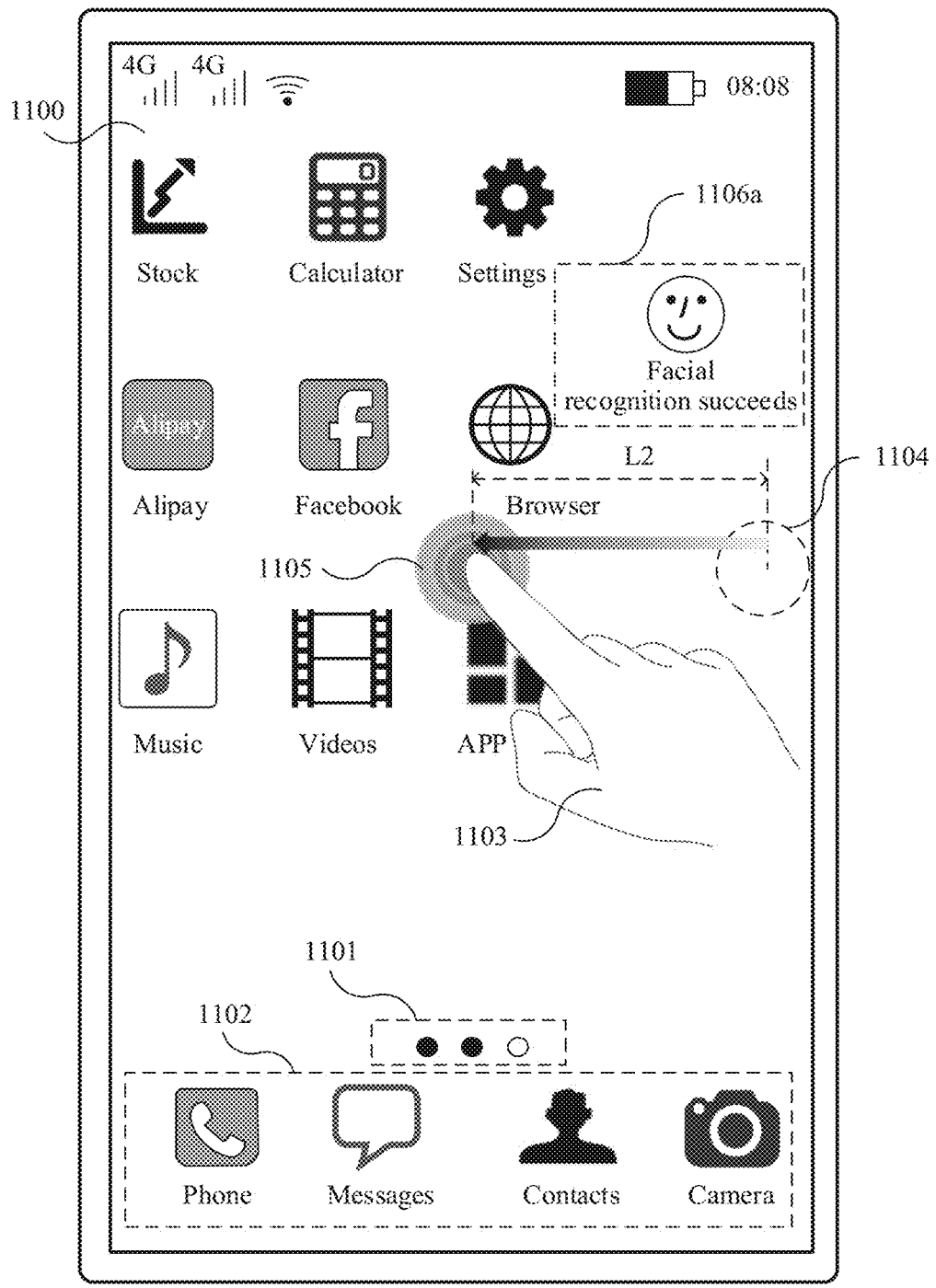

As shown in FIG. 13*c*, in a process in which the electronic device receives the sliding operation 1103 of the user, when the electronic device determines that the sliding distance of the finger of the user (which may be the distance between the current location 1105 of the finger of the user and the start location 1104) is greater than a second distance threshold (L2), a first prompt 1106*a* or a second prompt 1106*b* may be displayed on the touchscreen. When the collected face information successfully matches the stored face information template, the electronic device may display the hidden application 1131 shown in the embodiment of FIG. 11*d*.

In an implementation, when the sliding distance of the sliding operation of the user is greater than the first distance threshold (L1), the user may lift the finger (in other words, the finger leaves the touchscreen). The electronic device may collect the face information of the user by using the facial recognition module. After collecting the face information of the user, the electronic device may match the face information with the stored face information template, and output the first prompt or the second prompt on the touchscreen. The first prompt is used to notify the user that facial recognition succeeds, and the second prompt is used to notify the user that facial recognition fails. If facial recognition succeeds, the electronic device may display the hidden application. In this way, identity identification may still be performed after the user accidentally lifts the finger in the sliding process, thereby improving user experience.

Figure 13D:
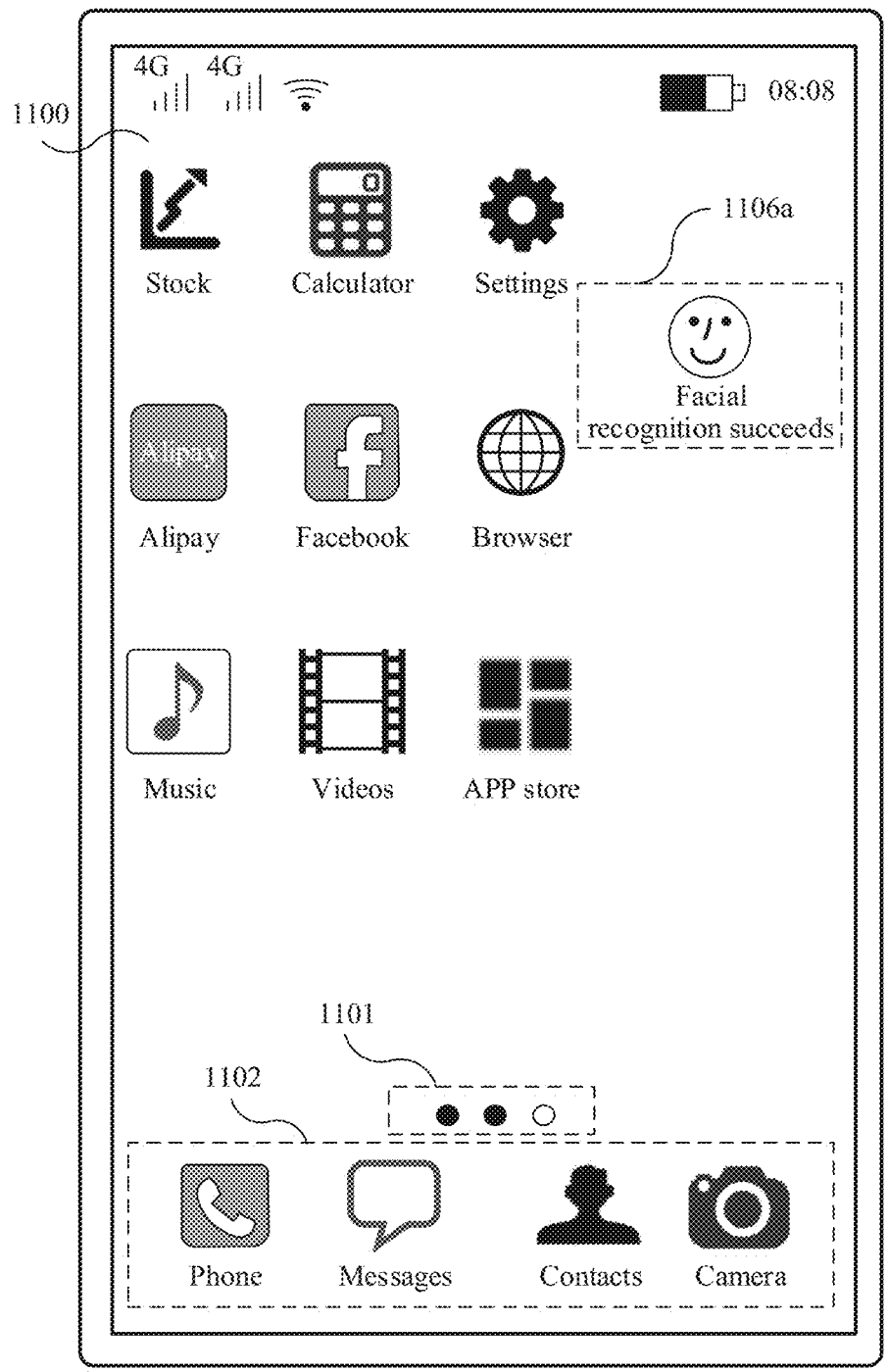

For example, as shown in FIG. 13*b* and FIG. 13*d*, in the process in which the electronic device receives the sliding operation 1103 of the user, when the sliding distance of the finger of the user is greater than the first distance threshold (L1), the electronic device may collect the face information by using a camera lens. In this case, the user may lift the finger (in other words, the finger leaves the touchscreen) and wait for the electronic device to output a facial recognition result (the first prompt or the second prompt). If the collected face information successfully matches the stored face information template, the electronic device may display the hidden application 1131 in the embodiment of FIG. 11*d*.

In an implementation, the electronic device may receive the sliding operation of the user on the rightmost page of the home screen, and trigger only an identity authentication manner of fingerprint recognition to identify an identity of the user, to quickly open the hidden application.

Figure 14A:
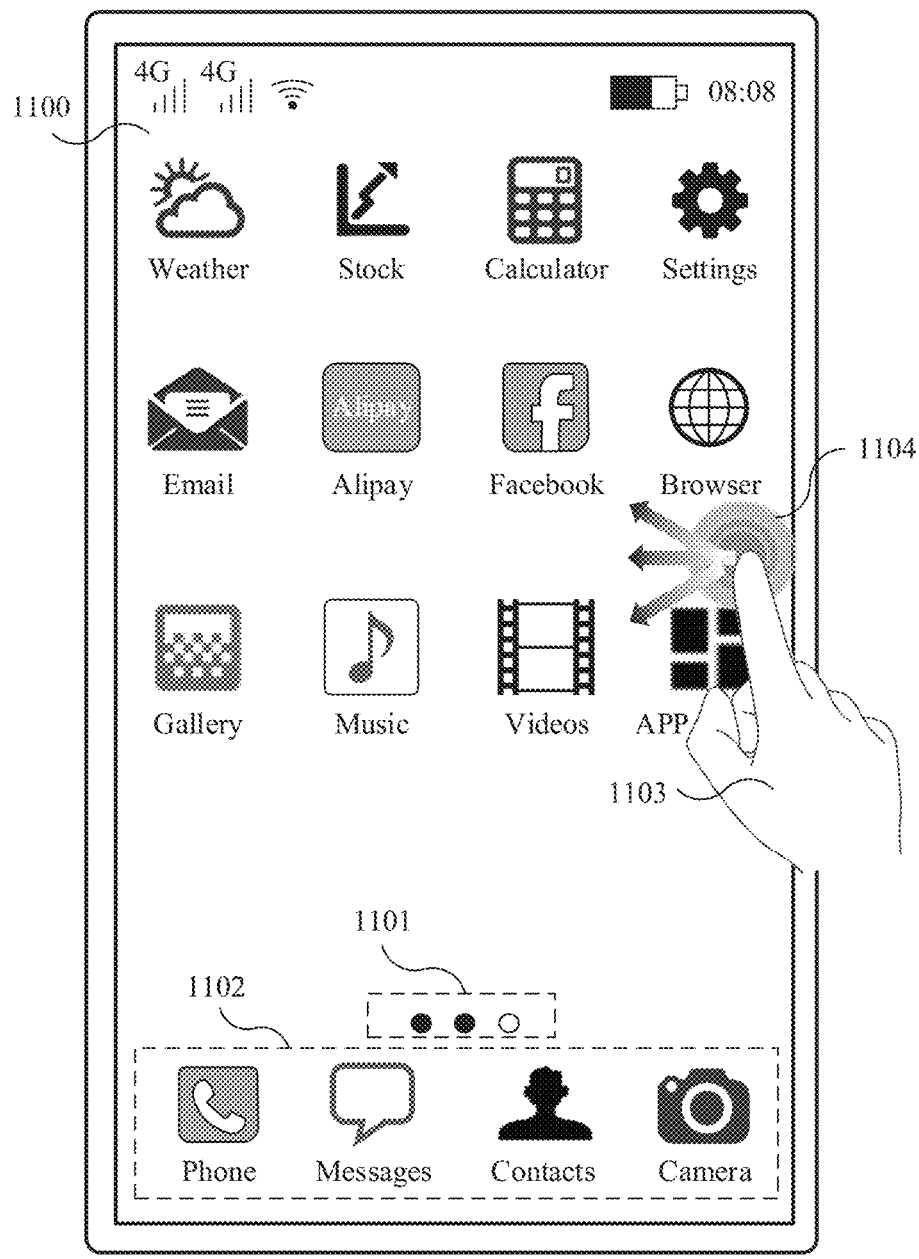
FIG. 14a to FIG. 14d are schematic diagrams of another group of interfaces according to an embodiment of this application.

For example, as shown in FIG. 14*a*, the electronic device may receive the sliding operation 1103 of the user for the rightmost page 1100 of the home screen. For the sliding operation 1103, refer to text descriptions of the sliding operation 1103 in the embodiment of FIG. 11*a*. Details are not described herein again.

Figure 14B:
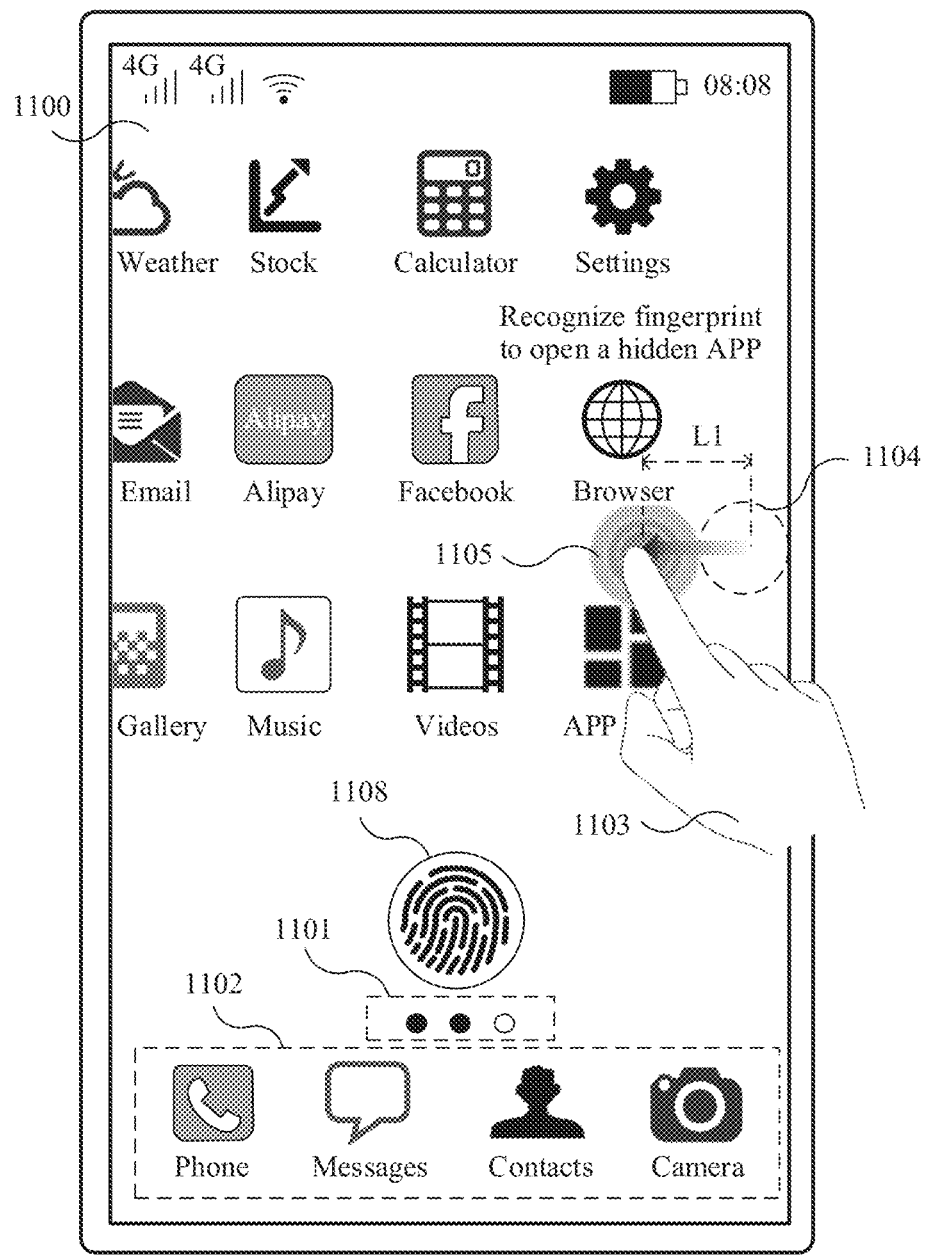

As shown in FIG. 14*b*, in a process in which the electronic device receives the sliding operation 1103 of the user, when the electronic device determines that the sliding distance of the finger of the user (which may be the distance between the current location 1105 of the finger of the user and the start location 1104) is greater than the first distance threshold (L1), the electronic device may display the fingerprint recognition icon 1108 on the touchscreen, and does not enable the facial recognition module.

Figure 14C:
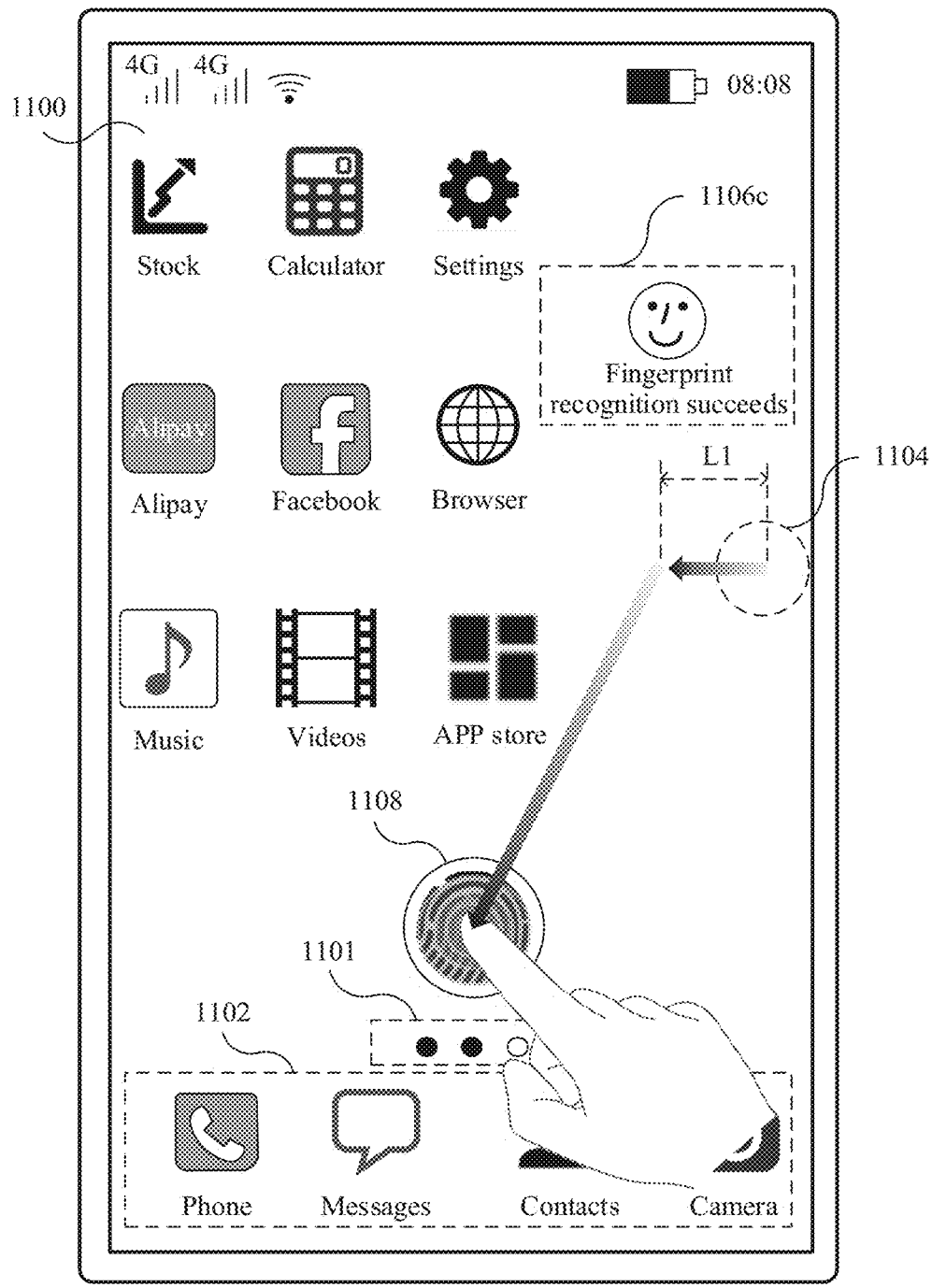
Figure 14D:
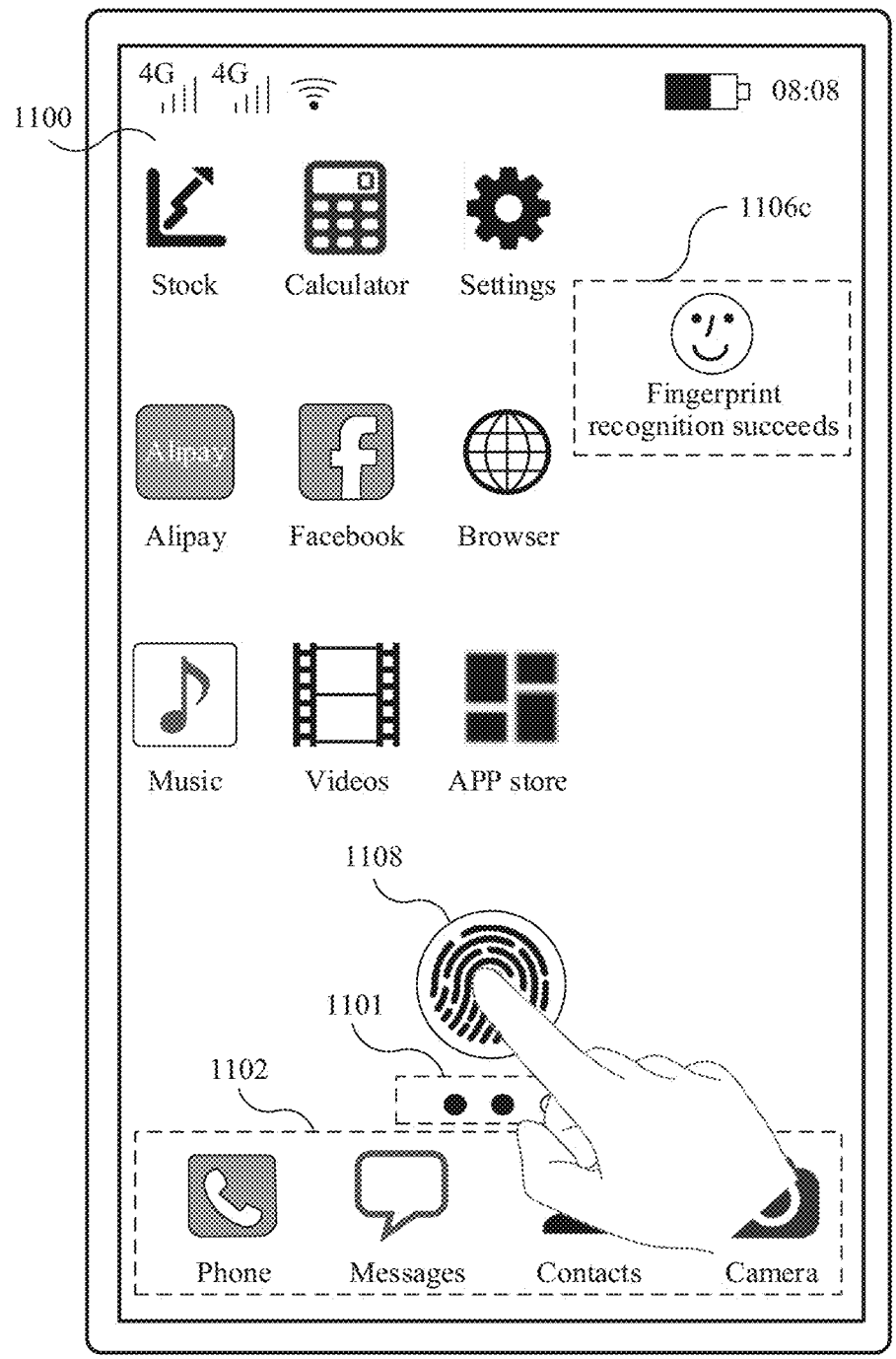

As shown in FIG. 14*c* and FIG. 14*d*, the electronic device may receive a touch operation of the user for the fingerprint recognition icon 1108, and the touch operation for the fingerprint recognition icon 1108 may be shown in FIG. 14*c*. In a process in which the user uses the sliding operation 1103, the finger may first slide a distance L1 in a direction toward the left side of the touchscreen, and then diagonally slide to a location of the fingerprint recognition icon 1108 in a direction toward the left side of the bottom of the touchscreen. The touch operation for the fingerprint recognition icon 1108 may be alternatively shown in FIG. 14*d*. After the sliding distance of the sliding operation of the user is greater than the first distance threshold (L1), the user touches the fingerprint recognition icon 1108 after lifting the finger (in other words, the finger leaves the touchscreen). In response to the touch operation for the fingerprint recognition icon 1108, the electronic device may collect the fingerprint information of the finger of the user by using the fingerprint recognition module, and perform matching with the stored fingerprint information template. When the collected fingerprint information successfully matches the stored fingerprint information template, the electronic device may display the hidden application 1131 shown in FIG. 11*d*.

In this embodiment of this application, a sliding track trend of the sliding operation 1103 is from right to left, may be a straight line, may be an arc line, may be oblique downward slide, or may be irregular slide, provided that a sliding trend is from right to left. The start location of the sliding operation 1103 may be the right area of the rightmost page 1100 of the home screen, or may be a middle location, provided that a vertical distance from the start location to the left side of the touchscreen is greater than a second threshold. This is not limited herein.

Figure 16A:
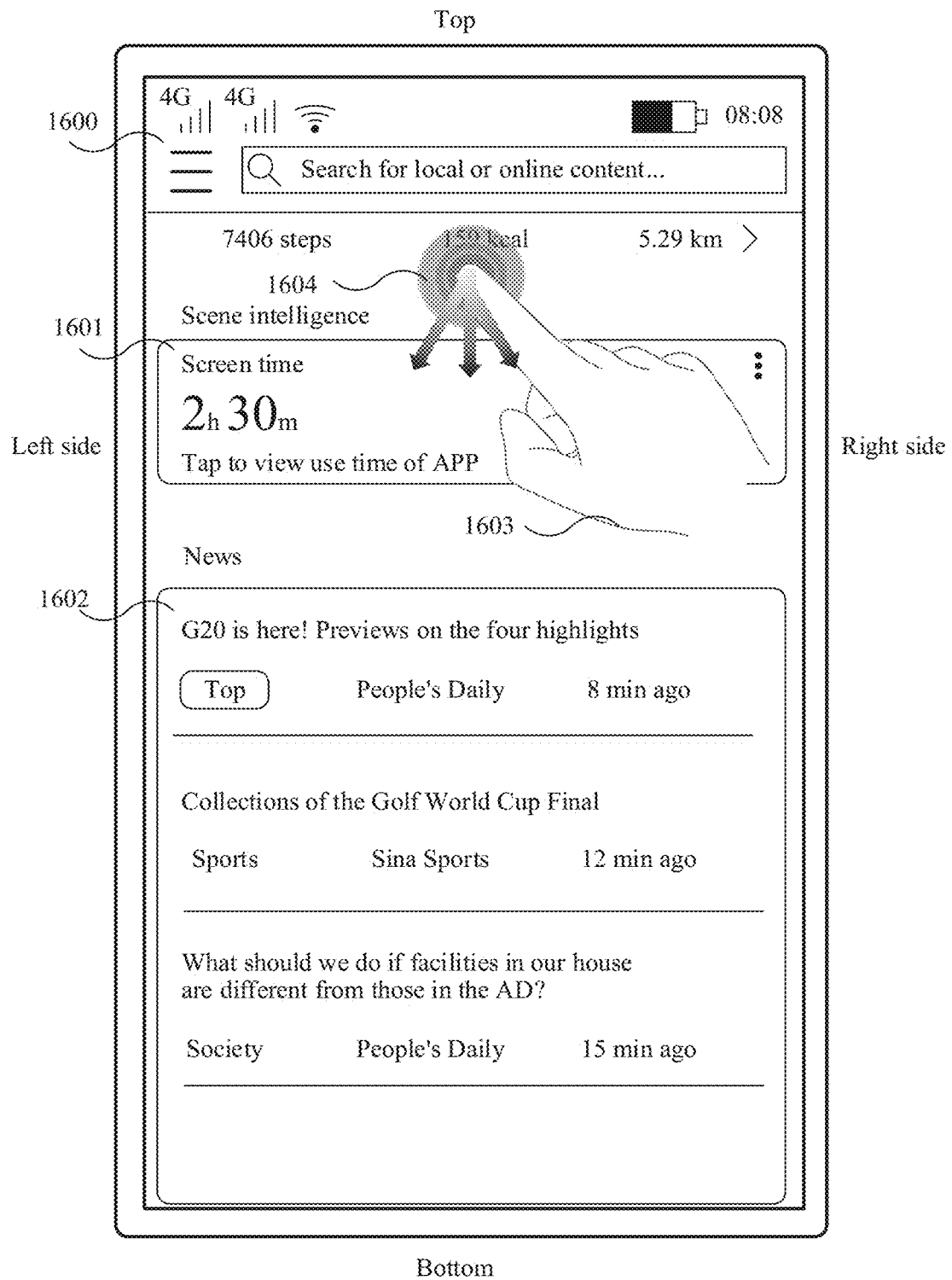
FIG. 16a to FIG. 16d are schematic diagrams of another group of interfaces according to an embodiment of this application.

In an implementation, the electronic device may receive a sliding operation of the user for a leftmost page of a user interface in all pages (which do not include an interface that accommodates an icon of a hidden application, and do not include a HiBoard or a smart assistant shown in FIG. 16a) of the home screen displayed on the touchscreen, to trigger facial recognition or fingerprint recognition, and may display the icon of the hidden application after facial recognition or fingerprint recognition succeeds.

Figure 15A:
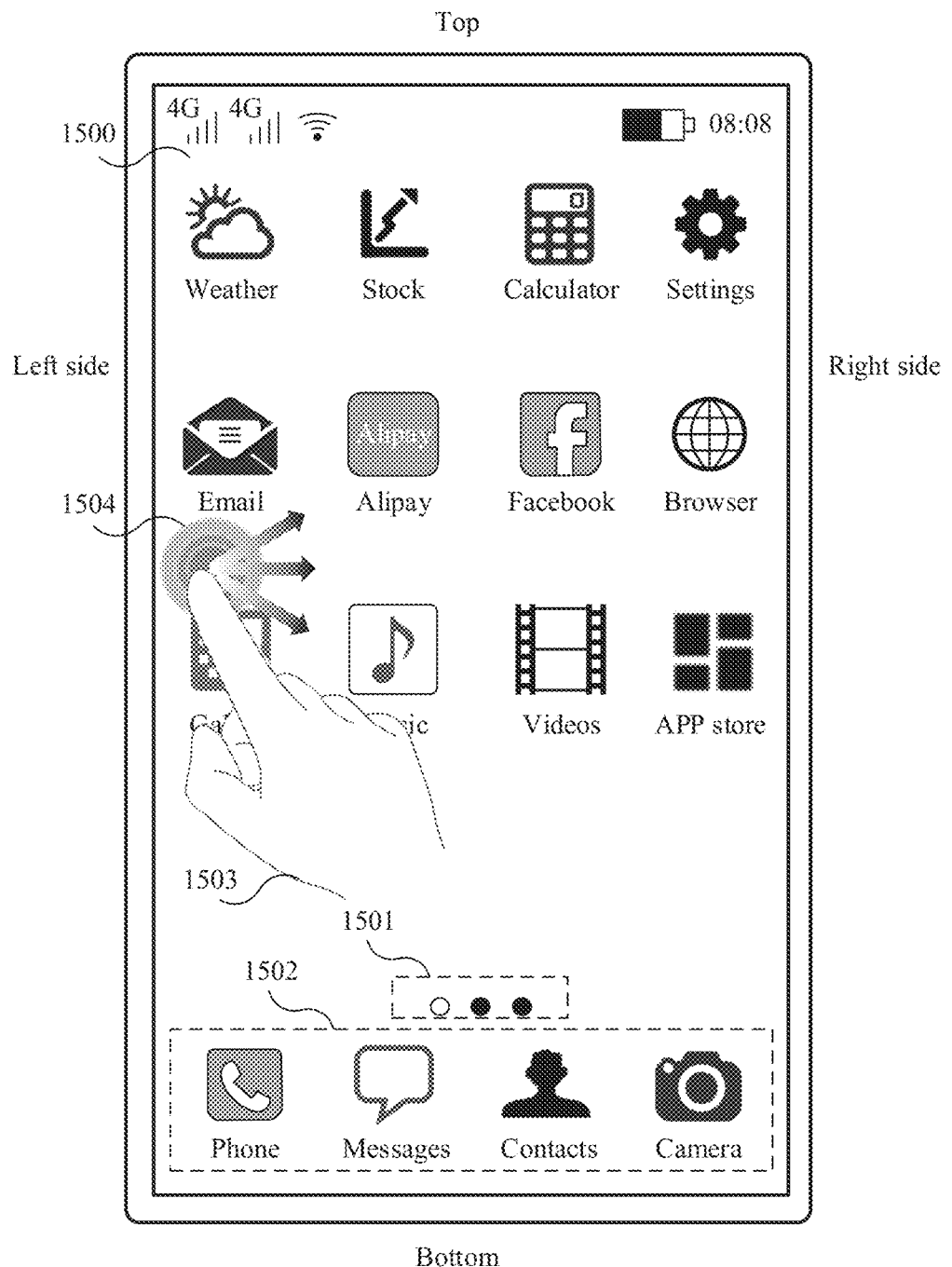
FIG. 15a to FIG. 15d are schematic diagrams of another group of interfaces according to an embodiment of this application.

For example, as shown in FIG. 15a, the touchscreen of the electronic device displays a leftmost page 1500 in all pages (which do not include an interface that accommodates an icon of a hidden application) of the home screen. A page indicator 1501 on an interface shown in FIG. 11a indicates that there are three pages in total, and a leftmost page in the three pages is currently displayed. The leftmost page 1500 may include a plurality of application icons (for example, a weather application icon, a stock application icon, a calculator application icon, a settings application icon, an email application icon, a music application icon, a videos application icon, and an APP store icon). There are a plurality of tray icons 1501 (for example, a phone application icon, a messages application icon, a contacts application icon, and a camera application icon) below the page indicator 1502. The tray icons 1502 keep displayed during page switching. The leftmost page 1500 may include a plurality of application icons and the page indicator 1501. Alternatively, the page indicator 1101 may not be a part of the page and exist alone. The tray icon is also optional. This is not limited in this embodiment of the present invention.

As shown in FIG. 15a, the electronic device may receive a sliding operation 1503 of the user on a rightmost page 1500 of the home screen, and a start point of the sliding operation 1103 may be a left area of the leftmost page. For example, a sliding start location of the sliding input operation 1103 may be a location 1504 shown in FIG. 15a. A trend of the sliding operation 1503 may be from the left side of the touchscreen to the right side, and the sliding operation is not required to be roughly parallel to the left and right sides of the touchscreen. For example, the sliding operation is, as shown in FIG. 15a, sliding from the left side of the touchscreen to the right side in a direction toward the bottom, or sliding from the left side of the touchscreen to the right side in a direction toward the top. In addition to the foregoing examples of the sliding operation, the sliding operation 1503 may be a single-finger sliding operation, or may be a two-finger sliding operation.

The electronic device may determine whether a sliding distance of the sliding operation is greater than a first distance threshold (L1), and if yes, the electronic device may collect face information by using a camera lens, and display a fingerprint recognition icon on the touchscreen. The sliding distance of the sliding operation may be a displacement from the start location to a current location of a finger of the user after the finger touches the touchscreen. In an optional implementation, the sliding distance of the sliding operation may be alternatively a displacement, in a specific direction, from the start location to the current location of the finger of the user after the finger touches the touchscreen (for example, a displacement on the touchscreen in a right-to-left direction).

Figure 15B:
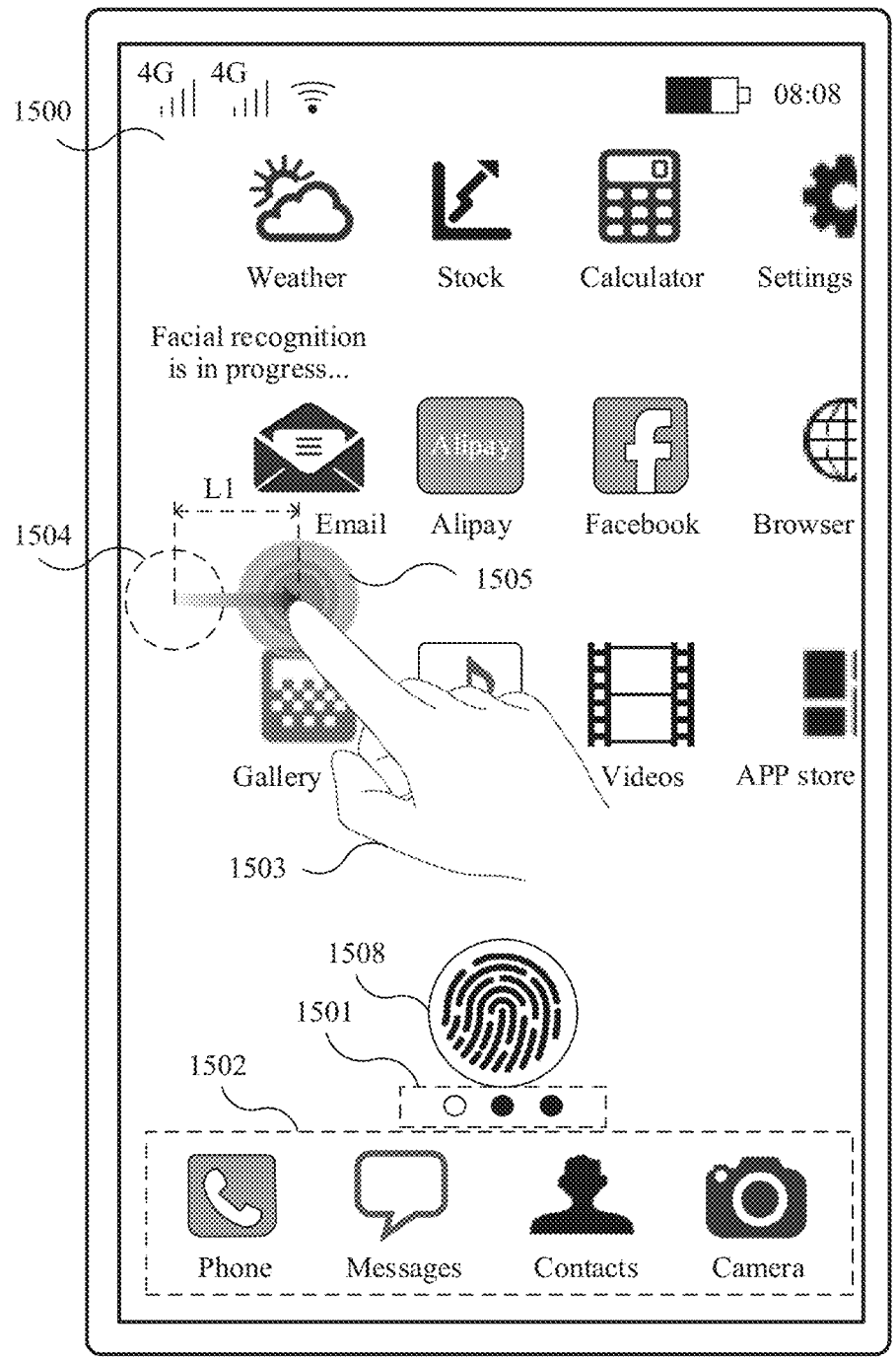

For example, as shown in FIG. 15b, in a process in which the electronic device receives the sliding operation 1503 of the user, when the electronic device determines that a sliding distance of the finger of the user (which may be a distance between the current location 1504 of the finger of the user and the start location 1505) is greater than the first distance threshold (L1), the electronic device may enable a facial recognition module to collect face information, and displays a fingerprint recognition icon 1108 on the touchscreen. After the electronic device collects the face information, the electronic device may match the collected face information with a stored face information template.

After collecting the face information of the user, the electronic device may determine whether the face information matches the stored face information template. If yes, the electronic device outputs a first prompt by using the touchscreen, to notify the user that facial recognition succeeds, and displays a hidden application (refer to the embodiment of FIG. 1I d).

After collecting the face information of the user, the electronic device may determine whether the face information matches the stored face information template. If no, the electronic device may output a second prompt by using the touchscreen, to notify the user that facial recognition fails.

Figure 15C:
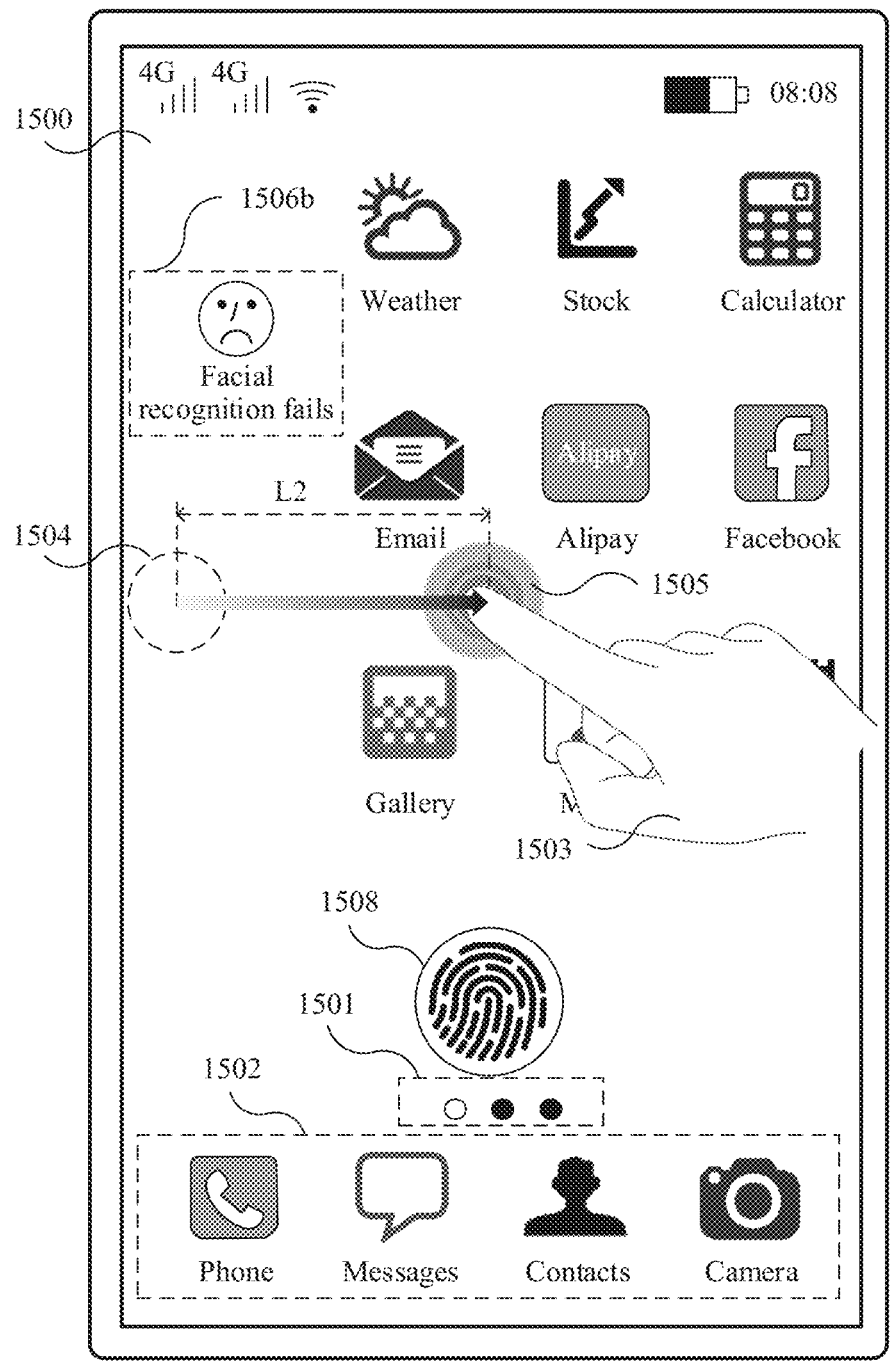

For example, as shown in FIG. 15c, in the process in which the electronic device receives the sliding operation 1503 of the user, when the electronic device determines that the sliding distance of the finger of the user (which may be the distance between the current location 1505 of the finger of the user and the start location 1504) is greater than a second distance threshold (L2), if the collected face information does not match the stored face information template, the touchscreen may output a second prompt 1506b shown in FIG. 15c.

When facial recognition fails, the electronic device may receive a touch operation of the user for the fingerprint recognition icon, and in response to this input operation for the fingerprint recognition icon, the electronic device may recognize a fingerprint of the user. If fingerprint recognition succeeds, the electronic device may display the hidden application.

Figure 15D:
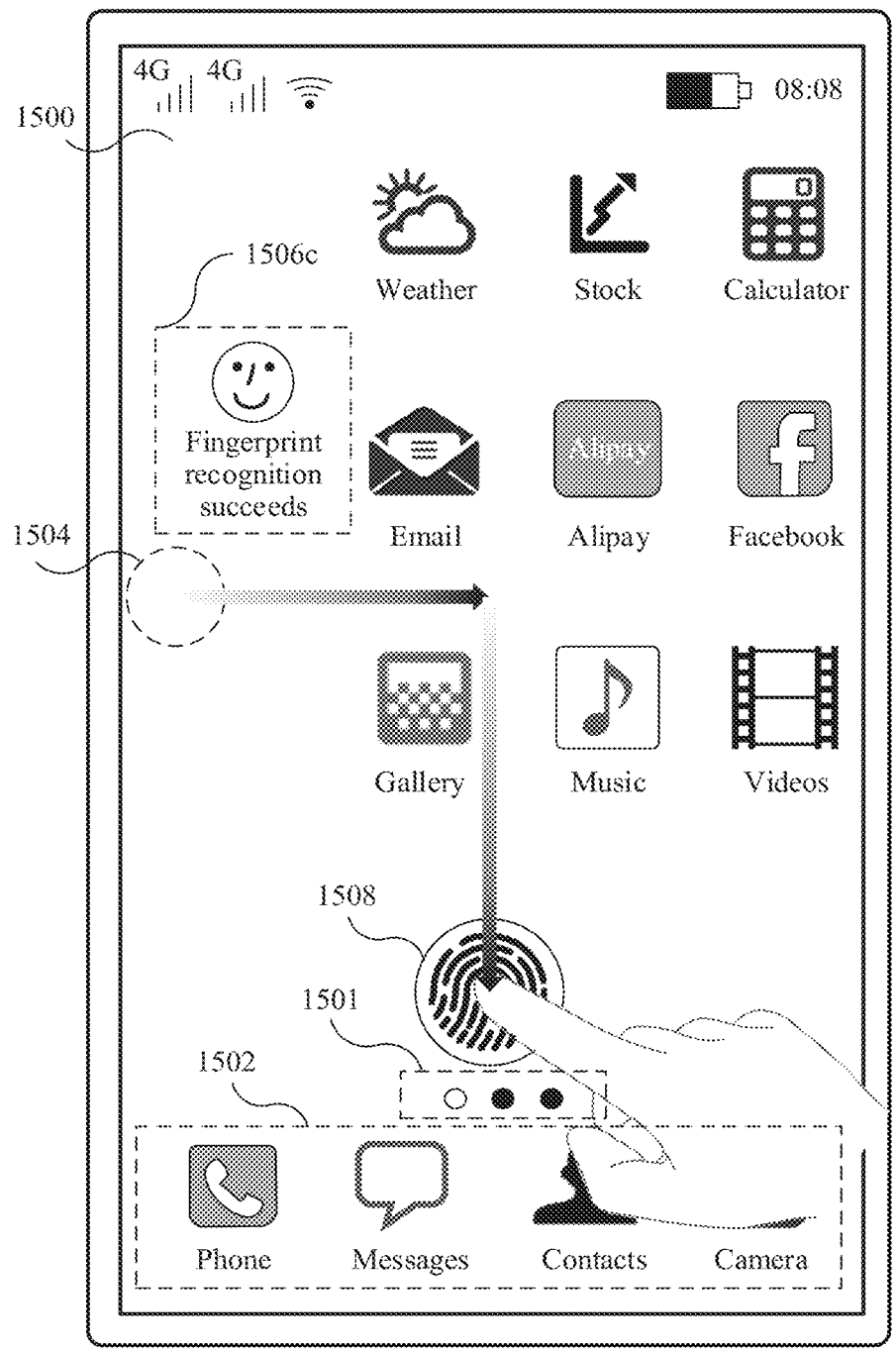

As shown in FIG. 15d, after facial recognition fails, the finger of the user may continue to slide until the finger reaches a location of the fingerprint recognition icon 1508. When the finger slides onto the fingerprint recognition icon 1508, the electronic device receives a touch operation of the user for the fingerprint recognition icon 1508. In response to the touch operation for the fingerprint recognition icon 1508, the electronic device may collect the fingerprint information of the finger of the user by using a fingerprint recognition module, and perform matching with a stored fingerprint information template. The stored fingerprint information template may be pre-entered by the user. If the collected fingerprint information of the finger of the user successfully matches the stored fingerprint information template (in other words, fingerprint recognition succeeds), the electronic device may display the hidden application shown in FIG. 11d.

In an implementation, the electronic device may receive a sliding operation of the user on a HiBoard displayed on the touchscreen, to trigger identity authentication (for example, facial recognition identity authentication or fingerprint recognition identity authentication). After identity authentication succeeds, a hidden album may be opened. The HiBoard is also referred to as a Hiboard, a smart assistant, or a scene assistant. Therefore, in this embodiment of this application, when a HiBoard interface is displayed in a display area, it may be understood as that the HiBoard interface is displayed, a smart assistant interface is displayed, or a scene assistant interface is displayed. The HiBoard may have different names in different descriptions. Therefore, the names described in this embodiment of this application should not be construed as a limiting meaning.

For example, as shown in FIG. 16a, a HiBoard interface 1600 is displayed on the touchscreen of the electronic device. The HiBoard interface 1600 may include scene intelligence display 1601 (for example, a mobile phone has been used for 2 hours and 30 minutes), news information 1602, and the like. The electronic device may receive a sliding operation 1603 of the user. The sliding operation 1603 may be that the user first presses a start location 1604 on the Hi-Board interface 1600 by using a finger, and then slides in a specific direction (for example, slides downward). The start location 1604 may be on the top of the HiBoard interface 1600, or may be on a left edge location of the touchscreen. This is not limited herein. A trend of the sliding operation 1503 may be from the top of the touchscreen to the bottom, and the sliding operation is not required to be roughly parallel to left and right sides of the touchscreen. For example, the sliding operation is, as shown in FIG. 16*a*, sliding from the top of the touchscreen to the bottom in a direction toward the left side, or sliding from the top of the touchscreen to the bottom in a direction toward the right side. In addition to the foregoing examples of the sliding operation, the sliding operation 1603 may be a single-finger sliding operation, or may be a two-finger sliding operation.

The electronic device may determine whether a sliding distance of the sliding operation is greater than a first distance threshold, and if yes, the electronic device may collect face information by using a camera lens, and display a fingerprint recognition icon on the touchscreen. The sliding distance of the sliding operation may be a displacement from a start location to a current location of the finger of the user after the finger touches the touchscreen. In an optional implementation, the sliding distance of the sliding operation may be alternatively a displacement, in a specific direction, from the start location to the current location of the finger of the user after the finger touches the touchscreen (for example, a displacement on the touchscreen in a top-down direction).

Figure 16B:
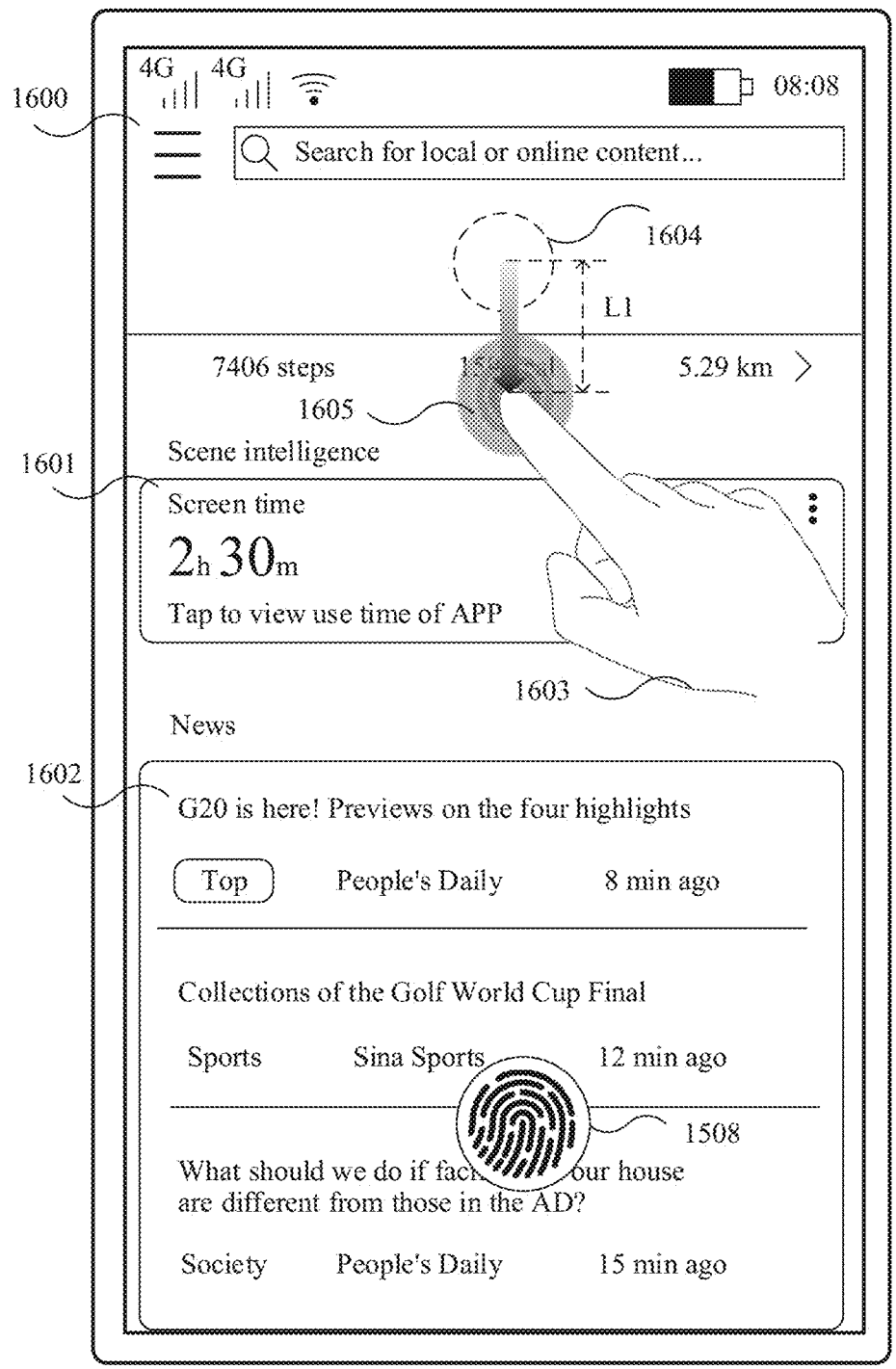

For example, as shown in FIG. 16*b*, in a process in which the electronic device receives the sliding operation 1603 of the user, when the electronic device determines that a sliding distance of the finger of the user (which may be a distance between a current location 1604 of the finger of the user and the start location 1605) is greater than the first distance threshold (L1), the electronic device may collect the face information by using the camera lens, and display a fingerprint recognition icon 1608 on the touchscreen. After the electronic device collects the face information by using a facial recognition module, the electronic device may match the collected face information with a stored face information template.

After collecting the face information of the user, the electronic device may determine whether the collected face information matches the stored face information template. If yes, the electronic device outputs a first prompt by using the touchscreen, to notify the user that facial recognition succeeds, and displays a hidden application (refer to the embodiment of FIG. 11*d*).

After collecting the face information of the user, the electronic device may determine whether the face information matches the stored face information template. If no, the electronic device may output a second prompt by using the touchscreen, to notify the user that facial recognition fails.

Figure 16C:
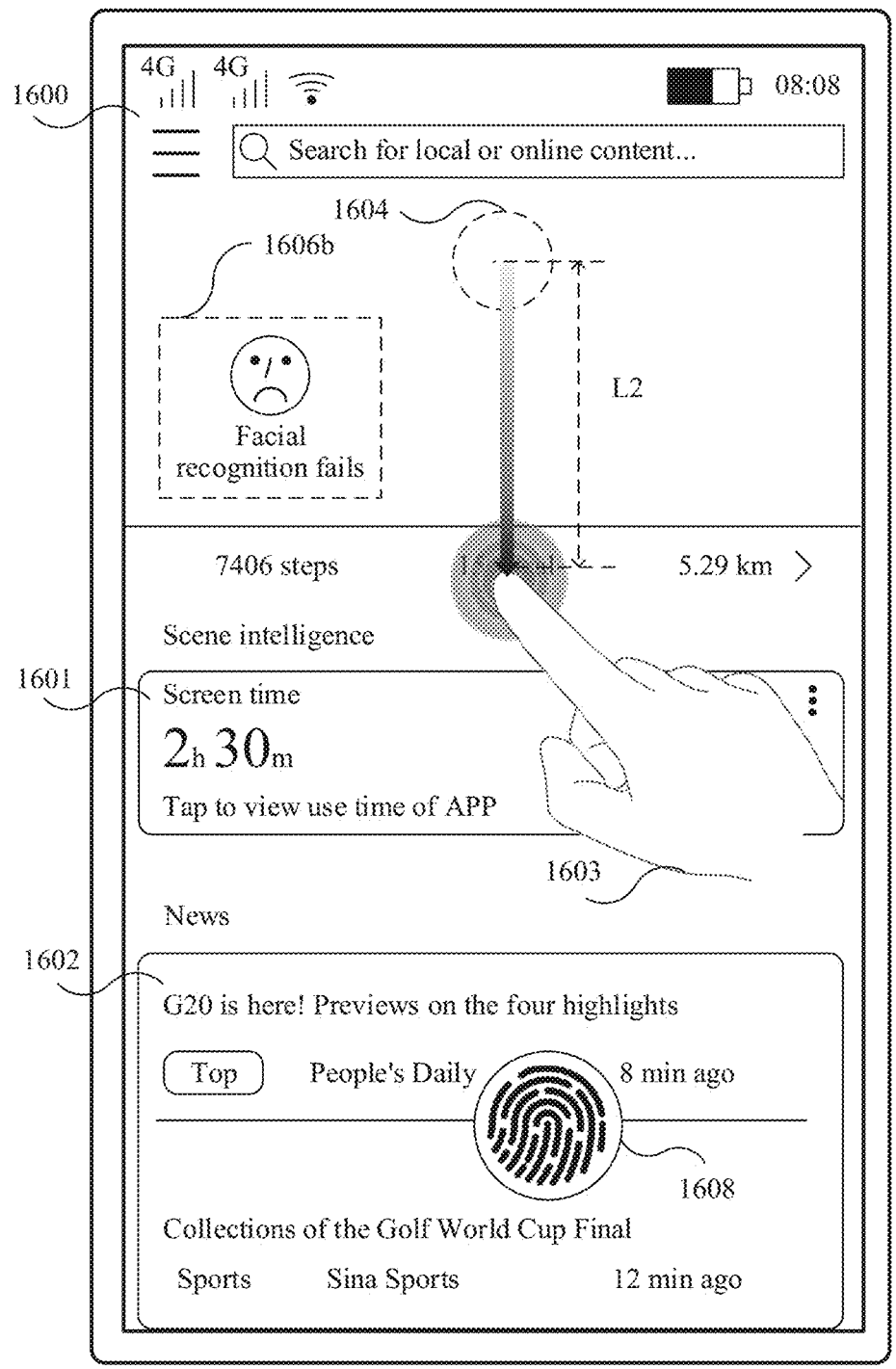

For example, as shown in FIG. 16*c*, in the process in which the electronic device receives the sliding operation 1603 of the user, when the electronic device determines that the sliding distance of the finger of the user (which may be the distance between the current location 1605 of the finger of the user and the start location 1604) is greater than the second distance threshold (L2), if the collected face information does not match the stored face information template, the touchscreen outputs a second prompt 1606*b*.

When facial recognition fails, the electronic device may receive a touch operation of the user for the fingerprint recognition icon, and in response to this input operation for the fingerprint recognition icon, the electronic device may recognize a fingerprint of the user. If fingerprint recognition succeeds, the electronic device may display the hidden application.

Figure 16D:
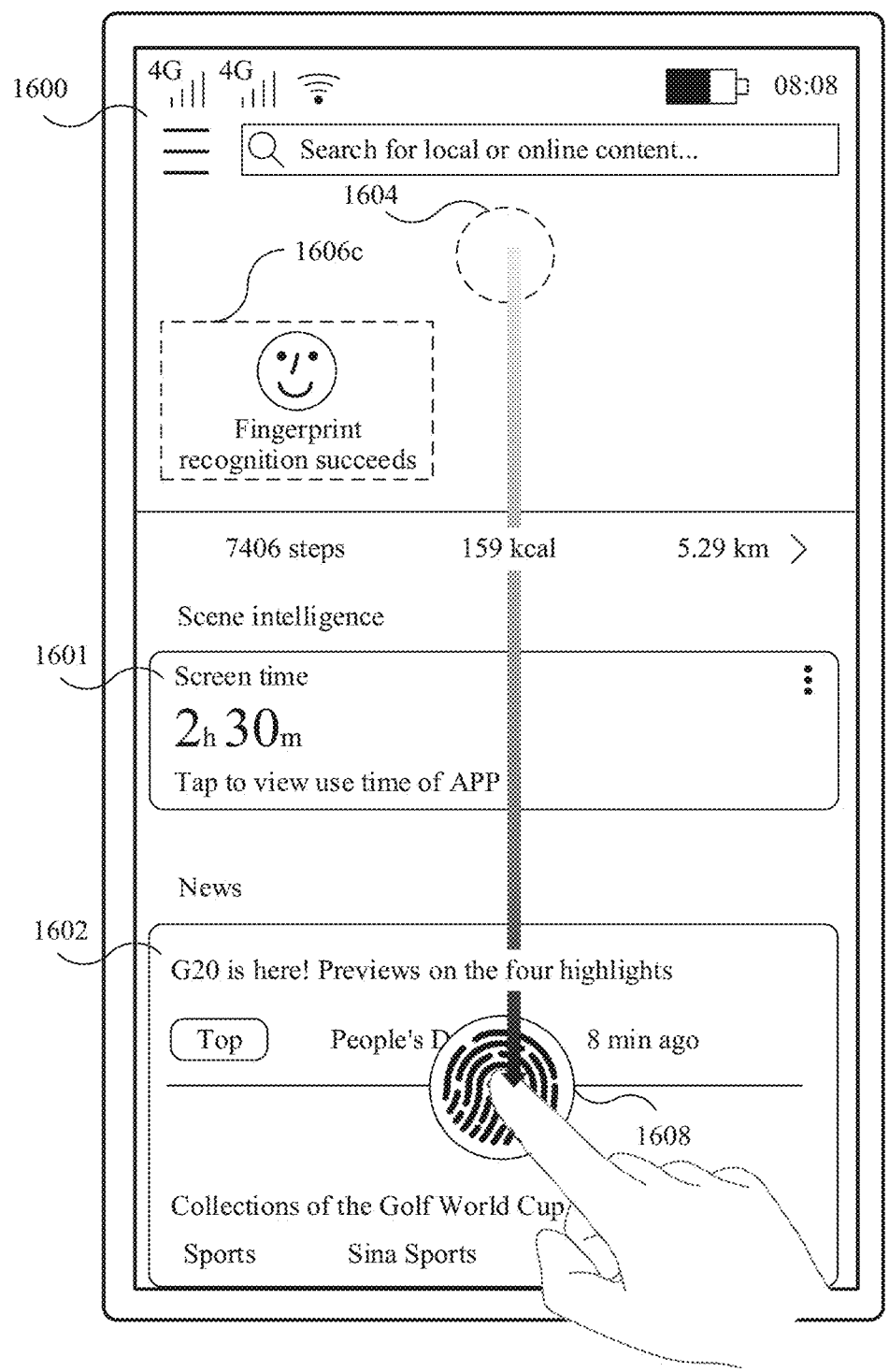

As shown in FIG. 16*d*, after facial recognition fails, the finger of the user may continue to slide until the finger reaches a location of the fingerprint recognition icon 1608. When the finger slides onto the fingerprint recognition icon 1608, the electronic device receives a touch operation of the user for the fingerprint recognition icon 1608. In response to the touch operation for the fingerprint recognition icon 1608, the electronic device may collect the fingerprint information of the finger of the user by using a fingerprint recognition module, and perform matching with a stored fingerprint information template. If the collected fingerprint information of the finger of the user successfully matches the stored fingerprint information template (in other words, fingerprint recognition succeeds), the electronic device may display the hidden application shown in FIG. 11*d*.

Application scenario 3: An embodiment of this application provides a biometric authentication interaction method, to quickly identify an identity of a user, and may automatically log in to an account after identity identification succeeds.

Figure 17A:
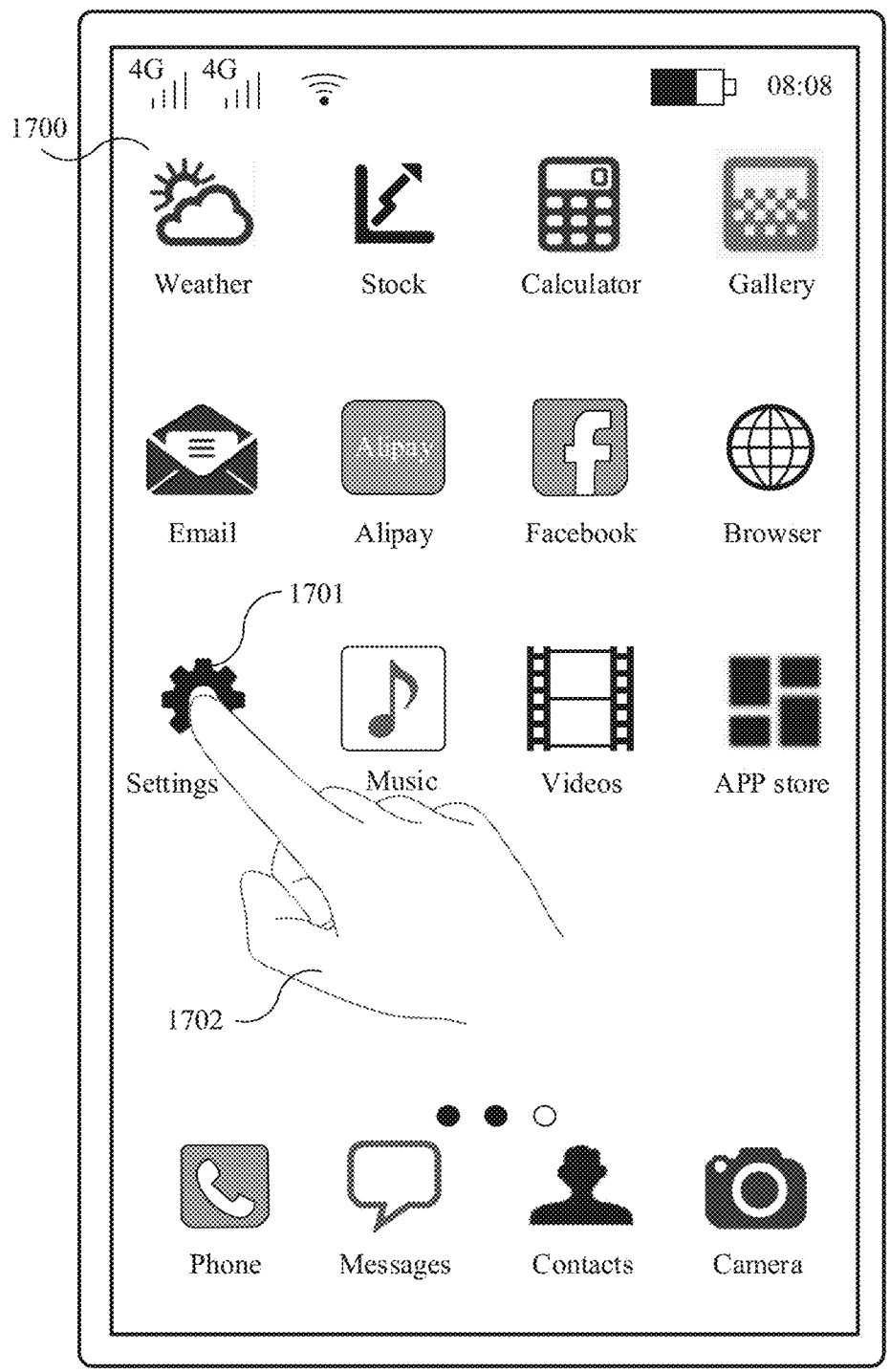
FIG. 17a and FIG. 17h are schematic diagrams of another group of interfaces according to an embodiment of this application.

For example, as shown in FIG. 17*a*, an interface of a home screen is displayed on a touchscreen. The page 1100 shown in FIG. 15*a* is the same as a page 1700 shown in FIG. 17*a*. Text descriptions of FIG. 11*a* are also applicable to FIG. 17*a*, and are not described herein again.

Figure 17B:
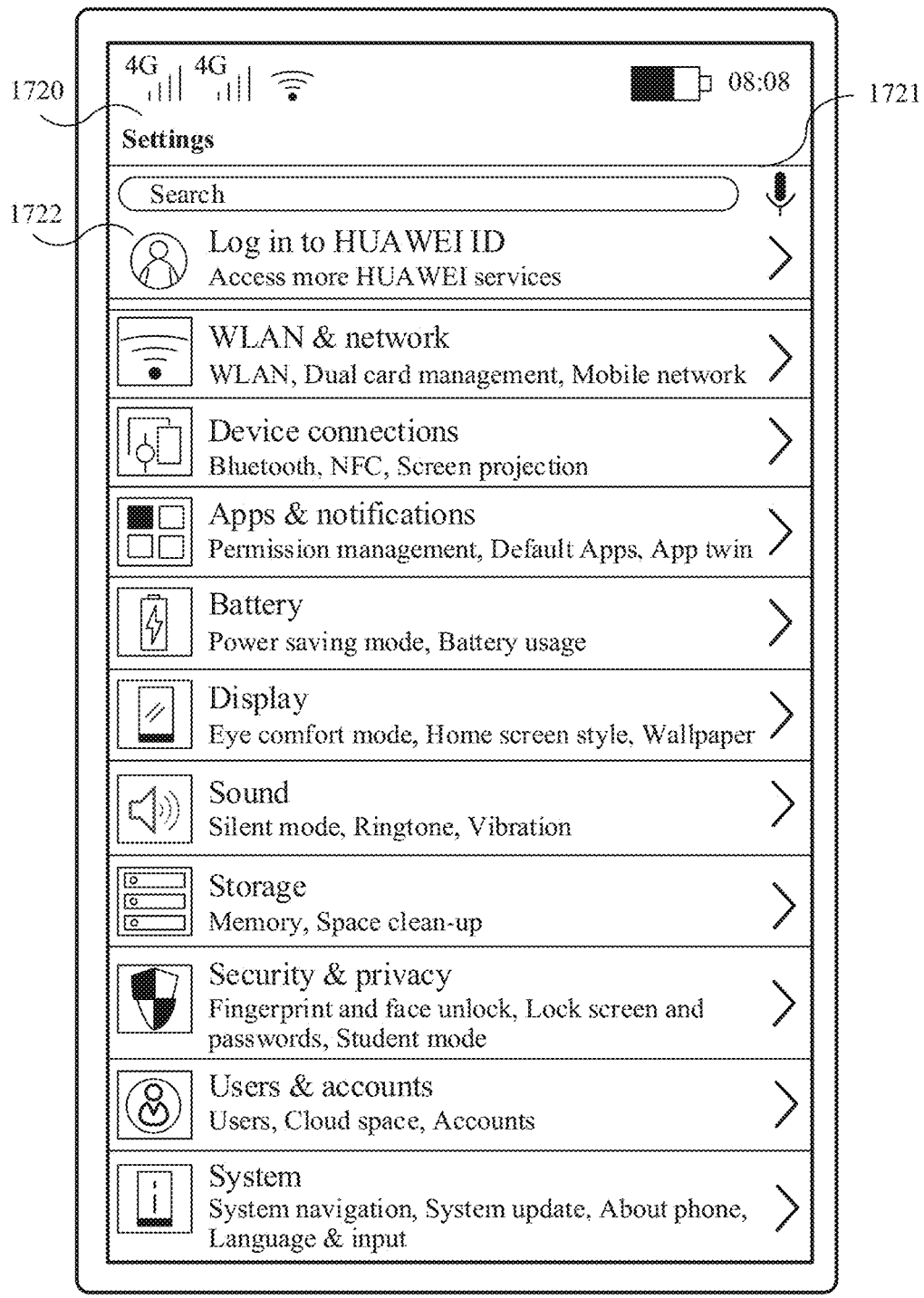

An electronic device may receive an input operation 1702 (for example, tapping) of the user for a settings application icon 1701, and in response to the input operation 1702, the electronic device may display, on the touchscreen, a settings interface 1720 shown in FIG. 17*b*.

As shown in FIG. 17*b*, the settings interface 1720 includes a settings entry page 1721. The settings entry page 1721 displays a system account login settings entry 1722 and other setting entries (for example, a "WLAN and network" settings entry, a "Device connections" settings entry, an "Apps and notifications" settings entry, a "Battery" settings entry, a "Display" settings entry, a "Sound" settings entry, a "Storage" settings entry, a "Security and privacy" settings entry, a "Users and accounts" settings entry, and a "System" settings entry).

Figure 17C:
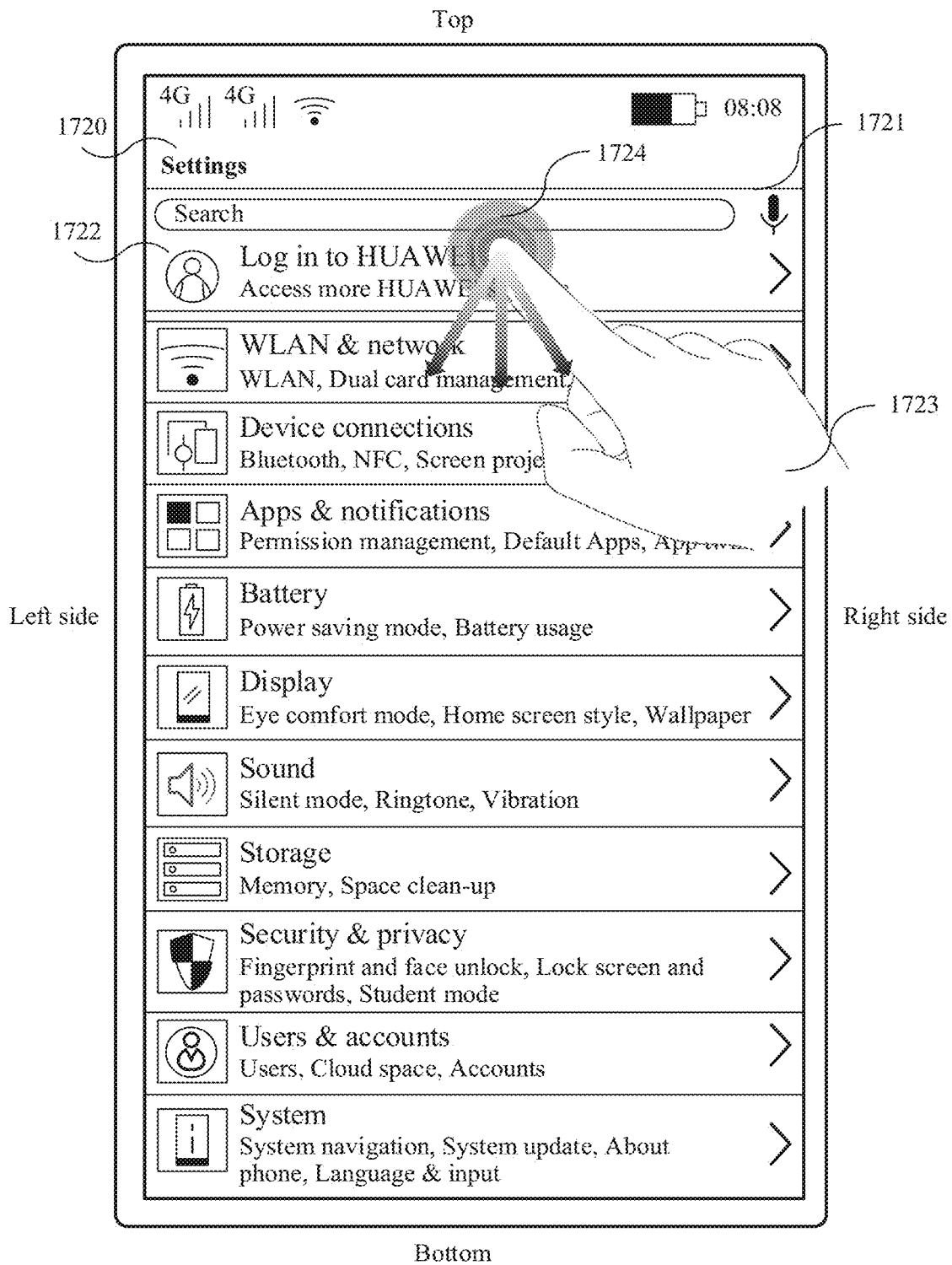

As shown in FIG. 17*c*, the electronic device may receive a sliding operation 1723 of the user on the settings entry page 1721. A start point of the sliding operation 1723 may be a top area of the settings entry page 1721, for example, near the system account login settings entry 1722. For example, a sliding start location of the sliding operation 1723 may be a location 1724 shown in FIG. 17*c*. A trend of the sliding operation 1723 may be from the top of the touchscreen to the bottom, and the sliding operation is not required to be roughly parallel to left and right sides of the touchscreen. For example, the sliding operation is, as shown in FIG. 17*c*, sliding from the top of the touchscreen to the bottom in a direction toward the left side, or sliding from the top of the touchscreen to the bottom in a direction toward the right side. In addition to the foregoing examples of the sliding operation, the sliding operation 1723 may be a single-finger sliding operation, or may be a two-finger sliding operation.

The electronic device may determine whether a sliding distance of the sliding operation is greater than a first distance threshold, and if yes, the electronic device may collect face information by using a facial recognition module, and display a fingerprint recognition icon on the touchscreen. The sliding distance of the sliding operation may be a displacement from the start location to a current location of a finger of the user after the finger touches the touchscreen. In an optional implementation, the sliding distance of the sliding operation may be alternatively a displacement, in a specific direction, from the start location to the current location of the finger of the user after the finger touches the touchscreen (for example, a displacement on the touchscreen in a top-down direction).

Figure 17D:
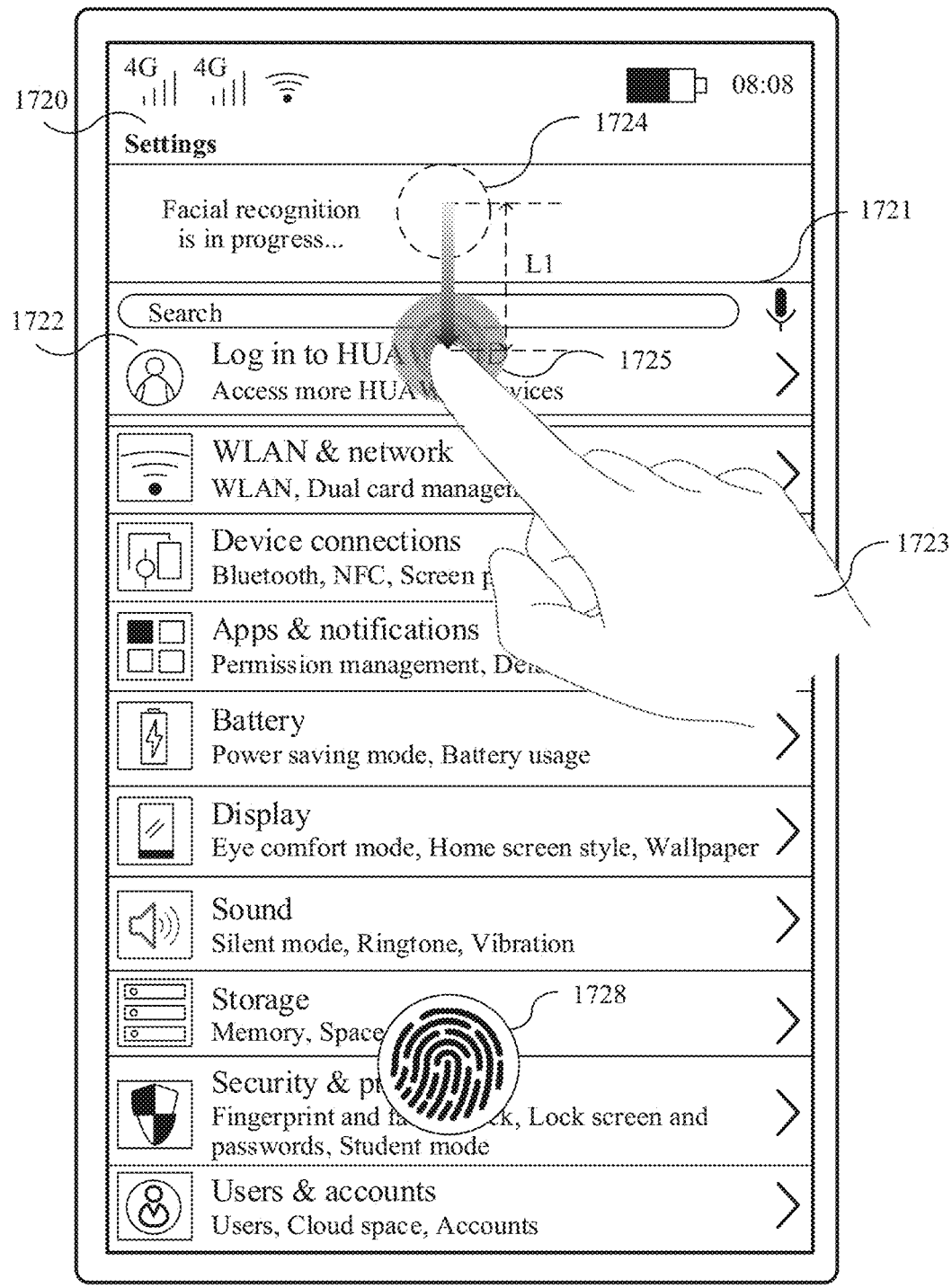

For example, as shown in FIG. 17d, in a process in which the electronic device receives the sliding operation 1723 of the user, when the electronic device determines that a sliding distance of the finger of the user (which may be a distance between a current location 1724 of the finger of the user and the start location 1725) is greater than the first distance threshold (L1), the electronic device may collect the face information by using the facial recognition module, and display a fingerprint recognition icon 1728 on the touchscreen. After the electronic device collects the face information by using a camera lens, the electronic device may match the collected face information with a stored face information template.

After collecting the face information of the user, the electronic device may determine whether the face information matches the stored face information template. If yes, the electronic device may output a first prompt by using the touchscreen, to notify the user that facial recognition succeeds, and log in to a system account associated with the face information template.

In this embodiment of this application, before facial recognition or fingerprint recognition, the electronic device may receive an operation of the user, apply for an account from a system vendor server of the electronic device, and set a password. After the system account is obtained and the password is set, a face information template and a fingerprint information template of the user are entered to the electronic device, and the account and the password are associated. After facial recognition and/or fingerprint recognition succeed/succeeds, the electronic device may send the system account and the password of the user to the system vendor server for account login. After the login succeeds, the electronic device may output a login success prompt (for example, a system account nickname (for example, Alice) and an account avatar in FIG. 17f).

Figure 17E:
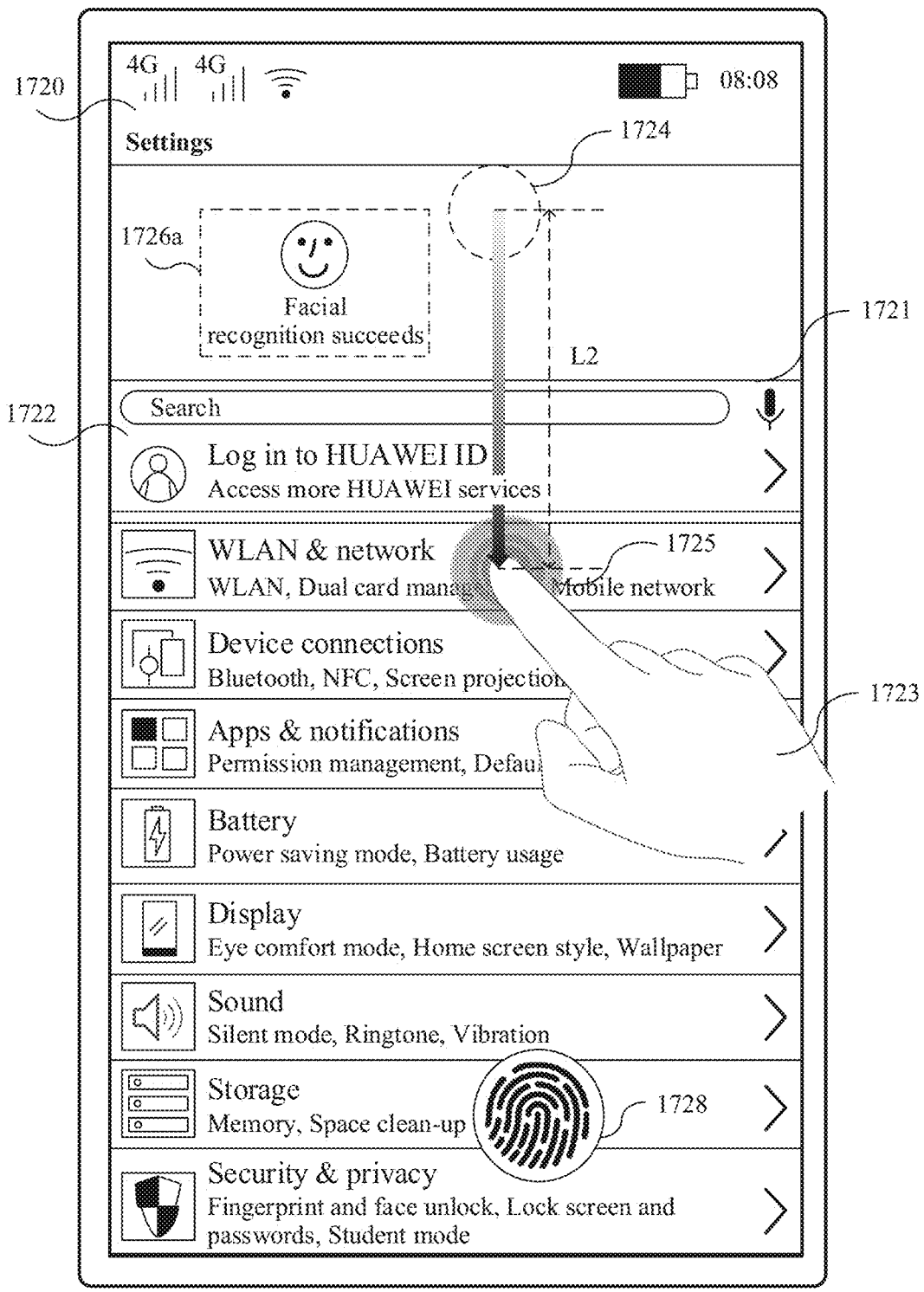
Figure 17F:
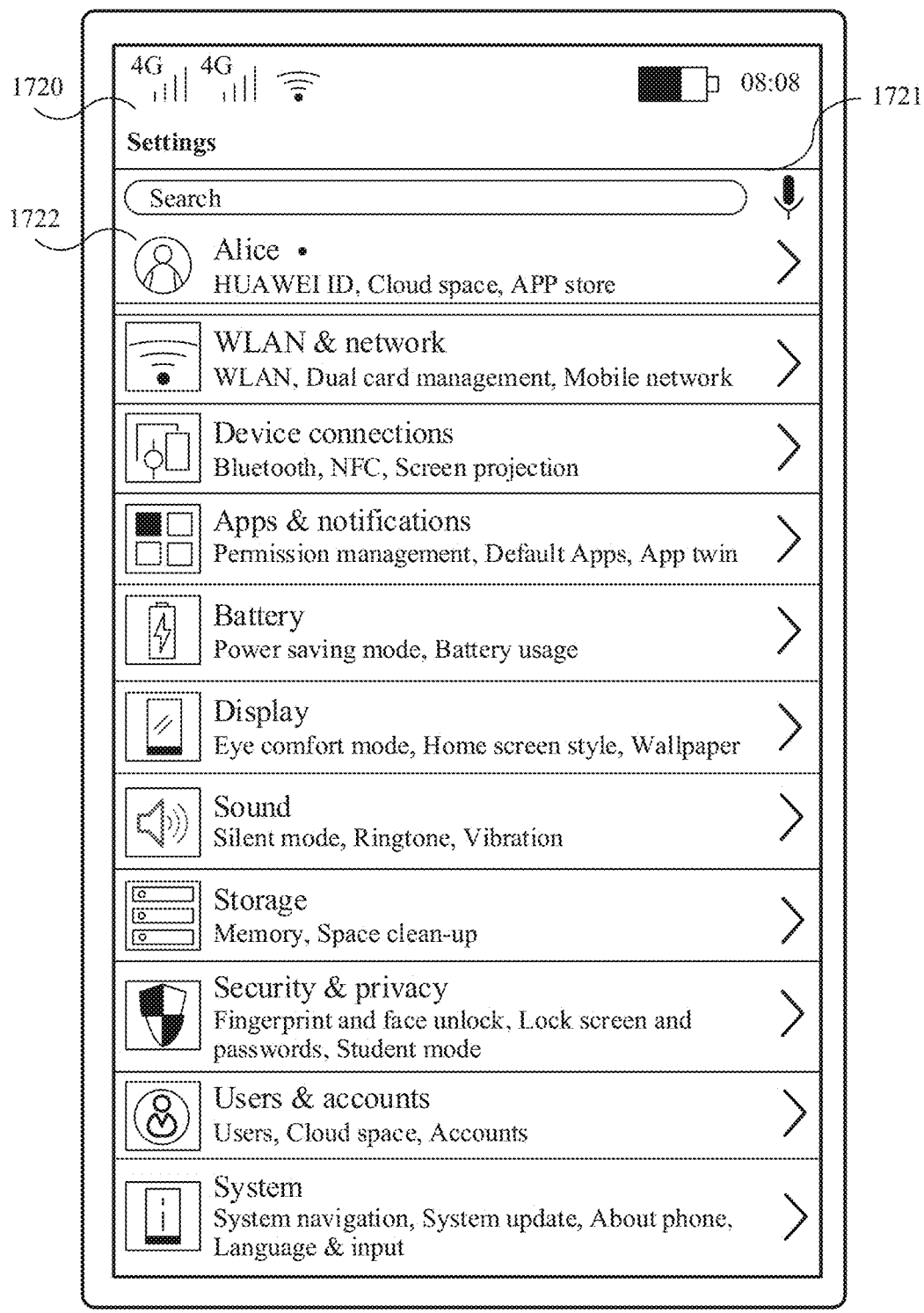

As shown in FIG. 17e, in a process in which the electronic device receives the sliding operation 1723 of the user, when the electronic device determines that the sliding distance of the finger of the user (which may be the distance between the current location 1725 of the finger of the user and the start location 1724) is greater than a second distance threshold (L2), if the collected face information successfully matches the stored face information template, the touchscreen displays a first prompt 1726a, and the electronic device logs in to a system account of the face feature template. As shown in FIG. 17f, after the electronic device logs in to the system account associated with the stored face information template, the system account login settings entry 1722 may display account information (including the account nickname (for example. Alice), the system account avatar, and the like).

After collecting the face information of the user, the electronic device may determine whether the face information matches the stored face information template. If no, the electronic device may output a second prompt by using the touchscreen, to notify the user that facial recognition fails.

Figure 17G:
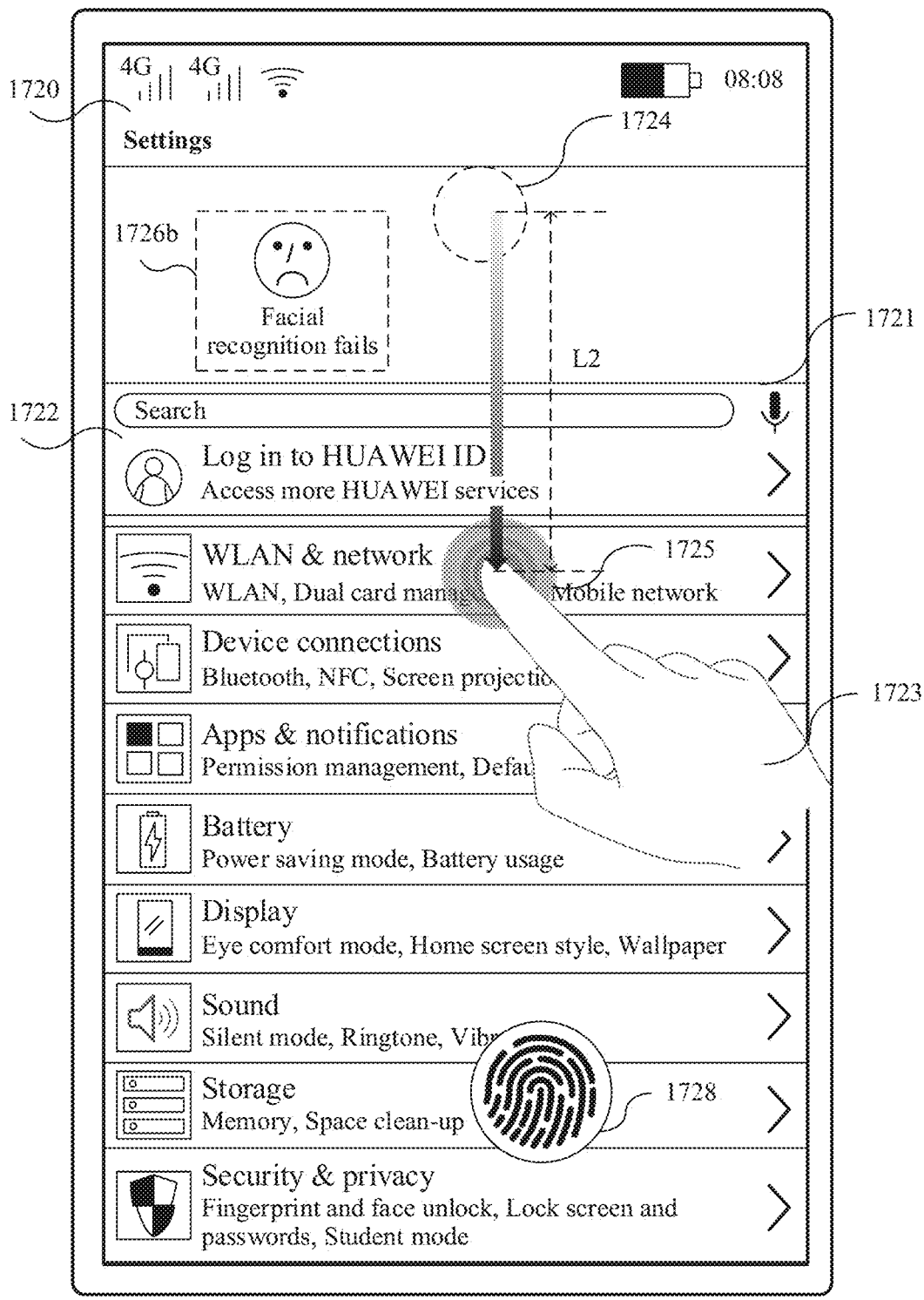

For example, as shown in FIG. 17g, in the process in which the electronic device receives the sliding operation 1723 of the user, when the electronic device determines that the sliding distance of the finger of the user (which may be the distance between the current location 1725 of the finger of the user and the start location 1724) is greater than the second distance threshold (L2), if the collected face information does not match the stored face information template, the touchscreen displays a second prompt 1726b.

When facial recognition fails, the electronic device may receive a touch operation of the user for the fingerprint recognition icon, and in response to this input operation for the fingerprint recognition icon, the electronic device may collect fingerprint information of the finger of the user. If the fingerprint information successfully matches the stored fingerprint information template, the electronic device may log in to a system account associated with the stored fingerprint information template. In an implementation, the electronic device may store a plurality of groups of system accounts and passwords, and each group of system accounts and passwords may be associated with one group of fingerprint information templates. If a fingerprint information template that successfully matches the collected fingerprint information exists in the electronic device, the electronic device may log in to a system account associated with the successfully matched fingerprint information template.

Figure 17H:
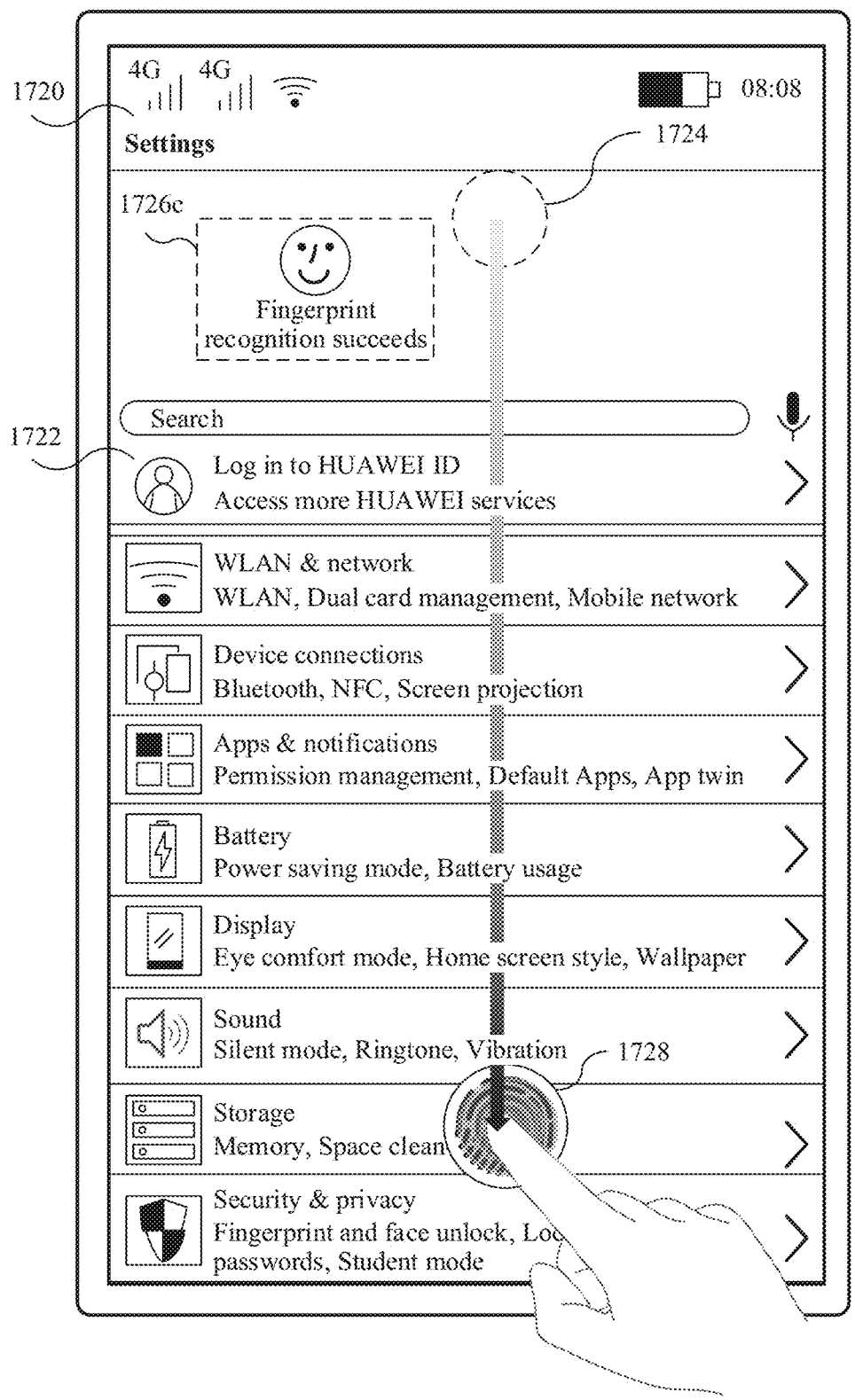

For example, as shown in FIG. 17h, after facial recognition fails, the finger of the user may continue to slide until the finger reaches a location of the fingerprint recognition icon 1728. When the finger slides onto the fingerprint recognition icon 1728, the electronic device receives a touch operation of the user for the fingerprint recognition icon 1728. In response to the touch operation for the fingerprint recognition icon 1728, the electronic device may collect the fingerprint information of the finger of the user by using a fingerprint recognition module, and perform matching with the stored fingerprint information template. If the collected fingerprint information of the finger of the user successfully matches the stored fingerprint information template (in other words, fingerprint recognition succeeds), the electronic device logs in to the system account associated with the stored fingerprint information template.

In an implementation, when the sliding distance of the sliding operation of the user is greater than the first distance threshold (L1), the user may lift the finger (in other words, the finger leaves the touchscreen). The electronic device may collect the face information of the user by using the facial recognition module, and display the fingerprint recognition icon on the touchscreen. After collecting the face information of the user, the electronic device may match the face information with the stored face information template. If facial recognition succeeds, the electronic device may log in to the system account associated with the stored face information template. If facial recognition fails, the electronic device may receive a touch operation of the user for the fingerprint recognition icon, and in response to the touch operation for the fingerprint recognition icon, the electronic device may collect the fingerprint information of the finger of the user, and perform matching with the stored fingerprint information template. If matching succeeds, the electronic device may log in to the system account associated with the fingerprint information template. In this way, facial recognition or fingerprint recognition may still be performed after the user accidentally lifts the finger in the sliding process, to log in to the system account, thereby improving user experience.

In an implementation, the electronic device may receive the sliding operation of the user in the settings interface, and trigger only an identity identification manner of facial recognition to identify an identity of the user, to quickly log in to the system account after facial recognition succeeds. For specific content, refer to content of triggering facial recognition by the sliding operation 1723 in FIG. 17a to FIG. 17f.

In an implementation, the electronic device may receive the sliding operation of the user in the settings interface, and trigger only an identity identification manner of fingerprint recognition to identify an identity of the user, to quickly log in to the system account. For specific content, refer to content of triggering fingerprint recognition by the sliding operation 1723 in FIG. 17a to FIG. 17d and FIG. 17h.

Figure 18A:
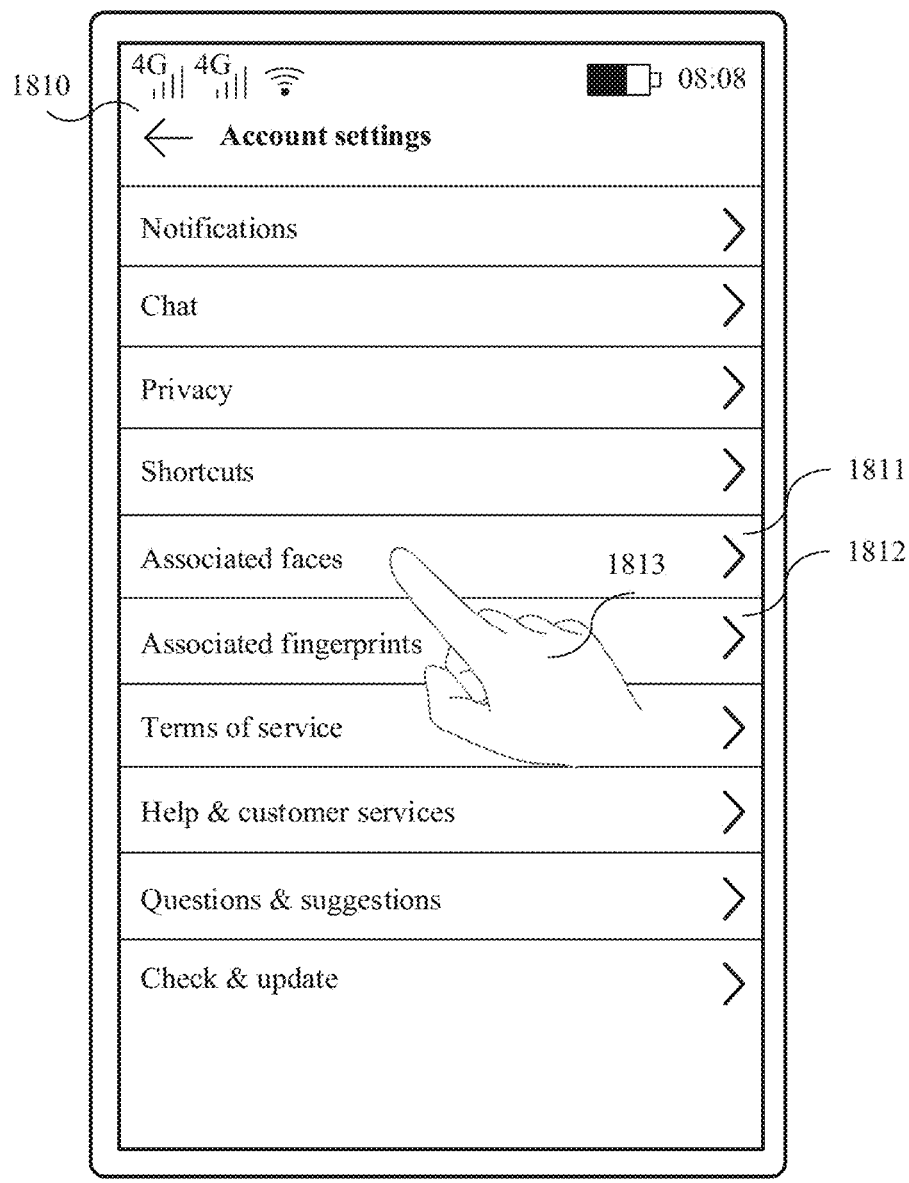
FIG. 18a and FIG. 18c are schematic diagrams of another group of interfaces according to an embodiment of this application.

In an implementation, before the electronic device receives the sliding operation 1723 of the user, the electronic device may set a facial feature associated with the system account (or a device account). The system account is an account registered by the user, for example, an Apple ID of iOS or a Huawei cloud account, and may be used to use various services provided by an electronic device manufacturer, for example, a cloud service. For example, as shown in FIG. 18a, the electronic device displays an account settings interface 1810 of the system account. After the user logs in to the system account, the electronic device may receive an input operation (for example, tapping) of the user for a settings entry in the system account, and display the account settings interface 1810 in response to the input operation. Alternatively, the electronic device may store a system account and a password of the user while the user does not need to log in to the system account. The electronic device may receive a user operation in system settings, display an account settings interface 1810 shown in FIG. 18a, and bind an associated face information template or fingerprint information template to the system account of the user.

Figure 18B:
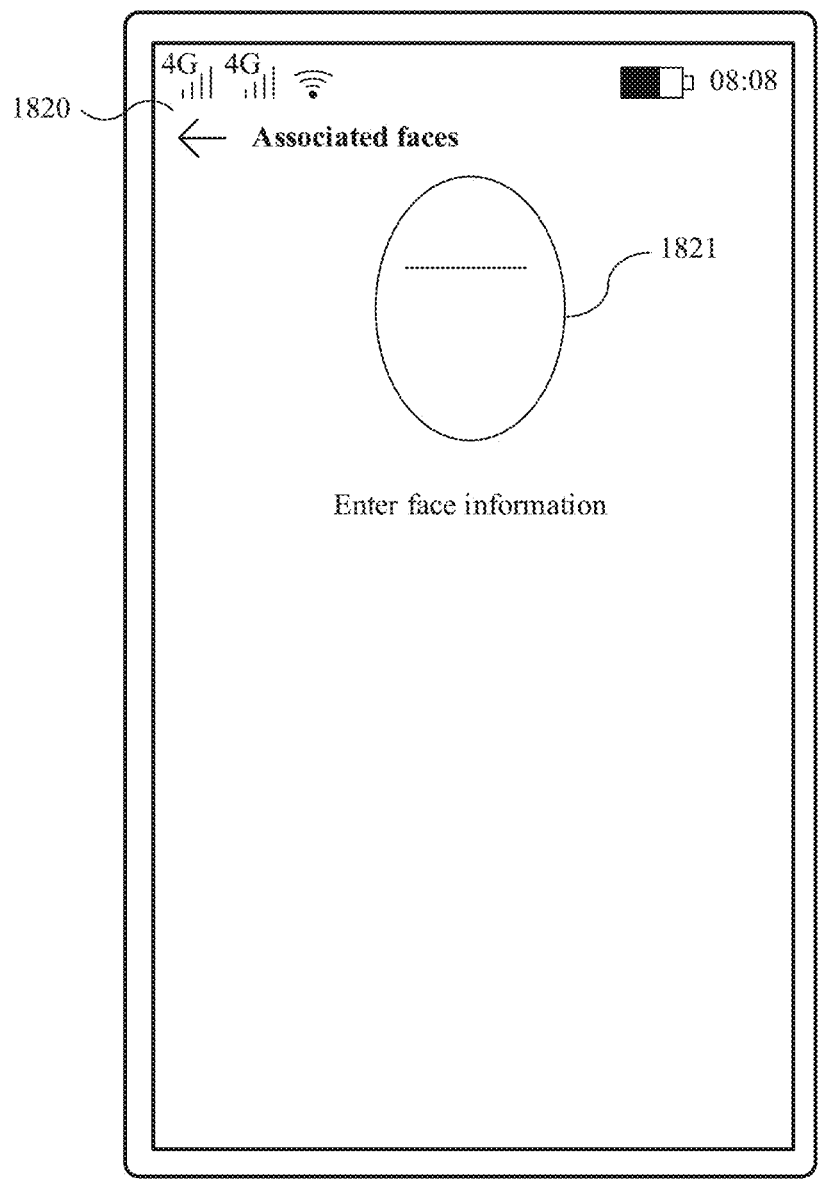
Figure 18C:
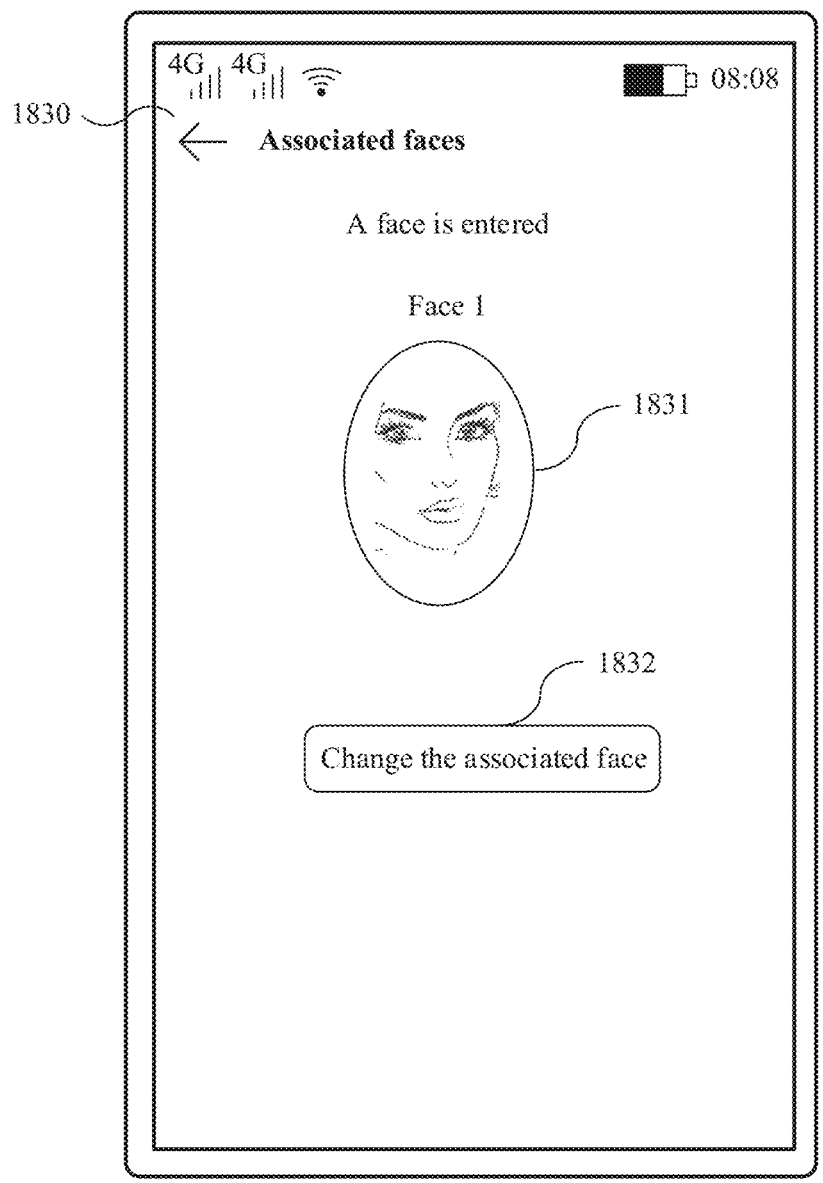

The account settings interface 1810 includes an "Associated faces" settings entry 1811, an "Associated fingerprints" settings entry 1812, and other settings entries (for example, a "Notifications" settings entry, a "Chat" settings entry, a "Privacy" settings entry, a "Shortcuts" settings entry, a "Terms of service" settings entry, a "Help and customer services" settings entry, a "Questions and suggestions" settings entry, and a "Check and update" settings entry). The electronic device may receive an input operation 1813 (for example, tapping) of the user for the "Associated faces" settings entry 1811, and in response to the input operation 1813 (for example, tapping), the electronic device may enable a facial recognition module, and display a face entering interface 1820 shown in FIG. 18b. The face entering interface 1820 includes a face display area 1821, and the face display area is used to display a face image captured by the facial recognition module, to help the user align with a camera lens of the facial recognition module. After receiving face image information entered by the user, the electronic device may perform some necessary processing on the face image information, and save the processed face information as a face information template. After saving the face information template, the electronic device may display a face entering complete interface 1830 shown in FIG. 18c. The face entering complete interface 1830 may include a change control 1832 that is used by the user to change the stored face information template.

Figure 19A:
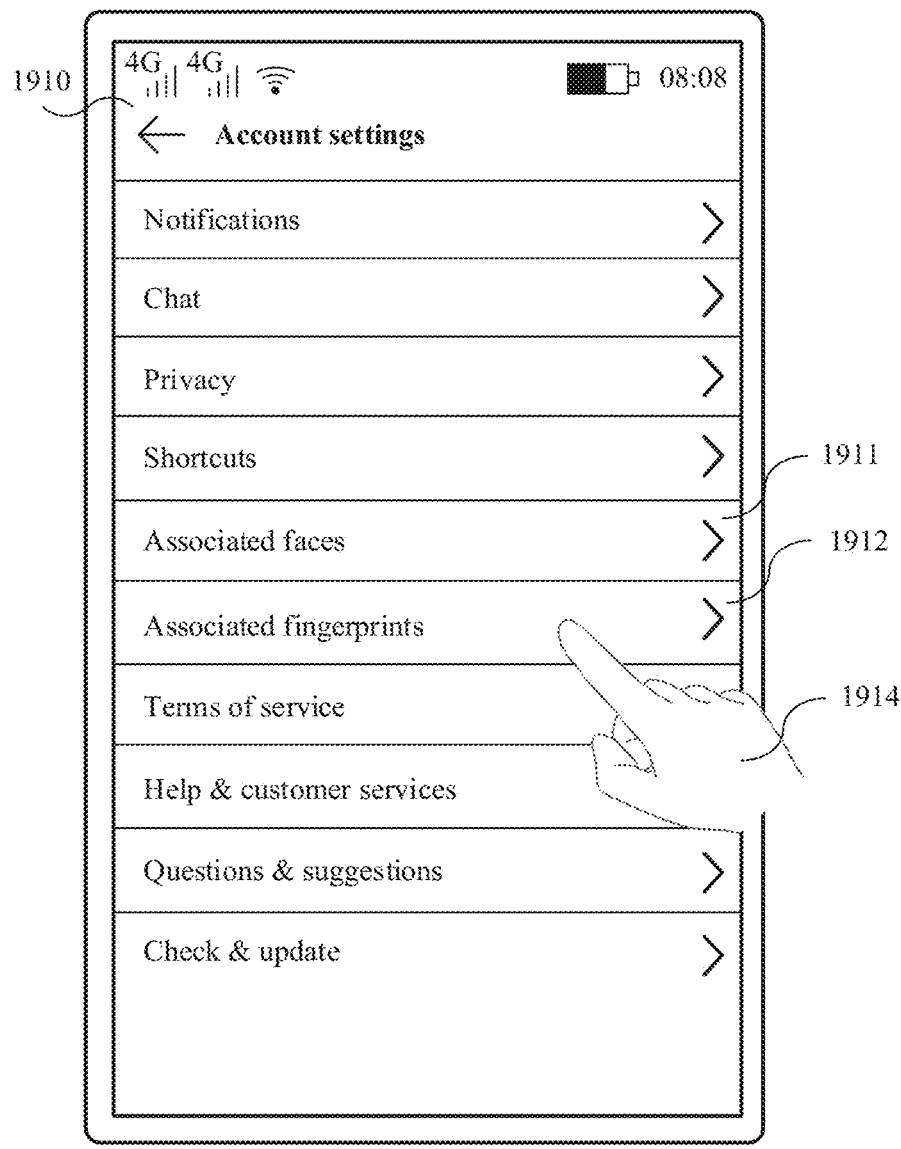
FIG. 19a and FIG. 19c are schematic diagrams of another group of interfaces according to an embodiment of this application.
Figure 19B:
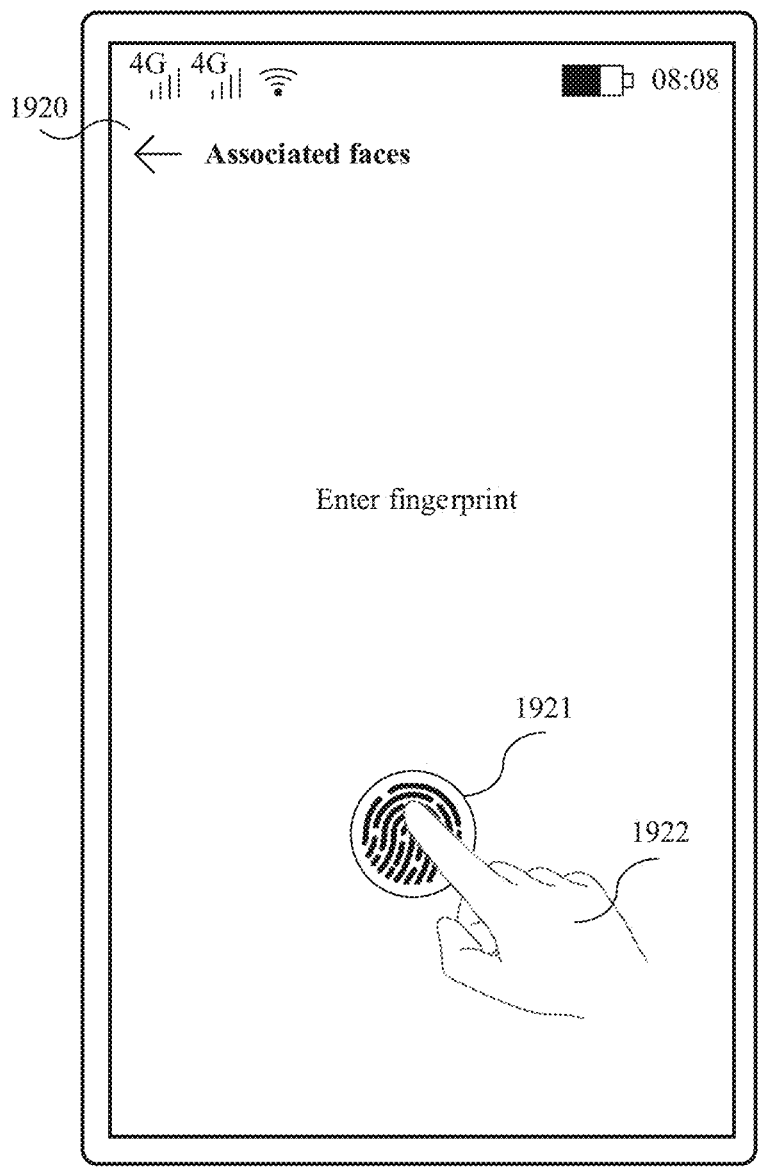
Figure 19C:
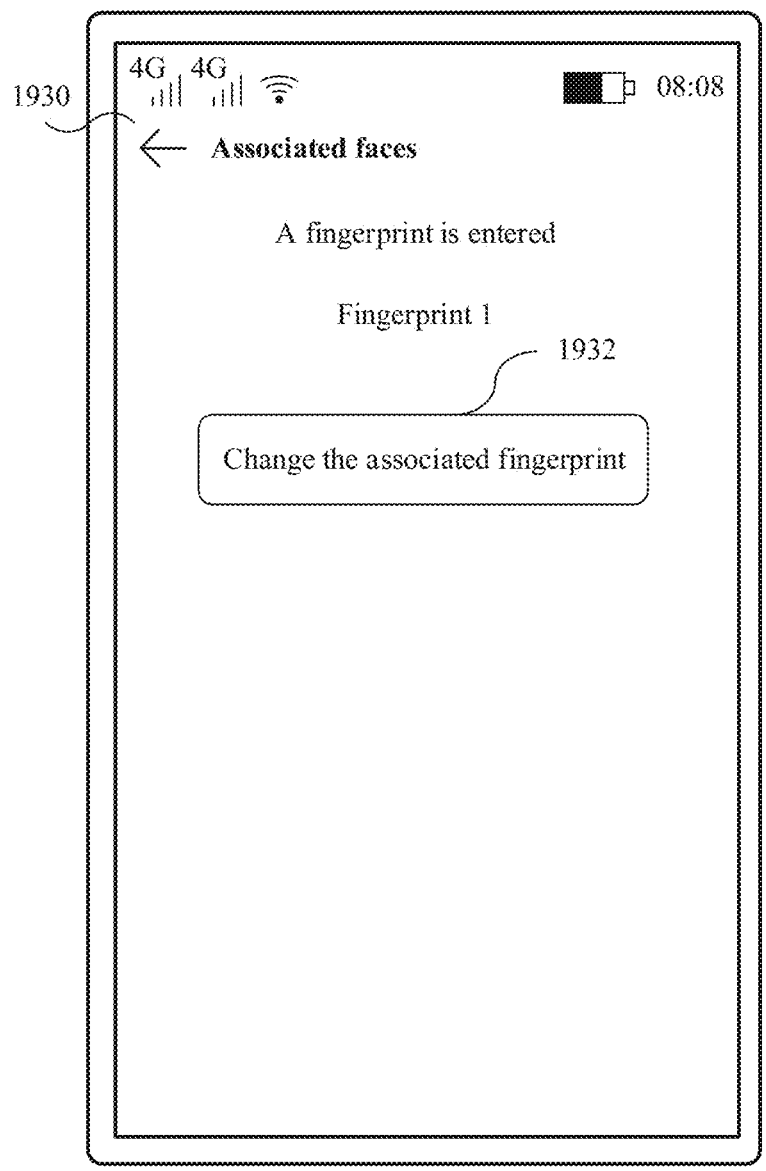

In an implementation, before the electronic device receives the sliding operation 1723 of the user, the electronic device may set a fingerprint feature associated with the system account. For example, as shown in FIG. 19a, the electronic device displays an account settings interface 1910 of the system account. FIG. 18a is the same as FIG. 19a. Text descriptions of FIG. 18a are also applicable to reference 19a, and are not described herein again. The electronic device may receive an input operation 1914 (for example, tapping) of the user for an "Associated fingerprints" settings entry 1912, and in response to the input operation 1914 (for example, tapping), the electronic device may enable a fingerprint recognition module, and display a fingerprint recognition icon 1921 on a fingerprint entering interface 1920 shown in FIG. 19b. The electronic device receives a touch operation 1922 of the user for the fingerprint recognition icon 1921, and in response to the touch operation 1922, the electronic device may collect fingerprint information of the user and save the fingerprint information as a fingerprint information template. After saving the fingerprint information, the electronic device may display a fingerprint entering complete interface 1930 shown in FIG. 19c. The fingerprint entering complete interface 1930 may include a fingerprint information template change control 1932 that is used by the user to change the stored fingerprint information template.

In an implementation, the electronic device may further receive a sliding operation of the user in a login interface of an application (for example, WeChat or Weibo). The electronic device determines whether a sliding distance of the sliding operation is greater than a first distance threshold (L1). If yes, the electronic device may collect face information by using a camera lens, and displays a fingerprint recognition icon on a touchscreen. If the collected face information matches the stored face information template, the electronic device logs in, on the application, to an application account associated with the stored face information template. If the collected face information does not match the stored face information template, the electronic device receives a touch operation of the user for a fingerprint icon, and in response to the touch operation for the fingerprint icon, the electronic device may collect fingerprint information of a finger of the user. If the collected face information matches the stored fingerprint information template, the electronic device may automatically send an application account and a password that are associated with the fingerprint information template to an application server. After verification on the application account and the password succeeds, the application server may send a verification success message to the electronic device, and allow the electronic device to access a data resource on the application server, in other words, the electronic device successfully logs in to the application account.

Figure 20A:
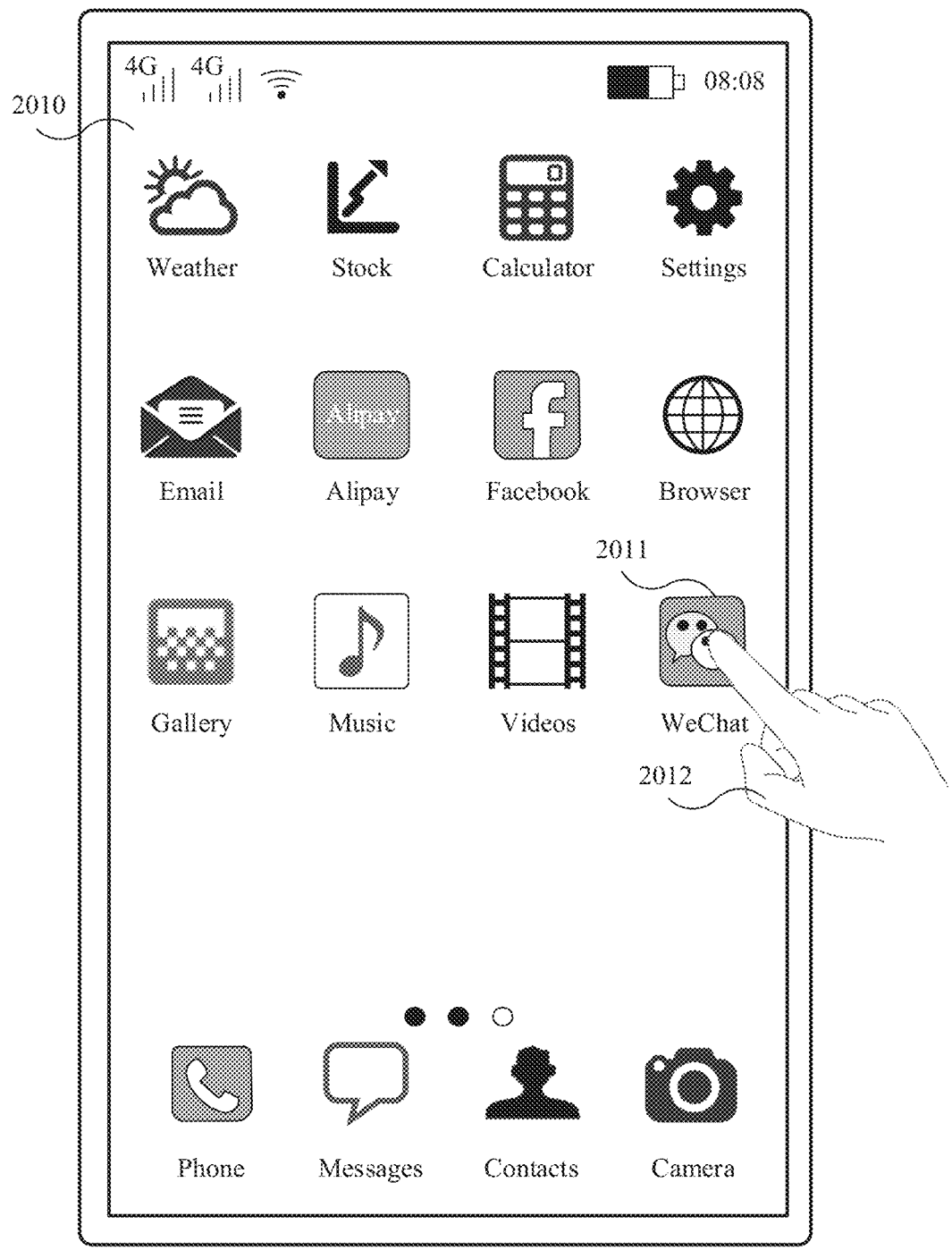
FIG. 20a and FIG. 20h are schematic diagrams of another group of interfaces according to an embodiment of this application.
Figure 20B:
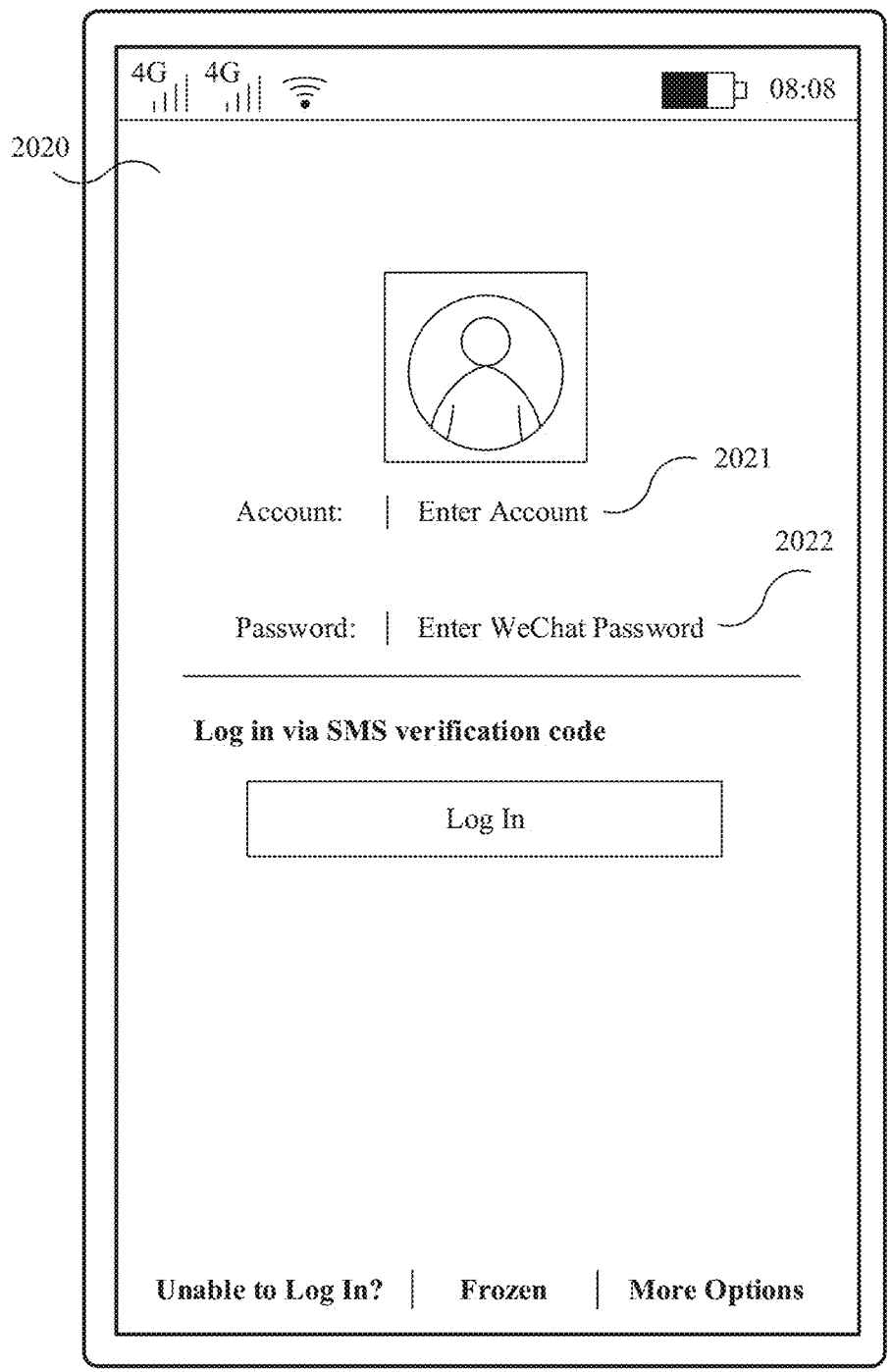

Log in to a WeChat application account is used as an example. As shown in FIG. 20a, the electronic device displays a last page 2000 of a home screen on the touchscreen. The last page includes a WeChat application icon 2011. For a part that is not described in FIG. 20a, refer to a text description part of the embodiment shown in FIG. 5a. Details are not described herein again. The electronic device may receive an input operation 2012 (for example, tapping) of the user for the WeChat application icon 2011, and in response to the input operation 2012, the electronic device may display, on the touchscreen, a WeChat login interface 2010 shown in FIG. 20b. As shown in FIG. 20b, the WeChat login interface 2020 includes an account input box 2021, a password input box 2022, and the like.

Figure 20C:
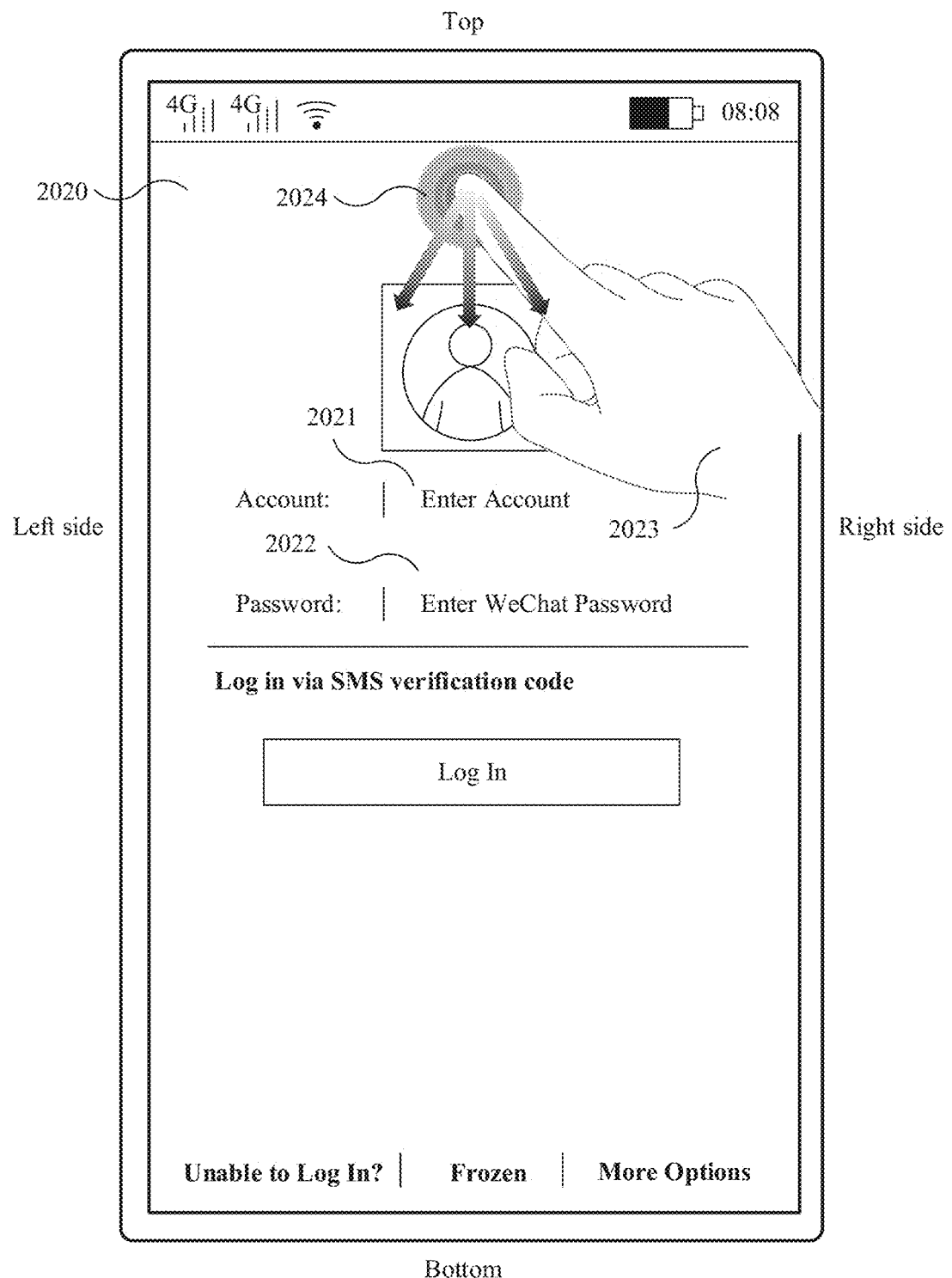

As shown in FIG. 20c, the electronic device receives a sliding operation 2023 of the user in the WeChat login interface 2020. A start point of the sliding operation 2023 may be the top of the WeChat login interface 2020. For example, a start location of the sliding input operation 2023 may be a location 2024 shown in FIG. 20c. A trend of the sliding operation 2023 may be from the top of the touchscreen to the bottom, and the sliding operation 2023 is not required to be roughly parallel to left and right sides of the touchscreen. For example, the sliding operation is, as shown in FIG. 20c, sliding from the top of the touchscreen to the bottom in a direction toward the left side, or sliding from the top of the touchscreen to the bottom in a direction toward the right side. In addition to the foregoing examples of the sliding operation, the sliding operation 2023 may be a single-finger sliding operation, or may be a two-finger sliding operation.

Figure 20D:
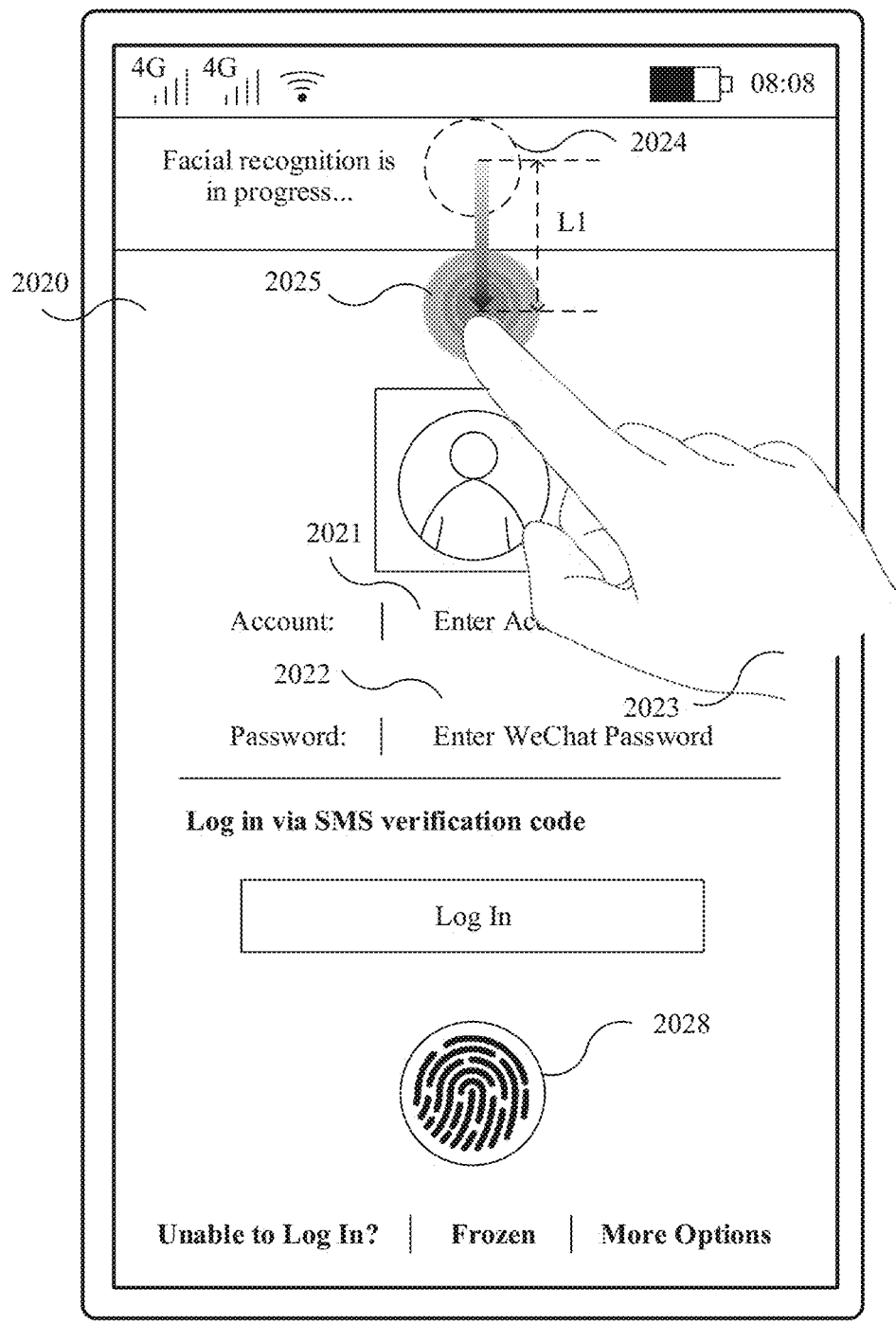

As shown in FIG. 20d, in a process in which the electronic device receives the sliding operation 2023 of the user, when the electronic device determines that a sliding distance of a finger of the user (which may be a distance between a current location 2024 of the finger of the user and a start location 2025) is greater than a first distance threshold (L1), the electronic device may collect face information by using a facial recognition module, and display a fingerprint recognition icon 2028 on the touchscreen.

After collecting the face information of the user, the electronic device may determine whether the face information matches the stored face information template. If yes, the electronic device may output a first prompt by using the touchscreen, to notify the user that facial recognition succeeds, and log in to an application account associated with the stored face information template. In an implementation, the electronic device may store a plurality of groups of WeChat accounts and passwords, and each group of WeChat accounts and passwords may be associated with one group of face information templates. If a face information template that matches the collected face information exists in the electronic device, the electronic device may log in to a WeChat account associated with the matched face information template. After the user logs in to the WeChat application account, the electronic device may receive an input operation (for example, tapping) of the user for account settings in a WeChat application. In response to the input operation, the electronic device may set an associated facial recognition information template and an associated fingerprint recognition information template for the WeChat account and password. In an implementation, the electronic device may directly bind an associated face information template and an associated fingerprint information template for a stored WeChat account and password in system settings of the electronic device while the user does not need to log in to the WeChat account. For a process of binding the face information template, refer to the embodiment shown in FIG. 18a to FIG. 18c. For a process of binding the fingerprint information template, refer to the embodiment shown in FIG. 19a to FIG. 19c. Details are not described herein again.

Figure 20E:
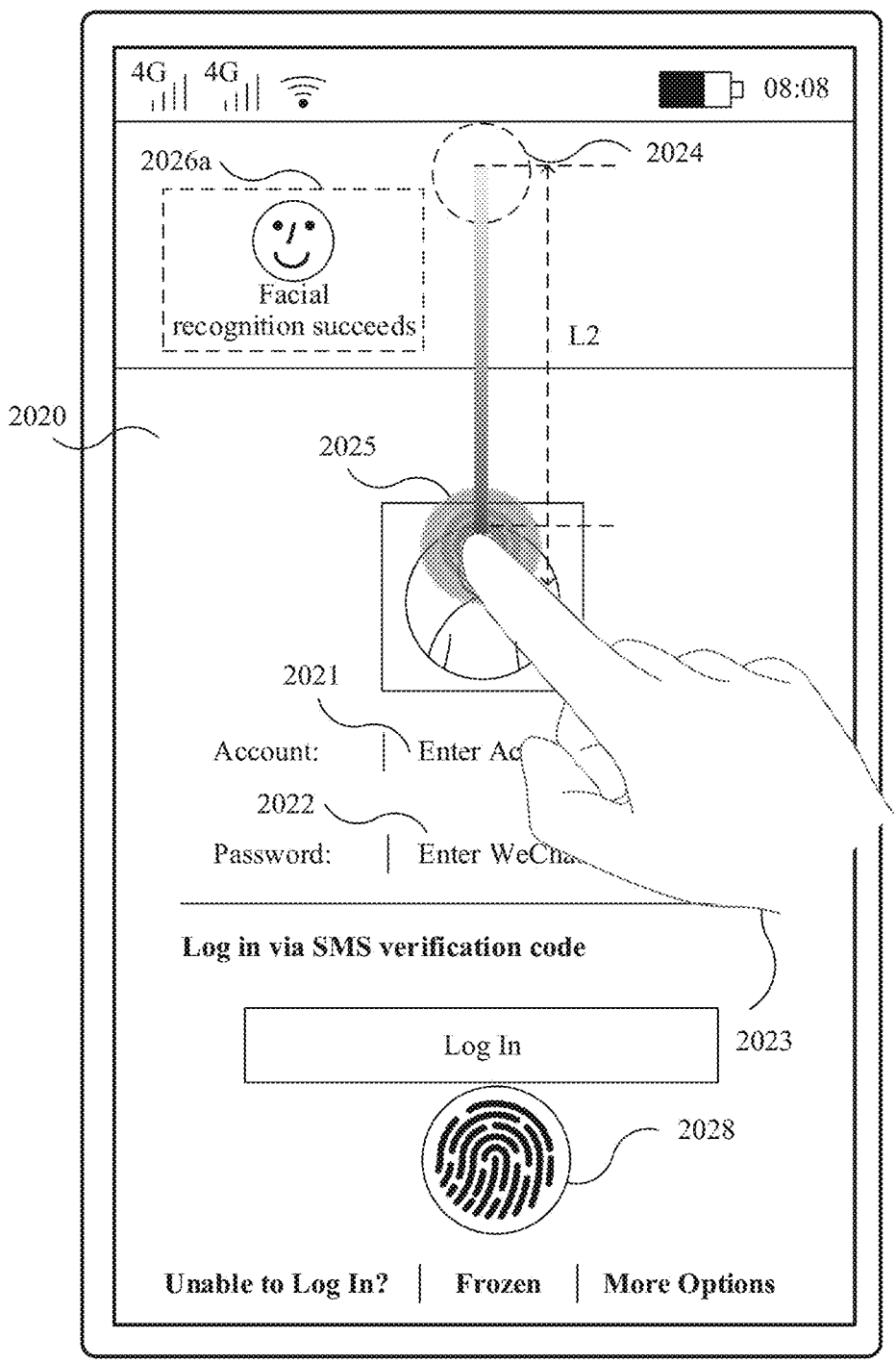
Figure 20F:
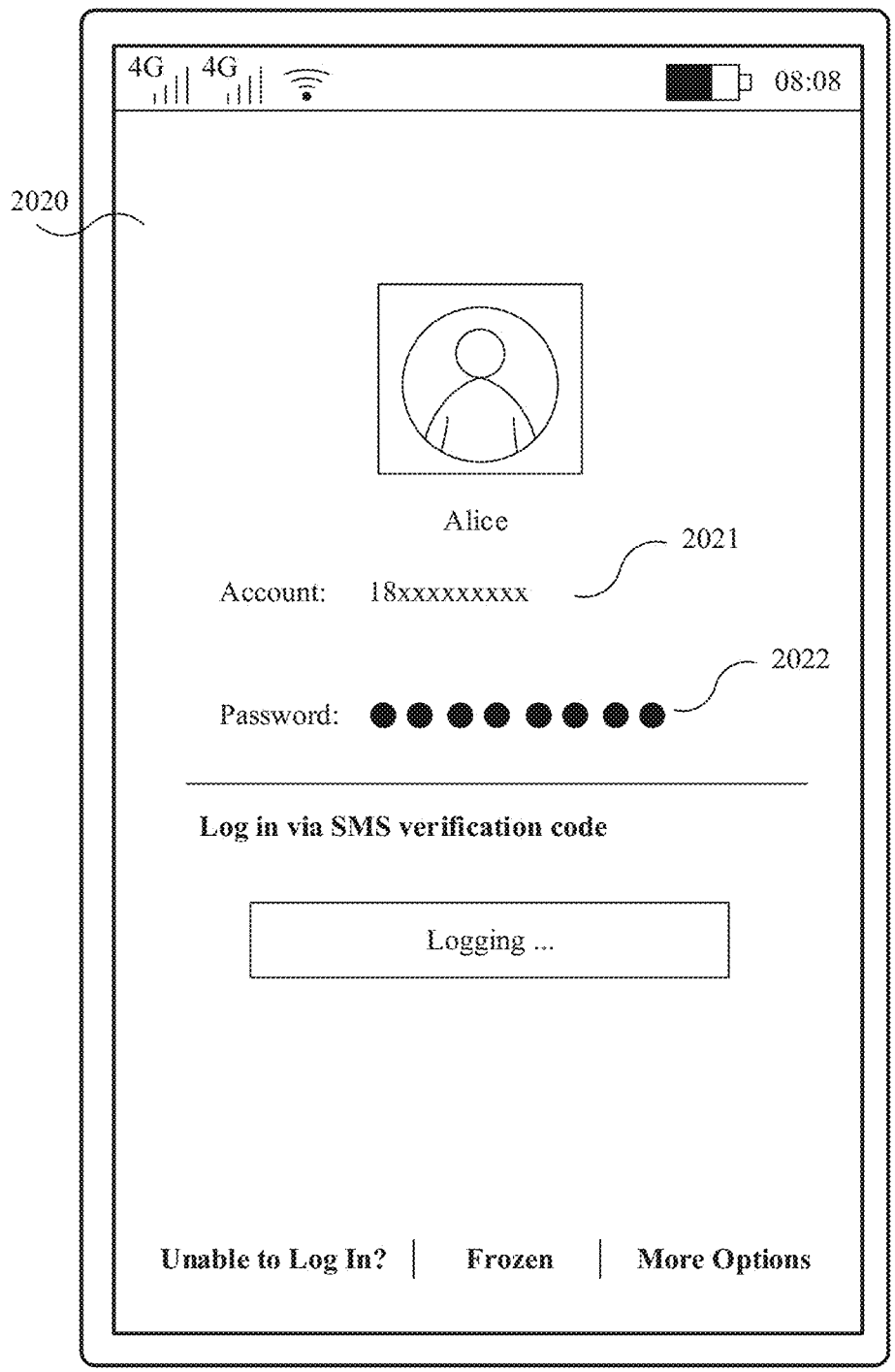

As shown in FIG. 20e, in the process in which the electronic device receives the sliding operation 2023 of the user, when the electronic device determines that the sliding distance of the finger of the user (which may be the distance between the current location 2025 of the finger of the user and the start location 2024) is greater than a second distance threshold (L2), if the collected face information successfully matches the stored face information template, the touchscreen may display a first prompt 2026a. After facial recognition succeeds, the electronic device may log in to a WeChat account associated with the stored face information template. As shown in FIG. 20f, after facial recognition succeeds, the electronic device may separately fill, in the account input box 2021 and the password input box 2022, the WeChat account and a WeChat password that are associated with the stored face information template, and log in to the WeChat account.

If the collected face information does not match the stored face information template, the touchscreen displays a second prompt to notify the user that facial recognition fails.

Figure 20G:
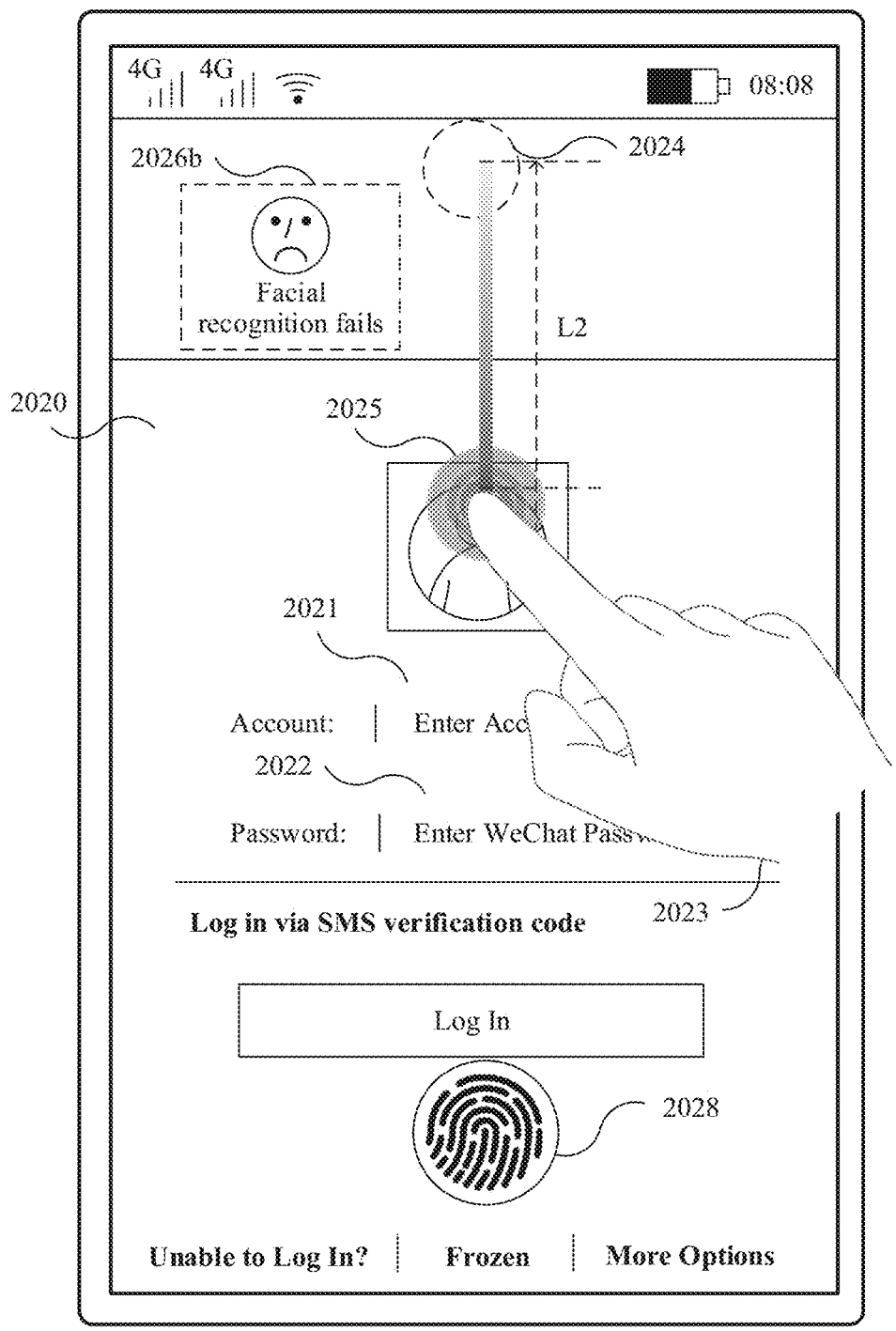

For example, as shown in FIG. 20g, in the process in which the electronic device receives the sliding operation 2023 of the user, when the electronic device determines that the sliding distance of the finger of the user (which may be the distance between the current location 2025 of the finger of the user and the start location 2024) is greater than the second distance threshold (L2), if the collected face information does not match the stored face information template, the touchscreen displays a second prompt 2026b.

When facial recognition fails, the electronic device may receive a touch operation of the user for the fingerprint recognition icon, and in response to this input operation for the fingerprint recognition icon, the electronic device may collect fingerprint information of the finger of the user. If the collected fingerprint information successfully matches a stored fingerprint information template, the electronic device may log in to a WeChat account associated with the fingerprint information template. In an implementation, the electronic device may store a plurality of groups of WeChat accounts and passwords, and each group of WeChat accounts and passwords may be associated with one group of fingerprint information templates. If a fingerprint information template that matches the collected fingerprint information exists in the electronic device, the electronic device may log in to a WeChat account associated with the matched fingerprint information template.

Figure 20H:
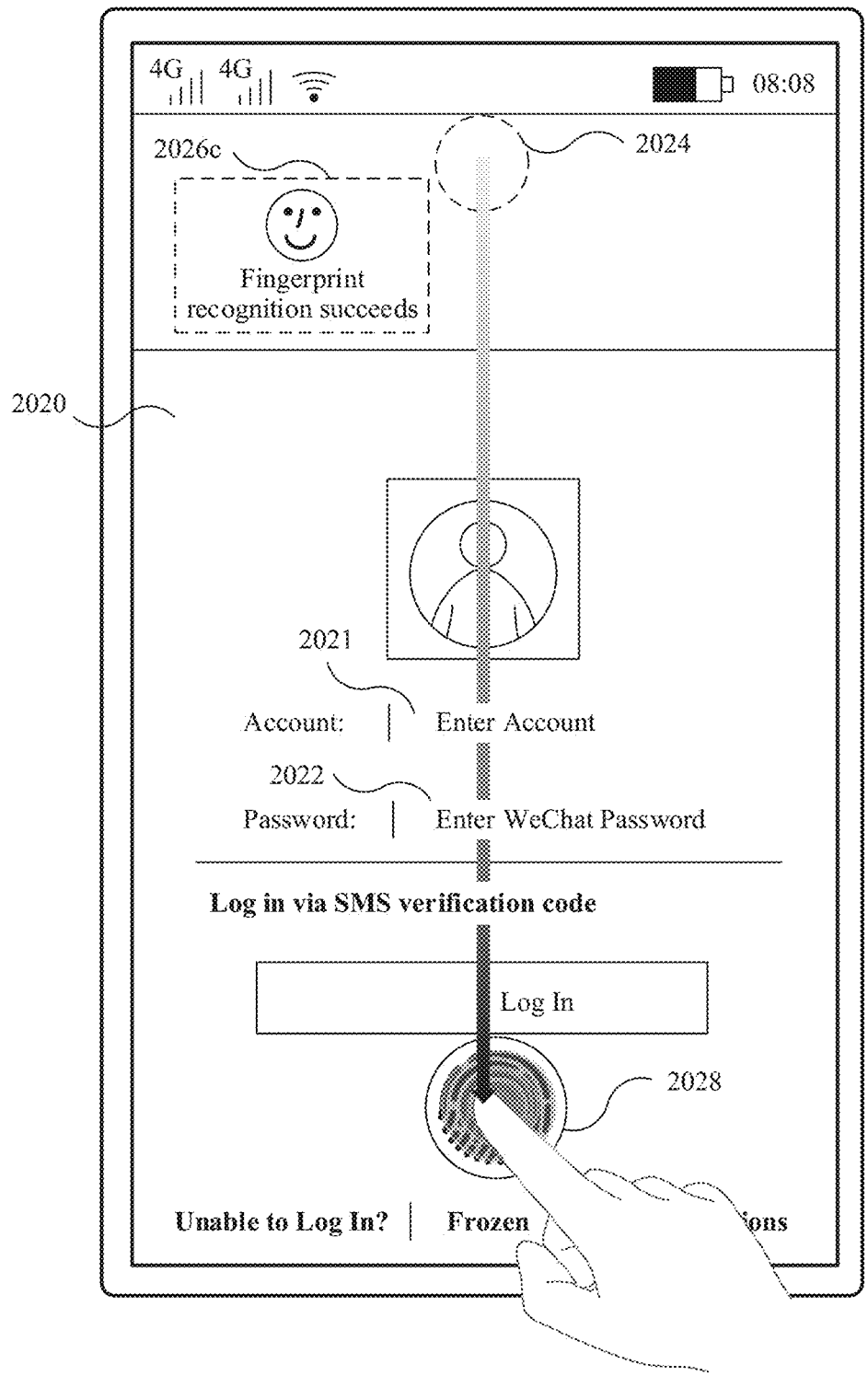

For example, as shown in FIG. 20h, after facial recognition fails, the finger of the user may continue to slide until the finger reaches a location of the fingerprint recognition icon 2028. When the finger slides onto the fingerprint recognition icon 2028, the electronic device receives a touch operation of the user for the fingerprint recognition icon 2028. In response to the touch operation for the fingerprint recognition icon 2028, the electronic device may collect the fingerprint information of the finger of the user by using a fingerprint recognition module, and perform matching with the stored fingerprint information template. If the collected fingerprint information of the finger of the user successfully matches the stored fingerprint information template, the electronic device may separately fill, in the account input box 2021 and the password input box 2022, a WeChat account and a WeChat password that are associated with the stored face information template, to log in to the WeChat account. For an interface for logging in to the WeChat account, refer to the embodiment shown in FIG. 20f.

Application scenario 4: An embodiment of this application provides a biometric authentication interaction method, to quickly identify an identity of a user, and to quickly complete mobile payment after identity identification succeeds.

Figure 21A:
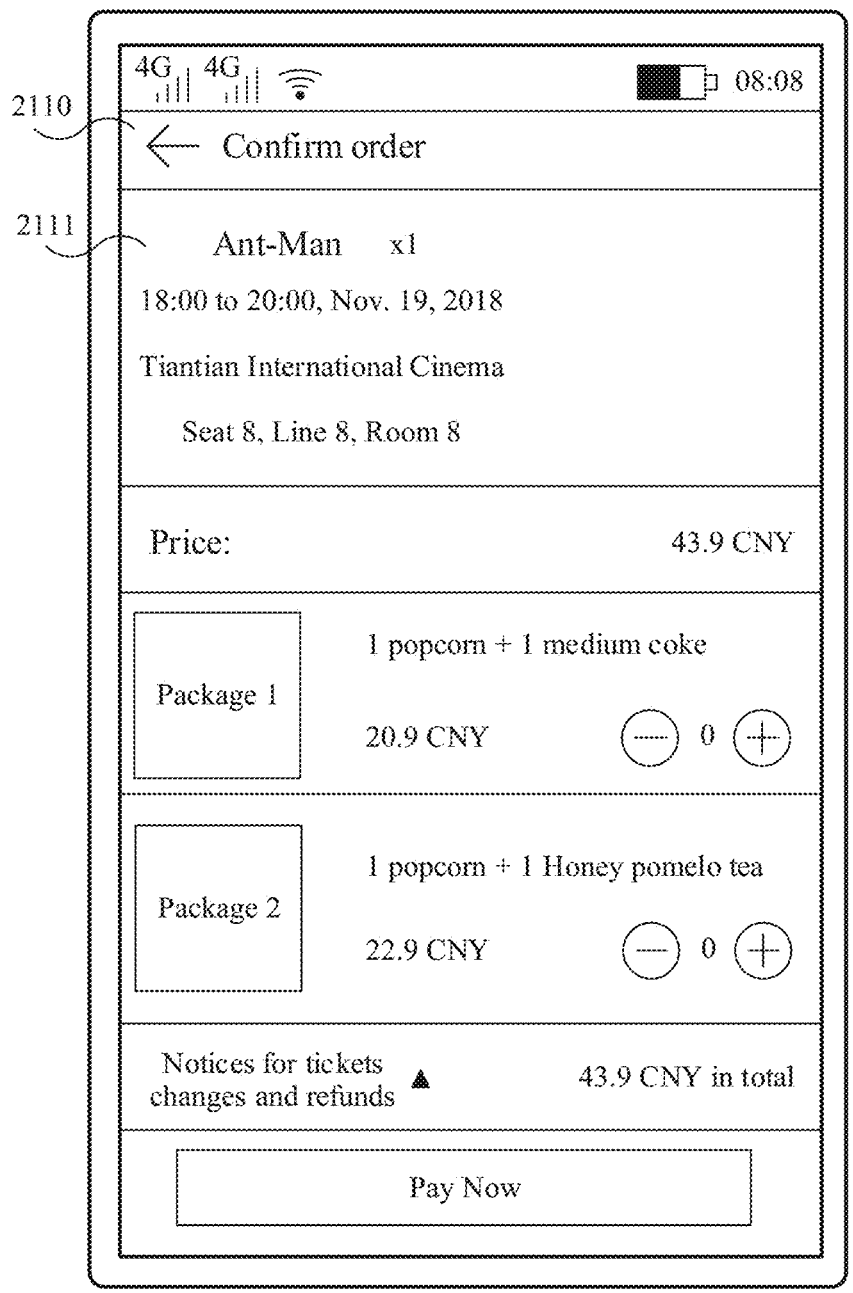
FIG. 21a to FIG. 21g are schematic diagrams of another group of interfaces according to an embodiment of this application.

For example, as shown in FIG. 21a, an order confirmation interface 2110 is displayed on a touchscreen of an electronic device. The order confirmation interface 2110 may include an order display interface 2111. The order display interface 2111 displays related information of an order (for example, content such as a movie name, a cinema address, and a movie ticket price). The order confirmation interface 2110 may be an order confirmation interface in an Amazon application, a Taobao application, a Jingdong application, a WeChat application, or an Alipay application. This is not limited herein.

Figure 21B:
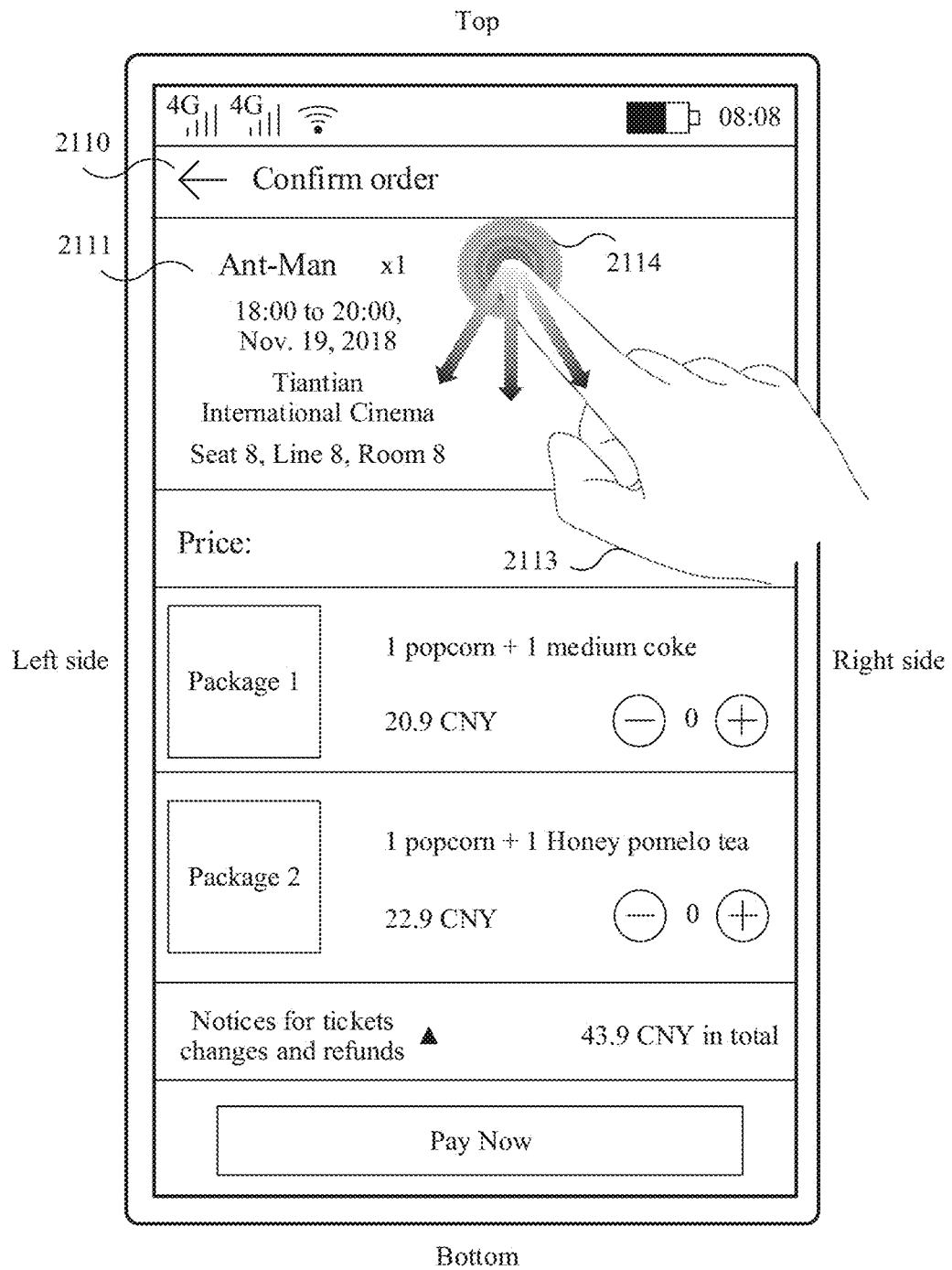

As shown in FIG. 21b, the electronic device may receive a sliding operation 2113 of the user in the order display interface 2111. A start point of the sliding operation 2113 may be a top area of the order display interface 2111. For example, a sliding start location of the sliding operation 2113 may be a location 2114 shown in FIG. 21b. A trend of the sliding operation 2113 may be from the top of the touchscreen to the bottom, and the sliding operation is not required to be roughly parallel to left and right sides of the touchscreen. For example, the sliding operation is, as shown in FIG. 21b, sliding from the top of the touchscreen to the bottom in a direction toward the left side, or sliding from the top of the touchscreen to the bottom in a direction toward the right side. In addition to the foregoing examples of the sliding operation, the sliding operation 2113 may be a single-finger sliding operation, or may be a two-finger sliding operation.

The electronic device may determine whether a sliding distance of the sliding operation is greater than a first distance threshold, and if yes, the electronic device may collect face information by using a facial recognition module, and display a fingerprint recognition icon on the touchscreen. The sliding distance of the sliding operation may be a displacement from the start location to a current location of a finger of the user after the finger touches the touchscreen. In an optional implementation, the sliding distance of the sliding operation may be alternatively a displacement, in a specific direction, from the start location to the current location of the finger of the user after the finger touches the touchscreen (for example, a displacement on the touchscreen in a top-down direction).

Figure 21C:
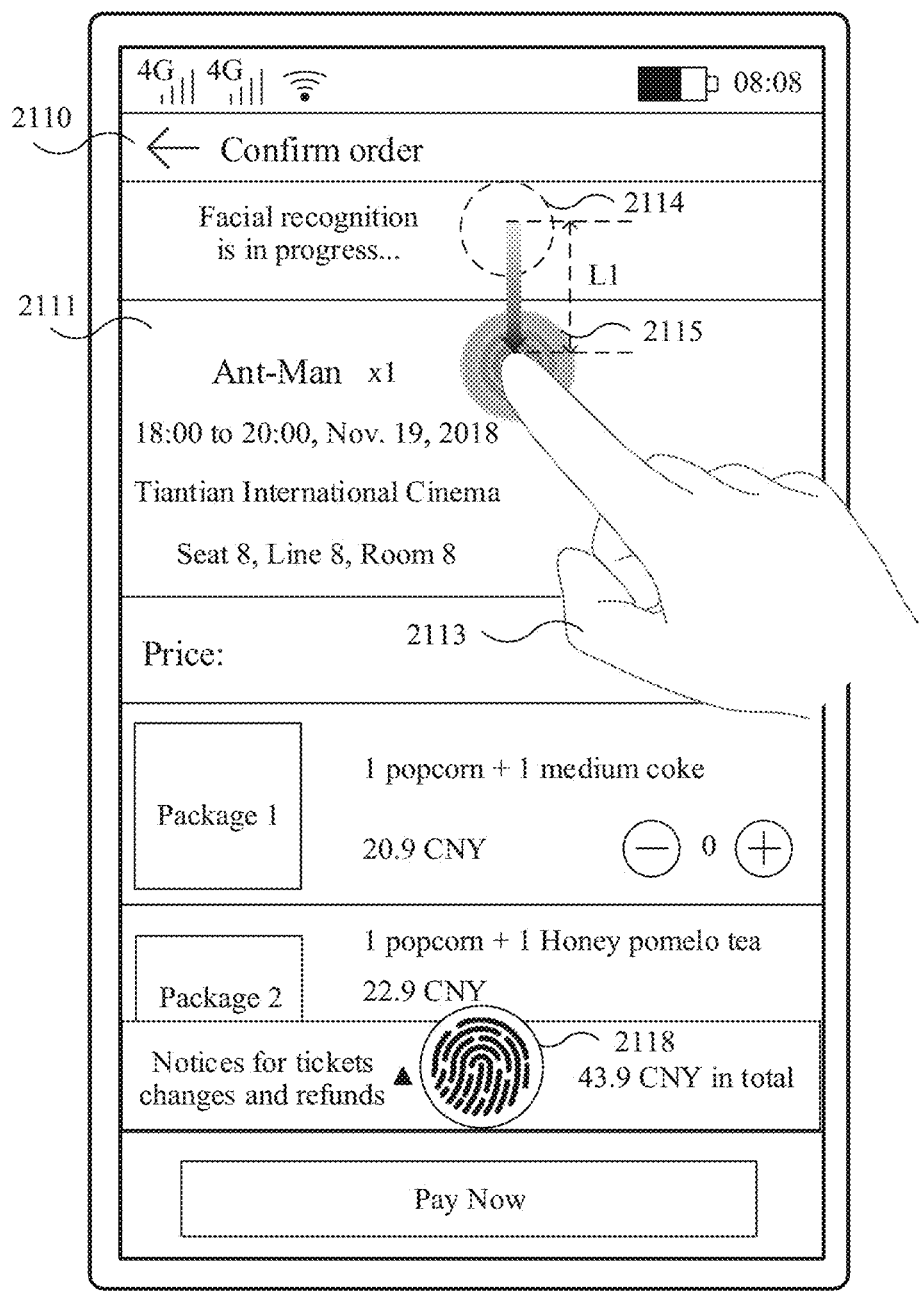

For example, as shown in FIG. 21c, in a process in which the electronic device receives the sliding operation 2113 of the user, when the electronic device determines that a sliding distance of the finger of the user (which may be a distance between a current location 2114 of the finger of the user and the start location 2115) is greater than the first distance threshold (L1), the electronic device may collect the face information by using the facial recognition module, and display a fingerprint recognition icon 2118 on the touchscreen. After collecting the face information, the electronic device may match the collected face information with a stored face information template. The face information template may be entered by the user before the face information is collected.

After collecting the face information of the user, the electronic device may determine whether the face information matches the stored face information template. If yes, the electronic device may output a first prompt by using the touchscreen, to notify the user that facial recognition succeeds, and complete order payment.

Figure 21D:
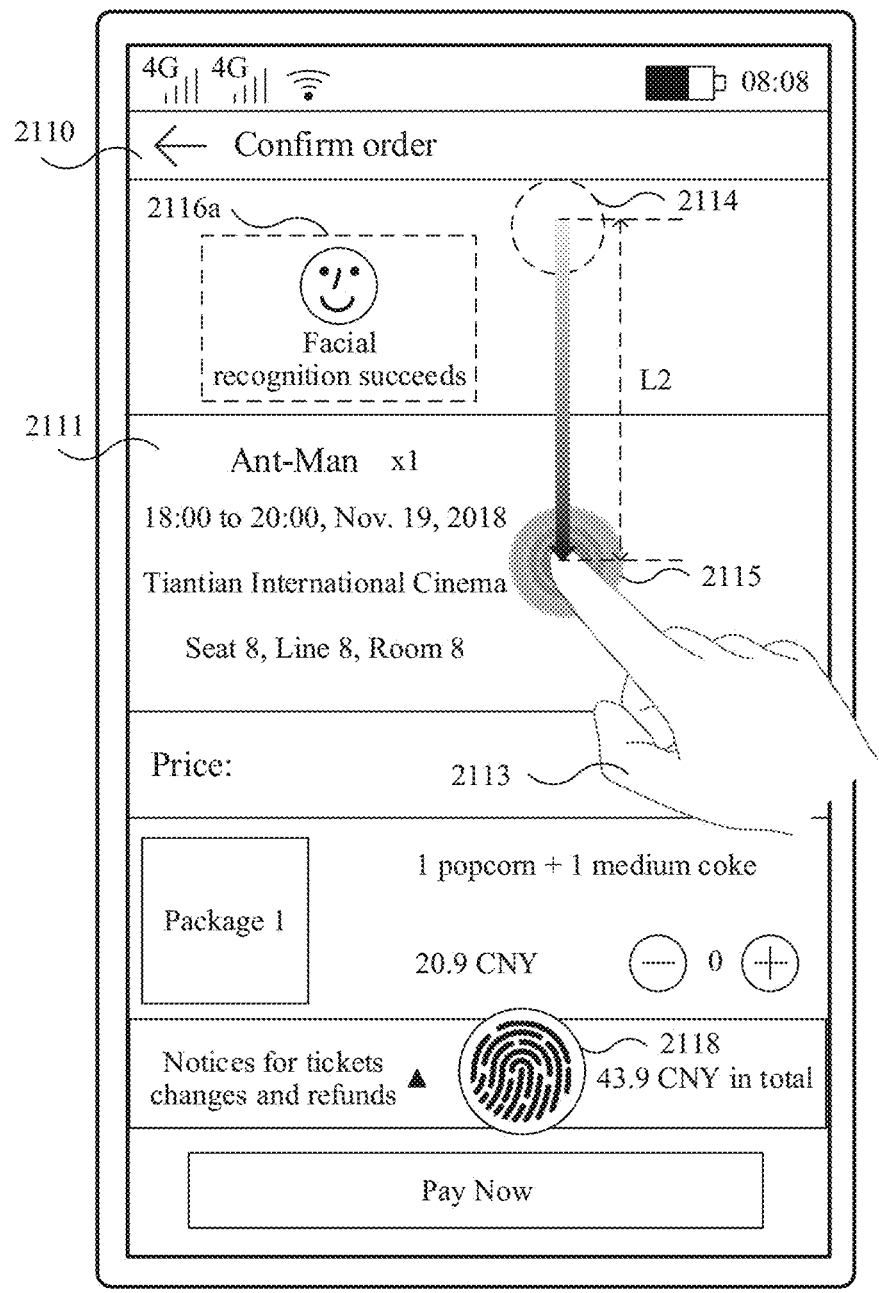

As shown in FIG. 21d, in the process in which the electronic device receives the sliding operation 2113 of the user, when the electronic device determines that the sliding distance of the finger of the user (which may be the distance between the current location 2115 of the finger of the user and the start location 2114) is greater than a second distance threshold (L2), if the collected face information successfully matches the stored face information template, the touchscreen displays a first prompt 2116a, and the electronic device performs an operation related to order payment. After the payment is completed, the electronic device may display a payment complete interface 2120 shown in FIG. 21g.

In this embodiment of this application, after facial recognition succeeds or fingerprint recognition succeeds, the electronic device may send a payment request to a server of a payment application by using the payment application (for example, WeChat or Alipay). After receiving the payment request, the server of the payment application may transfer an order amount in a payment application account (or a bank card account) of the user to a payment application account (or a bank card account) of a vendor of the order, and feed back a payment complete message to the electronic device. After receiving the payment complete message fed back by the server, the electronic device may display the payment complete interface 2120 shown in FIG. 21g.

Before the electronic device collects the face information or the fingerprint information of the user, the electronic device may receive an input operation of the user in the payment application. In response to the input operation, the electronic device may bind a payment function of the payment application to a face information template and/or a fingerprint information template entered by the user.

After collecting the face information of the user, the electronic device may determine whether the face information matches the stored face information template. If no, the electronic device may output a second prompt by using the touchscreen, to notify the user that facial recognition fails.

Figure 21E:
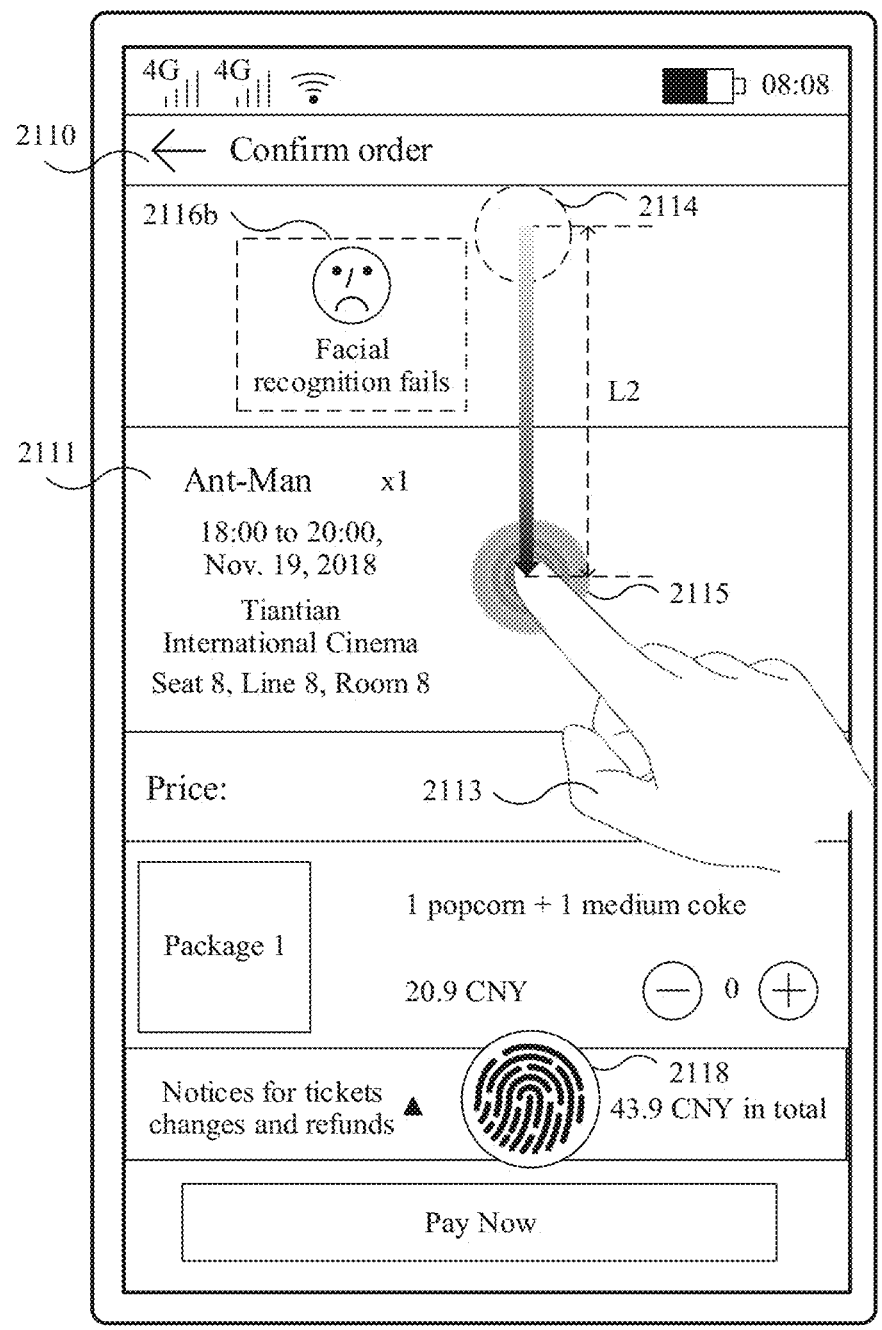

For example, as shown in FIG. 21e, in the process in which the electronic device receives the sliding operation 2113 of the user, when the electronic device determines that the sliding distance of the finger of the user (which may be the distance between the current location 2115 of the finger of the user and the start location 2114) is greater than the second distance threshold (L2), if the collected face information does not match the stored face information template, the touchscreen may display a second prompt 2116b.

When facial recognition fails, the electronic device may receive a touch operation of the user for the fingerprint recognition icon, and in response to this input operation for the fingerprint recognition icon, the electronic device may collect the fingerprint information of the finger of the user. If the collected fingerprint information successfully matches a stored fingerprint template, the electronic device may complete payment of the order.

Figure 21F:
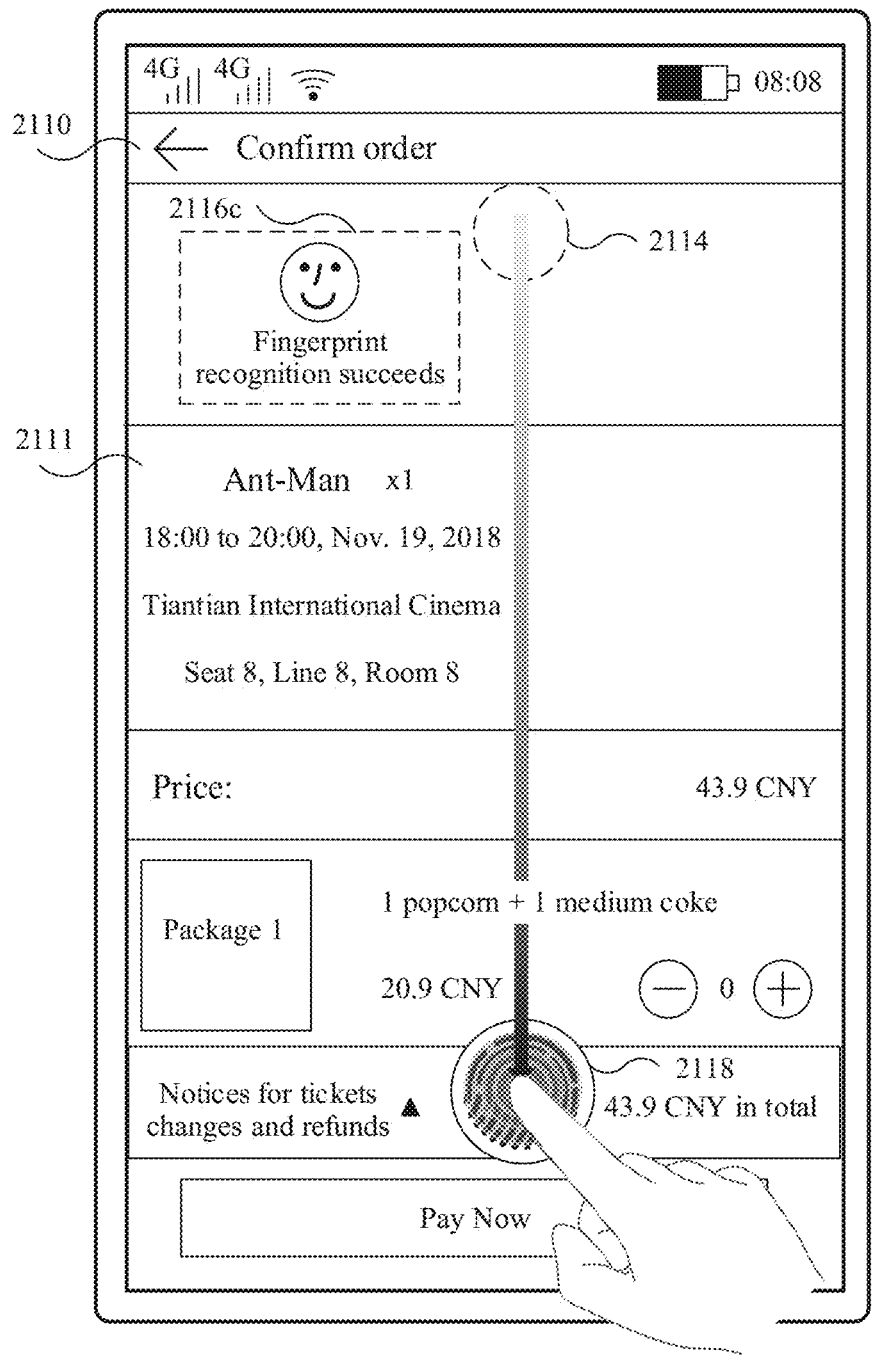
Figure 21G:
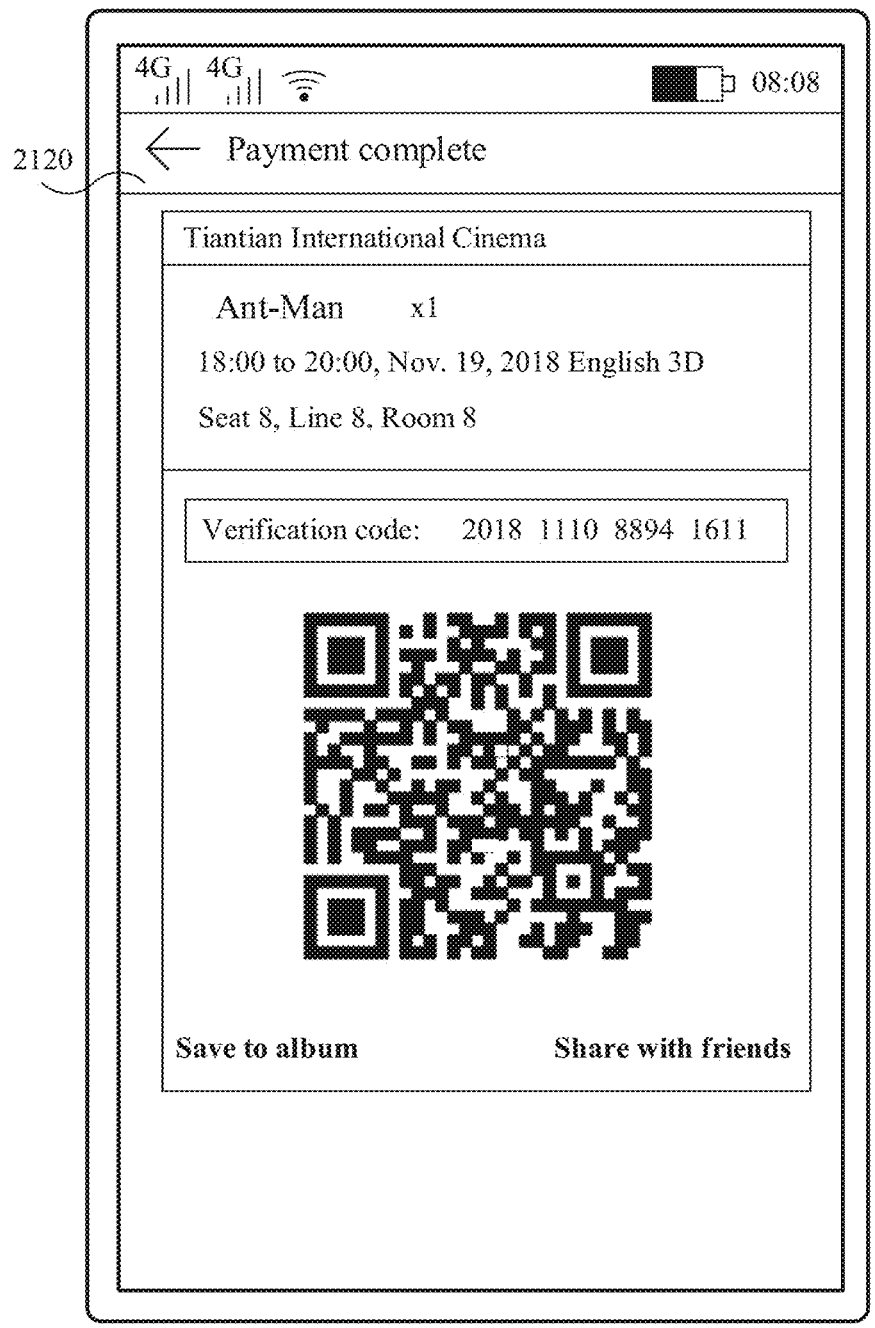

For example, as shown in FIG. 21f, after facial recognition fails, the finger of the user may continue to slide until the finger reaches a location of the fingerprint recognition icon 2118. When the finger slides onto the fingerprint recognition icon 2118, the electronic device receives a touch operation of the user for the fingerprint recognition icon 2118. In response to the touch operation for the fingerprint recognition icon 2118, the electronic device may collect the fingerprint information of the finger of the user by using a fingerprint recognition module, and perform matching with the stored fingerprint template. If the collected fingerprint information of the finger of the user matches the stored fingerprint information template (in other words, fingerprint recognition succeeds), the electronic device may complete payment of the order. After the payment is completed, the electronic device may display the payment complete interface 2120 shown in FIG. 21g.

In an implementation, when the sliding distance of the sliding operation of the user is greater than the first distance threshold (L1), the user may lift the finger (in other words, the finger leaves the touchscreen). The electronic device may collect the face information of the user by using the facial recognition module, and display the fingerprint recognition icon on the touchscreen. After collecting the face information of the user, the electronic device may match the face information with the stored face information template. If facial recognition succeeds, the electronic device may complete payment of the order. If facial recognition fails, the electronic device may receive a touch operation of the user for the fingerprint recognition icon, and in response to the touch operation for the fingerprint recognition icon, the electronic device may collect the fingerprint information of the finger of the user, and perform matching with the stored fingerprint information template. If the collected fingerprint information successfully matches the stored fingerprint information template, the electronic device may complete payment of the order.

In an implementation, the electronic device may receive the sliding operation of the user in the order display interface, and trigger only an identity identification manner of facial recognition to identify an identity of the user, to quickly complete payment of the order after facial recognition succeeds. For specific content, refer to content of triggering facial recognition by the sliding operation 2113 in FIG. 21a to FIG. 21d.

In an implementation, the electronic device may receive the sliding operation of the user in the order display interface, and trigger only an identity identification manner of fingerprint recognition to identify an identity of the user, to quickly complete payment of the order after fingerprint recognition succeeds. For specific content, refer to content of triggering fingerprint recognition by the sliding operation 2113 in FIG. 21a to FIG. 21c and FIG. 21e to FIG. 21f.

In this embodiment of this application, a sliding track of the sliding operation 2113 may be a straight line, or may be an arc line, or may be oblique downward slide, or may be irregular slide. This is not limited herein.

In an implementation, the electronic device may receive a sliding operation of the user in a payment interface, to trigger identity identification or authentication (for example, facial recognition or fingerprint recognition) of the user. After identity identification succeeds, payment can be completed, thereby simplifying payment operation steps of the user, and improving user experience.

Figure 22A:
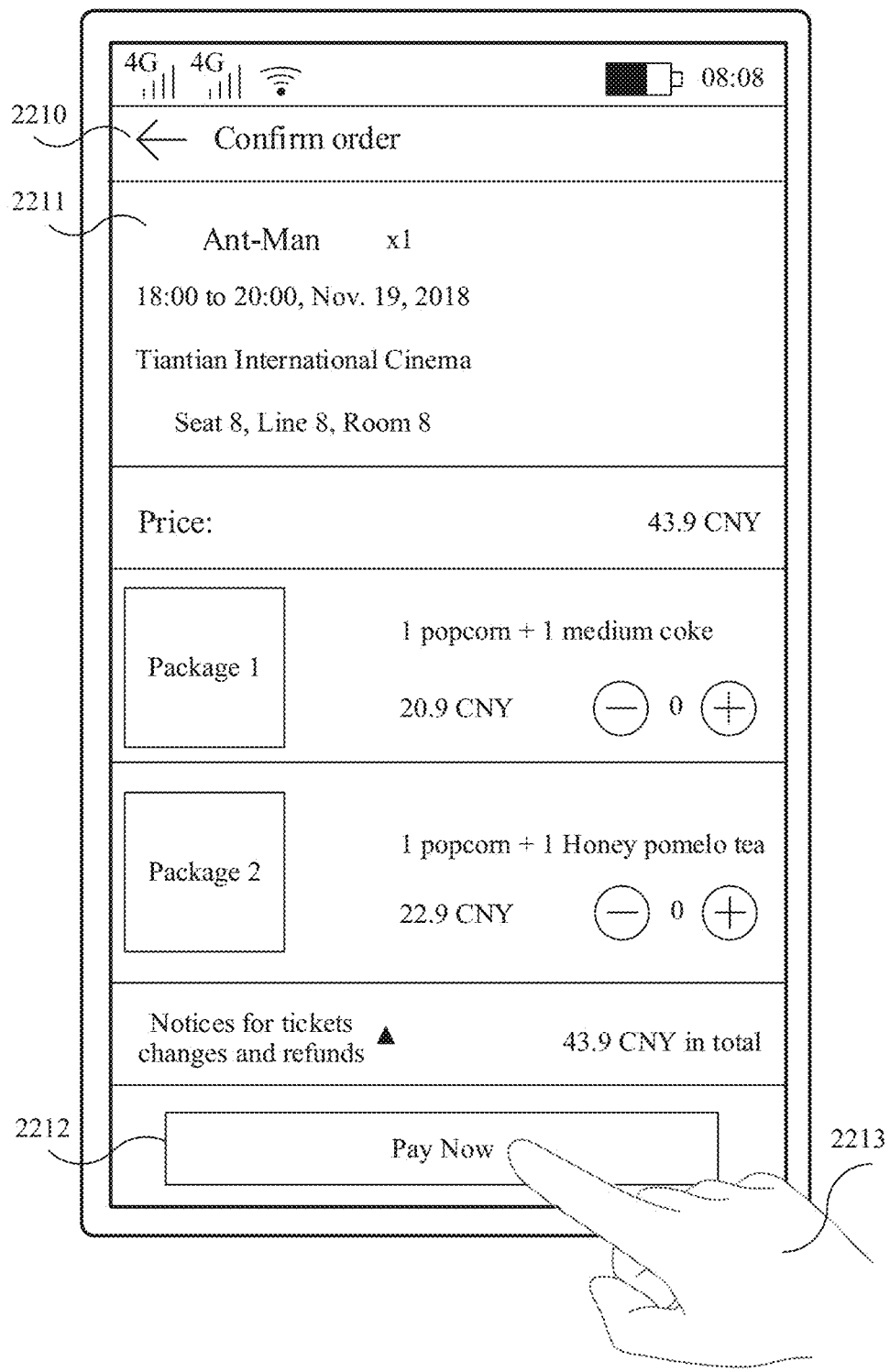
FIG. 22a and FIG. 22h are schematic diagrams of another group of interfaces according to an embodiment of this application.
Figure 22B:
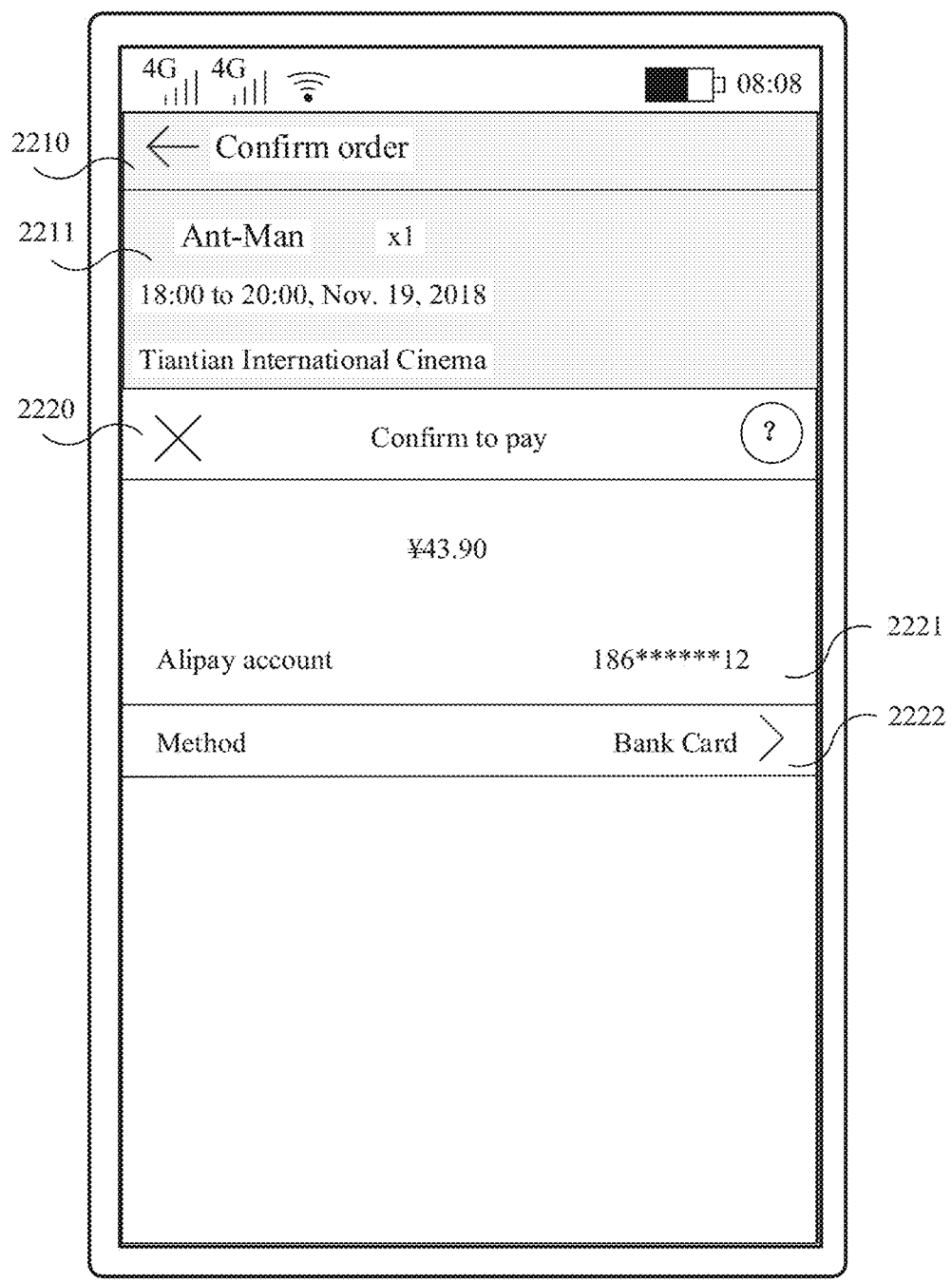

For example, as shown in FIG. 22a, an order confirmation interface 2210 is displayed on a touchscreen of an electronic device. The order confirmation interface 2210 may include an order display interface 2211 and a "Pay Now" control 2212. The order display interface 2211 displays related information of an order (for example, content such as a movie name, a cinema address, and a movie ticket price). The order confirmation interface 2210 may be an order confirmation interface in a Taobao application, a Jingdong application, a WeChat application, or an Alipay application. This is not limited herein. The electronic device may receive an input operation 2213 (for example, tapping) of the user for the "Pay Now" control 2212, and in response to the input operation 2213, the electronic device may display a payment interface 2220 shown in FIG. 22b. As shown in FIG. 22b, the payment interface 2220 may display a payment account 2221, a payment method 2222 (for example, a bank card), and a payment amount (for example, 43.9 CNY).

Figure 22C:
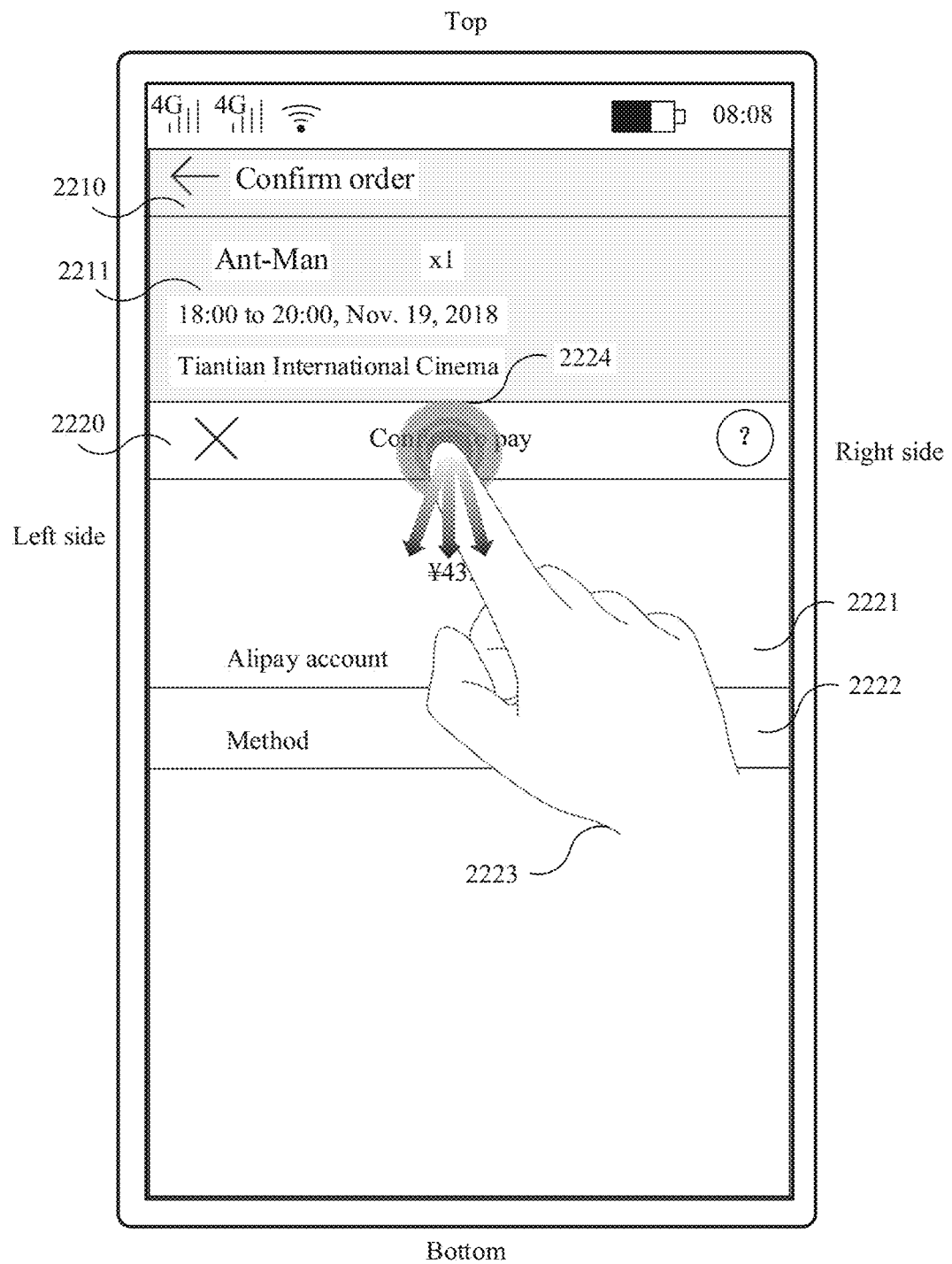

As shown in FIG. 22c, the electronic device may receive a sliding operation 2223 of the user in the payment interface 2220. A start point of the sliding operation 2223 may be a top area of the payment interface 2220. For example, a sliding start location of the sliding operation 2223 may be a location 2224 shown in FIG. 22c. A trend of the sliding operation 2223 may be from the top to the bottom of the payment interface 2220, and the sliding operation is not required to be roughly parallel to left and right sides of the touchscreen. For example, the sliding operation is, as shown in FIG. 22c, sliding from the top of the payment interface 2220 to the bottom in a direction toward the left side, or sliding from the top of the payment interface 2220 to the bottom in a direction toward the right side. In addition to the foregoing examples of the sliding operation, the sliding operation 2223 may be a single-finger sliding operation, or may be a two-finger sliding operation.

Figure 22D:
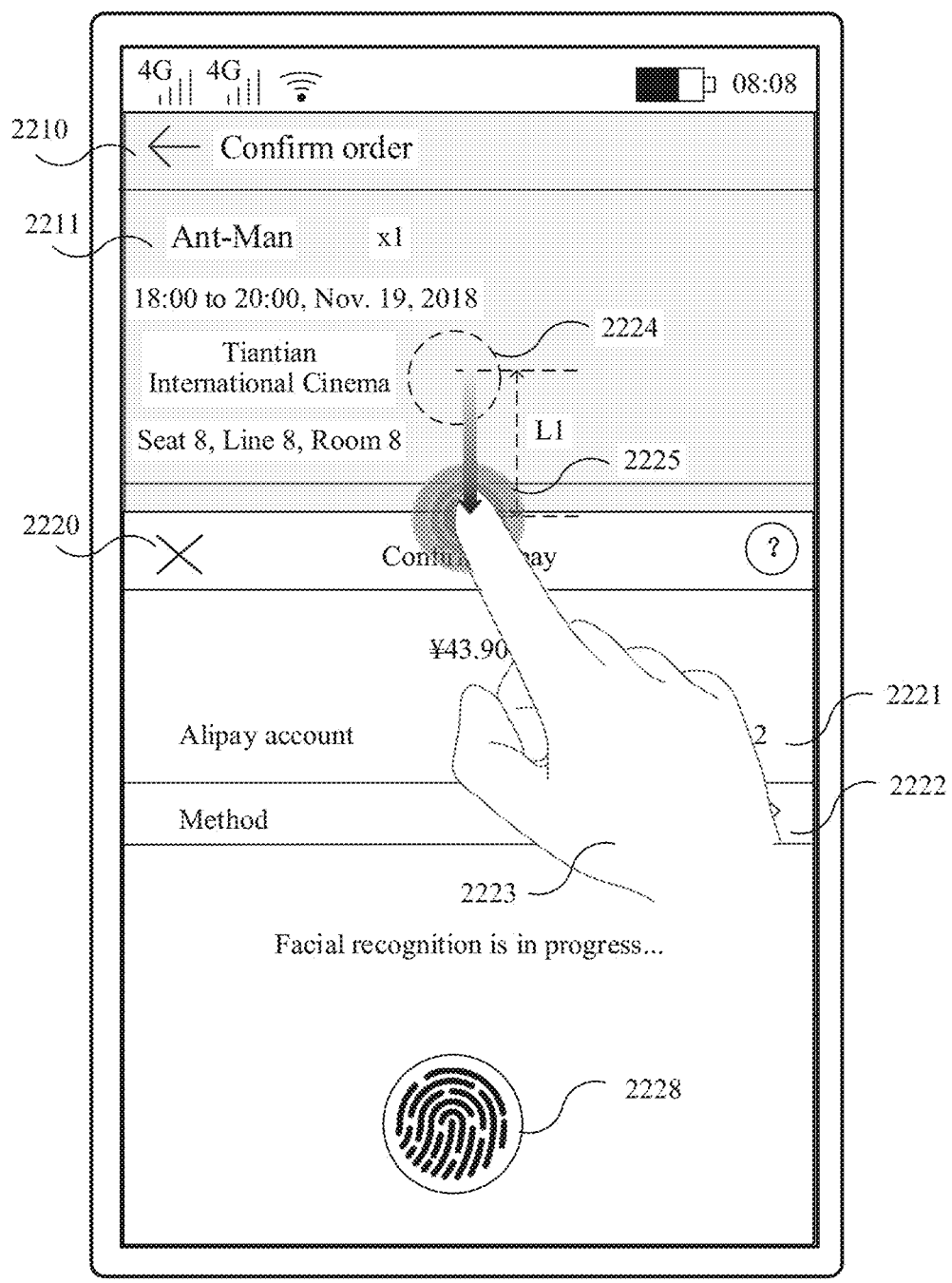

As shown in FIG. 22d, in a process in which the electronic device receives the sliding operation 2223 of the user, when the electronic device determines that a sliding distance of a finger of the user (which may be a distance between a current location 2224 of the finger of the user and the start location 2225) is greater than a first distance threshold (L1), the electronic device may collect face information by using a facial recognition module, and display a fingerprint recognition icon 2228 on the touchscreen. After the electronic device collects the face information by using a camera lens, the electronic device may match the collected face information with a stored face information template.

After collecting the face information of the user, the electronic device may determine whether the face information matches the stored face information template. If yes, the electronic device outputs a first prompt by using the touchscreen, to notify the user that facial recognition succeeds, and completes payment. For a payment process of the electronic device, refer to a text description part of the embodiment shown in FIG. 21d. Details are not described herein again.

Figure 22E:
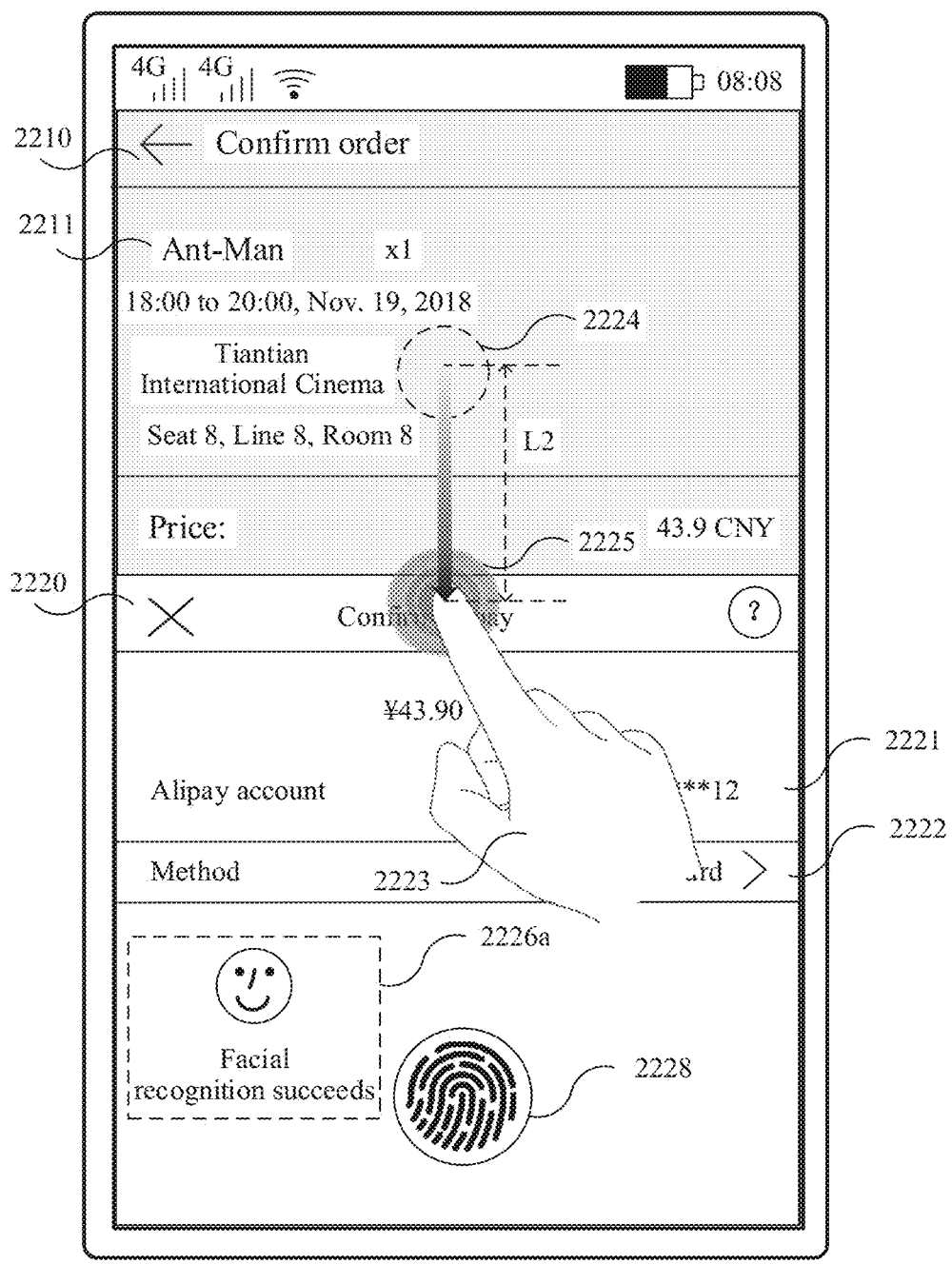

As shown in FIG. 22e, in the process in which the electronic device receives the sliding operation 2223 of the user, when the electronic device determines that the sliding distance of the finger of the user (which may be the distance between the current location 2225 of the finger of the user and the start location 2224) is greater than a second distance threshold (L2), if the collected face information successfully matches the stored face information template, the touchscreen may display a first prompt 2226a, and complete payment of the order. After the payment is completed, the electronic device may display a payment complete interface 2230 shown in FIG. 22h.

After collecting the face information of the user, the electronic device may determine whether the face information matches the stored face information template. If no, the electronic device may output a second prompt by using the touchscreen, to notify the user that facial recognition fails.

Figure 22F:
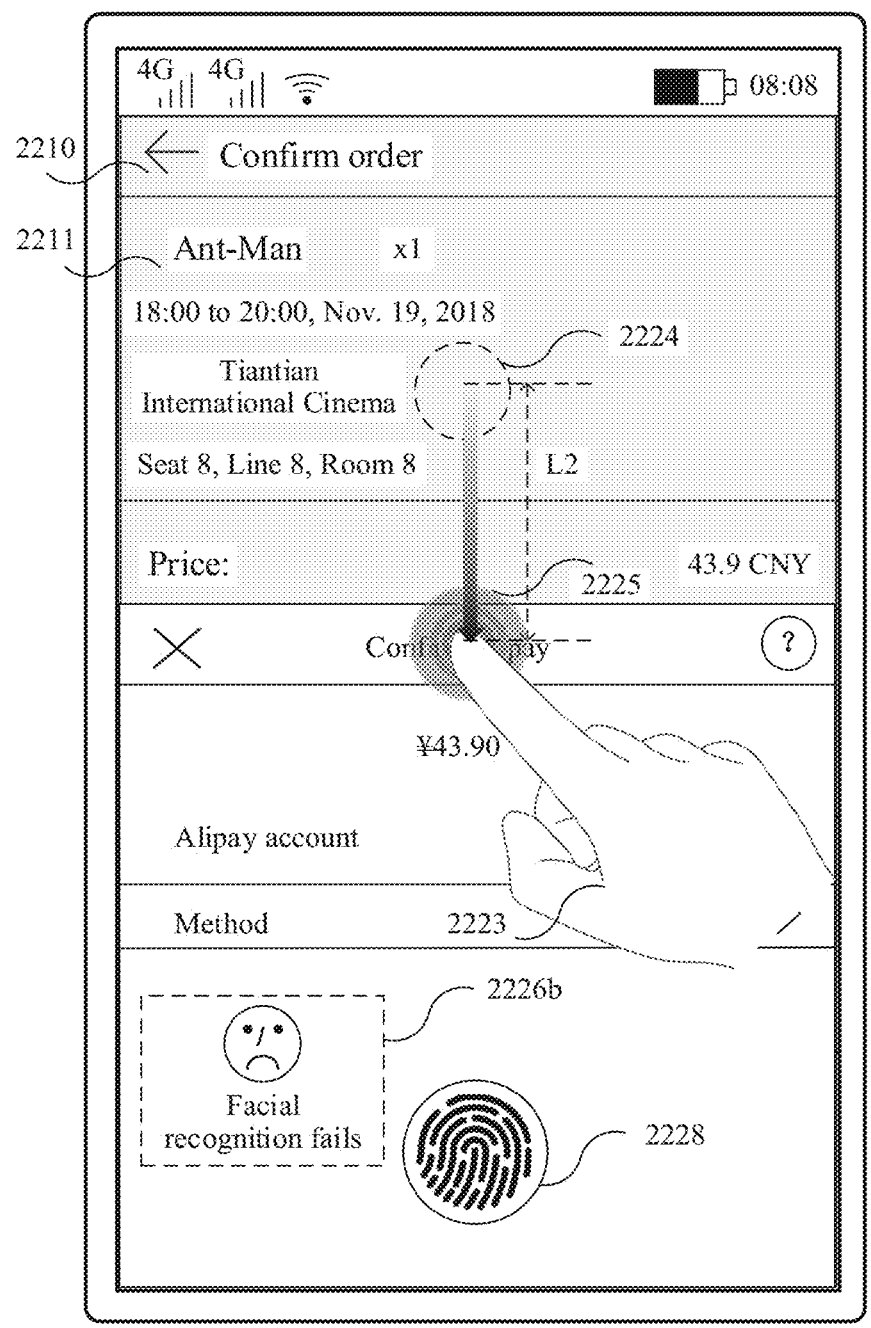

For example, as shown in FIG. 22f, in the process in which the electronic device receives the sliding operation 2223 of the user, when the electronic device determines that the sliding distance of the finger of the user (which may be the distance between the current location 2225 of the finger of the user and the start location 2224) is greater than the second distance threshold (L2), if the collected face information does not match the stored face information template, the touchscreen displays a second prompt 2226b.

When facial recognition fails, the electronic device may receive a touch operation of the user for the fingerprint recognition icon, and in response to this input operation for the fingerprint recognition icon, the electronic device may collect a fingerprint of the user. If the collected fingerprint information successfully matches a stored fingerprint information template, the electronic device completes payment.

Figure 22G:
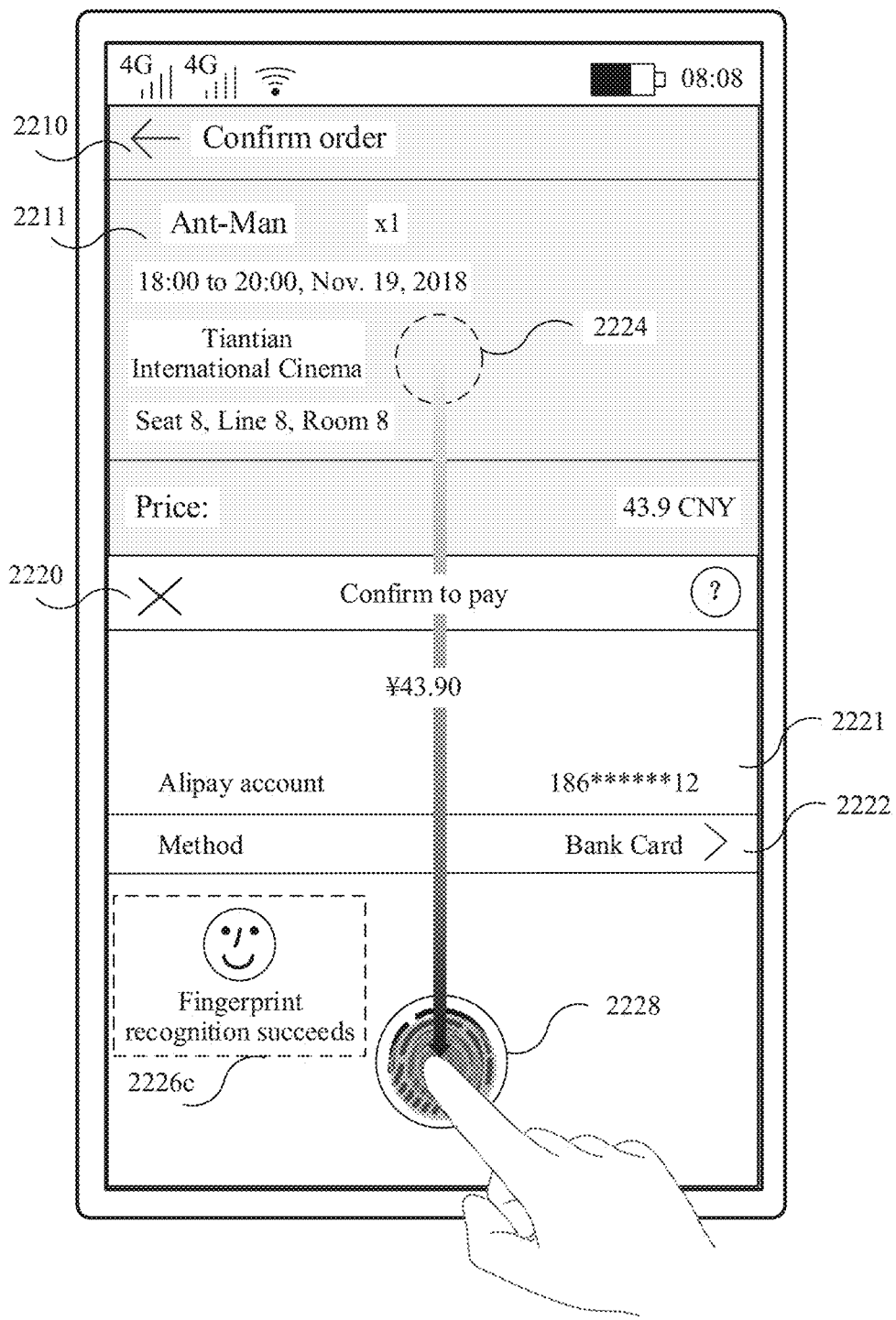
Figure 22H:
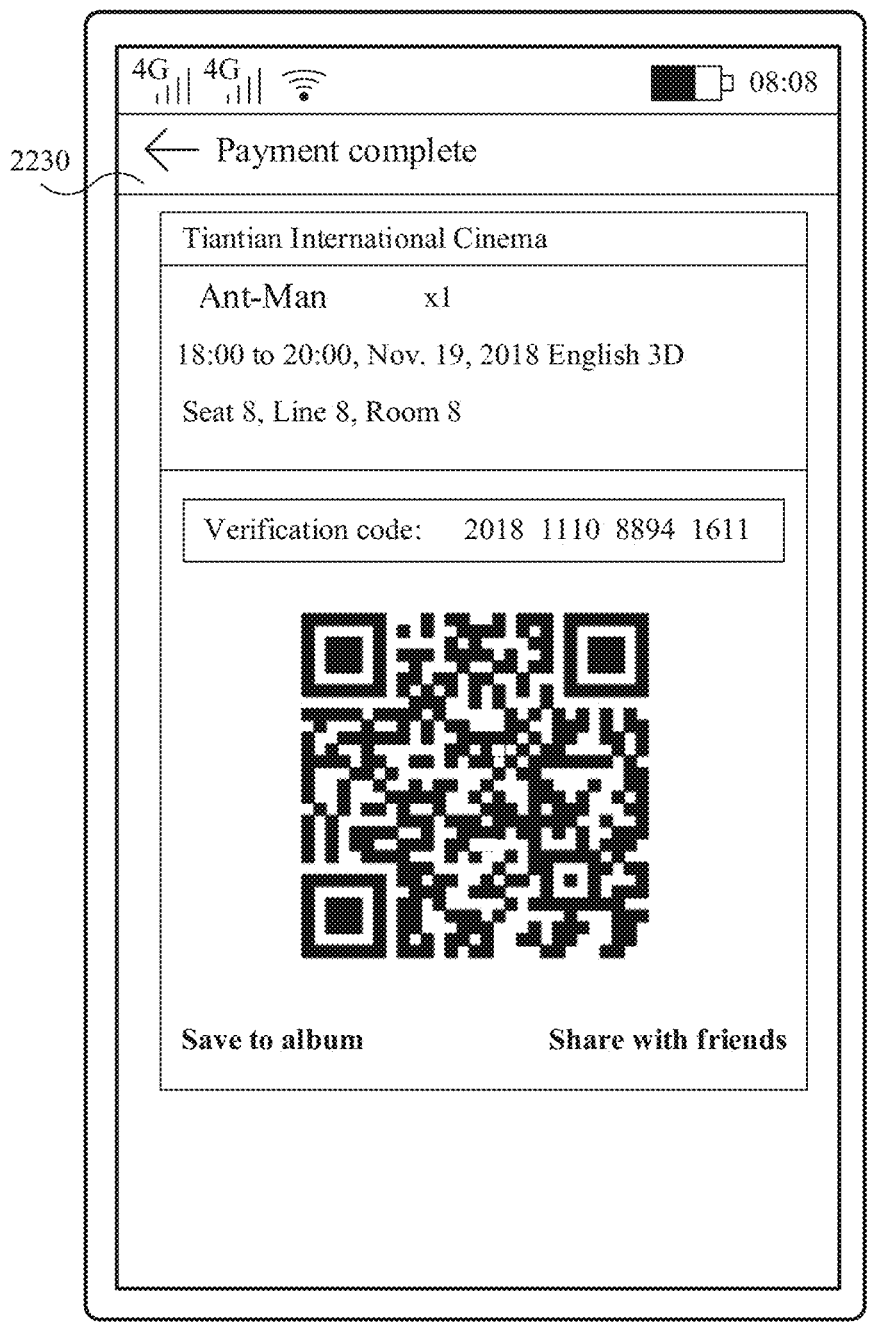

For example, as shown in FIG. 22g, after facial recognition fails, the finger of the user may continue to slide until the finger reaches a location of the fingerprint recognition icon 2228. When the finger slides onto the fingerprint recognition icon 2228, the electronic device receives a touch operation of the user for the fingerprint recognition icon 2228. In response to the touch operation for the fingerprint recognition icon 2228, the electronic device may collect the fingerprint information of the finger of the user by using a fingerprint recognition module, and perform matching with the stored fingerprint information template. If the collected fingerprint information of the finger of the user matches the stored fingerprint information template (in other words, fingerprint recognition succeeds), the electronic device may complete payment of the order. After the payment is completed, the electronic device may display the payment complete interface 2230 shown in FIG. 22h.

In an implementation, when the sliding distance of the sliding operation of the user is greater than the first distance threshold (L1), the user may lift the finger (in other words, the finger leaves the touchscreen). The electronic device may collect the face information of the user by using the facial recognition module, and display the fingerprint recognition icon on the touchscreen. After collecting the face information of the user, the electronic device may match the face information with stored face information. If facial recognition succeeds, the electronic device may complete payment. If facial recognition fails, the electronic device may receive a touch operation of the user for the fingerprint recognition icon, and in response to the touch operation for the fingerprint recognition icon, the electronic device may collect the fingerprint information of the finger of the user, and perform matching with the stored fingerprint information template. If fingerprint matching succeeds, the electronic device may complete payment of the order.

In an implementation, the electronic device may receive the sliding operation of the user in the payment interface, and trigger only an identity identification manner of facial recognition to identify the user, to quickly complete payment after facial recognition succeeds. For specific content, refer to content of triggering facial recognition by the sliding operation 2223 in FIG. 22a to FIG. 22e.

In an implementation, the electronic device may receive the sliding operation of the user in the payment interface, and trigger only an identity identification manner of fingerprint recognition to identify an identity of the user, to quickly complete payment after fingerprint recognition succeeds. For specific content, refer to content of triggering fingerprint recognition by the sliding operation 2223 in FIG. 22a to FIG. 22d and FIG. 22g.

In an implementation, the electronic device may receive a sliding operation of the user on a home page of a mobile payment application (for example, a WeChat application or an Alipay application), to trigger identity authentication (for example, facial recognition or fingerprint recognition). After the identity authentication succeeds, the electronic device may quickly open a payment code (for example, a payment barcode or a payment QR code) for the user to pay to a vendor.

Figure 23A:
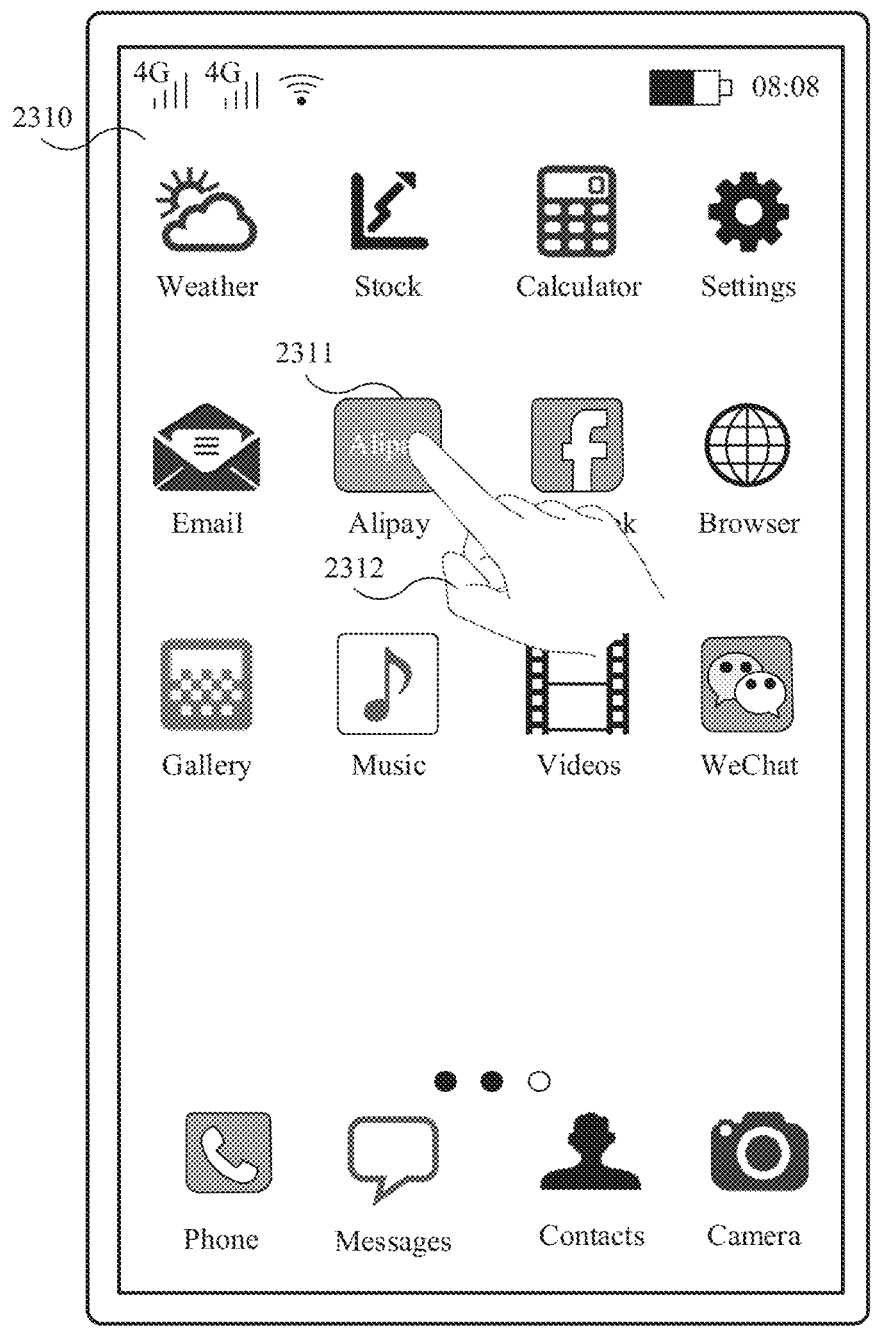
FIG. 23a and FIG. 23h are schematic diagrams of another group of interfaces according to an embodiment of this application.
Figure 23B:
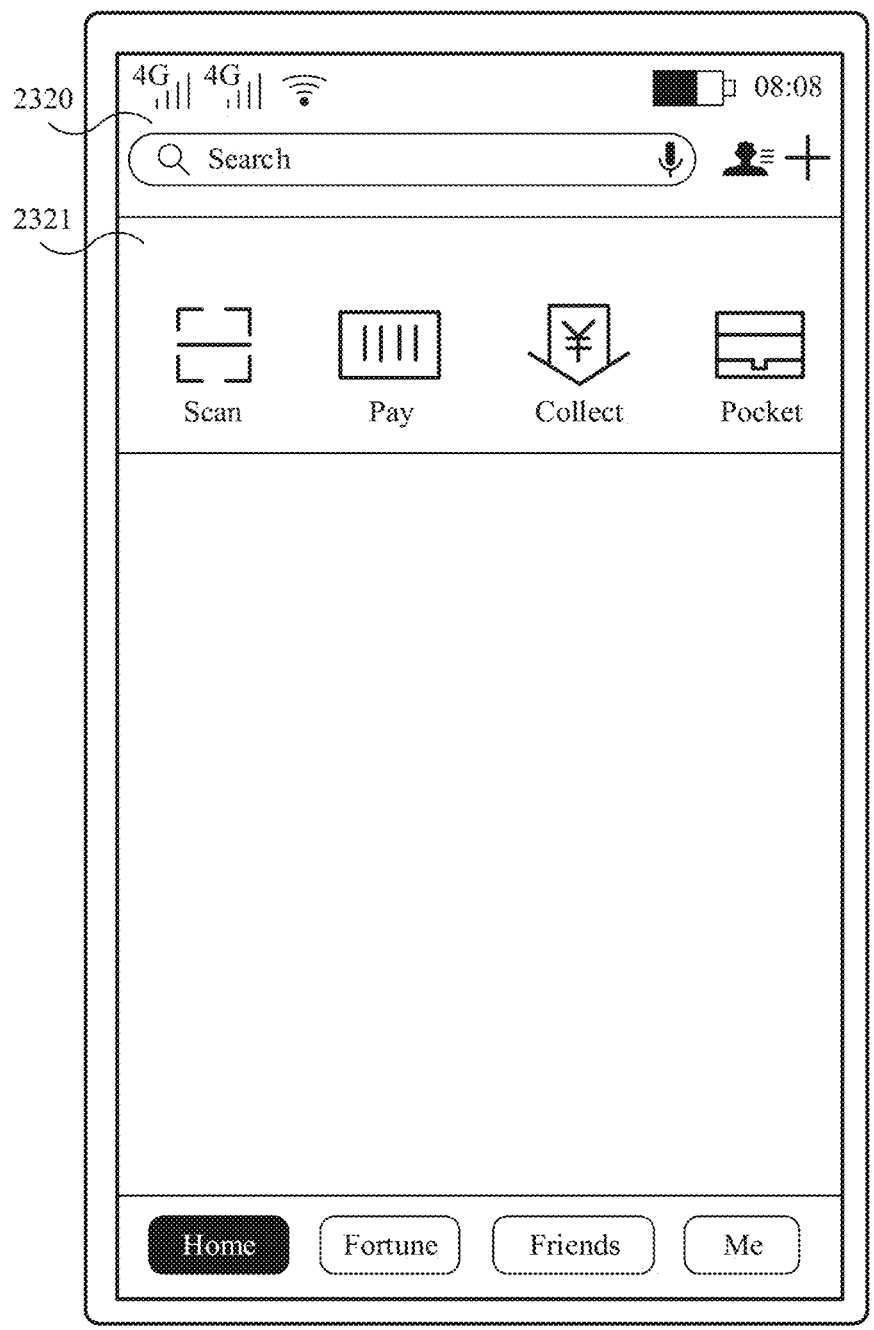

For example, as shown in FIG. 23a, the electronic device displays a rightmost page 2310 of a home screen. The rightmost page includes an Alipay application icon 2311. For a part that is not described in FIG. 23a, refer to a text description part of the embodiment shown in FIG. 5a. Details are not described herein again. The electronic device may receive an input operation 2312 (for example, tapping) of the user for the Alipay application icon 2311, and in response to the input operation 2312, the electronic device may display, on a touchscreen, an Alipay home page 2320 shown in FIG. 23b. As shown in FIG. 23b, the Alipay home page 2320 may include a function display interface 2321. The function display interface 2321 may display a "Scan" function, a "Pay" function, a "Collect" function, "Pocket", and the like.

Figure 23C:
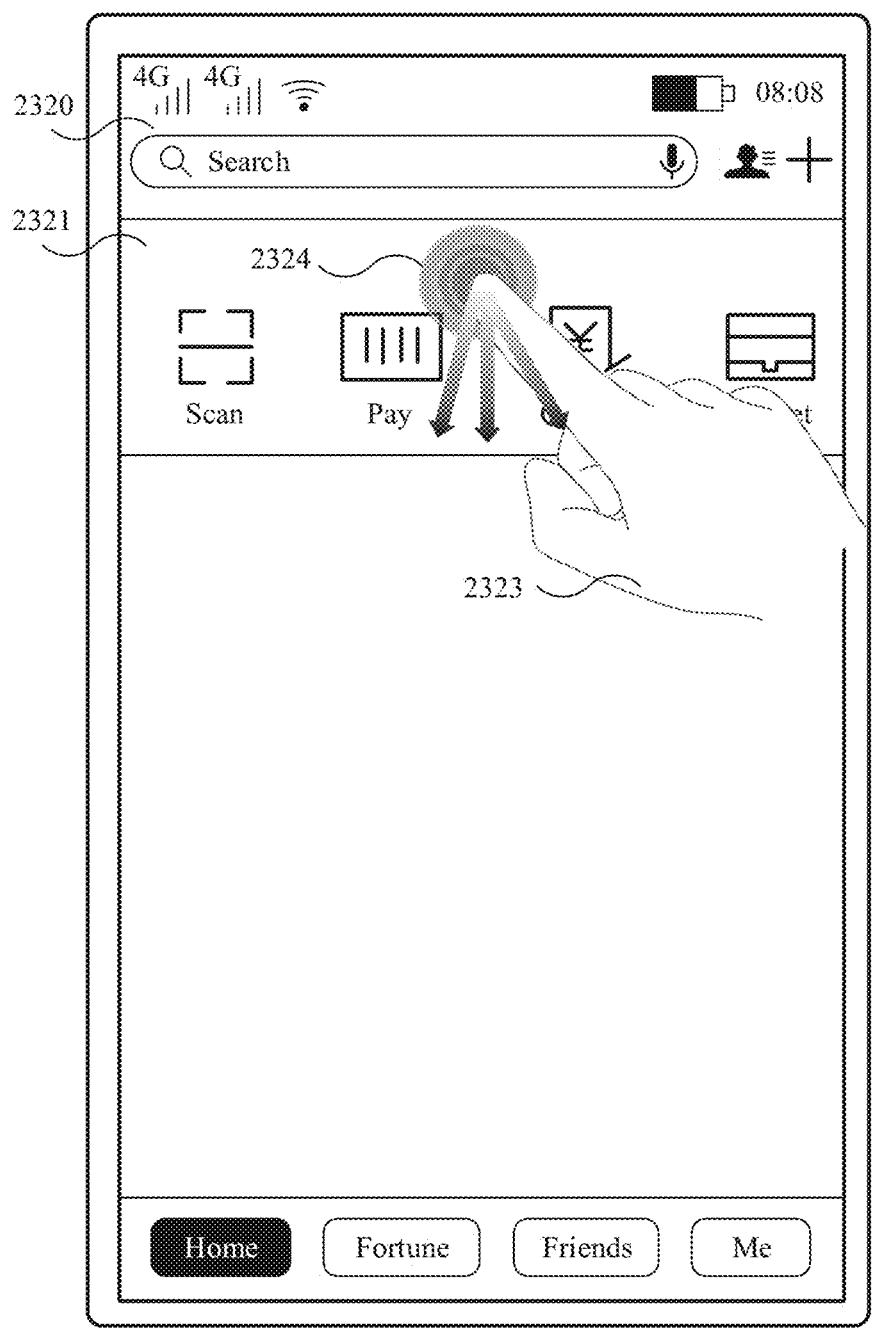

As shown in FIG. 23c, the electronic device receives a sliding operation 2323 of the user in the function display interface 2321. A start point of the sliding operation 2323 may be the top of the function display interface 2321. For example, a start location of the sliding input operation 2323 may be a location 2324 shown in FIG. 23c. A trend of the sliding operation 2323 may be from the top of the touchscreen to the bottom, and the sliding operation 2323 is not required to be roughly parallel to left and right sides of the touchscreen. For example, the sliding operation is, as shown in FIG. 23c, sliding from the top of the touchscreen to the bottom in a direction toward the left side, or sliding from the top of the touchscreen to the bottom in a direction toward the right side. In addition to the foregoing examples of the sliding operation, the sliding operation 2323 may be a single-finger sliding operation, or may be a two-finger sliding operation.

Figure 23D:
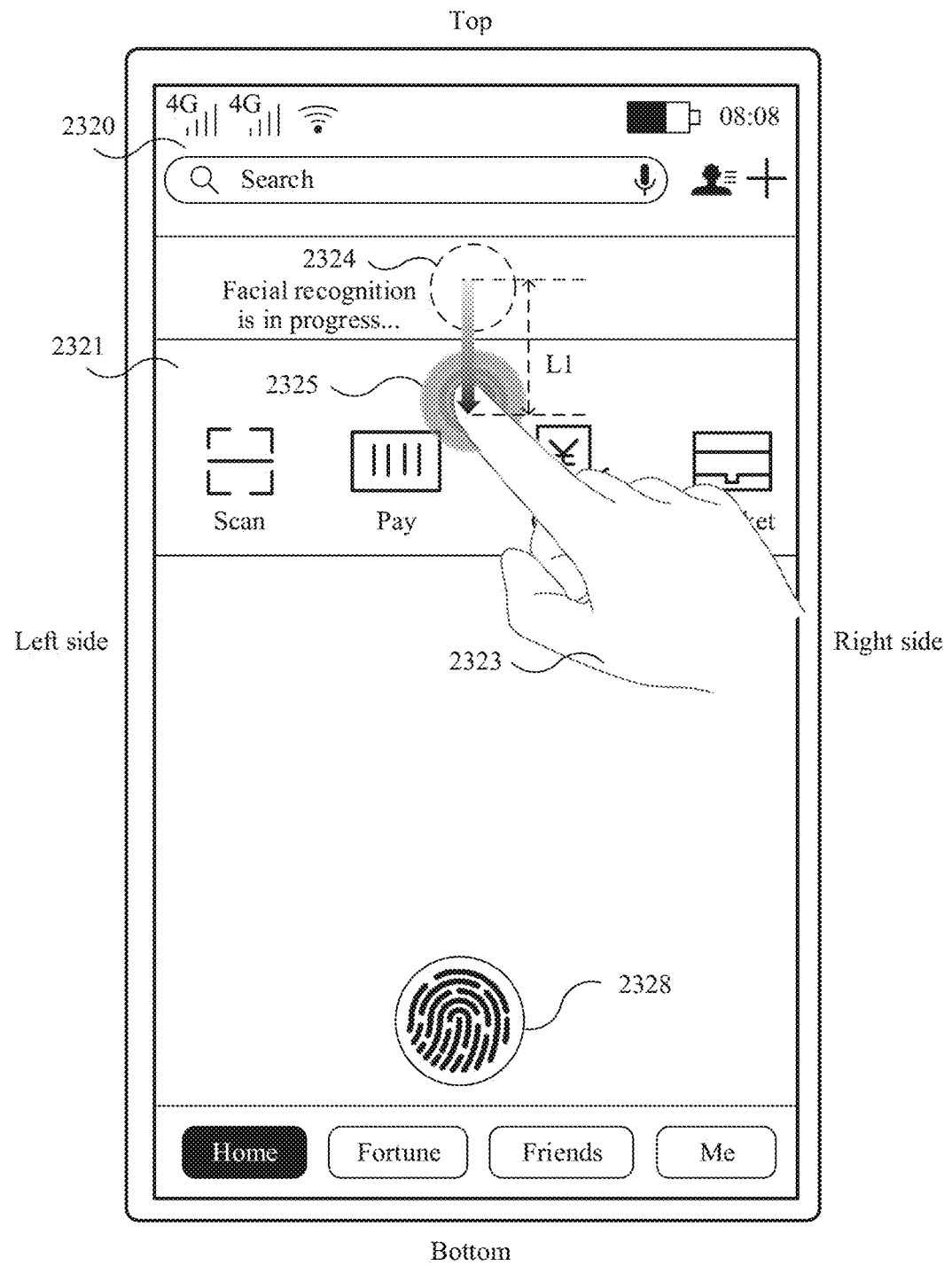

As shown in FIG. 23d, in a process in which the electronic device receives the sliding operation 2323 of the user, when the electronic device determines that a sliding distance of a finger of the user (which may be a distance between a current location 2324 of the finger of the user and the start location 2325) is greater than a first distance threshold (L1), the electronic device may collect face information by using a facial recognition module, and display a fingerprint recognition icon 2328 on the touchscreen.

After collecting the face information of the user, the electronic device may determine whether the face information matches a stored face information template. If yes, the electronic device may output a first prompt by using the touchscreen, to notify the user that facial recognition succeeds and open a payment code (for example, a payment barcode or a payment QR code).

Figure 23E:
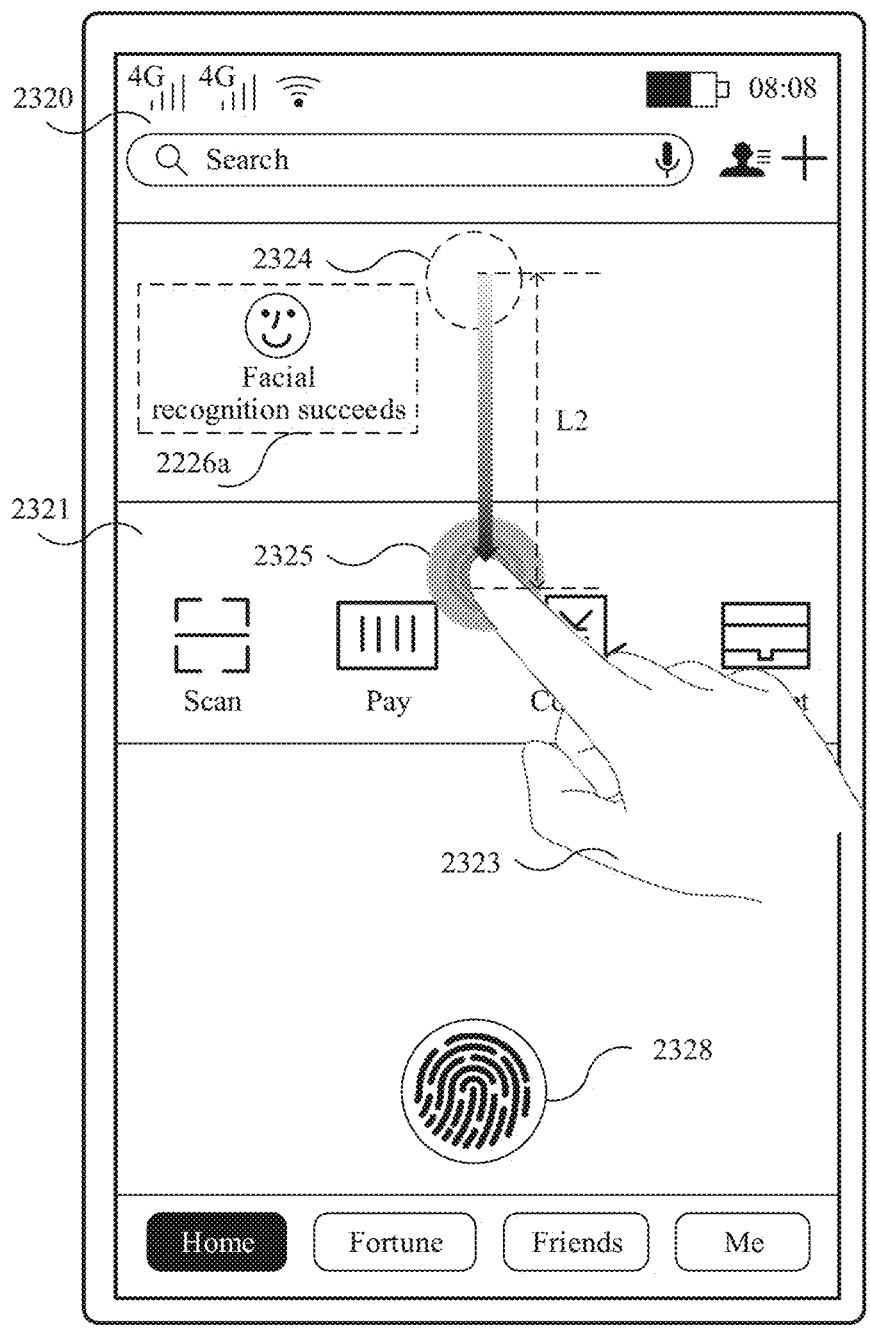
Figure 23F:
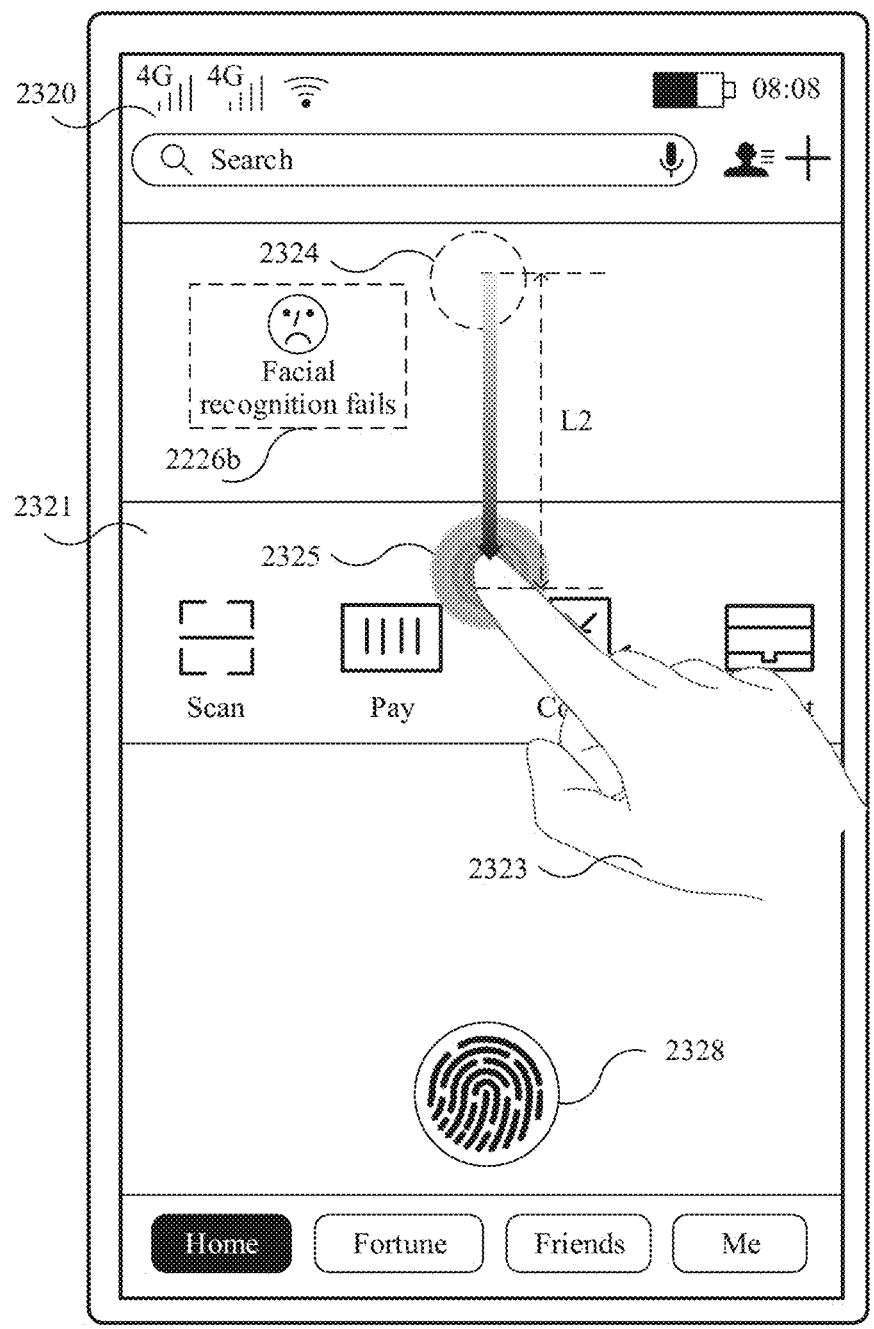
Figure 23G:
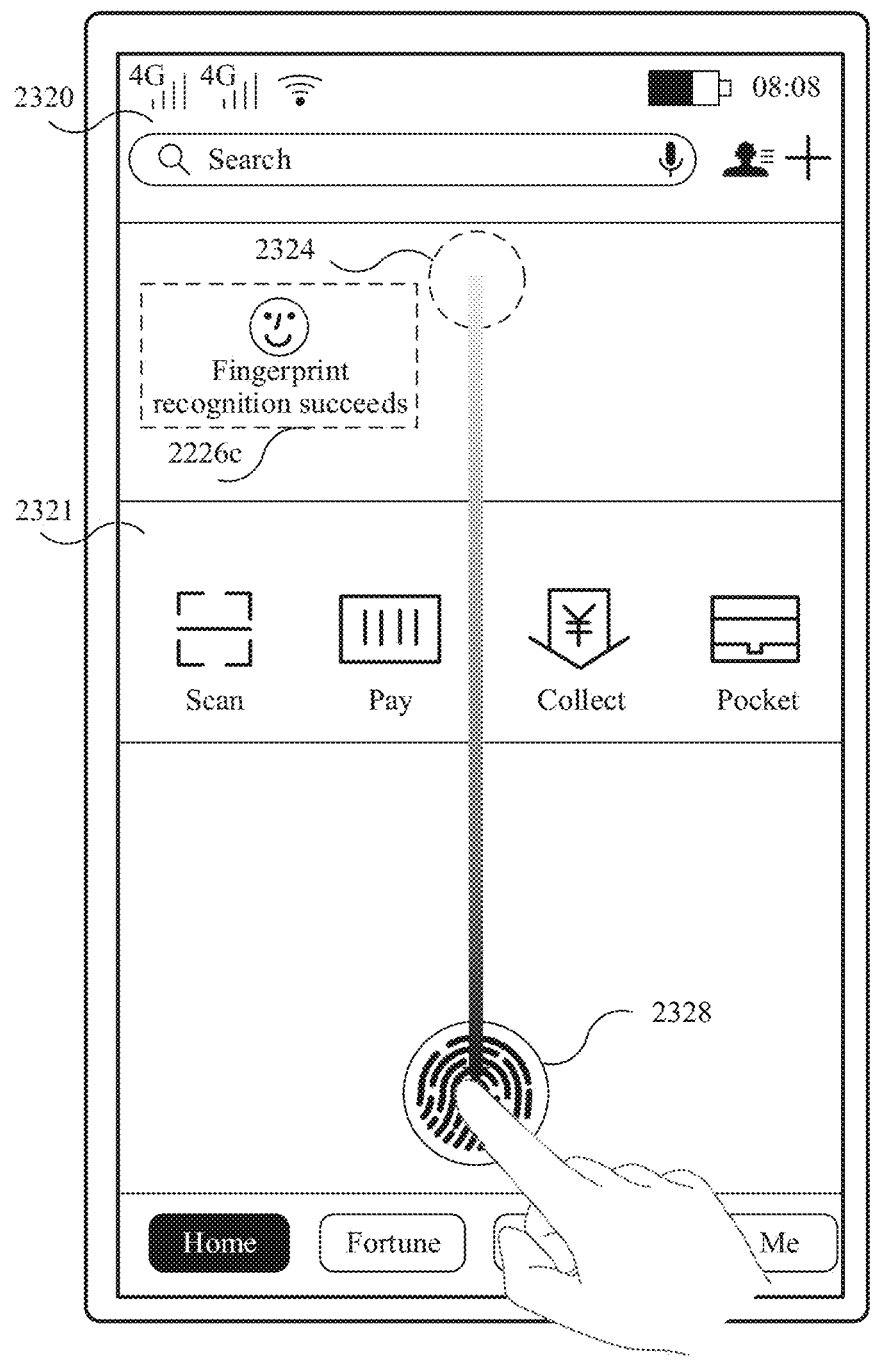

For example, as shown in FIG. 23e, in the process in which the electronic device receives the sliding operation 2323 of the user, when the electronic device determines that the sliding distance of the finger of the user (which may be the distance between the current location 2325 of the finger of the user and the start location 2324) is greater than a second distance threshold (L2), if the collected face information matches the stored face information template, the touchscreen may display a first prompt 2326a, and open a payment interface 2330 shown in FIG. 23g. The payment interface 2330 includes a payment barcode, a payment QR code, a payment digital code, a payment method setting entry, and the like.

After collecting the face information of the user, the electronic device may determine whether the face information matches the stored face information template. If no, the electronic device may output a second prompt by using the touchscreen, to notify the user that facial recognition fails.

For example, as shown in FIG. 23f, in the process in which the electronic device receives the sliding operation 2323 of the user, when the electronic device determines that the sliding distance of the finger of the user (which may be the distance between the current location 2325 of the finger of the user and the start location 2024) is greater than the second distance threshold (L2), if the collected face information does not match the stored face information template, the touchscreen may display a second prompt 2326b.

When facial recognition fails, the electronic device may receive a touch operation of the user for the fingerprint recognition icon, and in response to this input operation for the fingerprint recognition icon, the electronic device may collect a fingerprint of the user. If fingerprint recognition succeeds, the electronic device may open a payment code (for example, a payment barcode or a payment QR code).

Figure 23H:
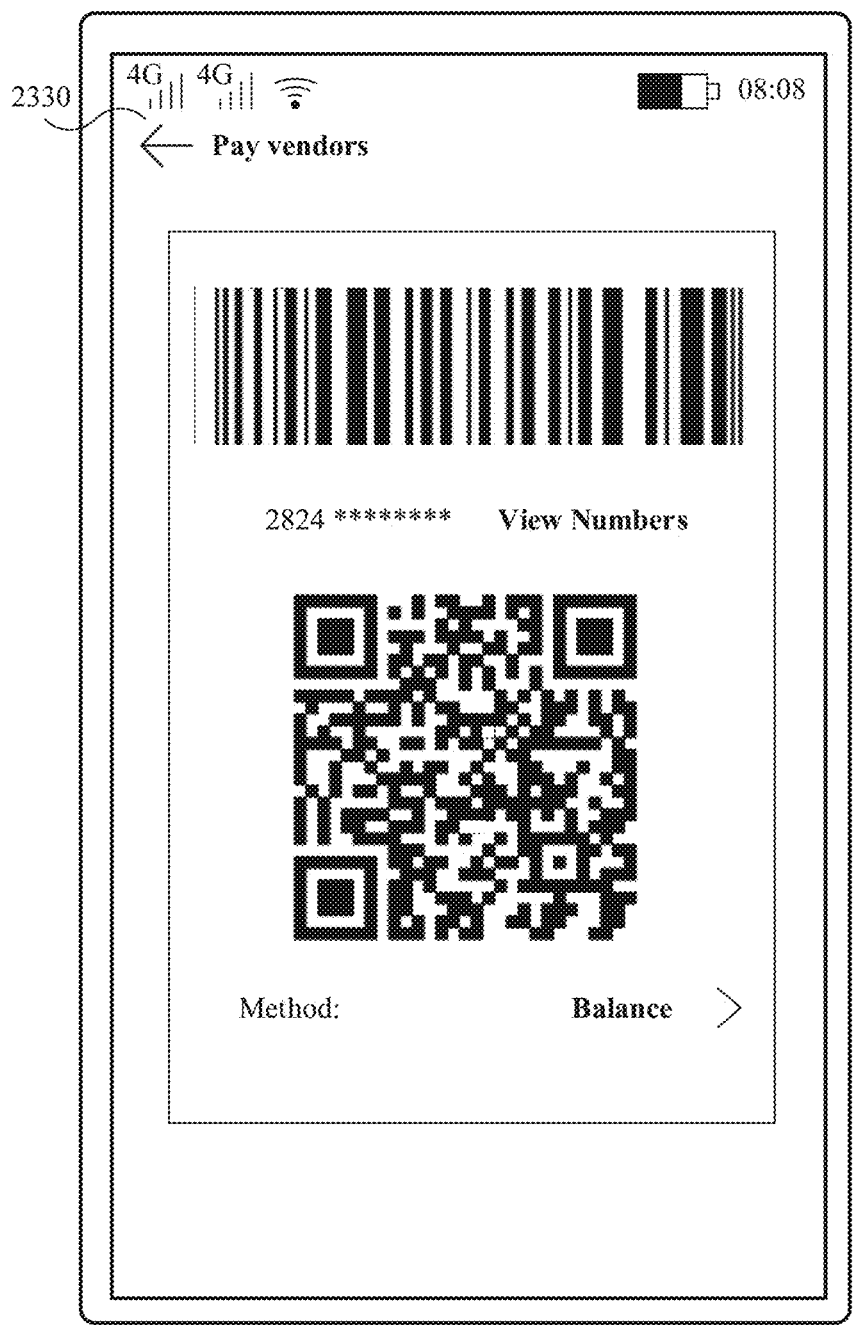

For example, as shown in FIG. 23g, after facial recognition fails, the finger of the user may continue to slide until the finger reaches a location of the fingerprint recognition icon 2328. When the finger slides onto the fingerprint recognition icon 2328, the electronic device receives a touch operation of the user for the fingerprint recognition icon 2028. In response to the touch operation for the fingerprint recognition icon 2328, the electronic device may collect the fingerprint information of the finger of the user by using a fingerprint recognition module, and perform matching with a stored fingerprint information template. If the collected fingerprint information of the finger of the user matches the stored fingerprint information template (in other words, fingerprint recognition succeeds), the electronic device may open a payment interface 2330 shown in FIG. 23h. The payment interface 2330 may include a payment barcode, a payment QR code, a payment digital code, a payment method setting entry, and the like.

In conclusion, the foregoing embodiments are merely intended for describing the technical solutions of this application, but not for limiting this application. Although this application is described in detail with reference to the foregoing embodiments, a person of ordinary skill in the art may understand that they may still make modifications to the technical solutions described in the foregoing embodiments or make equivalent replacements to some technical features thereof, without departing from the scope of the technical solutions of the embodiments of this application.

What is claimed is:

1. A method, comprising:
    displaying, by an electronic device, a gallery application interface, wherein the gallery application interface is not a lock screen interface, wherein the gallery application interface displays at least one album entry, and wherein the at least one album entry is different from a hidden albums entry;
    receiving, by the electronic device, a sliding operation of a user in the gallery application interface, wherein a start location of the sliding operation is a top of the gallery application interface, and wherein a trend of the sliding operation is from the top of the gallery application interface to a bottom of the gallery application interface;
    in response to determining that a sliding distance of the sliding operation is greater than a first distance threshold or duration of the sliding operation is greater than a first duration threshold, collecting, by the electronic device, face information of the user as collected face information; and
    in response to determining that the collected face information matches a stored face information template:
        displaying, by the electronic device, the hidden albums entry; and
        in response to selection of the hidden albums entry by the user, displaying, by the electronic device, a hidden albums interface; or
    in response to determining that the collected face information matches a stored face information template, displaying, by the electronic device, the hidden albums interface, wherein the hidden albums interface comprises one or more hidden photos.

2. The method according to claim 1, wherein the method further comprises:
    in response to determining that the sliding distance is greater than the first distance threshold, displaying, by the electronic device, a fingerprint recognition icon in an area corresponding to fingerprint recognition of the electronic device;
    in response to determining that the duration of the sliding operation is greater than the first duration threshold, displaying, by the electronic device, the fingerprint recognition icon in the area corresponding to the fingerprint recognition of the electronic device; or
    in response to determining that the collected face information does not match the stored face information template, displaying, by the electronic device, the fingerprint recognition icon in the area corresponding to the fingerprint recognition of the electronic device.

3. The method according to claim 2, wherein the method further comprises:
    in response to the electronic device detecting that the user touches the fingerprint recognition icon, collecting, by the electronic device, fingerprint information of the user as collected fingerprint information;
    determining, by the electronic device, whether the collected fingerprint information matches a stored fingerprint information template; and
    in response to determining that the collected fingerprint information matches the stored fingerprint information template;
    displaying, by the electronic device, the hidden albums entry in the gallery application interface; or
    displaying, by the electronic device, the hidden albums interface.

4. The method according to claim 3, wherein the method further comprises:
    during or before the displaying, by the electronic device, the fingerprint recognition icon, enabling the fingerprint recognition of the electronic device; and
    after the electronic device completes a process of matching the collected fingerprint information with the stored fingerprint information template, not displaying the fingerprint recognition icon.

5. The method according to claim 1, wherein the method further comprises:
    displaying, by the electronic device, in a process of matching the collected face information with the stored face information template, a prompt indicating that facial recognition is in progress, wherein the prompt indicating that recognition is in progress is displayed in an area that is emptied after the at least one album entry moves downward.

6. The method according to claim 1, wherein the method further comprises:
    in response to determining that the face information matches the stored face information template, displaying, by the electronic device, a first prompt to notify the user that facial recognition succeeds; or
    in response to determining that the face information does not match the stored face information template, displaying, by the electronic device, a second prompt, to notify the user that facial recognition fails, wherein the first prompt and the second prompt are displayed in an area that is emptied after the at least one album entry moves downward.

7. The method according to claim 1, wherein the method further comprises:
    after the electronic device completes a process of matching the collected face information with the stored face information template, disabling collection of the face information.

8. A method, comprising:
- displaying, by an electronic device, a page of a home screen, wherein the page of the home screen is not a lock screen, wherein the page of the home screen displays an icon of at least one application, and wherein the icon of the at least one application is different from an icon of a hidden application;
- receiving, by the electronic device, a sliding operation of a user on the page of the home screen;
- in response to determining that a sliding distance of the sliding operation is greater than a first distance threshold or duration of the sliding operation is greater than a first duration threshold, collecting, by the electronic device, face information of the user as collected face information; and
- in response to determining that the collected face information matches a stored face information template, displaying, by the electronic device, the icon of the hidden application.

9. The method according to claim 8, wherein
- the page of the home screen is a rightmost page of the home screen, wherein a start location of the sliding operation is a right side of the rightmost page, and wherein a trend of the sliding operation is leftward; or wherein
- the page of the home screen is a leftmost page of the home screen, wherein a start location of the sliding operation is a left side of the leftmost page, and wherein a trend of the sliding operation is rightward.

10. The method according to claim 8, wherein the method further comprises:
- in response to determining that the sliding distance is greater than the first distance threshold, displaying, by the electronic device, a fingerprint recognition icon in an area corresponding to fingerprint recognition of the electronic device;
- in response to determining that the duration of the sliding operation is greater than the first duration threshold, displaying, by the electronic device, the fingerprint recognition icon in the area corresponding to the fingerprint recognition of the electronic device; or
- in response to determining that the collected face information does not match the stored face information template, displaying, by the electronic device, the fingerprint recognition icon in the area corresponding to the fingerprint recognition of the electronic device.

11. The method according to claim 10, wherein the method further comprises:
- in response to the electronic device detecting that the user touches the fingerprint recognition icon, collecting, by the electronic device, fingerprint information of the user as collected fingerprint information;
- determining, by the electronic device, whether the collected fingerprint information matches a stored fingerprint information template; and
- in response to determining that the collected fingerprint information matches the stored fingerprint information template, displaying, by the electronic device, the icon of the hidden application.

12. The method according to claim 11, wherein the method further comprises:
- during or before the displaying, by the electronic device, the fingerprint recognition icon, enabling the fingerprint recognition of the electronic device; and
- after the electronic device completes a process of matching the collected fingerprint information with the stored fingerprint information template, not displaying the fingerprint recognition icon.

13. The method according to claim 8, wherein the method further comprises:
- displaying, by the electronic device, in a process of matching the collected face information with the stored face information template, a prompt indicating that facial recognition is in progress, wherein the prompt indicating that recognition is in progress is displayed in an area that is emptied after the icon of the at least one application moves.

14. The method according to claim 8, wherein the method further comprises:
- in response to determining that the face information matches the stored face information template, displaying, by the electronic device, a first prompt, to notify the user that facial recognition succeeds; or
- in response to determining that the face information does not match the stored face information template, displaying, by the electronic device, a second prompt, to notify the user that facial recognition fails, wherein
- the first prompt and the second prompt are displayed in an area that is emptied after the icon of the at least one application moves.

15. The method according to claim 8, wherein the method further comprises:
- after the electronic device completes a process of matching the collected face information with the stored face information template, disabling collection of the face information.

16. A method, comprising:
- displaying, by an electronic device, a system settings interface, wherein the system settings interface comprises at least one settings entry, and wherein the system settings interface is not a lock screen interface;
- receiving, by the electronic device, a sliding operation of a user in the system settings interface, wherein a start location of the sliding operation is a top of the system settings interface, and wherein a trend of the sliding operation is toward a bottom of the system setting interface;
- in response to determining that a sliding distance of the sliding operation is greater than a first distance threshold or duration of the sliding operation is greater than a first duration threshold, collecting, by the electronic device, face information of the user as collected face information; and
- in response to determining that the collected face information matches a stored face information template, logging in, by the electronic device, to a system account associated with the stored face information template.

17. The method according to claim 16, wherein the method further comprises:
- in response to determining that the sliding distance is greater than the first distance threshold, displaying, by the electronic device, a fingerprint recognition icon in an area corresponding to fingerprint recognition of the electronic device;
- in response to determining that the duration of the sliding operation is greater than the first duration threshold, displaying, by the electronic device, the fingerprint recognition icon in the area corresponding to the fingerprint recognition of the electronic device; or
- in response to determining that the collected face information does not match the stored face information template, displaying, by the electronic device, the fingerprint recognition icon in the area corresponding to the fingerprint recognition of the electronic device.

18. The method according to claim 17, wherein the method further comprises:

in response to the electronic device detecting that the user touches the fingerprint recognition icon, collecting, by the electronic device, fingerprint information of the user as collected fingerprint information;

determining, by the electronic device, whether the collected fingerprint information matches a stored fingerprint information template; and in response to determining that the collected fingerprint information matches the stored fingerprint information template, logging in, by the electronic device, to the system account associated with the stored fingerprint information template.

19. The method according to claim 16, wherein the method further comprises:

displaying, by the electronic device, in a process of matching the collected face information with the stored face information template, a prompt indicating that facial recognition is in progress, wherein the prompt indicating that recognition is in progress is displayed in an area that is emptied after the at least one settings entry moves downward.

20. The method according to claim 16, wherein the method further comprises:

in response to determining that the face information matches the stored face information template, displaying, by the electronic device, a first prompt, to notify the user that facial recognition succeeds; or in response to determining that the face information does not match the stored face information template, displaying, by the electronic device, a second prompt, to notify the user that facial recognition fails, wherein the first prompt and the second prompt are displayed in an area that is emptied after the at least one settings entry moves downward.

* * * * *

UNITED STATES PATENT AND TRADEMARK OFFICE
CERTIFICATE OF CORRECTION

PATENT NO. : 11,500,534 B2
APPLICATION NO. : 17/296852
DATED : November 15, 2022
INVENTOR(S) : Jie Xu It is certified that error appears in the above-identified patent and that said Letters Patent is hereby corrected as shown below:

In the Claims

Column 48/Line 26 - In Claim 3, delete "template;" and insert -- template: --.

Signed and Sealed this
Fourteenth Day of November, 2023

Katherine Kelly Vidal
*Director of the United States Patent and Trademark Office*